(12) United States Patent
Kim et al.

(10) Patent No.: US 12,019,846 B2
(45) Date of Patent: Jun. 25, 2024

(54) APPARATUS FOR SEARCHING USING MULTIPLE DISPLAYS

(71) Applicant: HYUNDAI MOBIS CO., LTD., Seoul (KR)

(72) Inventors: Kyung Hoon Kim, Yongin-si (KR); Tae Hun Kim, Seongnam-si (KR); Seung Hwan Lee, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 80 days.

(21) Appl. No.: 17/586,362

(22) Filed: Jan. 27, 2022

(65) Prior Publication Data
US 2022/0236840 A1    Jul. 28, 2022

(30) Foreign Application Priority Data

| Jan. 27, 2021 | (KR) | .................. 10-2021-0011861 |
| Jan. 27, 2021 | (KR) | .................. 10-2021-0011862 |
| Jan. 27, 2021 | (KR) | .................. 10-2021-0011863 |
| Jan. 27, 2021 | (KR) | .................. 10-2021-0011864 |
| Jan. 27, 2021 | (KR) | .................. 10-2021-0011865 |
| Jan. 27, 2021 | (KR) | .................. 10-2021-0011866 |
| Jan. 27, 2021 | (KR) | .................. 10-2021-0011867 |

(51) Int. Cl.
*G06F 3/0482* (2013.01)
*B60K 35/00* (2006.01)
(Continued)

(52) U.S. Cl.
CPC ............ *G06F 3/0482* (2013.01); *B60K 35/00* (2013.01); *B60K 35/60* (2024.01);
(Continued)

(58) Field of Classification Search
CPC ... G06F 3/0482; G06F 3/04817; B60K 35/00; B60K 37/02
See application file for complete search history.

(56) References Cited

U.S. PATENT DOCUMENTS 9,600,259 B2 *   3/2017   Shapira ................. G06F 3/0482
9,940,387 B2 *   4/2018   Holt ..................... G06F 16/3322
(Continued)

OTHER PUBLICATIONS

Extended European Search Report dated Jun. 27, 2022 in corresponding European Patent Application No. 22153690.7.
(Continued)

*Primary Examiner* — Anil K Bhargava
(74) *Attorney, Agent, or Firm* — Novo TechIP International PLLC

(57) ABSTRACT

The present invention relates to an apparatus for searching using multiple displays. The apparatus for searching using multiple displays includes an input part configured to receive an integrated search command signal, a memory in which a program for controlling an integrated search function to be displayed on at least one of an upper display and a lower display according to the integrated search command signal is stored, and a processor configured to execute the program, wherein the processor controls display of an integrated search window for at least one of the lower display disposed in a cockpit and the upper display disposed above the lower display.

3 Claims, 156 Drawing Sheets

(51) Int. Cl.
*B60K 35/60* (2024.01)
*G06F 3/04817* (2022.01)
*B60K 35/10* (2024.01)
*B60K 35/22* (2024.01)

(52) U.S. Cl.
CPC .......... *G06F 3/04817* (2013.01); *B60K 35/10* (2024.01); *B60K 35/22* (2024.01); *B60K 2360/115* (2024.01); *B60K 2360/1438* (2024.01)

(56) References Cited

U.S. PATENT DOCUMENTS

| | | | |
|---|---|---|---|
| 10,332,170 B2* | 6/2019 | Isaacson | G06Q 20/384 |
| 2008/0077318 A1* | 3/2008 | Saito | G06F 16/29 |
| | | | 701/516 |
| 2009/0281727 A1* | 11/2009 | Nagatani | G01C 21/3688 |
| | | | 701/414 |
| 2010/0090868 A1* | 4/2010 | Hall | B64D 43/00 |
| | | | 701/14 |
| 2011/0264681 A1* | 10/2011 | Kimberlin | G06F 16/90332 |
| | | | 707/767 |
| 2015/0161291 A1* | 6/2015 | Gur | G06F 16/90332 |
| | | | 707/722 |
| 2015/0309682 A1* | 10/2015 | Lee | G06F 3/048 |
| | | | 715/780 |
| 2016/0224233 A1* | 8/2016 | Phang | H04N 21/4828 |
| 2016/0342406 A1* | 11/2016 | Ahmed | G06F 8/61 |
| 2017/0010772 A1* | 1/2017 | Matthews | G06F 9/451 |
| 2017/0212926 A1* | 7/2017 | Amacker | G06F 16/2455 |
| 2020/0104427 A1* | 4/2020 | Long | G06N 3/04 |
| 2022/0156820 A1* | 5/2022 | Isaacson | H04W 12/08 |
| 2022/0172039 A1* | 6/2022 | Liu | G06N 3/08 |

OTHER PUBLICATIONS

"Sensus Navigation", Oct. 31, 2020, pp. 1-42, XP055931240, Retrieved from the Internet: URL:https://web. archive.org/web/20201031170405if_/https://az685612.vo.msecnd.net/pdfs/19w46/SensusNavigation_MY20_en-GB_TP31734/SensusNavigation_MY20_en-GB_TP31734.pdf [retrieved on Jun. 14, 2022].

"Mazda Navigation System Owner's Manual", Jan. 1, 2019, pp. 1-84, XP055932113, Retrieved from the Internet: URL:https://owners-manual.mazda.com/gen/en/navi/gen_navi_en_vl.pdf [retrieved on Jun. 16, 2022].

XP93106991A, "2019 Infiniti Intouch Owner's Manual", Aug. 2019.

Car Confections, XP93107117A, "Infiniti In Touch 2017 Detailed Tutorial: Tech Help", Jun. 14, 2016.

* cited by examiner

[UP TO SIX DISPLAYS IN SCREEN]

[PROFILE LIST IN POP-UP IS CENTERED]

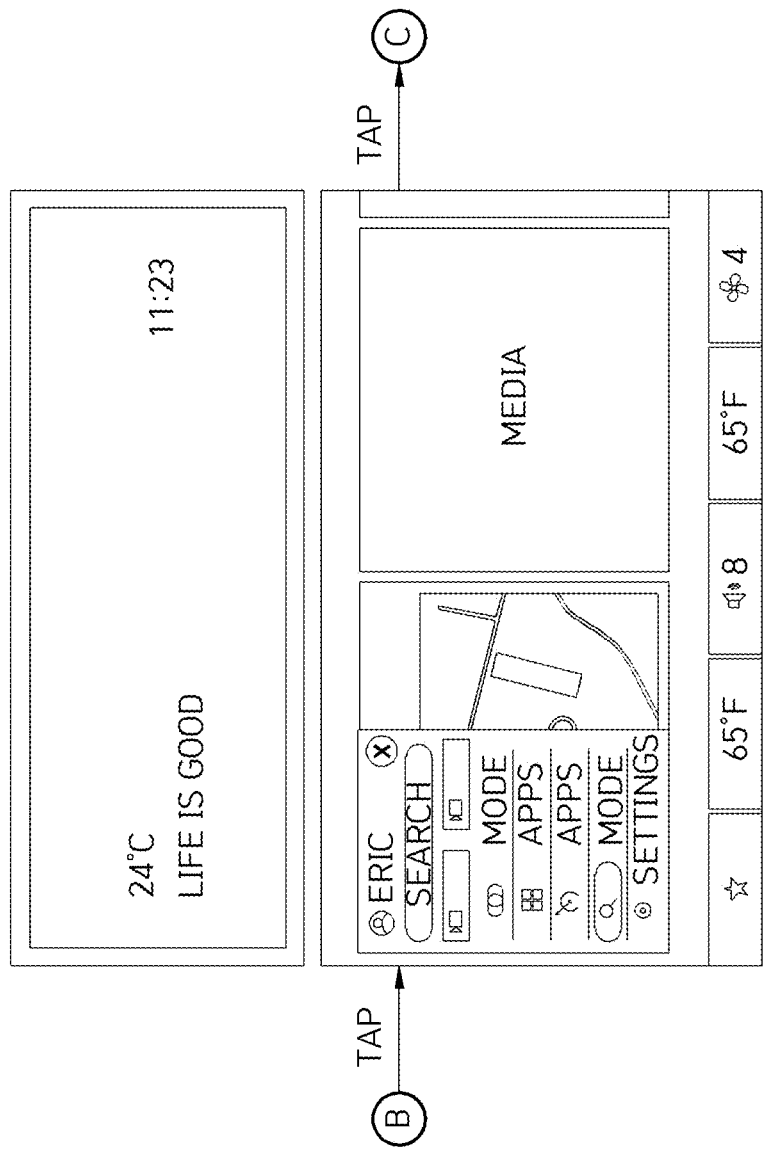

FIG. 8A

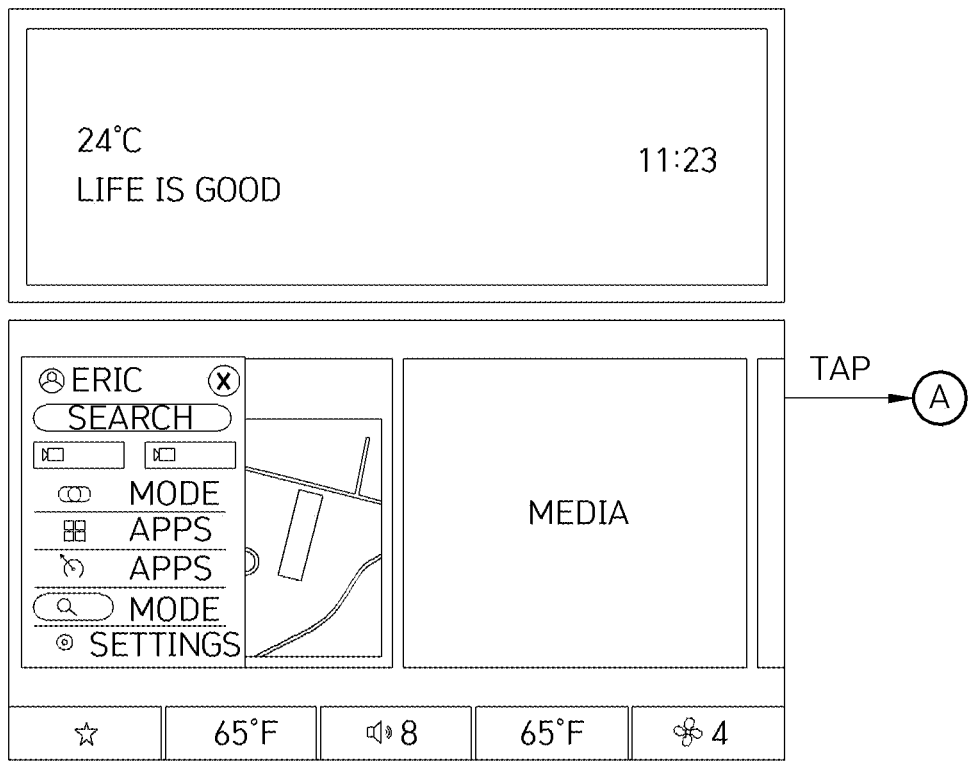

[DESCRIPTION]
- WHEN MOVING TO INTEGRATED SEARCH, INTEGRATED SEARCH POP-UP IS PROVIDED
- RECENT USAGE LIST BY MEDIA/PHONE/DESTINATION IS DISPLAYED
- WHEN MORE THAN ONE CHARACTER IS INPUT, SEARCH RESULT BY MEDIA/PHONE/DESTINATION IS DISPLAYED

[DESCRIPTION]
(1) WHEN SEARCH RESULT EXECUTION APP IS IN SCREEN
- EXECUTED IN CORRESPONDING POSITION (2) WHEN SEARCH RESULT EXECUTION APP IS NOT IN SCREEN
- NAVIGATION: ALWAYS EXECUTED AT NUMBER 1 (LEFTMOST)
- MEDIA/PHONE
  ⌞ WHEN THERE IS NO NAVIGATION: EXECUTED AT NUMBER 1
  ⌞ WHEN THERE IS NAVIGATION: EXECUTED AT NUMBER 2

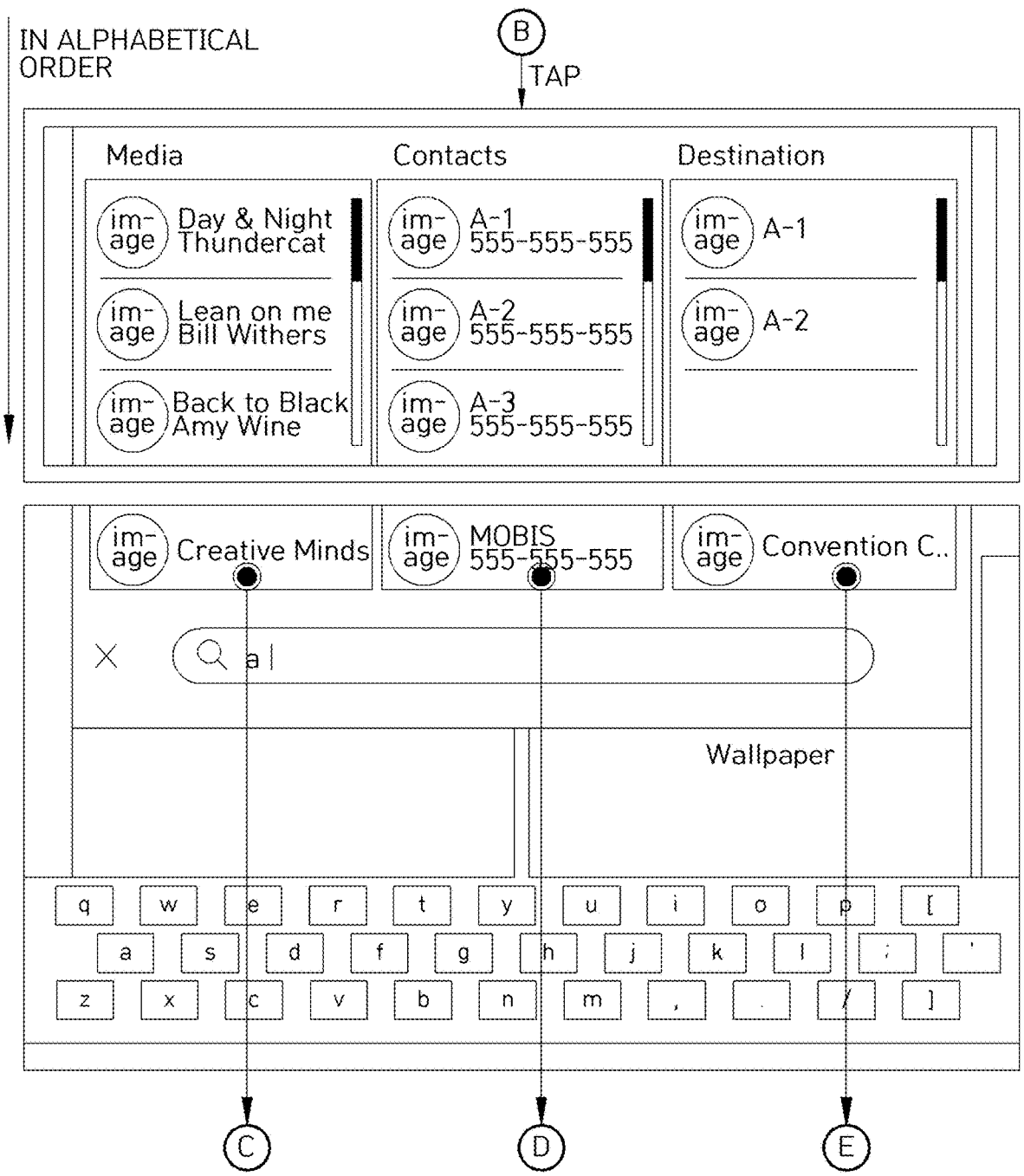

- MEDIA ARE REPRODUCED IN MEDIA WIDGET

- ENTER NAVIGATION ROUTE PREVIEW SCREEN

[Media Search - 13.2"]

[ Phone Search - 13.2" ]

- WHEN MEDIA/PHONE SEARCH BUTTON IS TOUCHED, INTEGRATED SEARCH WINDOW IS CALLED

- MEDIA ARE REPRODUCED

- ENTER NAVIGATION ROUTE PREVIEW SCREEN

- WHEN FRONT-FACING CAMERA IS OPERATED, OPERATION IS PERFORMED BY KNOB ANGLE ADJUSTMENT FUNCTION
- ANGLE OF TOP LEFT ICON IS CHANGE IN REAL TIME ACCORDING TO ANGLE
- WHEN FRONT-FACING CAMERA IS OPERATED, CHANGE IS MADE BY ANGLE ADJUSTMENT MENU AT KNOB VOLUME POSITION
- KNOB AREA FRONT-FACING CAMERA ICON IS DISPLAYED

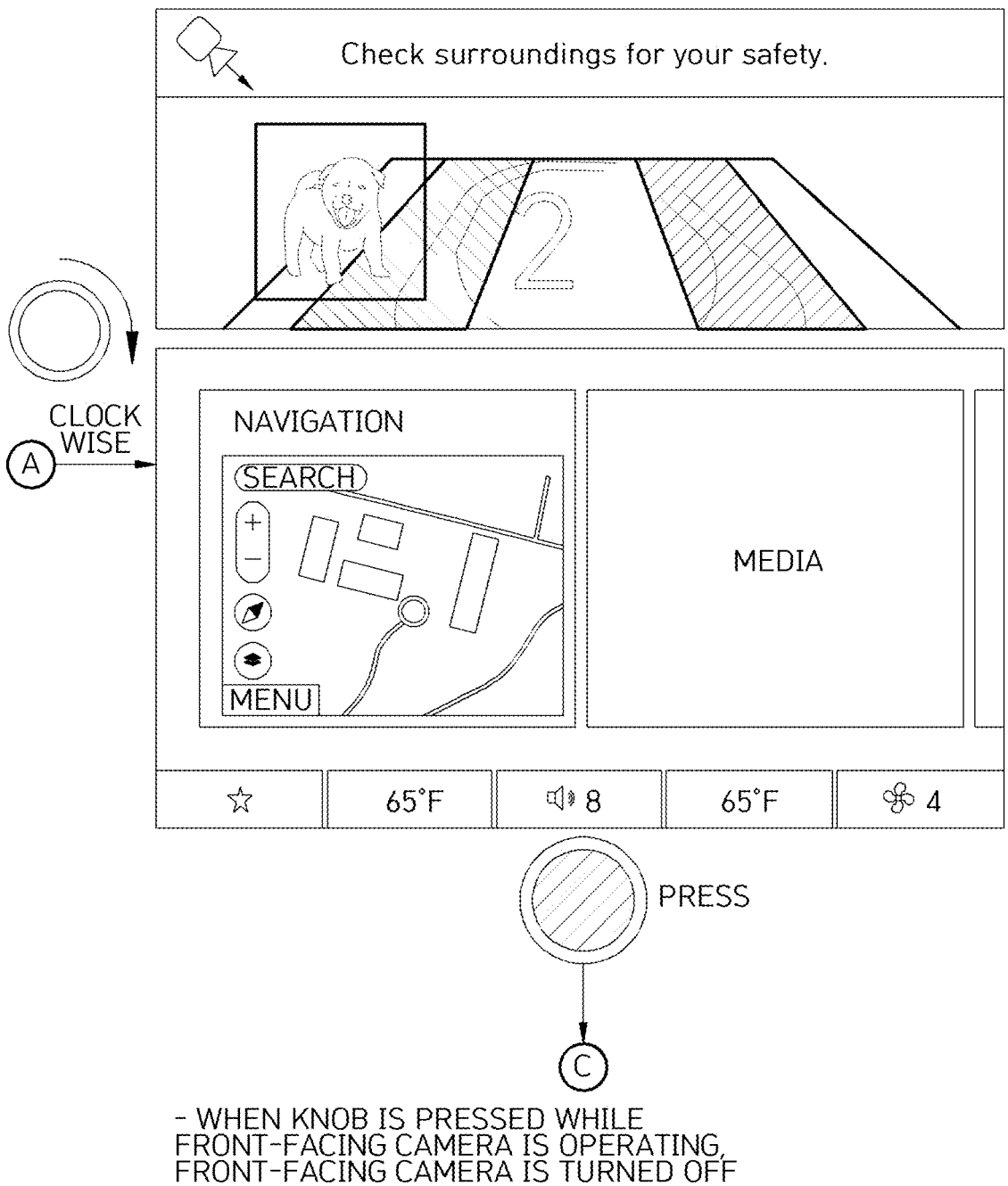

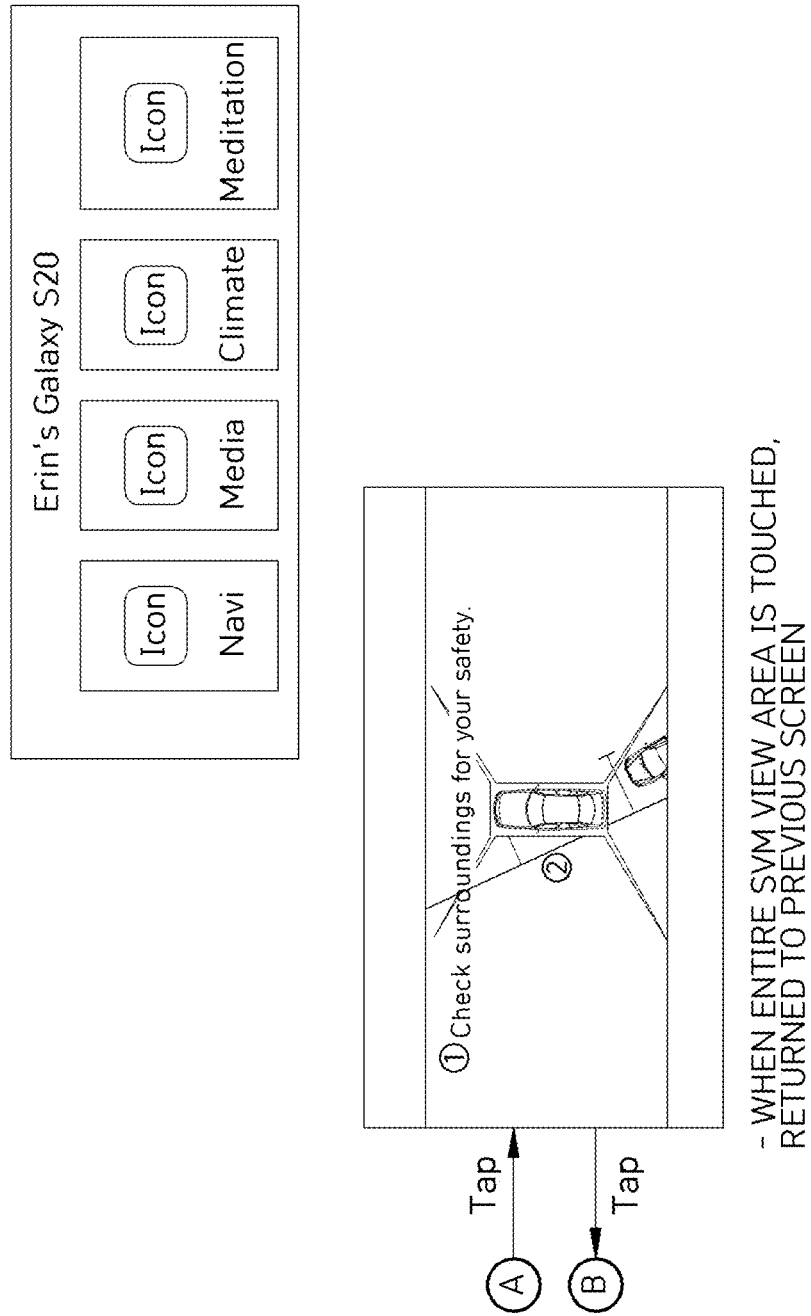

- BEFORE DRIVING, UPPER AND LOWER APPS ARE OPERATED SEPARATELY
- VERTICAL LINKAGE IS NOT POSSIBLE ACCORDING TO PINCH IN & OUT AND PANNING

- ROUTE CONFIRMATION BY PINCHING IN & OUT

- WHEN [START] BUTTON IS TOUCHED,
SYNCHRONIZED AT SAME TIME AS DRIVING STARTS

- 12.3", 3D DRIVING IMAGE STARTS

- 13.2", 2D DRIVING IMAGE STARTS, AND PINCH IN&OUT OPERATION

- BEFORE DRIVING, UPPER AND LOWER APPS ARE OPERATED SEPARATELY
- VERTICAL LINKAGE IS NOT POSSIBLE ACCORDING TO PINCH IN & OUT AND PANNING

- ROUTE CONFIRMATION BY PINCHING IN & OUT

- WHEN [START] BUTTON IS TOUCHED,
SYNCHRONIZED AT SAME TIME AS DRIVING STARTS

- 12.3", 3D DRIVING IMAGE STARTS

- 13.2", 2D DRIVING IMAGE STARTS,
AND PINCH IN&OUT OPERATION

[3D NAVIGATION REPRODUCTION]

- PLAYER IS DISPLAYED IN 12.3" WHEN MOVED UP TO UPPER END OF APP
- 13.2", CHANGED TO LIST SCREEN
- WHEN CHANGED TO B DEVICE, B DEVICE LIST IS DISPLAYED

- 13.2", SOUND PATH SETTING BUTTON -> CHANGEABLE TO HEADREST SPEAKER

- PLAYER IS DISPLAYED IN 12.3" WHEN MOVED UP TO UPPER END OF APP
- 13.2", CHANGED TO LIST SCREEN

- PLAYER IS DISPLAYED IN 12.3" WHEN MOVED UP TO UPPER END OF APP
- SOUND SOURCE REPRODUCTION IS MAINTAINED WHILE THE PLAYER IS MOVING

- 13.2", SOUND PATH SETTING BUTTON -> CHANGEABLE TO HEADREST SPEAKER

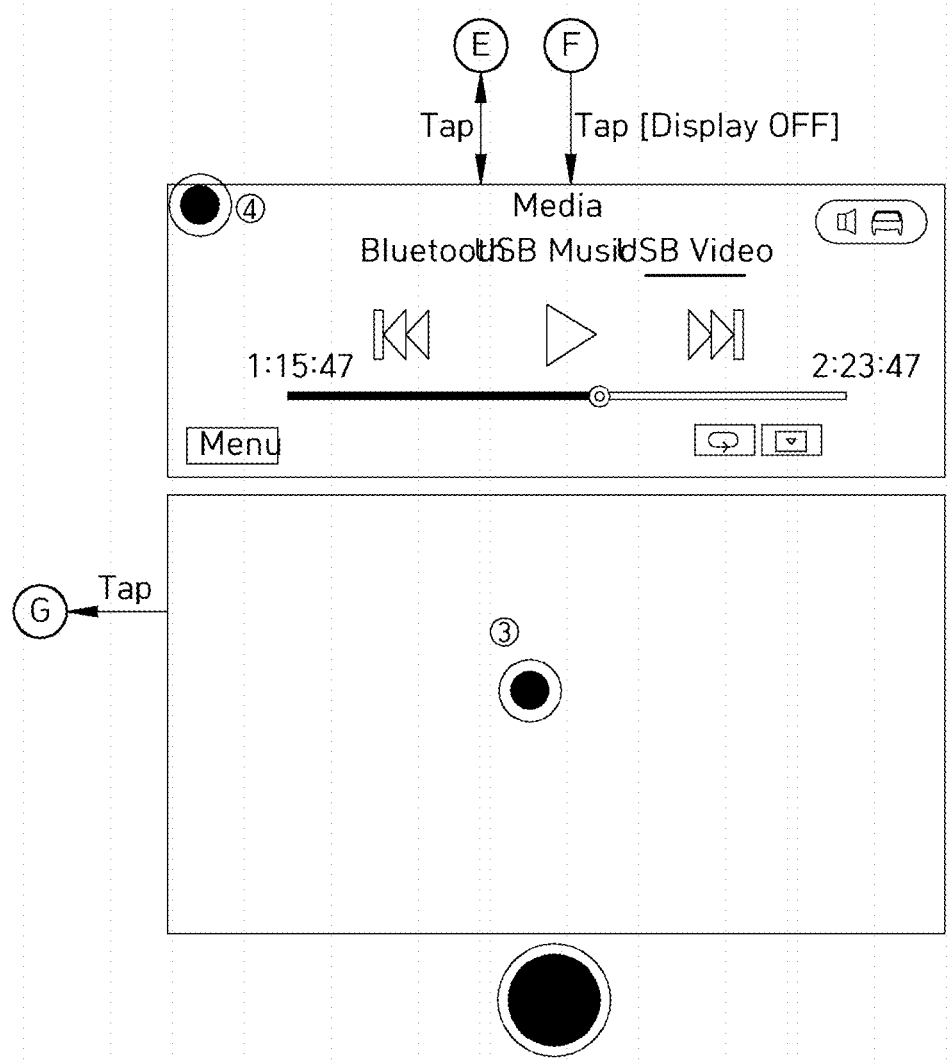

- IN PASSENGER MODE, MEDIA SOUND SOURCE REPRODUCED IN 13.2" IS OUTPUT THROUGH BLOOMING SOUND
- MEDIA SOUND SOURCE REPRODUCED IN 12.3" IS OUTPUT THROUGH HEADREST SPEAKER
- IN PASSENGER MODE, EACH SPEAKER FORMS SOUND BUBBLE TO PREVENT SOUND SOURCES PROVIDED TO DRIVER AND PASSENGER FROM INTERFERING WITH EACH OTHER

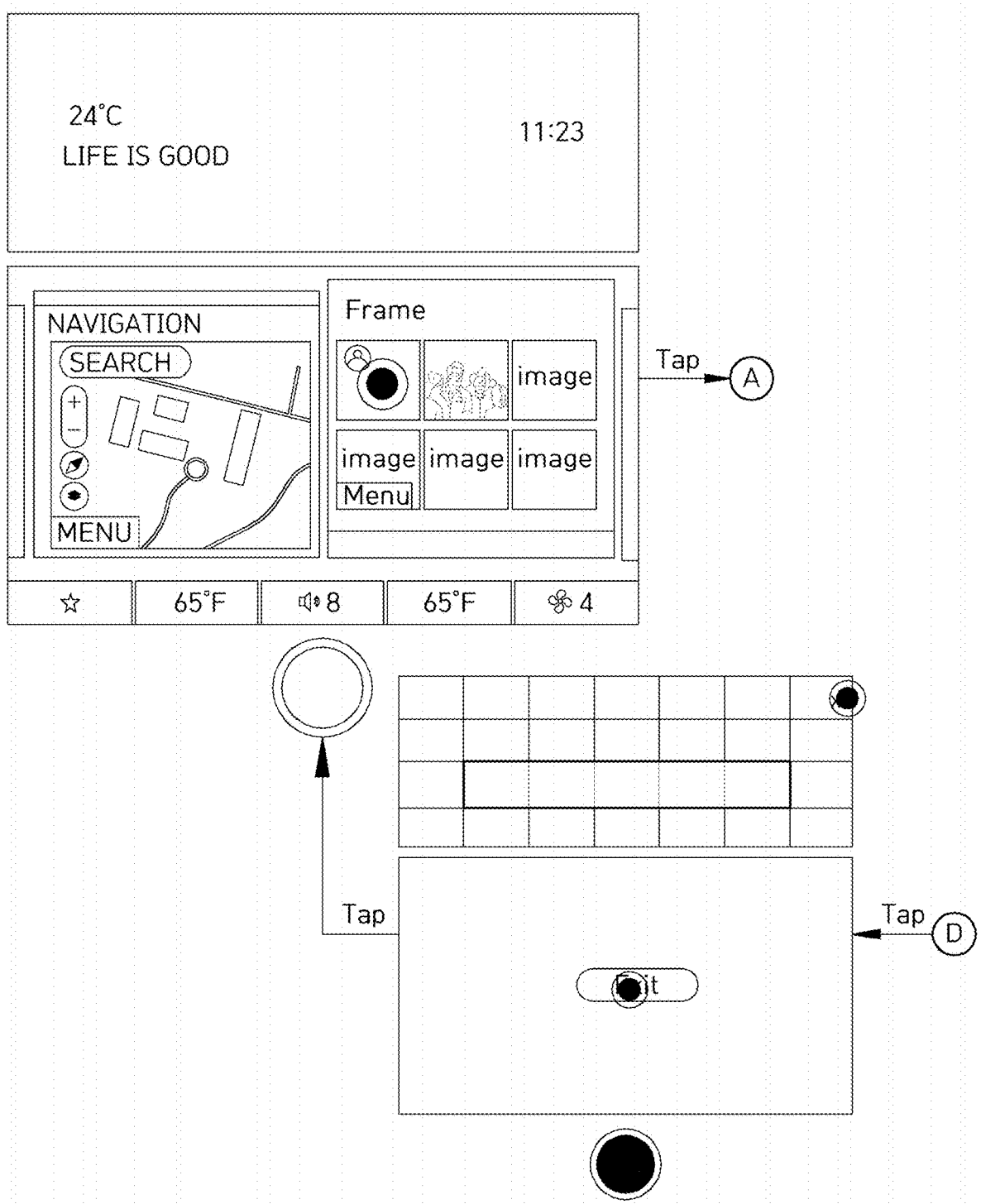

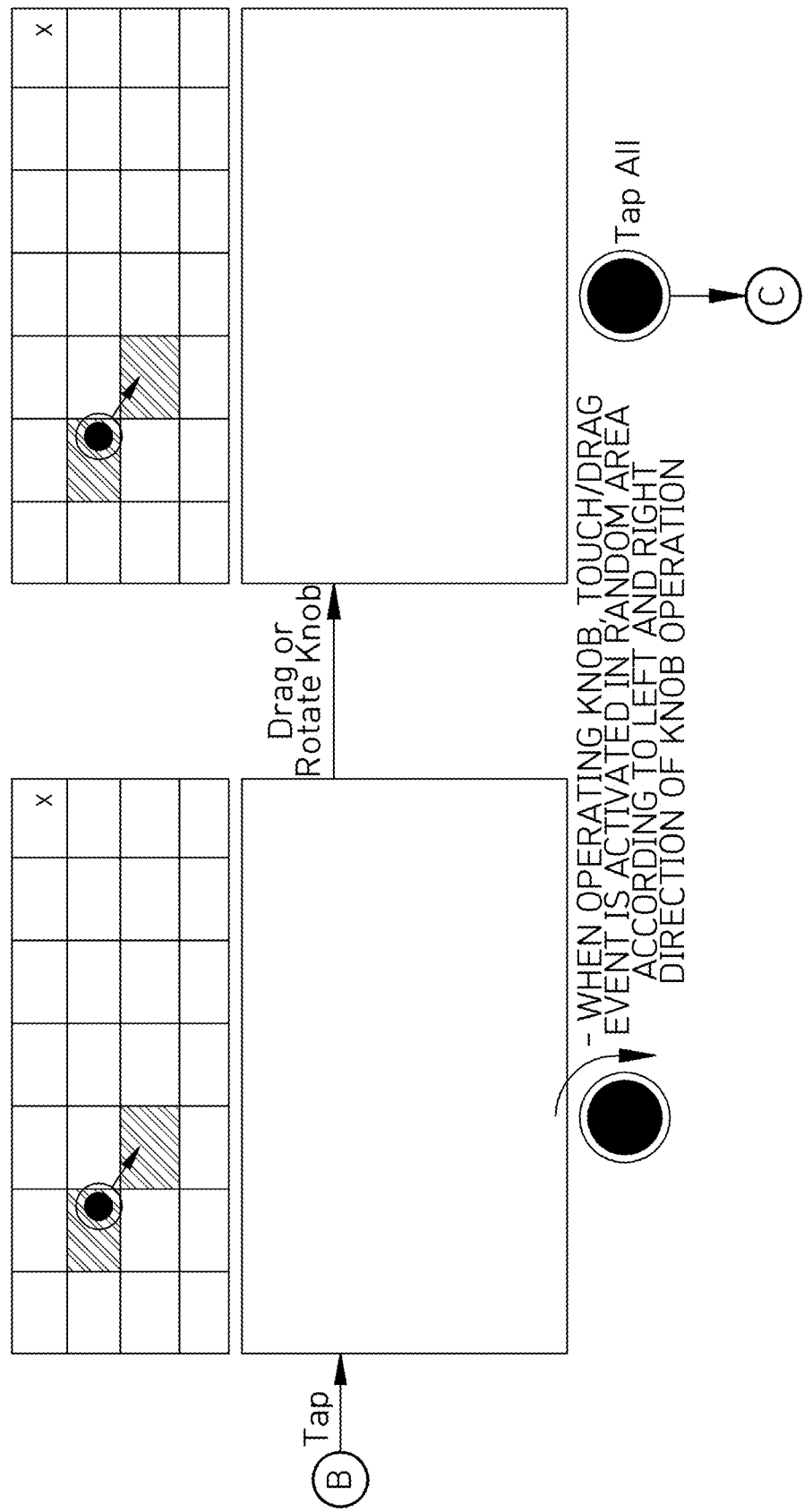

- IN PASSENGER MODE, MEDIA SOUND SOURCE REPRODUCED IN 13.2" IS OUTPUT THROUGH BLOOMING SOUND
- MEDIA SOUND SOURCE REPRODUCED IN 12.3" IS OUTPUT THROUGH HEADREST SPEAKER
- IN PASSENGER MODE, EACH SPEAKER FORMS SOUND BUBBLE TO PREVENT SOUND SOURCES PROVIDED TO DRIVER AND PASSENGER FROM INTERFERING WITH EACH OTHER

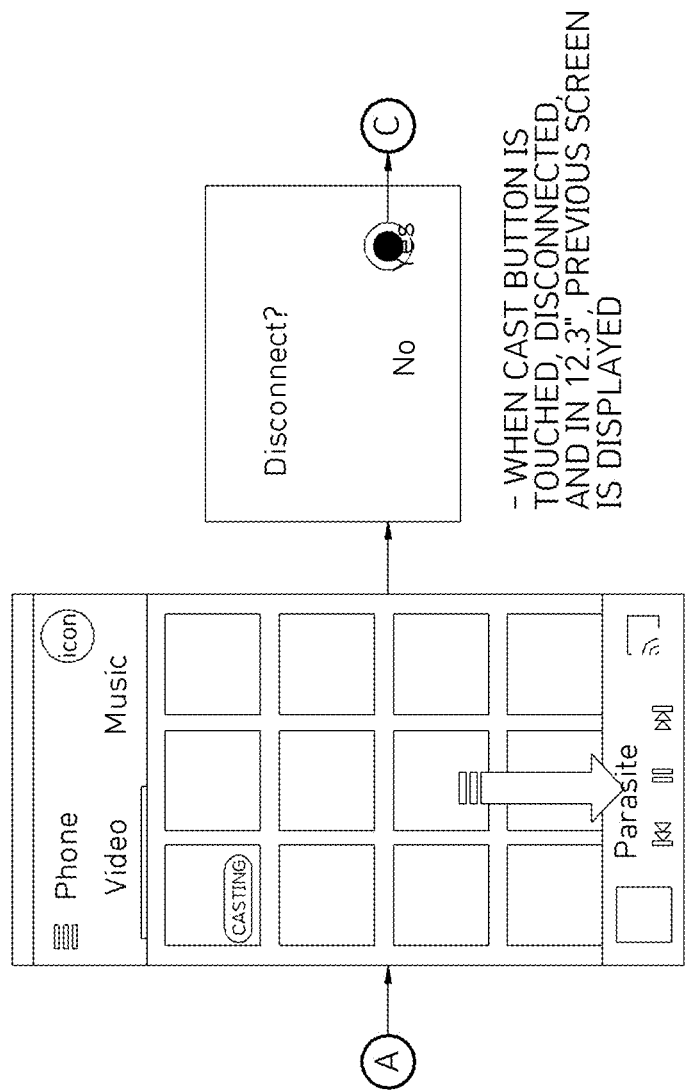

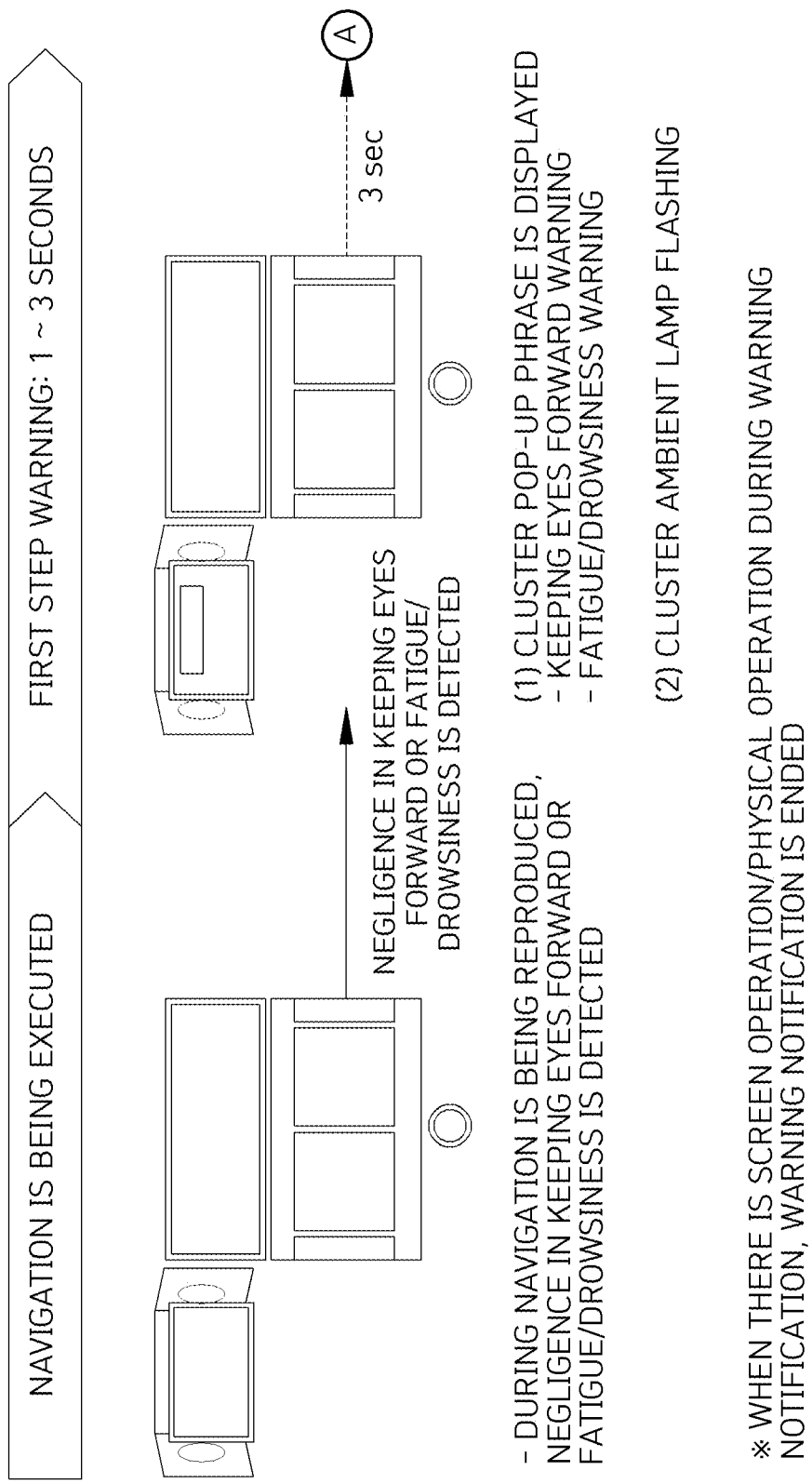

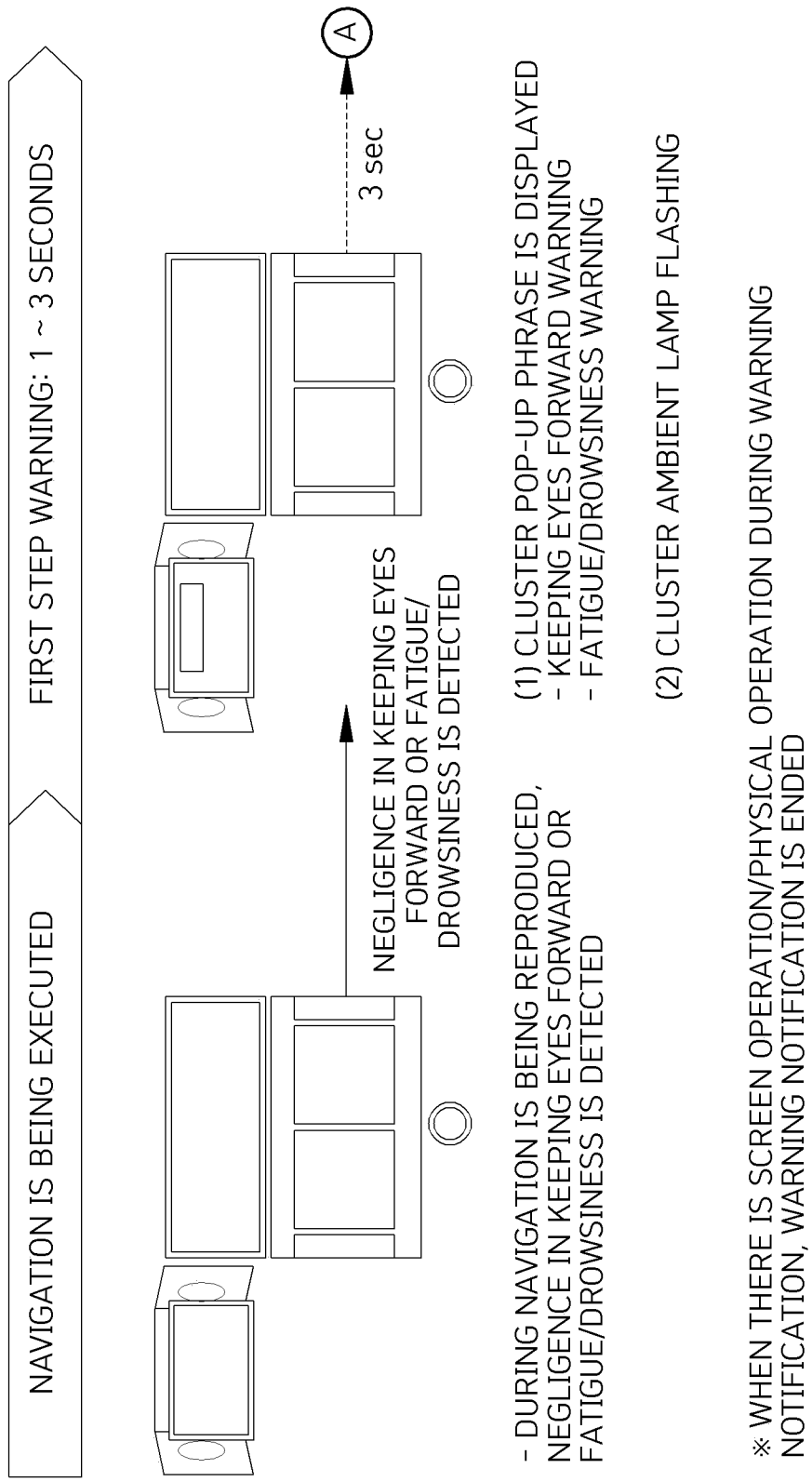

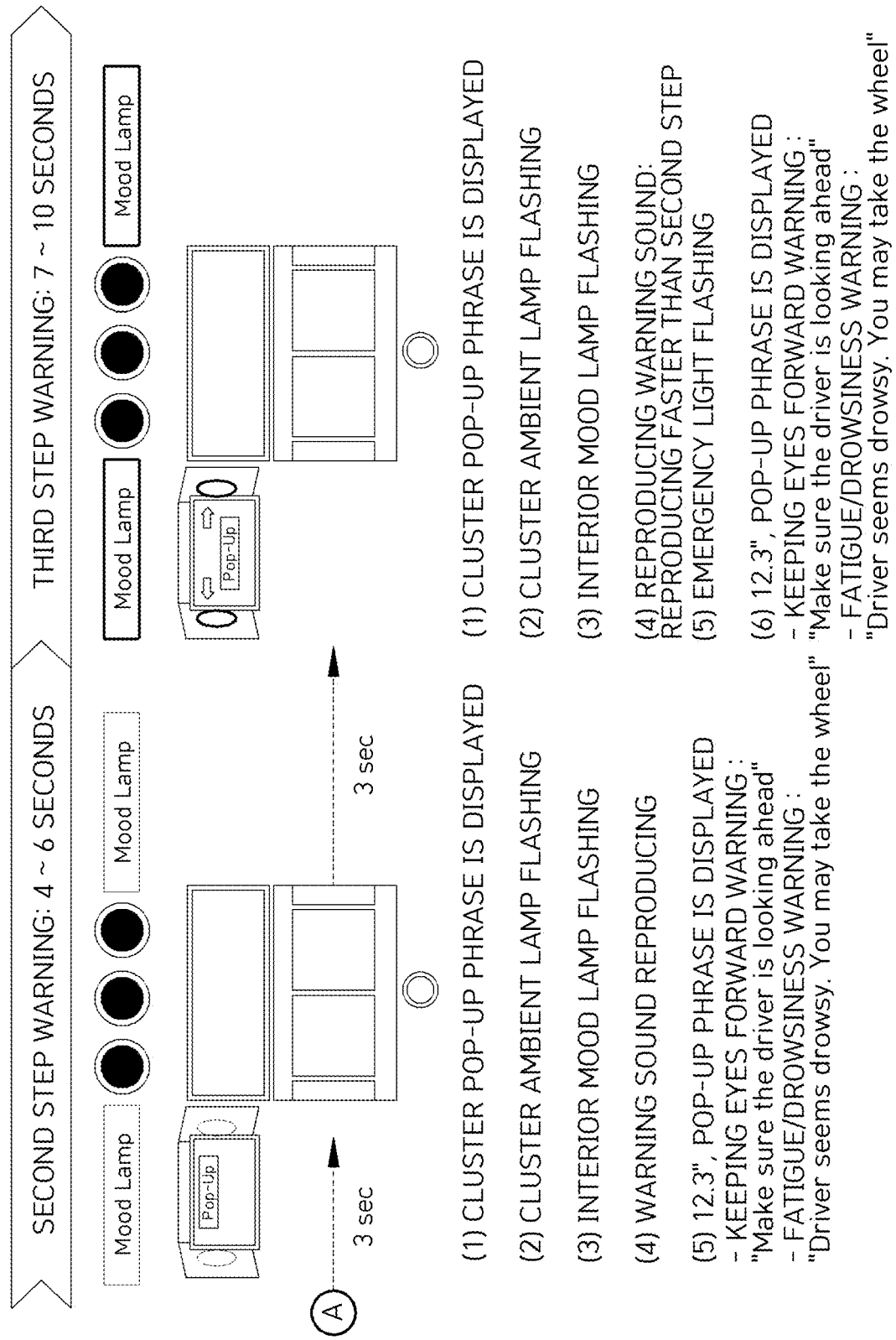

APPARATUS FOR SEARCHING USING MULTIPLE DISPLAYS

CROSS-REFERENCE TO RELATED APPLICATIONS

This application claims priority to and the benefit of Korean Patent Application Nos. 10-2021-0011861, filed on Jan. 27, 2021, 10-2021-0011862, filed on Jan. 27, 2021, 10-2021-0011863, filed on Jan. 27, 2021, 10-2021-0011864, filed on Jan. 27, 2021, 10-2021-0011865, filed on Jan. 27, 2021, 10-2021-0011866, filed on Jan. 27, 2021, and 10-2021-0011867, filed on Jan. 27, 2021, the disclosure of which is incorporated herein by reference in their entirety.

BACKGROUND

1. Technical Field

The present invention relates to an apparatus for searching using multiple displays.

2. Discussion of Related Art

According to the related art, there is a problem in that a search for only a specific menu (e.g., search for navigation destination) may be performed within a limited area in a vehicle internal display.

SUMMARY

The present invention is directed to providing an apparatus capable of performing an integrated search using separate upper/lower displays (multiple displays) disposed at different positions.

According to an aspect of the present disclosure, there is provided an apparatus for searching using multiple displays including an input part configured to receive an integrated search command signal, a memory in which a program for controlling an integrated search function to be displayed on at least one of an upper display and a lower display according to the integrated search command signal is stored, and a processor configured to execute the program, wherein the processor controls display of an integrated search window for at least one of the lower display disposed in a cockpit and the upper display disposed above the lower display.

The processor may use selection information about a user profile to display a search result for each menu corresponding to the user profile and a search word.

When an integrated search request is received, the processor may control to display a list of the items in the menu according to a recent use order for each menu according to the user profile.

When an integrated search request is received and a search word is input, the processor may control to display a list corresponding to the search word according to a predetermined order.

The processor may control to arrange and display a list for each predetermined menu on the upper display and to display information having high usage frequency for each predetermined menu on the lower display.

The processor may control to display information according to a recent use order for each predetermined menu on the upper display, and, when a search word is input on the lower display, the processor may control to display a list corresponding to the search word on the upper display according to a predetermined order.

When an app function is being executed on the upper display, the processor may control such that the integrated search window is displayed using the lower display.

When a passenger mode is being executed, the processor may control such that the integrated search window is displayed using the upper display.

BRIEF DESCRIPTION OF THE DRAWINGS

The above and other objects, features, and advantages of the present invention will become more apparent to those of ordinary skill in the art by describing exemplary embodiments thereof in detail with reference to the accompanying drawings, in which:

FIGS. 5A to 5D illustrate a profile change process according to an embodiment of the present invention;

FIGS. 8A to 8F, 9A to 9G and 10A to 10D illustrate an integrated search process according to an embodiment of the present invention;

FIGS. 16A to 16C and 17A to 17D illustrate front image display according to an embodiment of the present invention;

FIGS. 18A, 18B and 19A to 19C illustrate surround-view monitoring screen display according to an embodiment of the present invention;

FIGS. 43A to 43E illustrate the movement of a video between the displays according to an embodiment of the present invention;

FIGS. 49A to 49D illustrate a meditation function-providing process according to an embodiment of the present invention;

FIGS. 61A to 61D illustrate a video cast process according to an embodiment of the present invention;

FIGS. 66A and 66B illustrate a stepwise warning-providing process in the driver mode according to an embodiment of the present invention; and FIGS. 67A and 67B illustrate a stepwise warning-providing process in the passenger mode according to an embodiment of the present invention.

DETAILED DESCRIPTION

Advantages and features of the present invention and methods for achieving them will be made clear from embodiments described in detail below with reference to the accompanying drawings.

However, the present invention may be implemented in many different forms and should not be construed as being limited to the embodiments set forth herein. Rather, the embodiments are provided in order to fully explain the present invention and fully explain the scope of the present invention for those skilled in the art. The scope of the present invention is defined by the appended claims.

Meanwhile, terms used herein are for the purpose of describing the embodiments and are not intended to limit the present invention. As used herein, the singular forms include the plural forms as well unless the context clearly indicates otherwise. The term "comprise" or "comprising" used herein does not preclude the presence or addition of one or more other elements, steps, operations, and/or devices other than stated elements, steps, operations, and/or devices.

Figure 1:
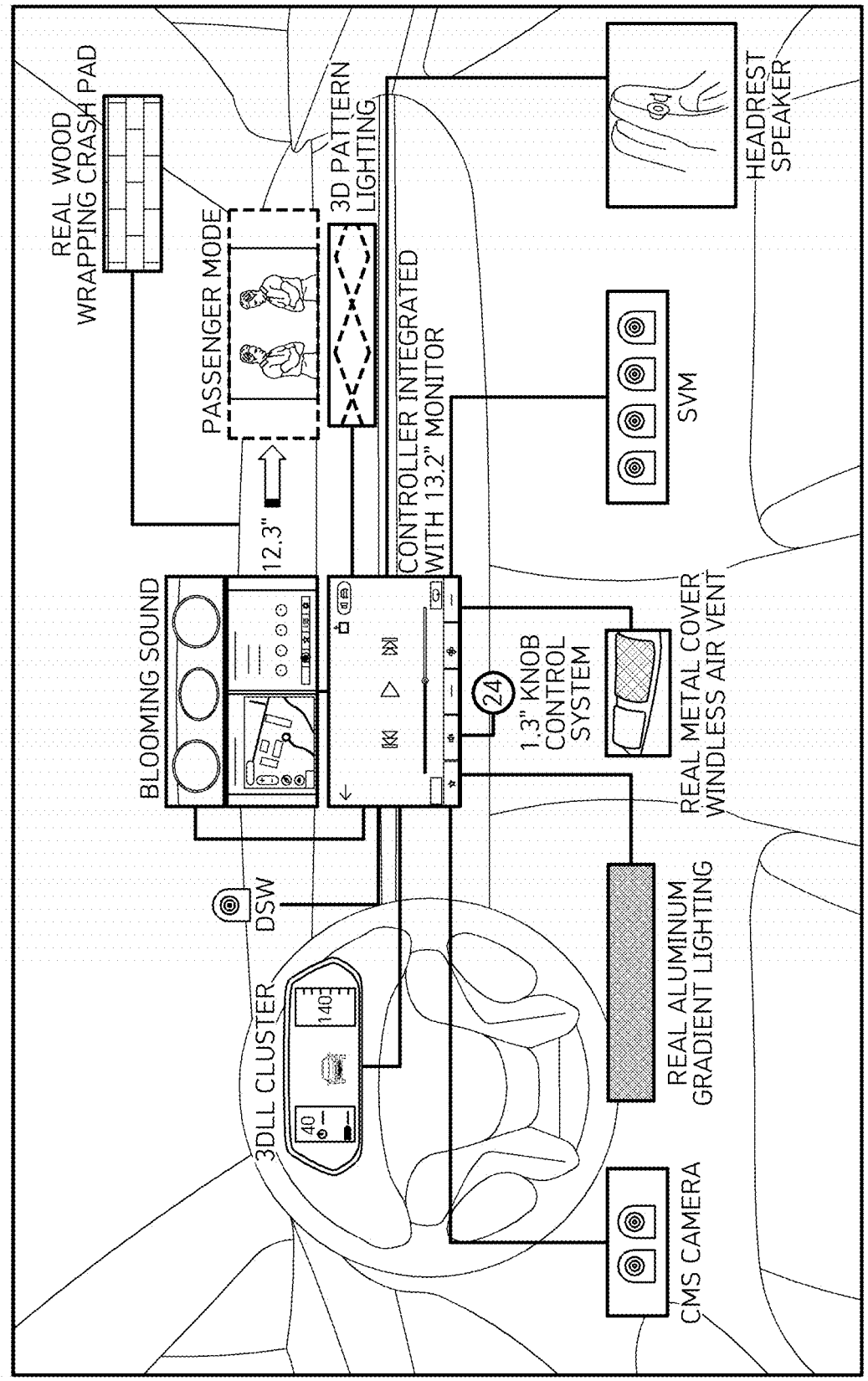
FIG. 1 is a conceptual diagram of an integrated cockpit according to an embodiment of the present invention.

FIG. 1 is a conceptual diagram of an integrated cockpit according to an embodiment of the present invention.

According to an embodiment of the present invention, a 12.3-inch upper display and a controller integrated with a 13.2-inch monitor are disposed in the integrated cockpit.

The 12.3-inch upper display may be operated in a passenger mode, and the controller integrated with a 13.2-inch monitor is connected to a cluster, driver state warning (DSW), blooming sound, the 12.3-inch upper display, three-dimensional (3D) pattern lighting, a headrest speaker, a surround view module (SVM), a knob operation system, an air vent, gradient lighting, and a camera monitor system (CMS) camera.

Hereinafter, an exemplary embodiment of the present invention will be described by naming the 12.3-inch display of FIG. 1 as an upper display and the controller integrated with a 13.2-inch monitor of FIG. 1 as a lower display.

Figure 2:
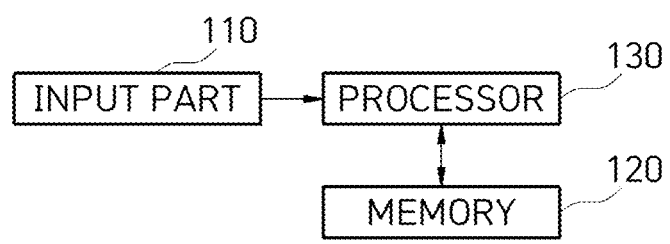
FIG. 2 illustrates an apparatus for searching using multiple displays according to an embodiment of the present invention.

FIG. 2 illustrates an apparatus for searching using multiple displays according to an embodiment of the present invention.

According to an embodiment of the present invention, the apparatus for searching using multiple displays includes an input part 110 configured to receive an integrated search command signal, a memory 120 in which a program for controlling an integrated search function to be displayed on at least one of the upper display and the lower display according to the integrated search command signal is stored, and a processor 130 configured to execute the program. The processor 130 controls display of an integrated search window for at least one of the lower display disposed in a cockpit and the upper display disposed above the lower display.

The processor 130 controls to display a search result for each menu corresponding to a user profile using selection information about the user profile.

When an integrated search request is received, the processor 130 controls to display a list of the items in the menu according to a recent use order for each menu according to the user profile.

When the integrated search request is received and a search word is input, the processor 130 controls to display a list corresponding to the search word according to a predetermined order.

The processor 130 controls to arrange and display a list for each predetermined menu on the upper display and to display information having high usage frequency for each predetermined menu on the lower display.

The processor 130 controls to display information according to a recent use order for each predetermined menu on the upper display, and when a search word is input to the lower display, the processor 130 controls to display a list corresponding to the search word on the upper display according to a predetermined order.

When an app function is being executed on the upper display, the processor 130 controls such that the integrated search window is displayed using the lower display.

The processor 130 controls such that the integrated search window is displayed using the upper display when the passenger mode is being executed.

Figure 3A:
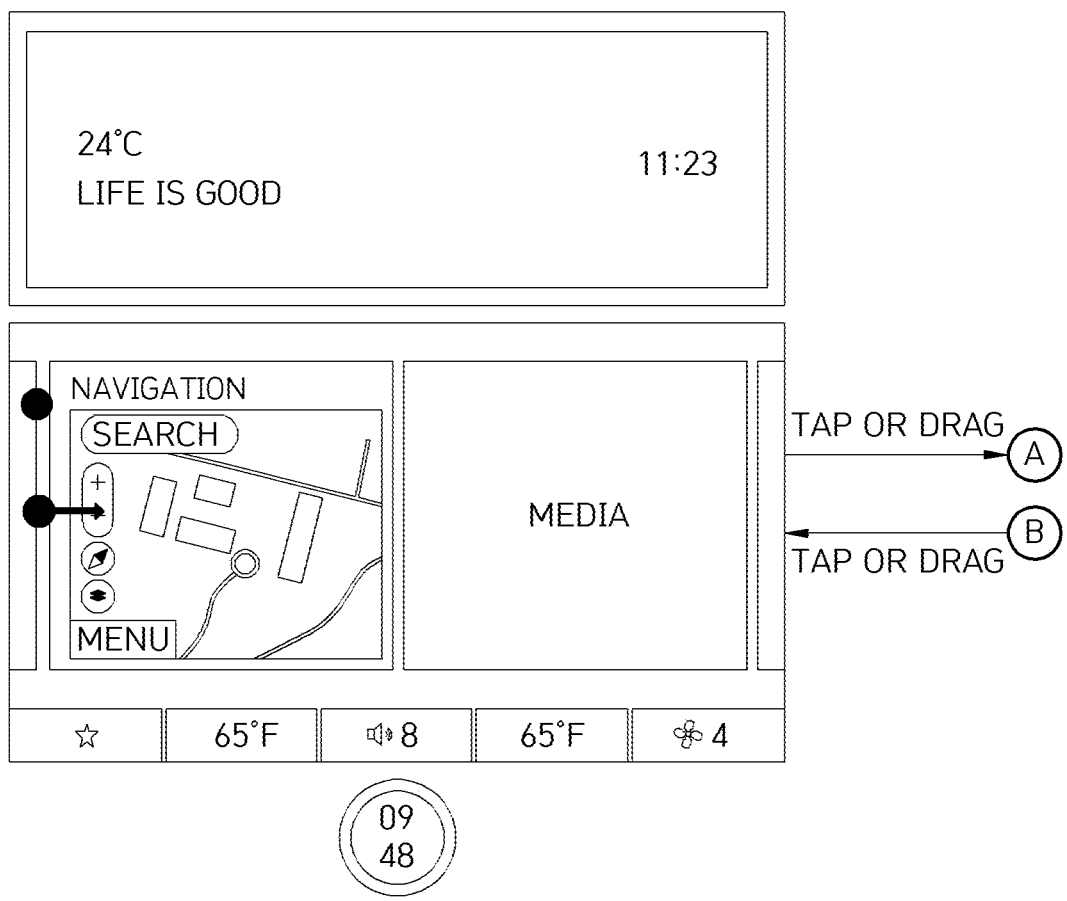
FIGS. 3A and 3B illustrate a global menu according to an embodiment of the present invention.
Figure 3B:
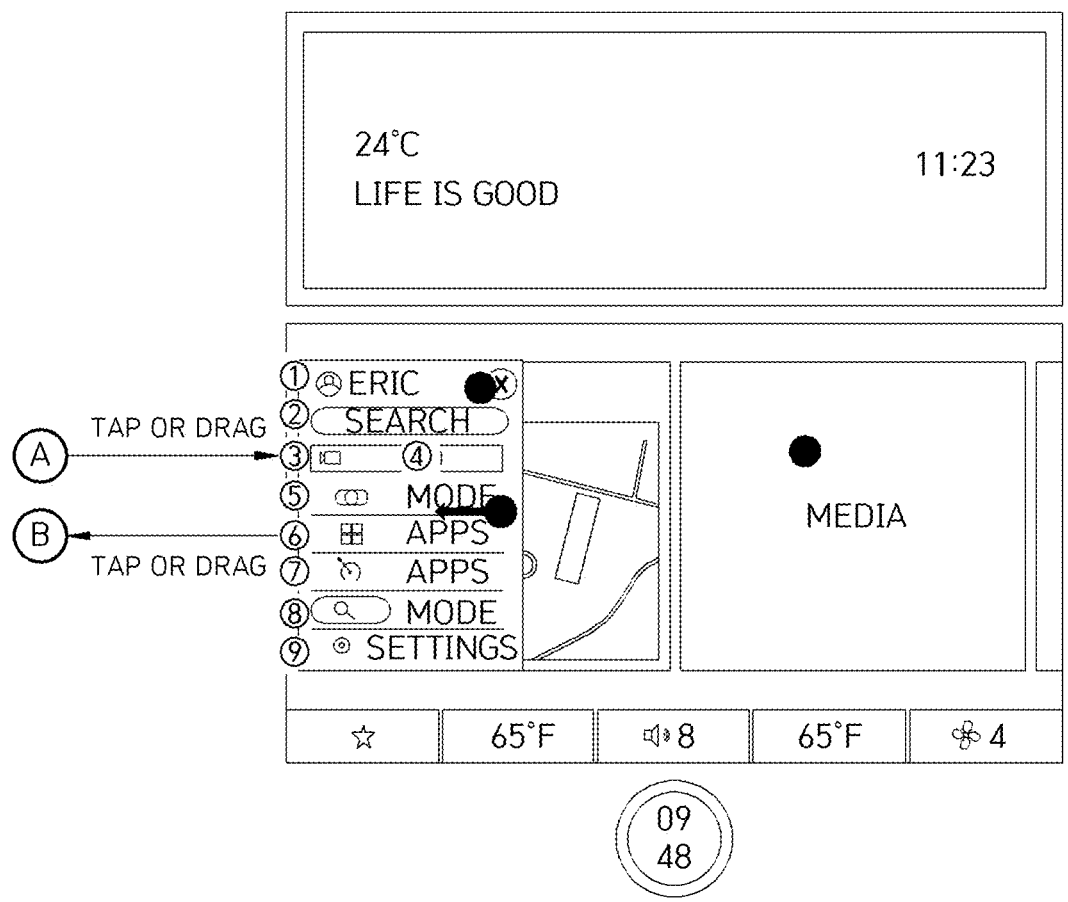

FIGS. 3A and 3B illustrate a global menu according to an embodiment of the present invention.

In the upper display, a temperature, a phrase (e.g., Life Is Good), and current time information (e.g., 11:23) are displayed.

Contents displayed on the upper display are not limited to those illustrated in FIGS. 3A and 3B.

Referring to FIGS. 3A and 3B, as a user taps or drags a specific area on the lower display, an existing navigation information display area and media display area are displayed dark or dimmed, and the global menu is displayed.

Each configuration of the global menu shown in FIG. 3B is defined as in Table 1 below.

TABLE 1

| No. | Component | Function execution form | Global menu state |
|---|---|---|---|
| 1 | User Profile | Pop-up | Reduce |
| 2 | Search | Pop-up | Reduce |
| 3 | Front Camera | 12.3": execute App | Maintain |
| 4 | SVM | 12.3": execute App | 12.3": Maintain |
|   |   | 13.2": execute App | 13.2": Reduce |
| 5 | Mode Change | Global menu toggle | Maintain |
| 6 | Apps | Pop-up | Reduce |
| 7 | ASCC | Widget | Reduce |
| 8 | Drive Mode | Global menu toggle | Maintain |
| 9 | Settings | Pop-up | Reduce |

Figure 4A:
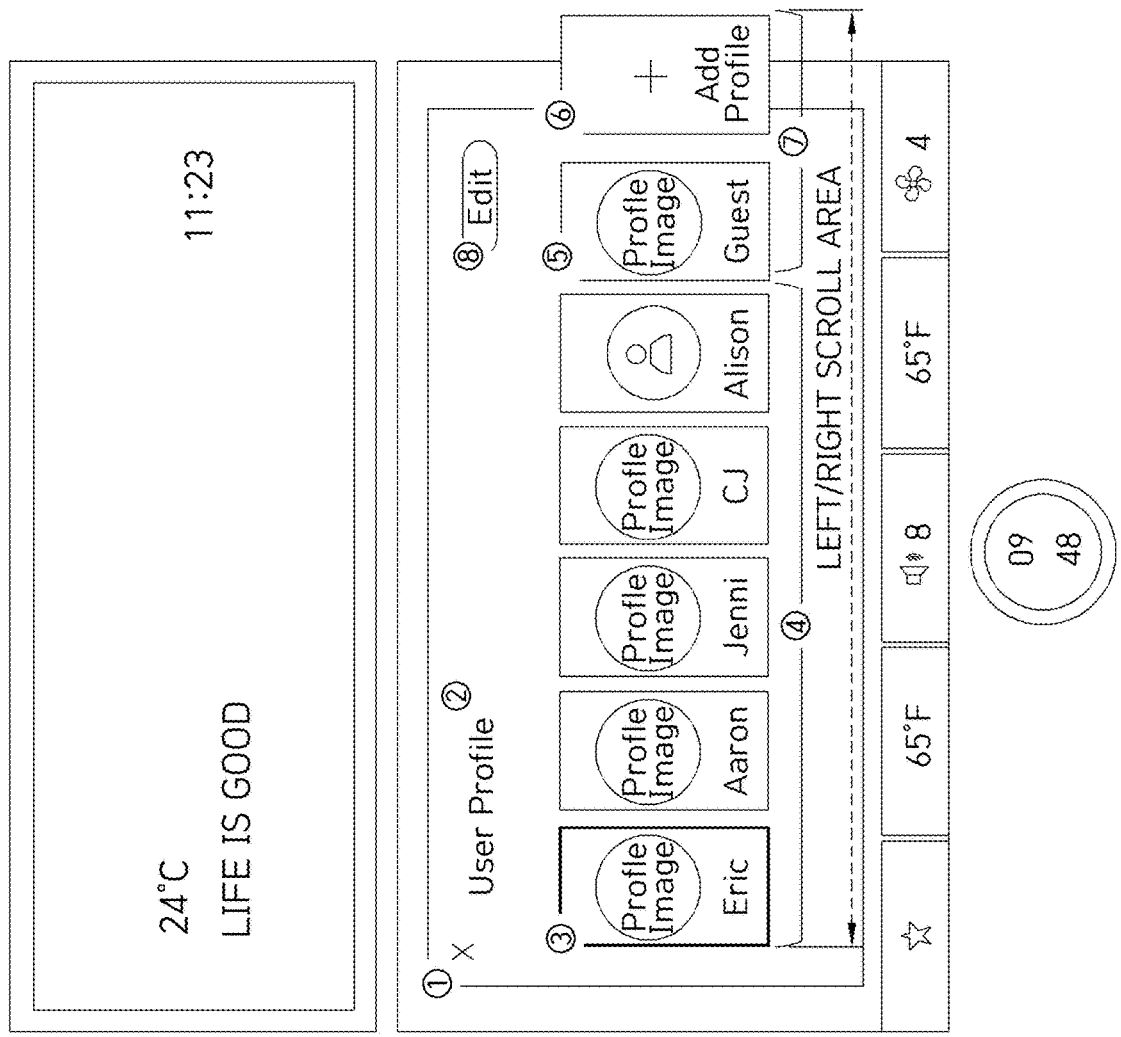
FIGS. 4A to 4C illustrate a profile according to an embodiment of the present invention.
Figure 4B:
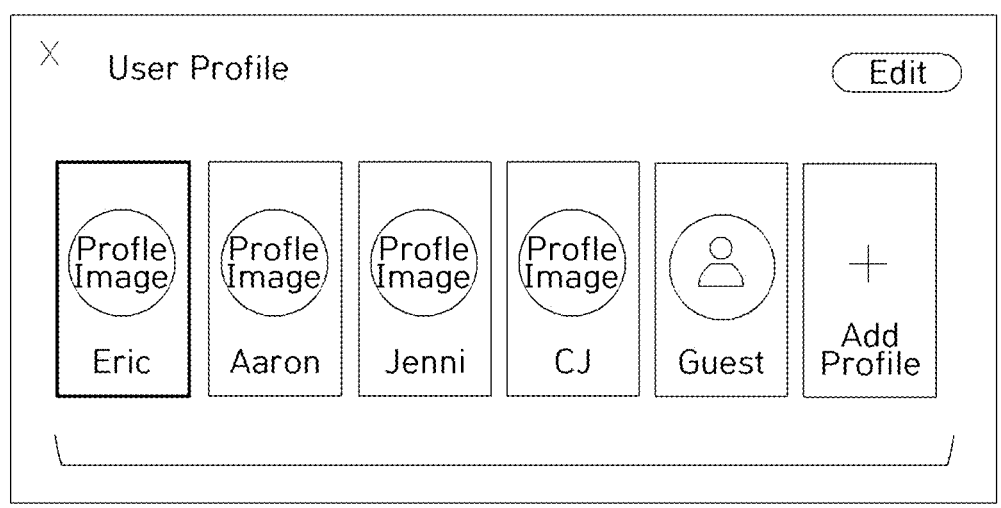
Figure 4C:
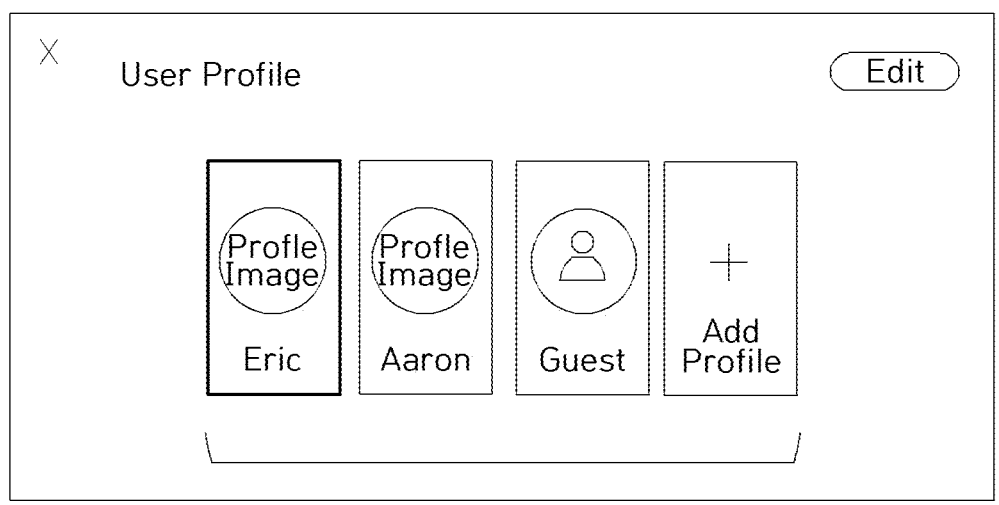
Figure 5A:
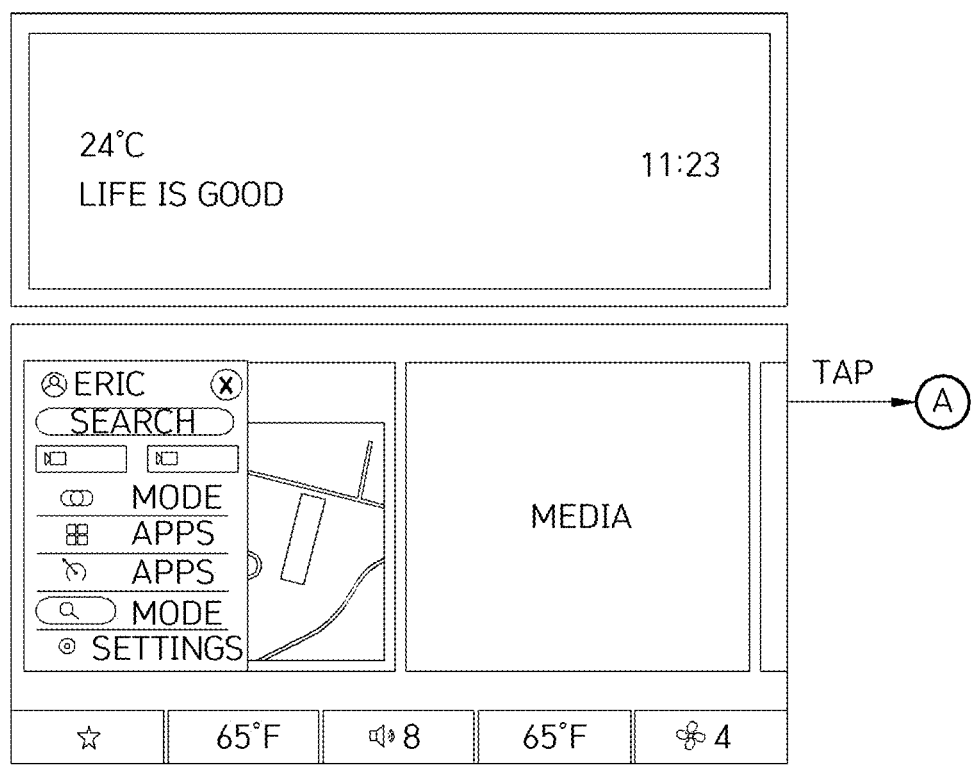
Figure 5B:
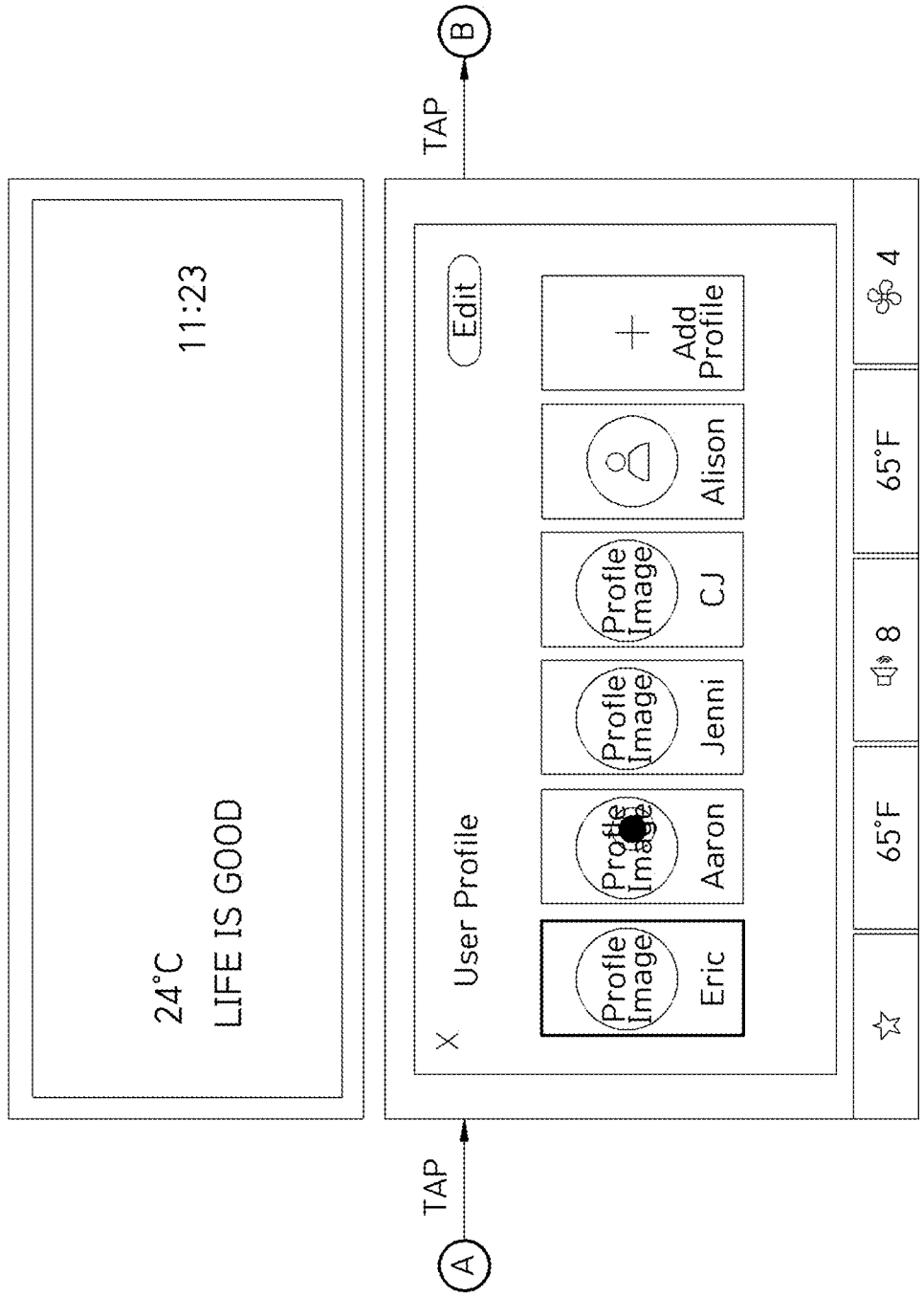
Figure 5D:
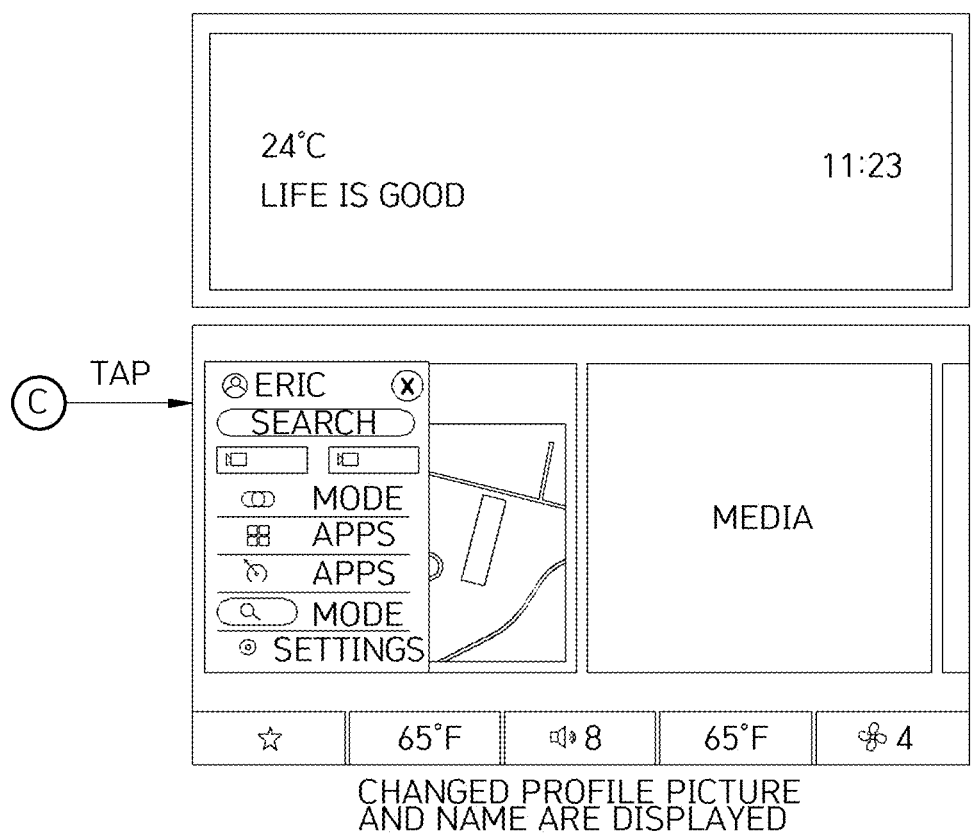

FIGS. 4A to 4C illustrate a profile according to an embodiment of the present invention.

Referring to FIG. 4A, a profile image and name of each user are displayed in a user profile of the lower display, and guest and profile addition buttons are provided according to a left/right scroll area.

FIG. 4B illustrates a case in which up to six user profiles are displayed on a screen of the lower display, and FIG. 4C illustrates a case in which a profile list is arranged in a center of a pop-up window.

Each configuration of the user profile shown in FIGS. 4A to 4C is defined as in Table 2 below.

TABLE 2

| No. | Component | Description |
|---|---|---|
| 1 | Close button | When touched, pop-up disappeared |
| 2 | Title | Display user profile text |
| 3 | Current set profile | Focus process |
|   |   | Display registered image + name |
| 4 | Profile list | Previously registered profile list |
|   |   | When profile is added, corresponding profile list is enlarged |
|   |   | When touched, apply corresponding profile |
| 5 | Guest profile | Display default image + geust |
|   |   | When touched, apply guest profile |
| 6 | Profile add button | When touched, enter profile addition screen |
|   |   | Dummy button |
| 7 | Right fixed button | ④ dispose [Guest] and [Add Profile] buttons on right side of profile list |
| 8 | Edit button | When touched, enter edit mode |
|   |   | Dummy button |

FIGS. 5A to 5D illustrate a profile change process according to an embodiment of the present invention.

When a profile name of "Eric" is selected from the global menu of the lower display, a user profile screen is displayed and a screen whose content is focused on "Eric" is displayed.

Here, when the user selects "Aaron," a user is changed to "Aaron."

When a profile name of "Aaron" is selected from the global menu of the lower display, a user profile screen is displayed and a screen whose content is focused on "Aaron" is displayed.

Here, when the user selects "Guest," a user is changed to "Guest."

According to the selection in the user profile, a profile image and name corresponding to the changed profile are displayed.

Figure 6A:
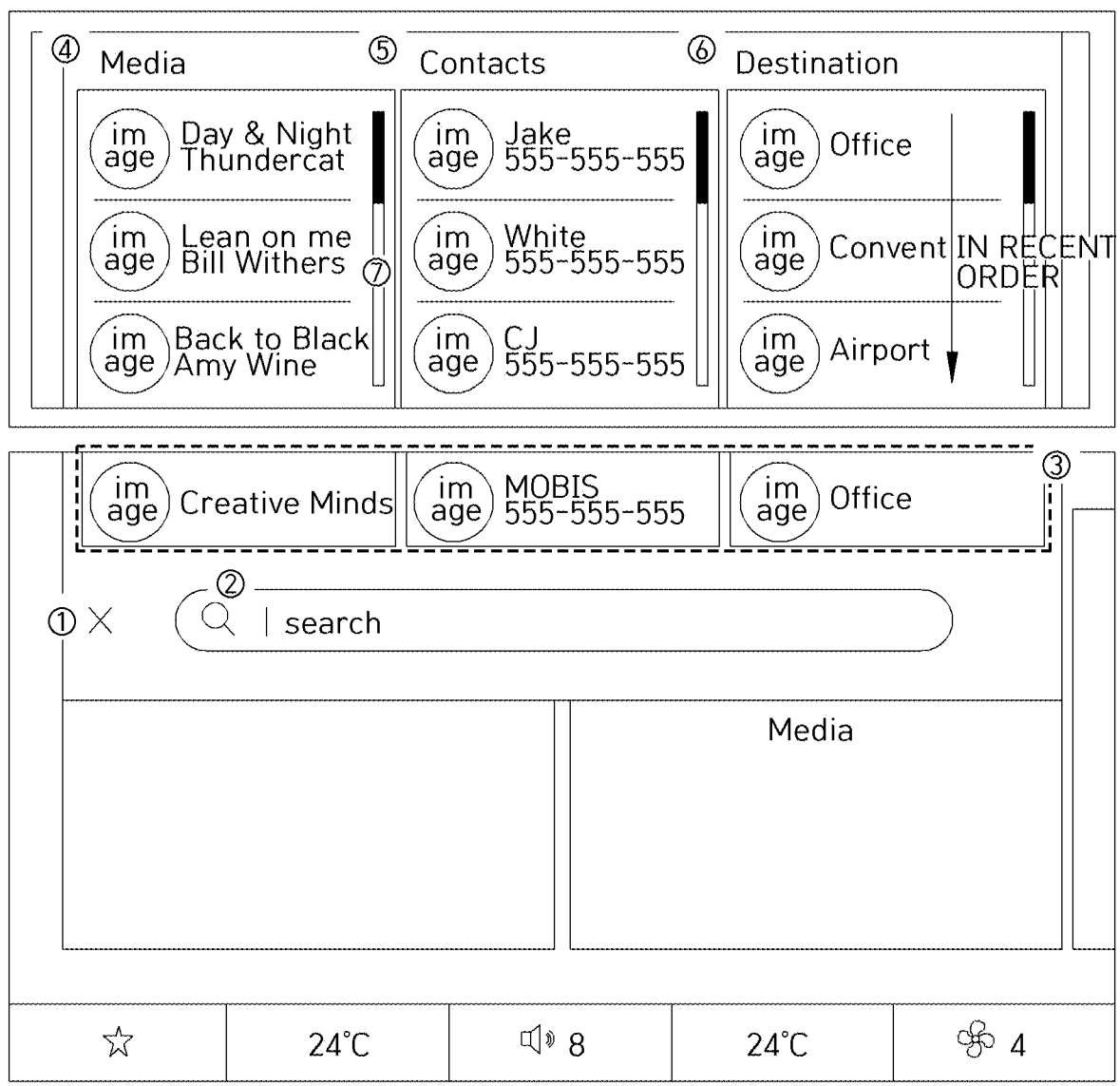
FIGS. 6A and 6B respectively illustrate a before-search screen and a search result screen according to an embodiment of the present invention.
Figure 6A:
Figure 6B:
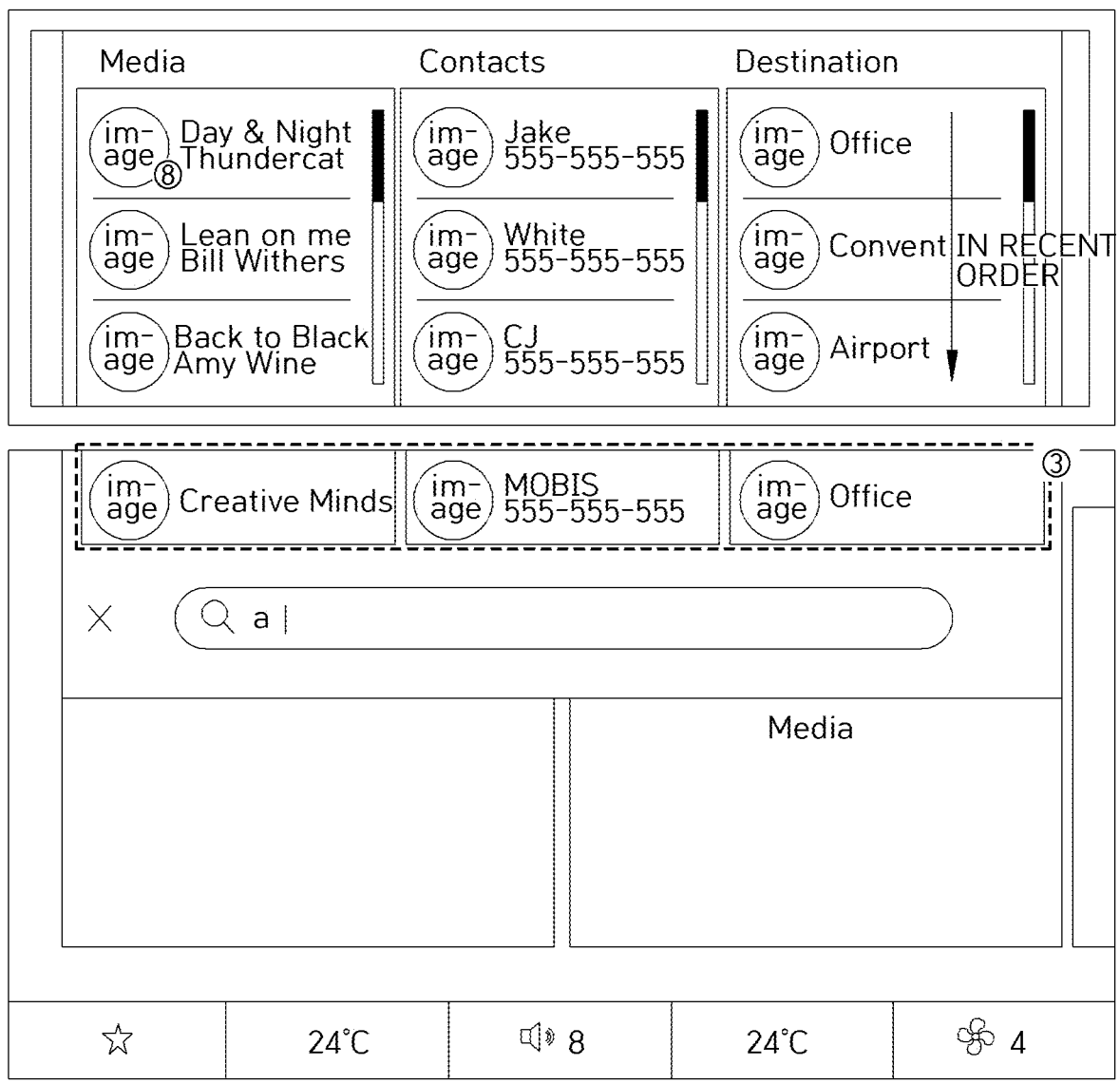
Figure 6B:
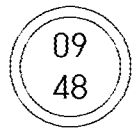

FIGS. 6A and 6B respectively illustrate a before-search screen and a search result screen according to an embodiment of the present invention.

FIG. 6A illustrates a case in which media, contacts, and destinations are each arranged in recent order before a search is conducted, and FIG. 6B illustrates a case in which the media, the contacts, and the destinations are each arranged in alphabetical order according to the search result.

In the integrated cockpit according to an embodiment of the present invention, it is possible to move a widget up from the lower display to the upper display, or to move the widget down from the upper display to the lower display.

When an integrated search is conducted, an integrated search screen is displayed on an upper display screen and a lower display screen.

Referring to FIG. 6A, in each of the media, the contacts, and the destinations of the upper display before the search is conducted, the media, the contacts, and the destinations are sorted and displayed in order they were recently selected, contacted, and set, and frequently searched media, contacts and destinations are displayed at an uppermost end of the lower display.

Referring to FIG. 6B, when "a" is input to a search window, the media, the contacts, and the destinations, in which "a" is included, are each arranged in alphabetical order and displayed as the search result.

At this point, the media, the contacts, and the destinations may each be displayed in consideration of both a usage frequency and an alphabetical order.

The configuration of the integrated search screen shown in FIGS. 6A and 6B is defined as in Table 3 below.

TABLE 3

| No. | Component | Description |
| --- | --- | --- |
| 1 | Close button | When touched, pop-up disappeared |
| 2 | Search window | Display prompt |
| 3 | Frequently searched search word button | Always display one frequently search word for each category<br>When touched, execute corresponding function |
| 4 | Media recent search result list | Title + list structure<br>Music: thumbnail + $1^{st}$ line song title + $2^{nd}$ line artist name<br>Video: thumbnail + video title<br>When touched, execute corresponding media |
| 5 | Contacts recent search result list | Title + list structure<br>Thumbnail + $1^{st}$ line contact name + $2^{nd}$ line phone number<br>Dummy list touch not allowed |
| 6 | Destination recent search result list | Title + list structure<br>Destination icon + destination name<br>When touched, execute navigation |
| 7 | List scroll bar | When there are more than N lists, display scroll bar |
| 8 | Search word matching display | Display color for word matched for input search word |

Figure 7A:
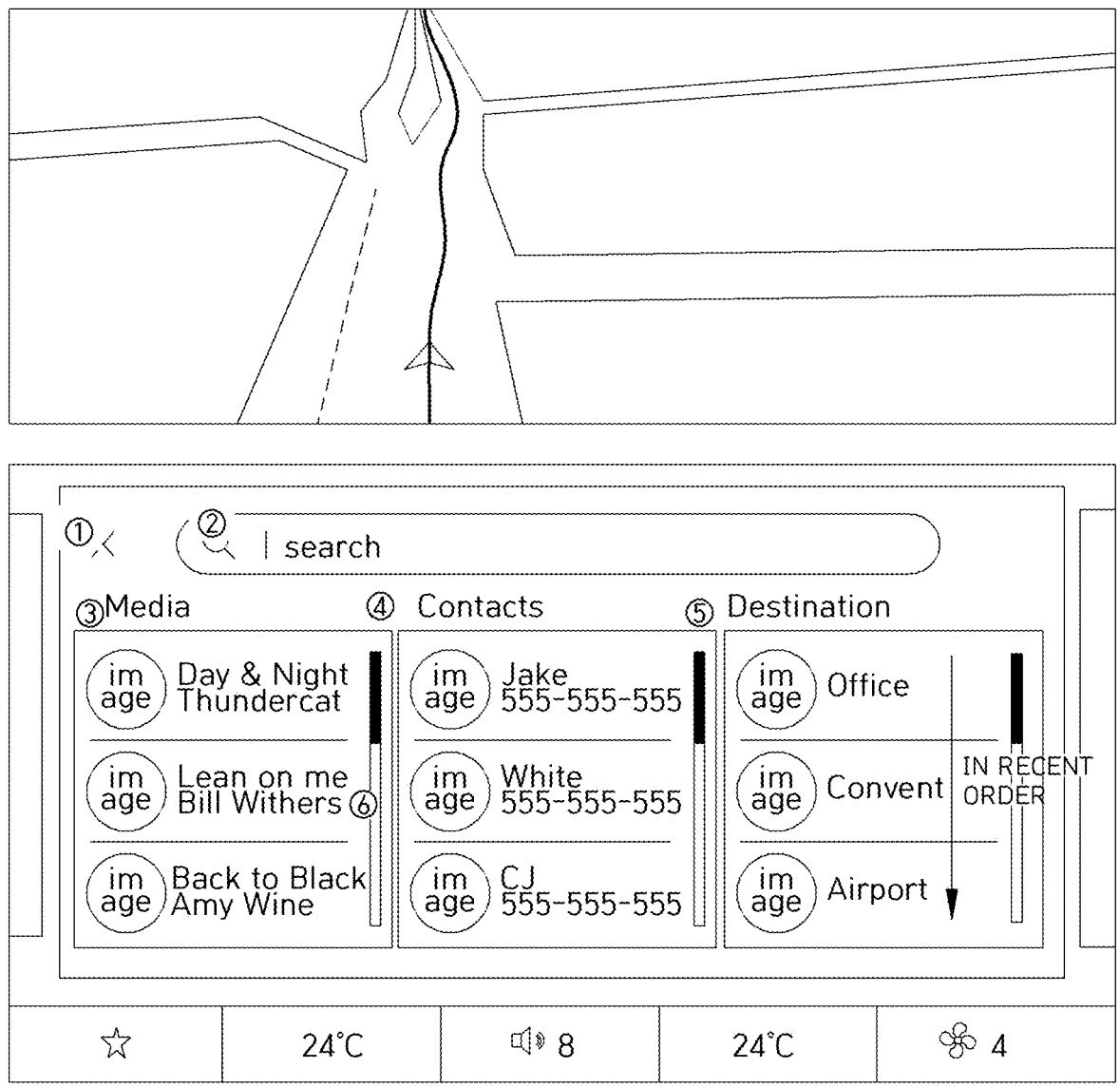
FIGS. 7A and 7B respectively illustrate a before-search screen and a search result screen of a lower display during a navigation operation of an upper display according to an embodiment of the present invention.
Figure 7A:
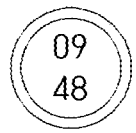
Figure 7B:
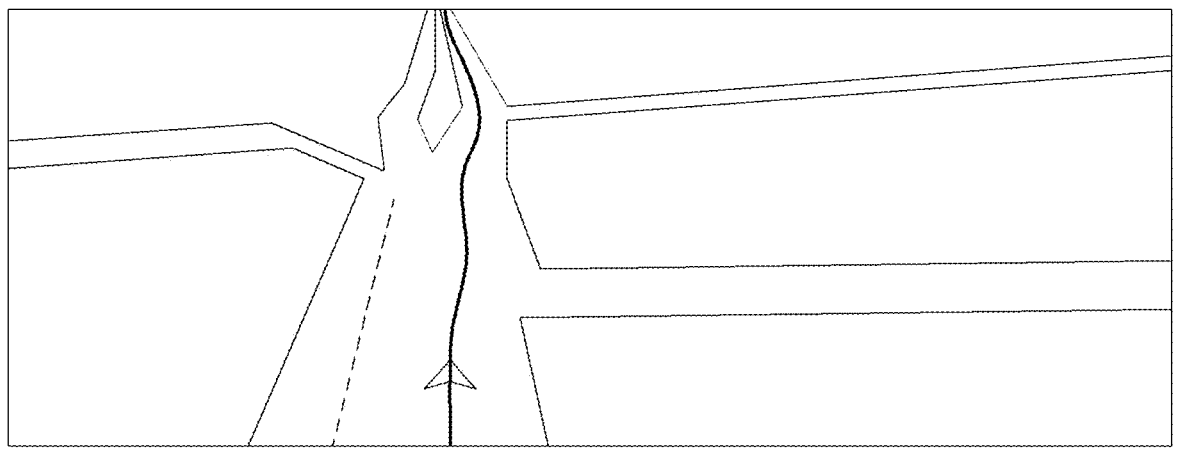
Figure 7B:
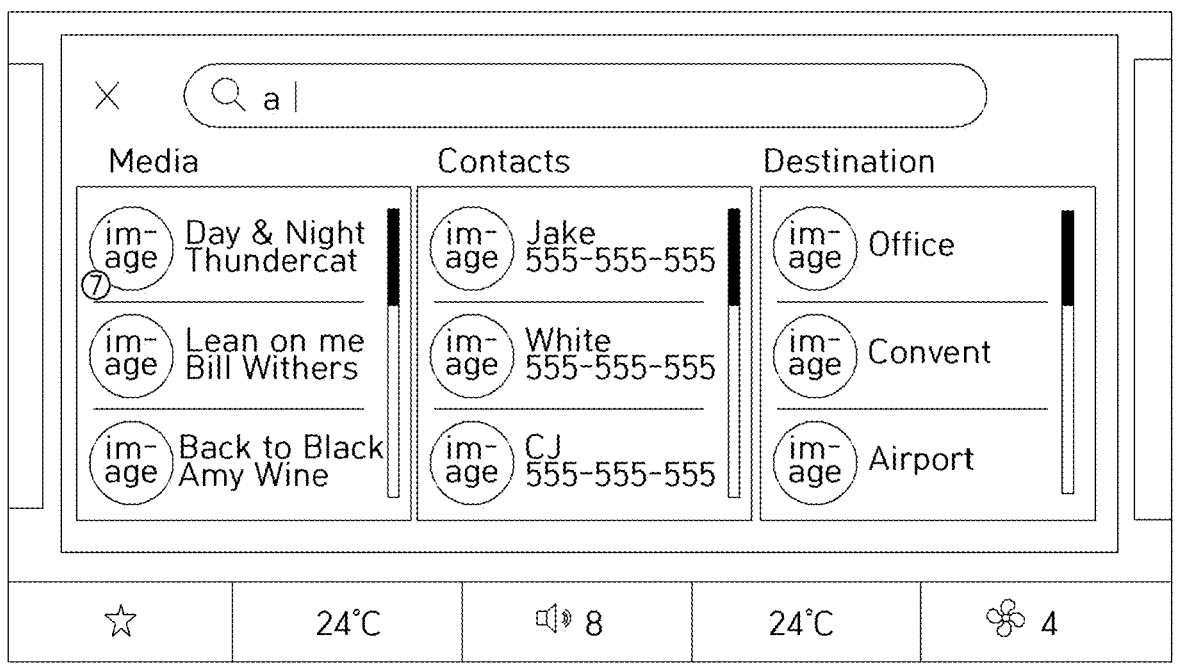
Figure 7B:
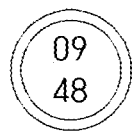
Figure 8B:
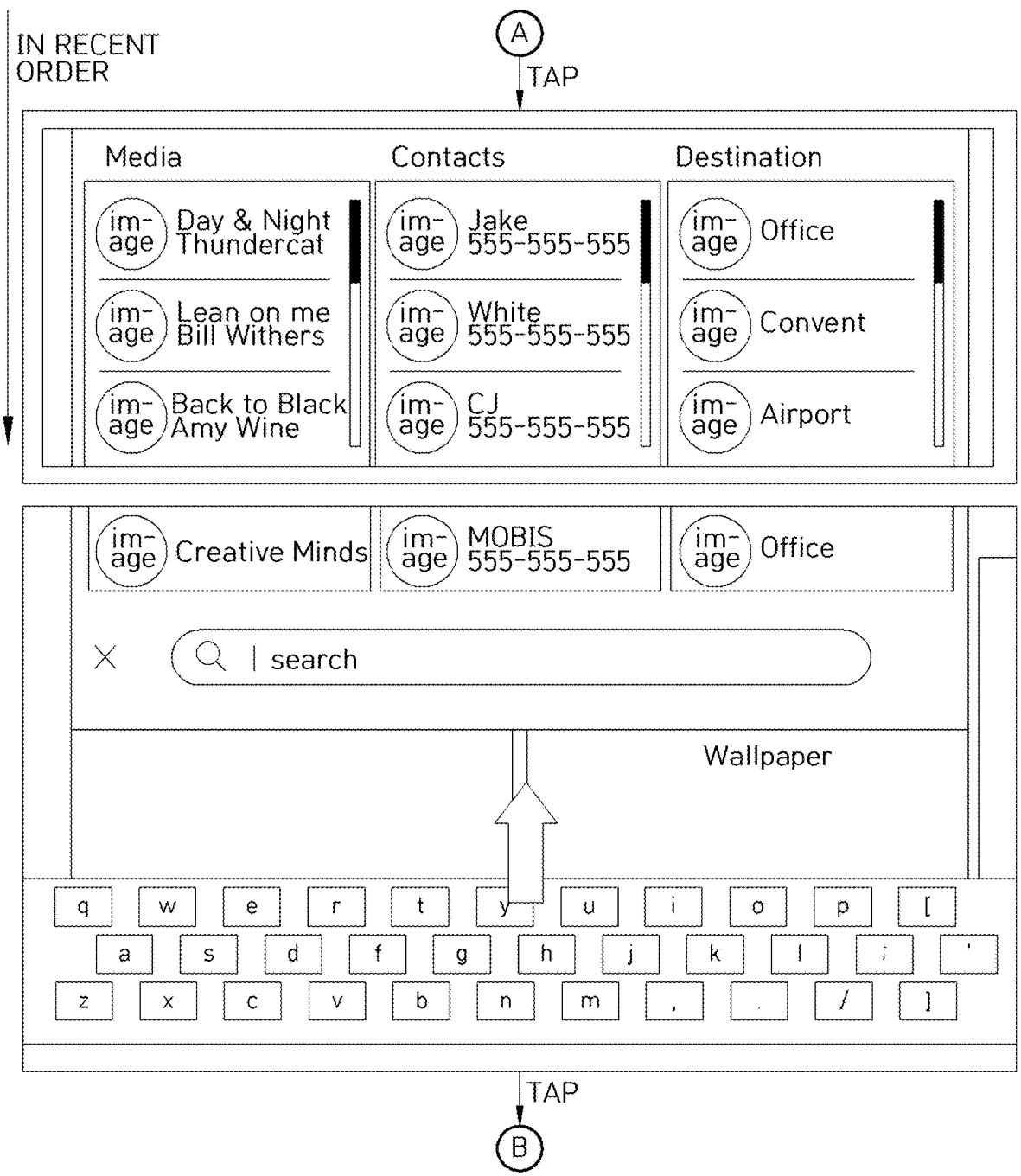
Figure 8D:
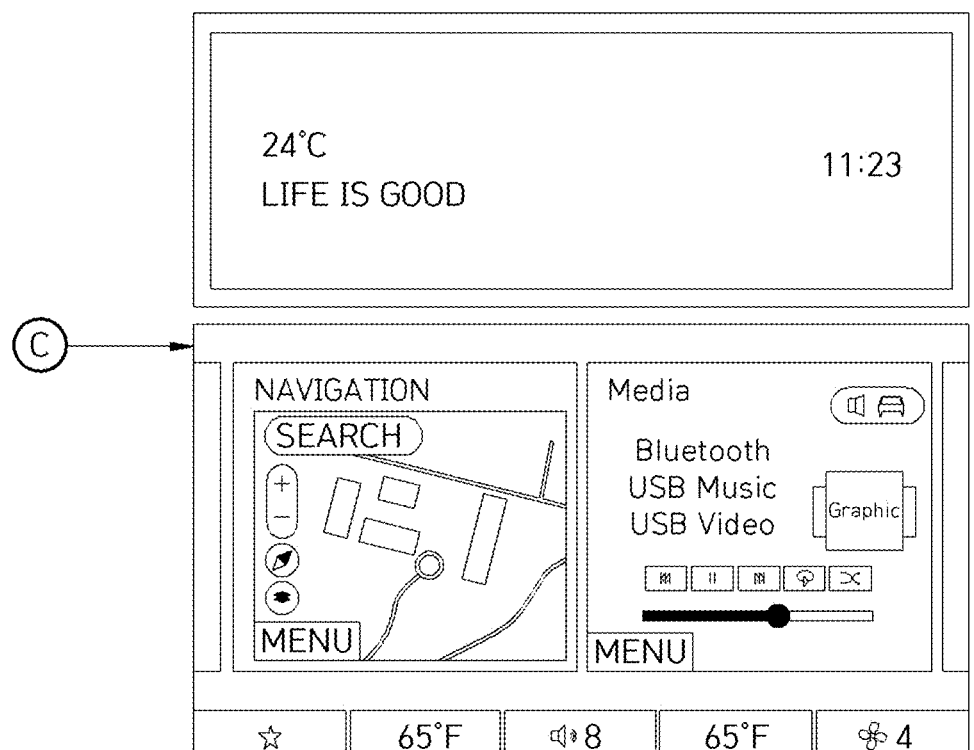
Figure 8E:
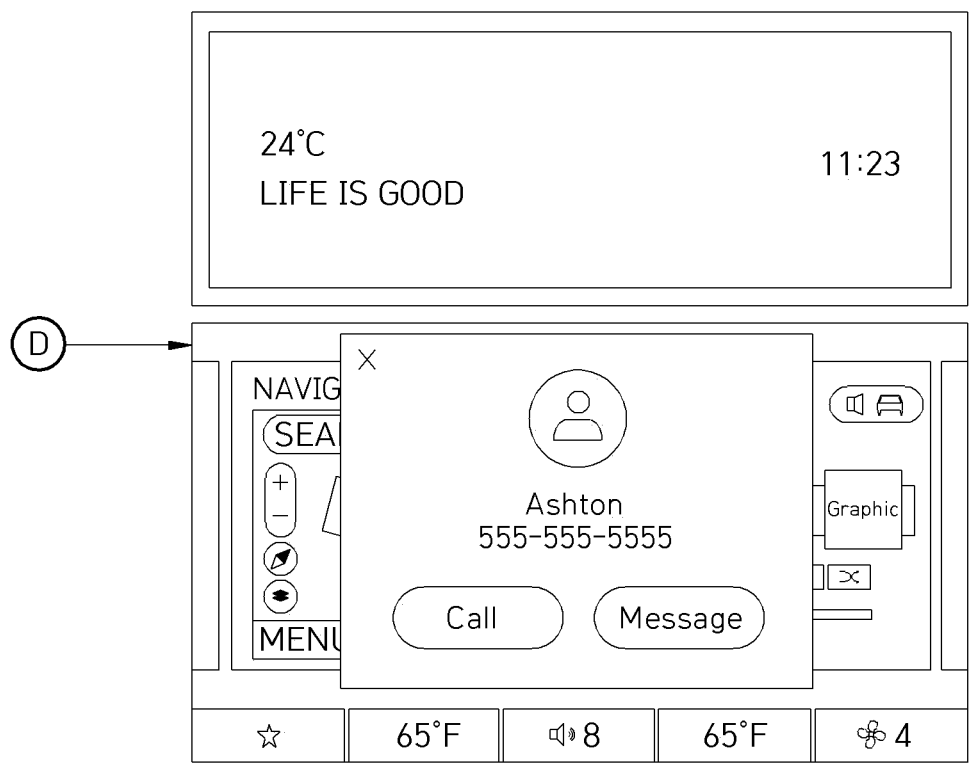
Figure 8F:
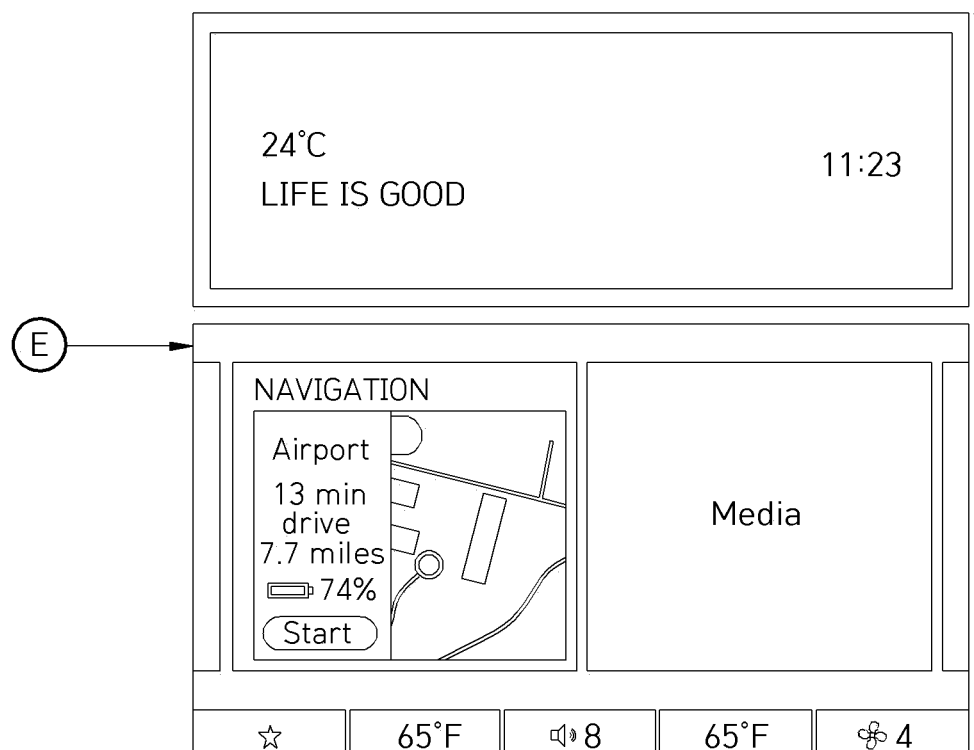
Figure 9A:
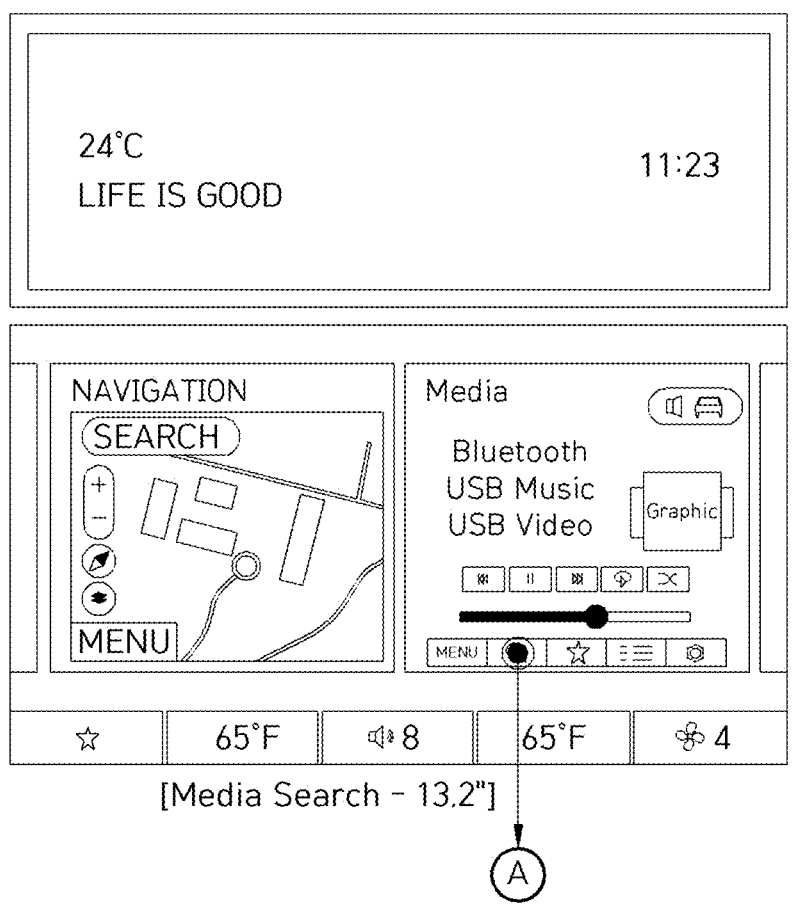
Figure 9B:
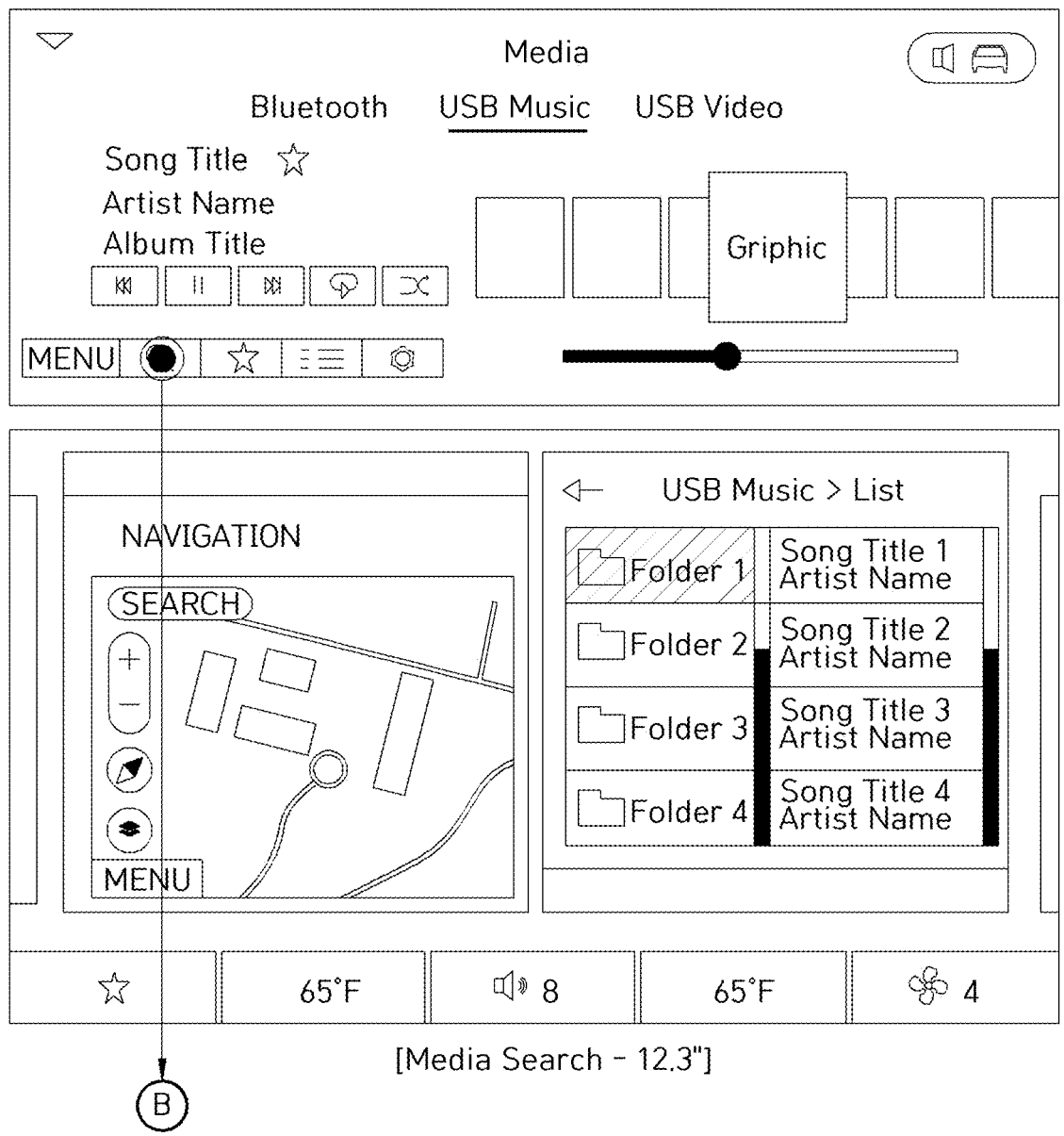
Figure 9C:
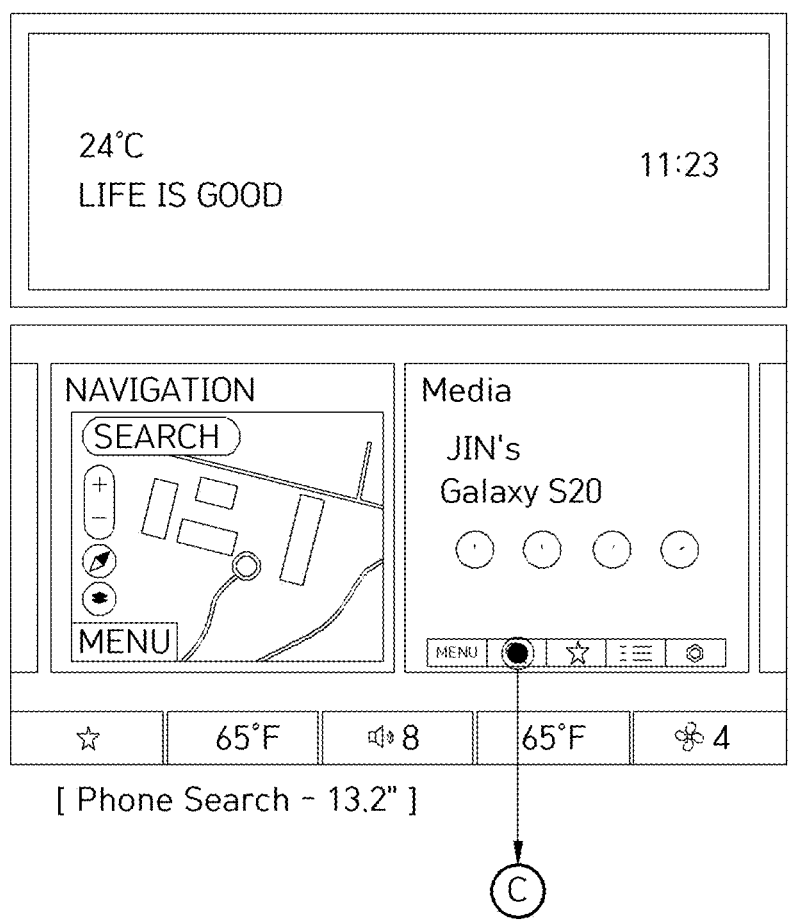
Figure 9D:
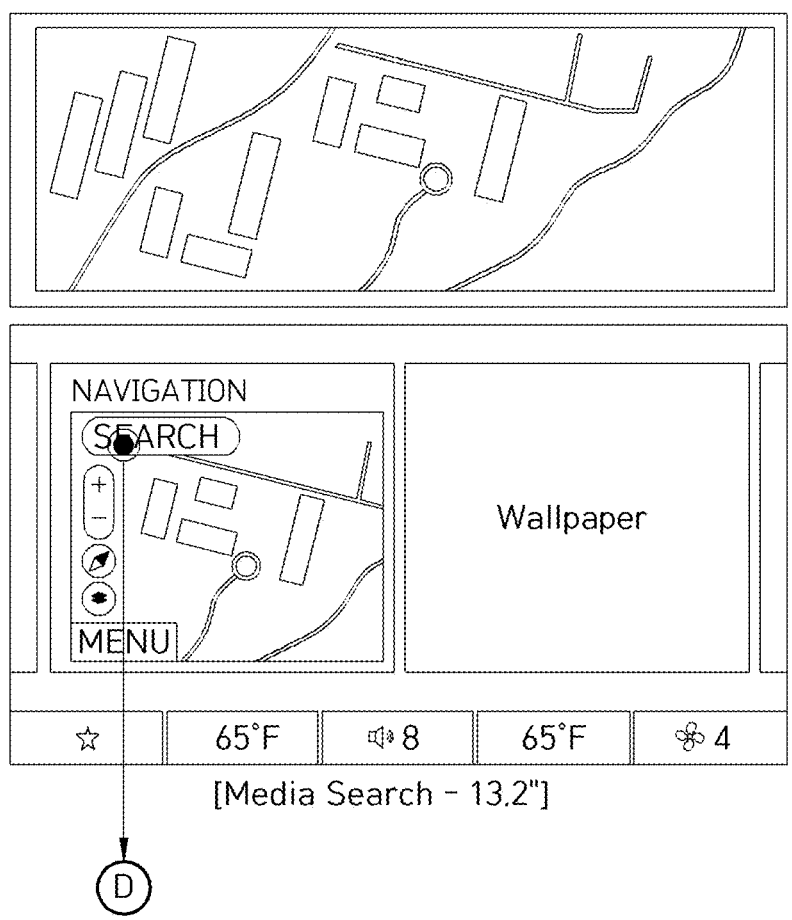
Figure 9E:
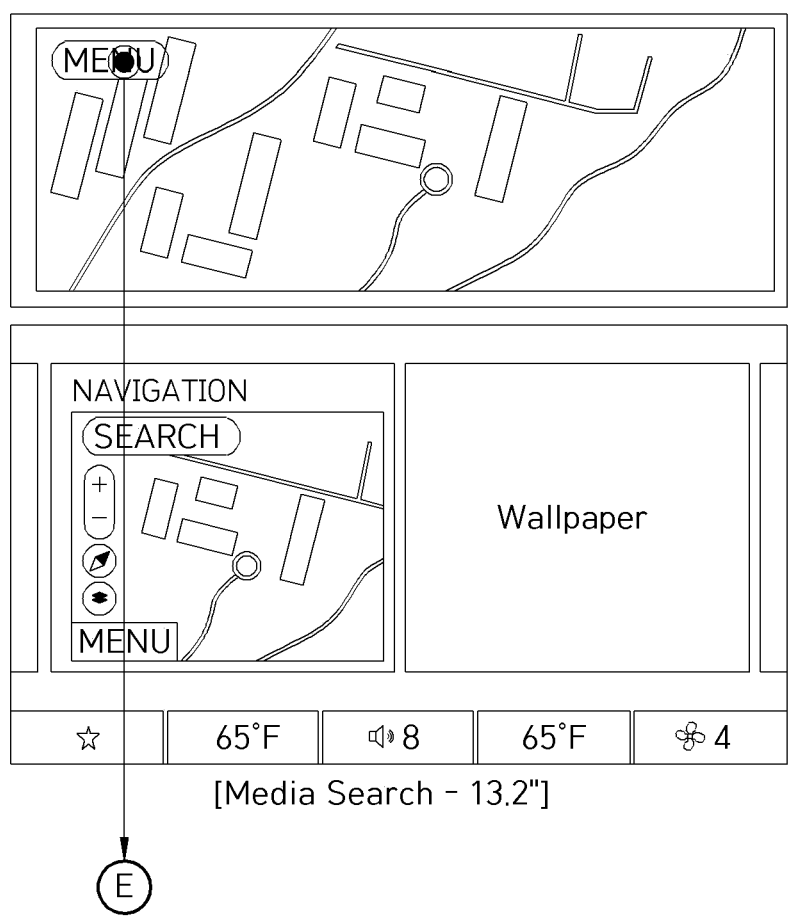
Figure 9F:
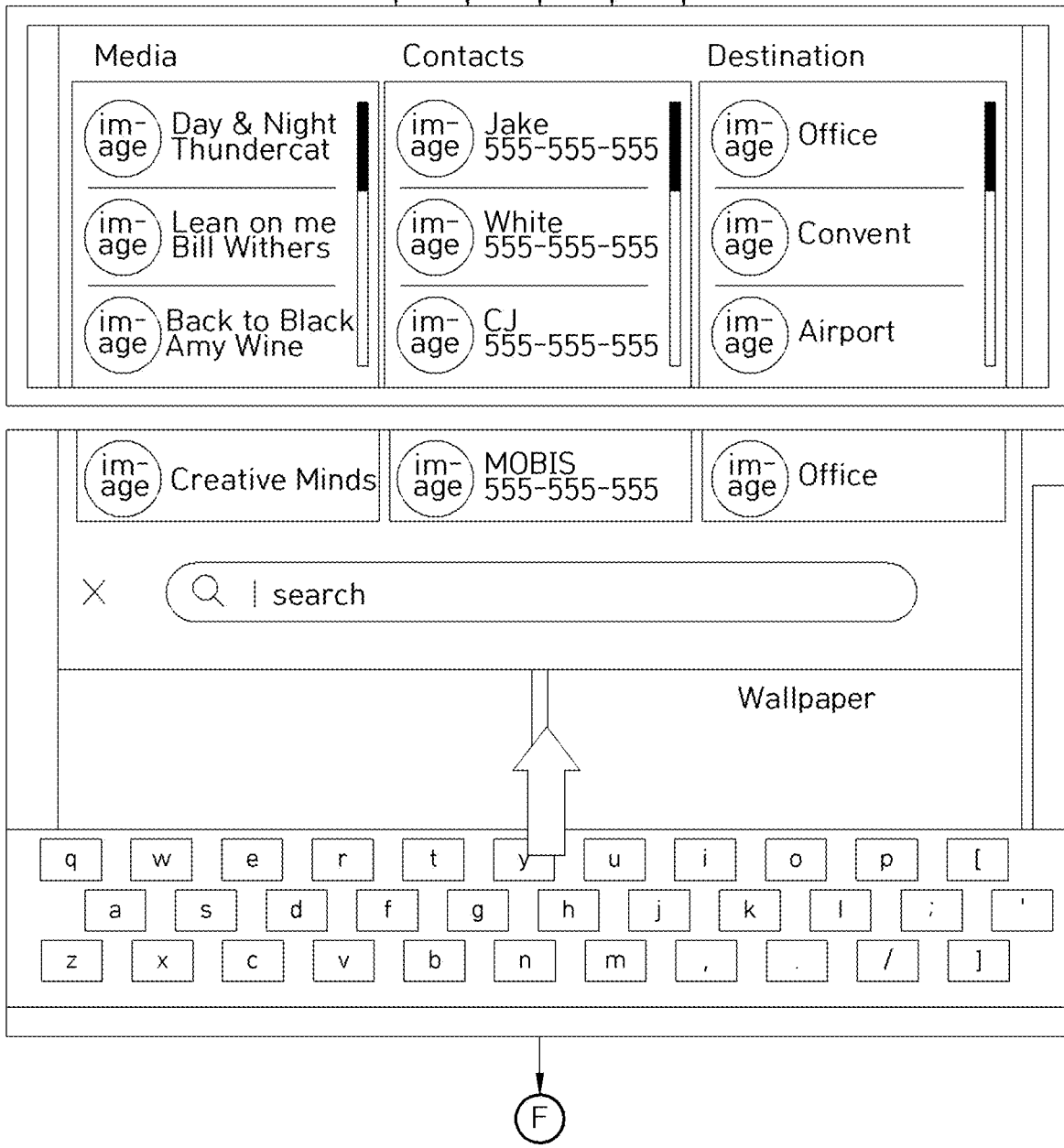
Figure 9G:
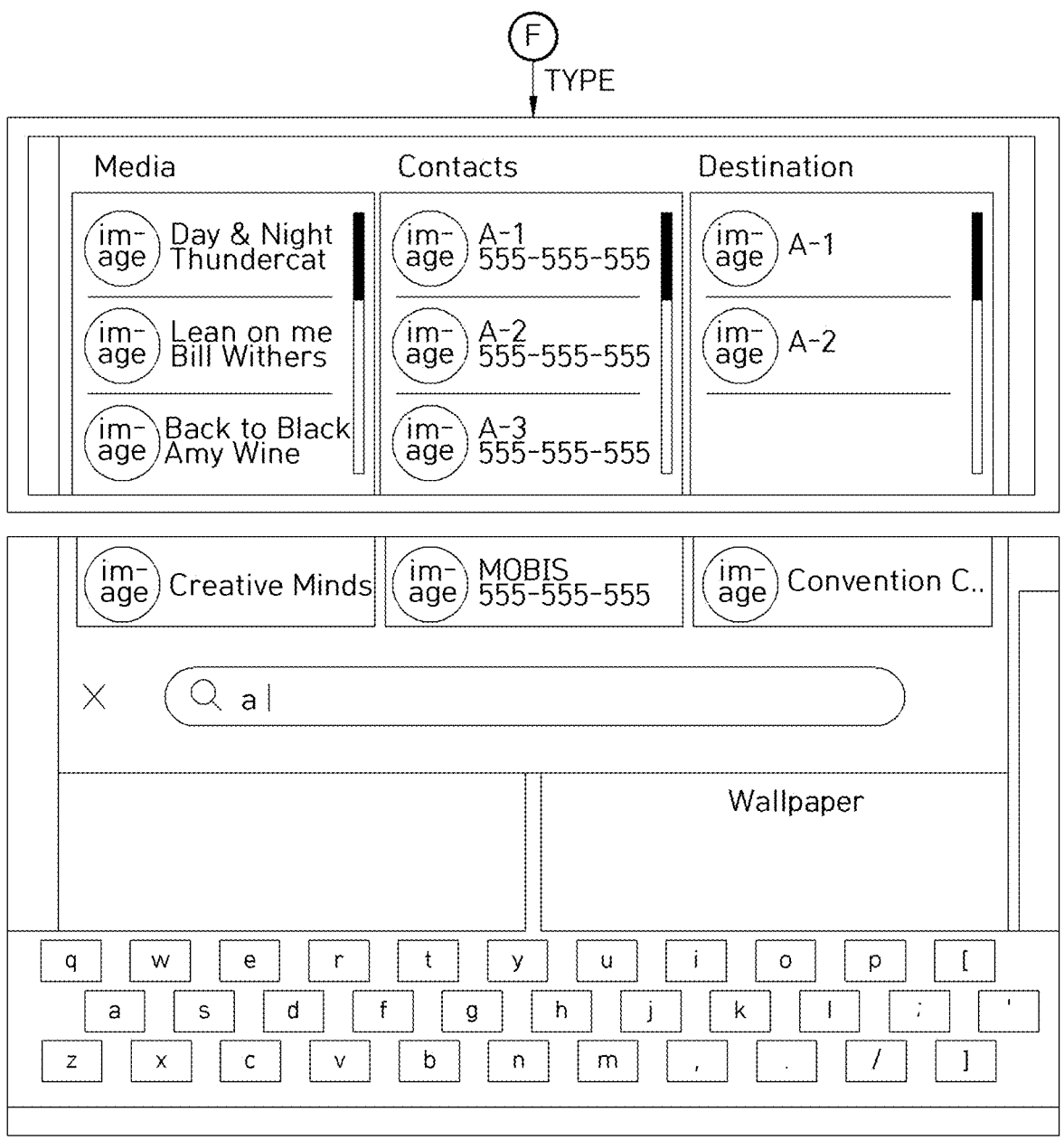
Figure 10A:
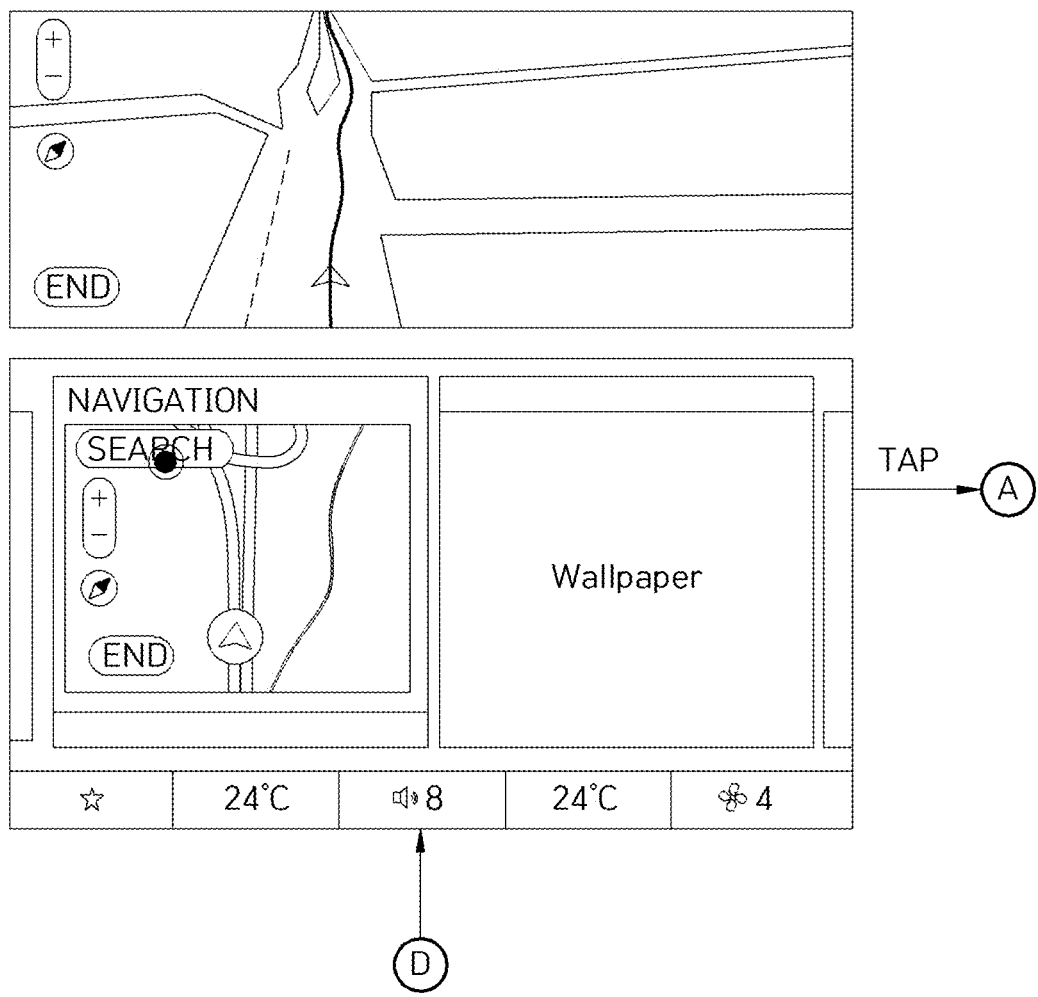
Figure 10B:
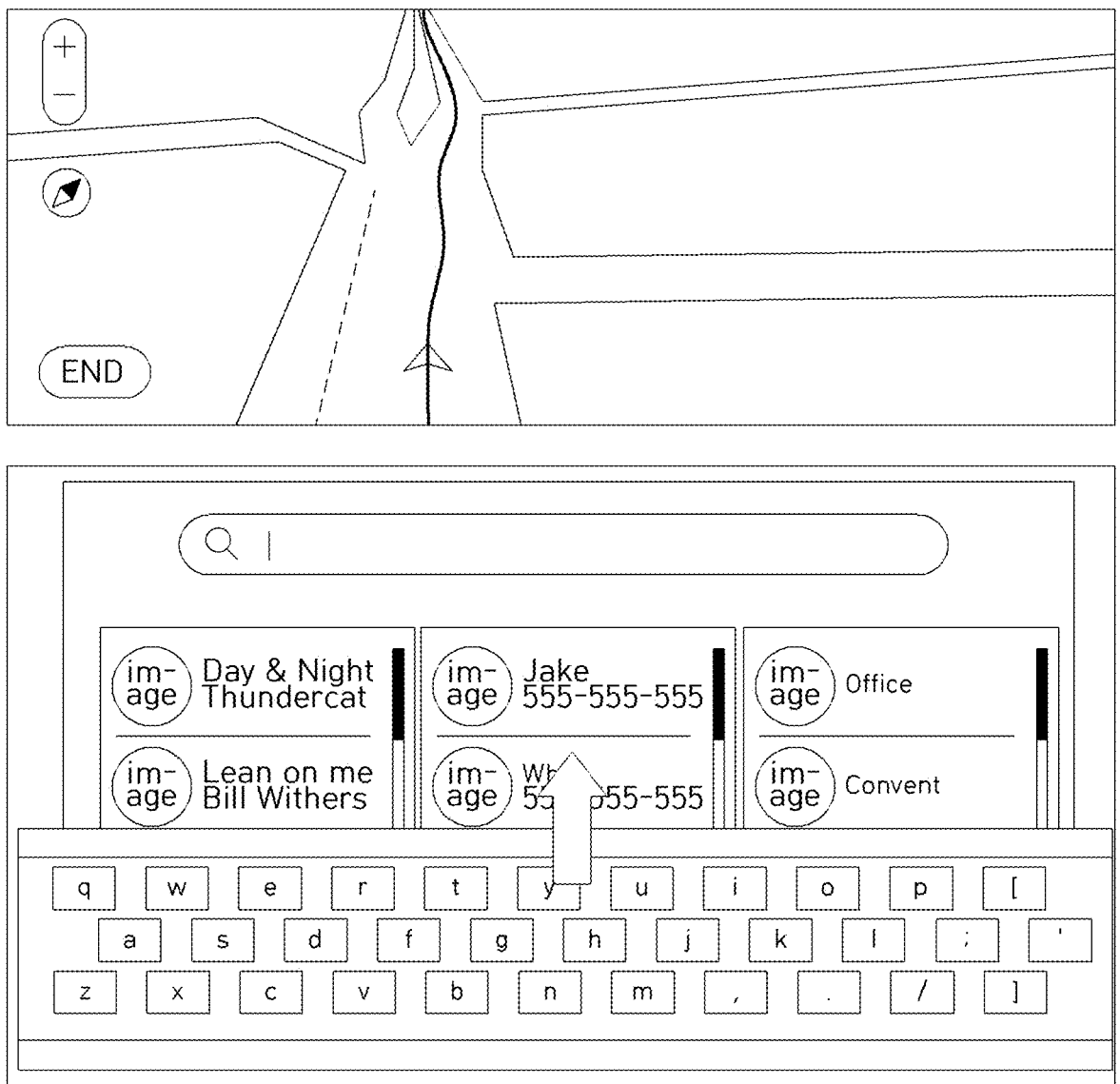
Figure 10C:
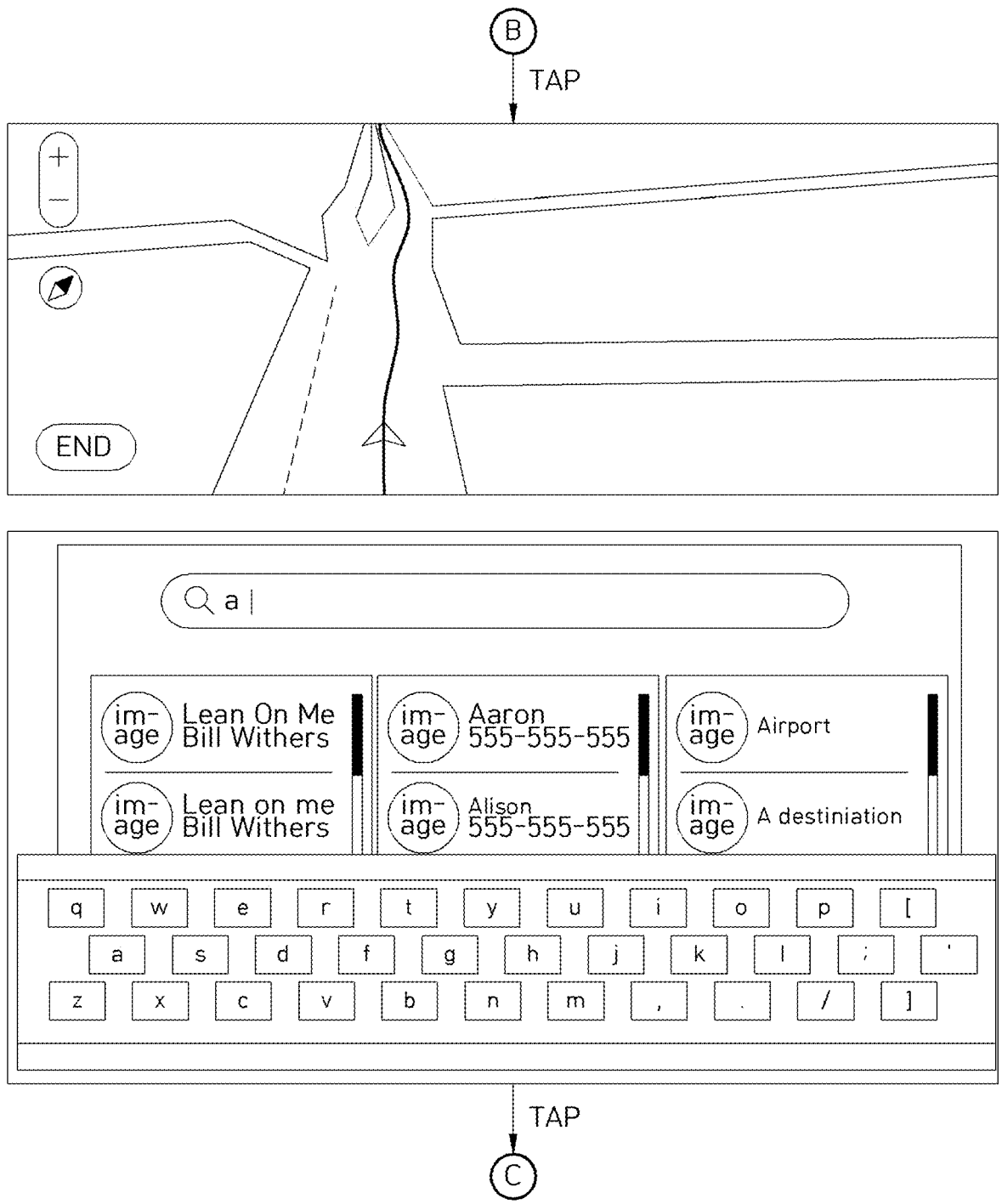
Figure 10D:
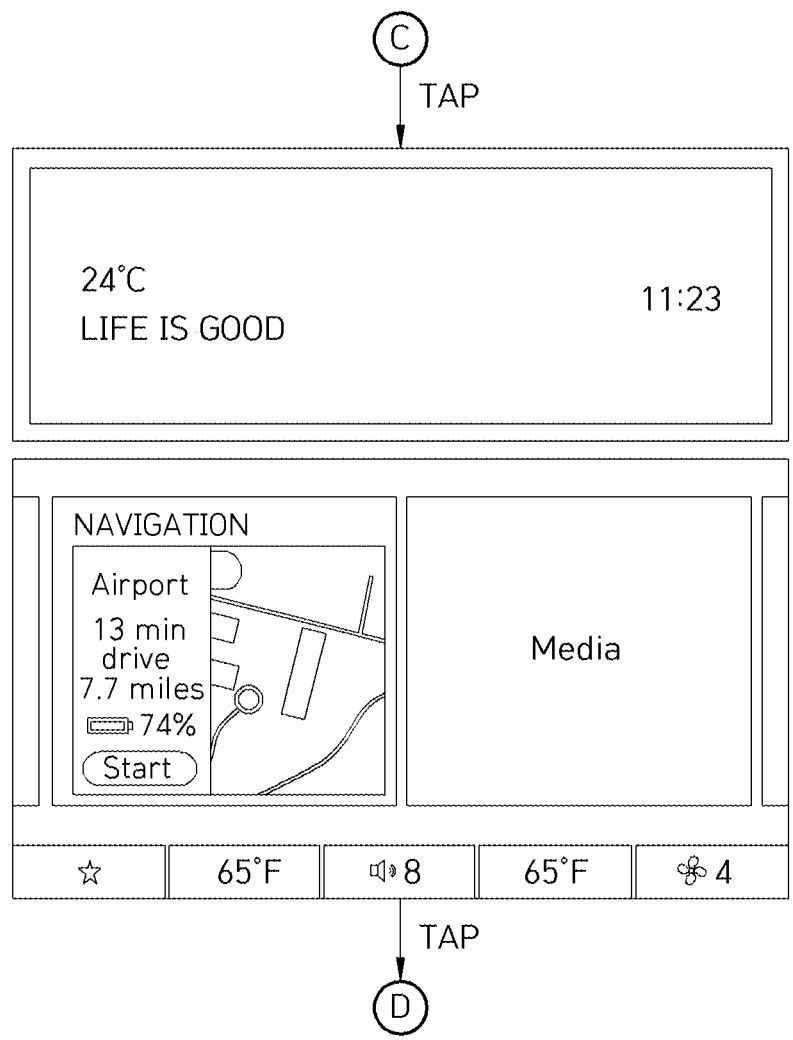

FIGS. 7A and 7B respectively illustrate a before-search screen and a search result screen of the lower display during a navigation operation of the upper display according to an embodiment of the present invention.

Navigation information is displayed on the upper display, and the integrated search screen is displayed on the lower display.

FIG. 7A illustrates a case in which media, contacts, and destinations are each arranged in recent order before a search is conducted, and FIG. 7B illustrates a case in which the media, the contacts, and the destinations are each arranged in alphabetical order according to the search result.

Referring to FIG. 7A, in each of the media, the contacts, and the destinations of the lower display before a search is conducted, the media, the contacts, and the destinations are each arranged and displayed in order they are recently selected, contacted, and set.

Referring to FIG. 7B, when "a" is input to a search window, the media, the contacts, and the destinations, in which "a" is included, are each arranged in alphabetical order and displayed as the search result.

At this point, the media, the contacts, and the destinations may each be displayed in consideration of both a usage frequency and an alphabetical order.

The configuration of the integrated search screen shown in FIGS. 7A and 7B is defined as in Table 4 below.

TABLE 4

| No. | Component | Description |
| --- | --- | --- |
| 1 | Close button | When touched, pop-up disappeared |
| 2 | Search window | Display prompt |
| 3 | Media recent search result list | Title + list structure<br>Music: thumbnail + $1^{st}$ line song title + $2^{nd}$ line artist name<br>Video: thumbnail + video title<br>When touched, execute corresponding media |
| 4 | Contacts recent search result list | Title + list structure<br>Thumbnail + $1^{st}$ line contact name + $2^{nd}$ line phone number<br>Dummy list touch not allowed |
| 5 | Destination recent search result list | Title + list structure<br>Destination icon + destination name<br>When touched, execute navigation |
| 6 | List scroll bar | When there are more than N lists, display scroll bar |
| 7 | Search word matching display | Display color for word matched for input search word |

FIGS. 8A to 8F, 9A to 9G and 10A to 10D illustrate an integrated search process according to an embodiment of the present invention.

Referring to FIGS. 8A to 8F, when moving to an integrated search, an integrated search pop-up is provided, a recent usage list is displayed for each of the media, the contacts, and the destinations, and when a search word is input to the search window, a search result for each of the media, the contacts, and the destination is displayed.

As described above, when the integrated search screen is provided using the upper display and the lower display, the media, the contacts, and the destinations are displayed in recent usage order or alphabetical order on the upper display and a frequently searched search word button may be displayed on the lower display.

When the specific media are selected from the integrated search screen, the corresponding media are reproduced in a media widget, and when the contact is selected, a function of making/transmitting a phone call/message to the corresponding contact may be selected, and when the specific destination is selected, a navigation widget enters a preview screen for a route to the corresponding destination.

When an execution app for the search result is in the screen of the lower display, the execution app is executed following the search and the search result in the corresponding position. When the execution app for the search result is not in the screen, the navigation is executed on the leftmost side. When the navigation is not in the screen, a media or phone widget is executed on the leftmost side, and when the navigation is in the screen, the media or phone widget is executed in a position on the right side of the navigation.

Referring to FIGS. 9A to 9G, when an icon related to "search" is selected from the media widget on the upper or lower display, or a "search" icon is selected from the navigation widget of the upper or lower display, or an icon related to "search" is selected from the phone widget on the lower display, the integrated search window is called. Here, as described above, in the integrated search window, before a search is conducted, media, contacts, and destinations are displayed in recent usage order, and when a search word is input, related media, contacts, and destinations are displayed in alphabetical order or Korean alphabetical order.

Referring to FIGS. 10A to 10D, navigation information is displayed on the upper display, and when the "search" icon is selected from the navigation widget of the lower display, the navigation information is continuously displayed on the upper display, and the integrated search window is called only on the lower display (i.e., the upper display is not used for displaying the integrated search window).

When a destination is selected by inputting a search word in the search window of the lower display, summary information about a route to the selected destination is displayed in the navigation widget of the lower display.

When a selection for start is input in the route summary information displayed on the navigation widget of the lower display, the navigation information is displayed through the upper display and route guidance information is also displayed through the navigation widget of the lower display.

Figure 11:
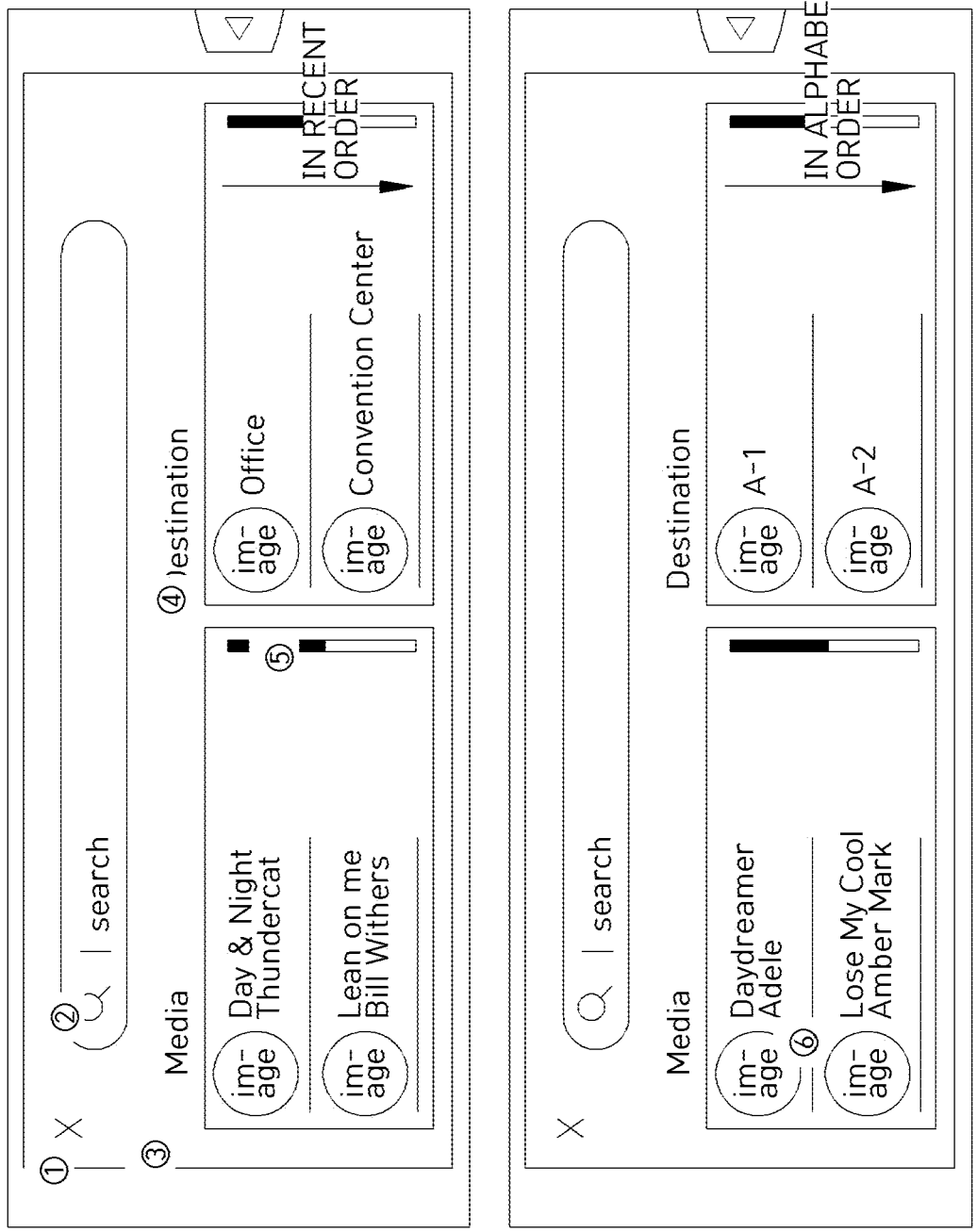
FIGS. 11 and 12A to 12C illustrate an integrated search in a passenger mode according to an embodiment of the present invention.
Figure 12A:
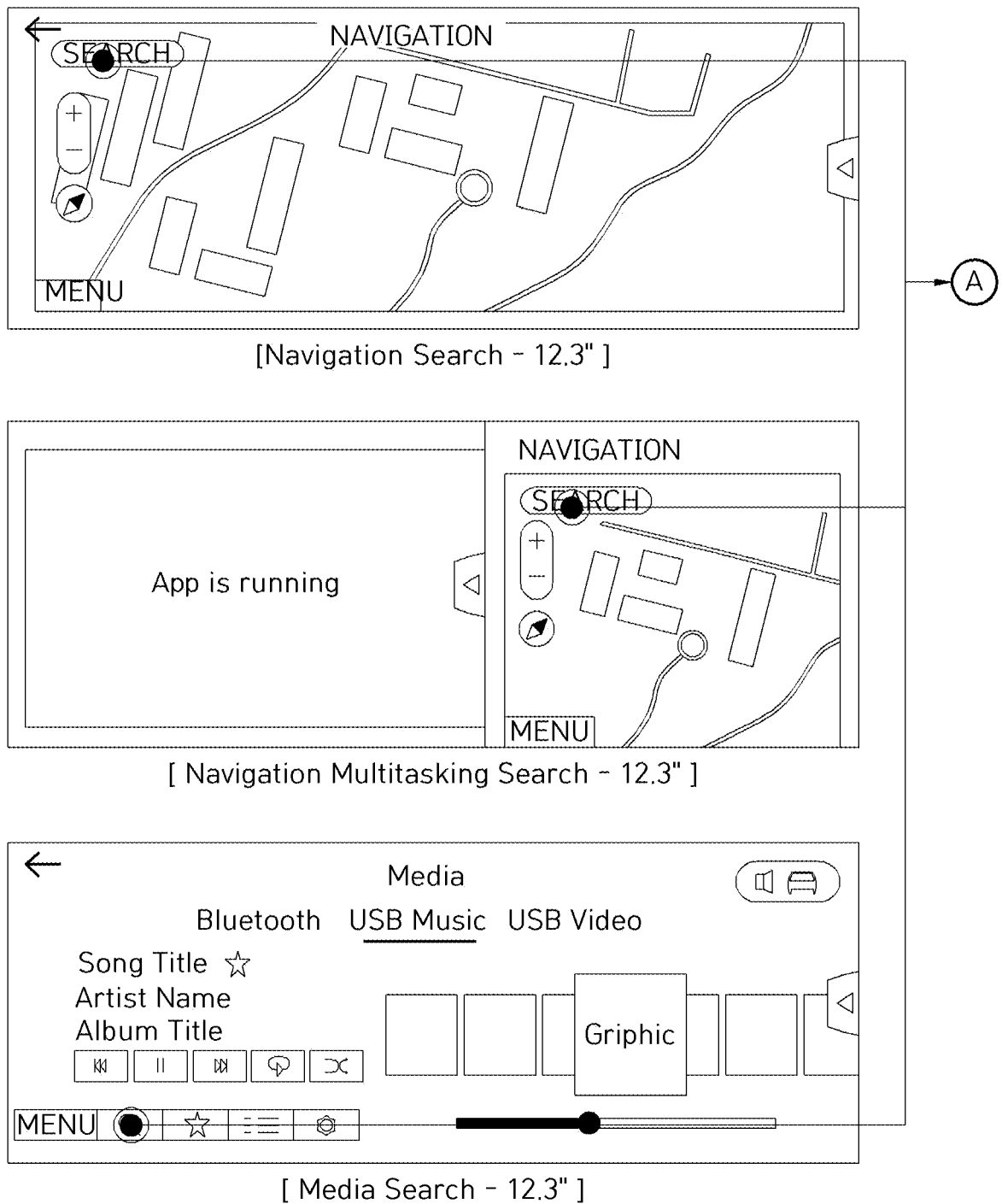
Figure 12B:
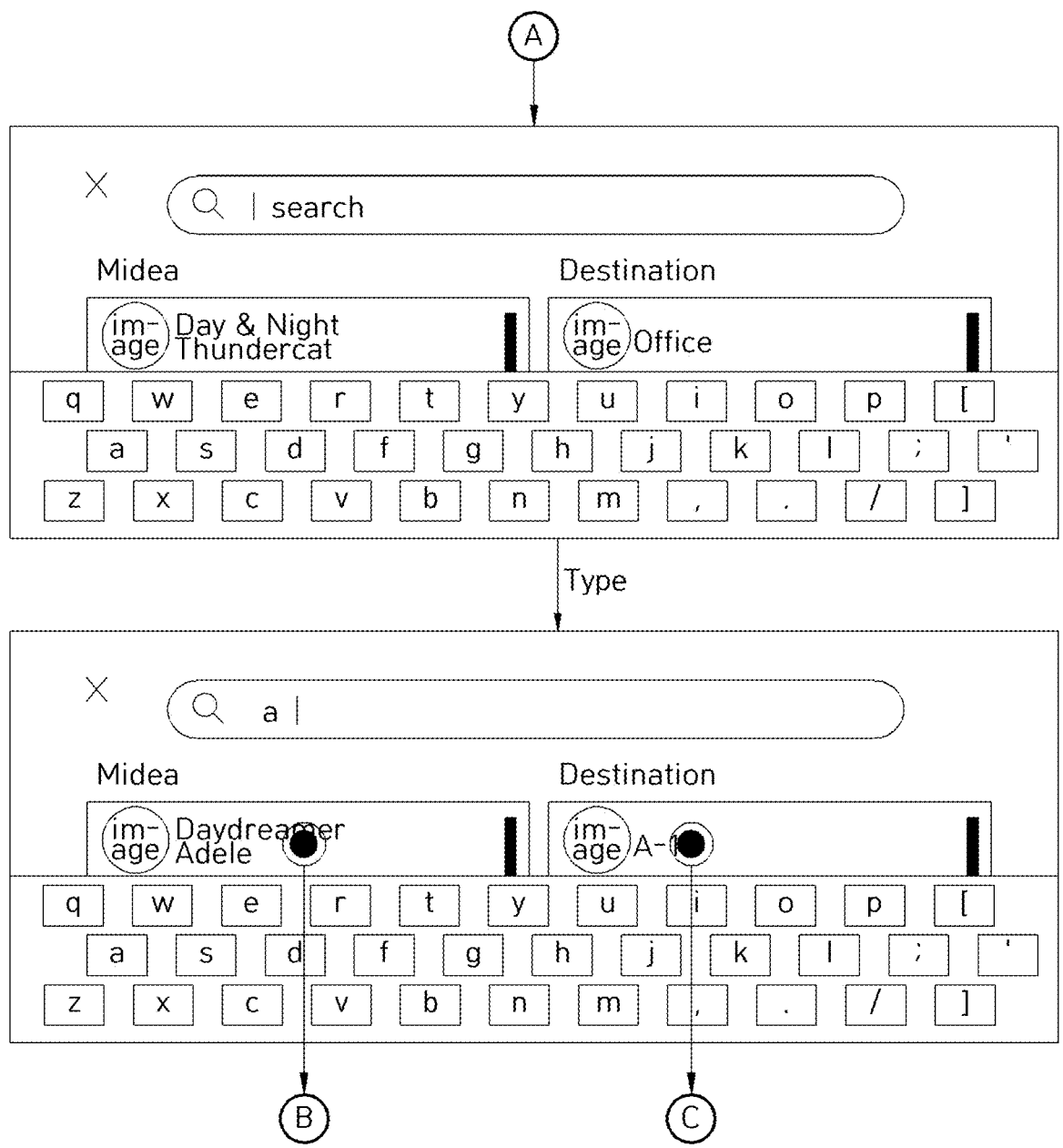
Figure 12C:
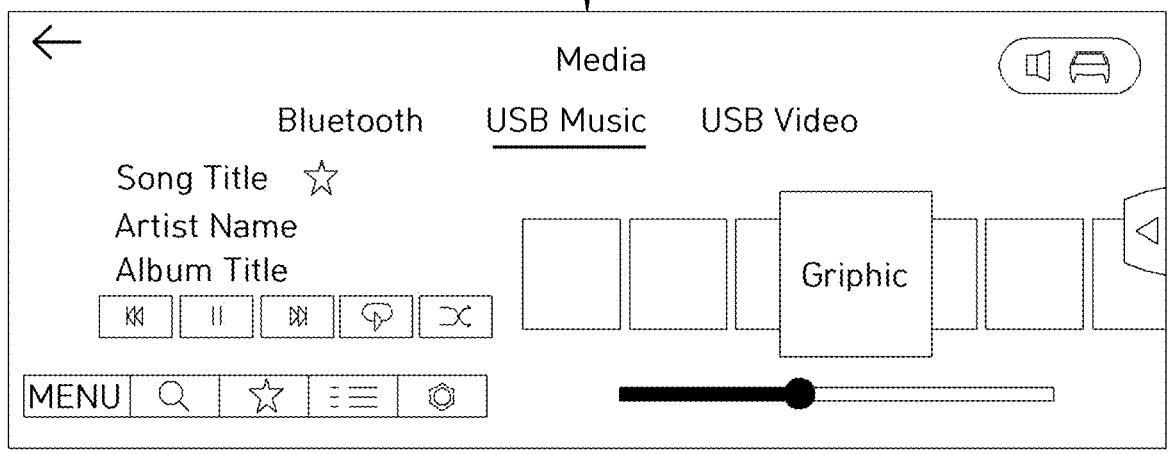
Figure 12C:
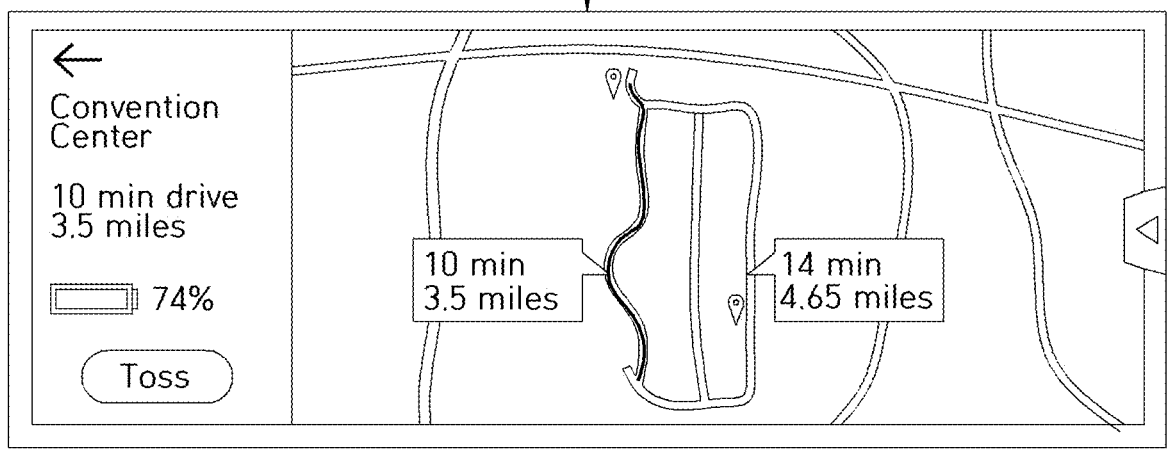

FIGS. 11, 12A and 12C illustrate an integrated search in the passenger mode according to an embodiment of the present invention.

Referring to FIG. 11, in the passenger mode, before a search is conducted, the media and the destinations are arranged and displayed in recent use order, and after the search is conducted, search results for the media and the destinations according to the search are arranged and displayed in alphabetical order.

The configuration of the integrated search in the passenger mode shown in FIG. 11 is defined as in Table 5 below.

TABLE 5

| No. | Component | Description |
| --- | --- | --- |
| 1 | Close button | When touched, pop-up disappeared |
| 2 | Search window | Display prompt |
| 3 | Media recent search result list | Title + list structure<br>Music: thumbnail + 1$^{st}$ line song title + 2$^{nd}$ line artist name<br>Video: thumbnail + video title<br>When touched, execute corresponding media |
| 4 | Navigation recent search result list | Title + list structure<br>Destination icon + destination name<br>When touched, execute navigation |
| 5 | List scroll bar | When there are more than N lists, display scroll bar |
| 6 | Search word matching display | Display color for word matched for input search word |

Referring to FIGS. 12A to 12C, in the passenger mode, when an icon related to "search" is selected from the navigation widget on the upper display, an icon related to "search" is selected from the navigation widget when the navigation and other apps are being executed in a multi-tasking manner, or an icon related to "search" is selected from the media widget, on the upper display, the integrated search window is displayed, selection histories for the media and the destinations are displayed in recent order, and search results for the media and the destinations according to the search word input are displayed in alphabetical order.

In the search result of the integrated search window of the upper display, when a selection for the media is input, the corresponding media are reproduced, and when a selection for the specific destination is input, a preview screen for a navigation route to the corresponding destination is displayed.

According to the related art, information is provided using an image of a front-facing camera, and information about surrounding objects of a vehicle is provided using a surround-view monitoring device, but there is a problem in that a captured image of a limited area is displayed through a display of a fixed area.

In order to solve the above problem, the present invention is directed to providing an apparatus capable of intuitively recognizing an image, which is obtained according to an image capturing angle, by a driver using multiple displays, and providing a surround-view monitoring screen according to display settings and a driving situation.

Figure 13:
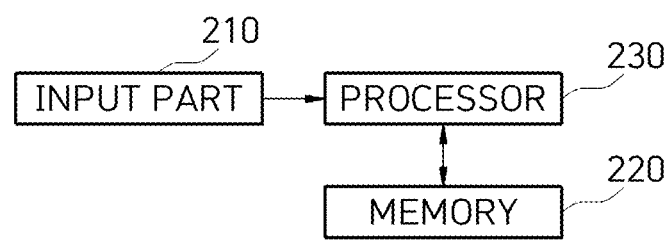
FIG. 13 illustrates an apparatus for controlling monitoring a front-facing camera image and a surround view using multiple displays according to an embodiment of the present invention.

FIG. 13 illustrates an apparatus for controlling monitoring a front-facing camera image and a surround view using multiple displays according to an embodiment of the present invention.

According to an embodiment of the present invention, the apparatus for controlling monitoring a front-facing camera image and a surround view using multiple displays includes an input part 210 configured to receive a vehicle surroundings confirmation request signal, a memory 220 in which a program for controlling to display a front image and a surround-view monitoring image upon receiving the vehicle surroundings confirmation request signal is stored, and a processor 230 configured to execute the program. The processor 230 controls to display the image using at least one of the lower display disposed in the cockpit and the upper display disposed above the lower display, and controls an image capturing angle or an image display area to be adjusted according to the operation of a knob.

In displaying the front image, the processor 230 adjusts the image capturing angle of the front-facing camera or the display area of the acquired front image in response to knob angle operation in a preset range.

The processor 230 controls to display an image acquired through an under-vehicle recognition camera in response to knob angle operation deviating from the preset range.

The processor 230 controls to overlay and display at least one of an overall width of the vehicle and a guideline for a wheel position of the vehicle on the image.

The processor 230 controls to display a surround-view monitoring image on the upper display in the case of a driver mode, and controls to display the surround-view monitoring image on the lower display in the case of a passenger mode.

The processor 230 controls the surround-view monitoring image to be displayed on the upper display or the lower display according to a request for displaying the surround-view monitoring image, or a reverse gear "R."

As the knob moves to a predetermined area, the processor 230 controls a pop-up screen to be called and to wait for a request for displaying an image.

Figure 14:
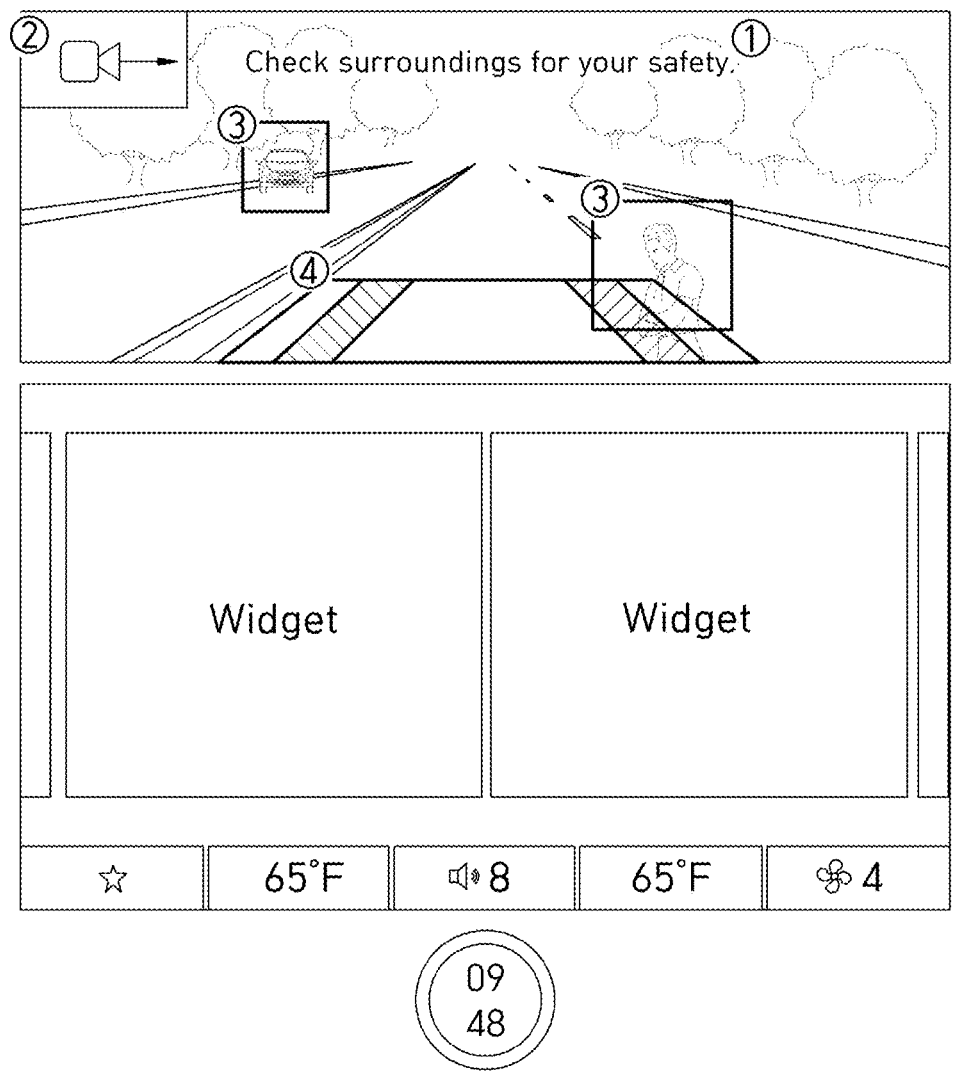
FIG. 14 illustrates an upper display screen and a lower display screen in a default mode according to an embodiment of the present invention.

FIG. 14 illustrates an upper display screen and a lower display screen in a default mode according to an embodiment of the present invention.

An image acquired using the front-facing camera is displayed on the upper display, and a widget is displayed on the lower display.

On the upper display, a warning phrase is displayed in an overlay form, angle information of the camera acquiring a current image is displayed, object detection information is displayed, and vehicle overall width information is displayed.

The configuration of the front-facing camera screen of the upper display shown in FIG. 14 is as shown in Table 6 below.

TABLE 6

| No. | Component | Description |
|---|---|---|
| 1 | Warning phrase | Display warning phrase in overlay form |
| 2 | Camera angle | When knob rotated, display view angle adjustment icon |
| 3 | Object Detection | detect animal (vehicle/pedestrian) and express real-time in overlay box form |
| 4 | Vehicle overall width guide | Display vehicle overall width guide in overlay form |

Figure 15:
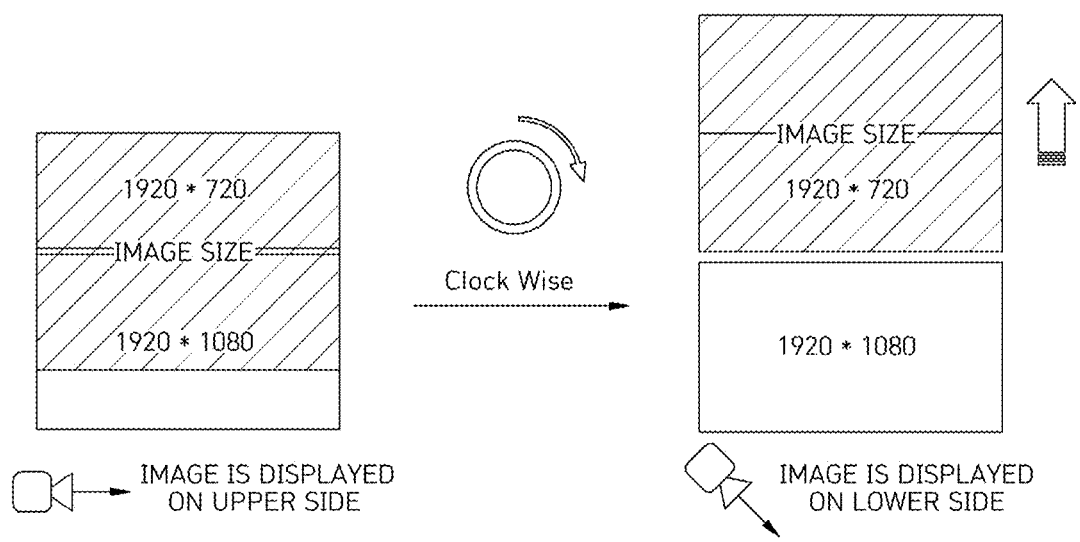
FIG. 15 illustrates image display in consideration of an image size according to an embodiment of the present invention.

FIG. 15 illustrates image display in consideration of an image size according to an embodiment of the present invention.

According to an embodiment of the present invention, an upper display area is 1920×720, and a lower display area is 1920×1080.

When a resolution of the image acquired through the camera is 1620×1250, the image is enlarged according to a horizontal width of 1920 of the display.

As shown in FIG. 15, some images may be displayed on one of the upper display and the lower display.

As shown in FIG. 15, an image corresponding to an entire image size may be displayed across the area of the upper display and the area of the lower display.

According to knob operation information, it is possible to adjust which portion of the image acquired using the camera is to be displayed.

For example, as shown in FIG. 15, when the knob is adjusted to a predetermined angle in a clockwise direction, a lower portion of the image acquired corresponding thereto may be adjusted to be displayed on the upper display.

FIGS. 16A to 16C and 17A to 17D illustrate front image display according to an embodiment of the present invention.

Figure 16A:
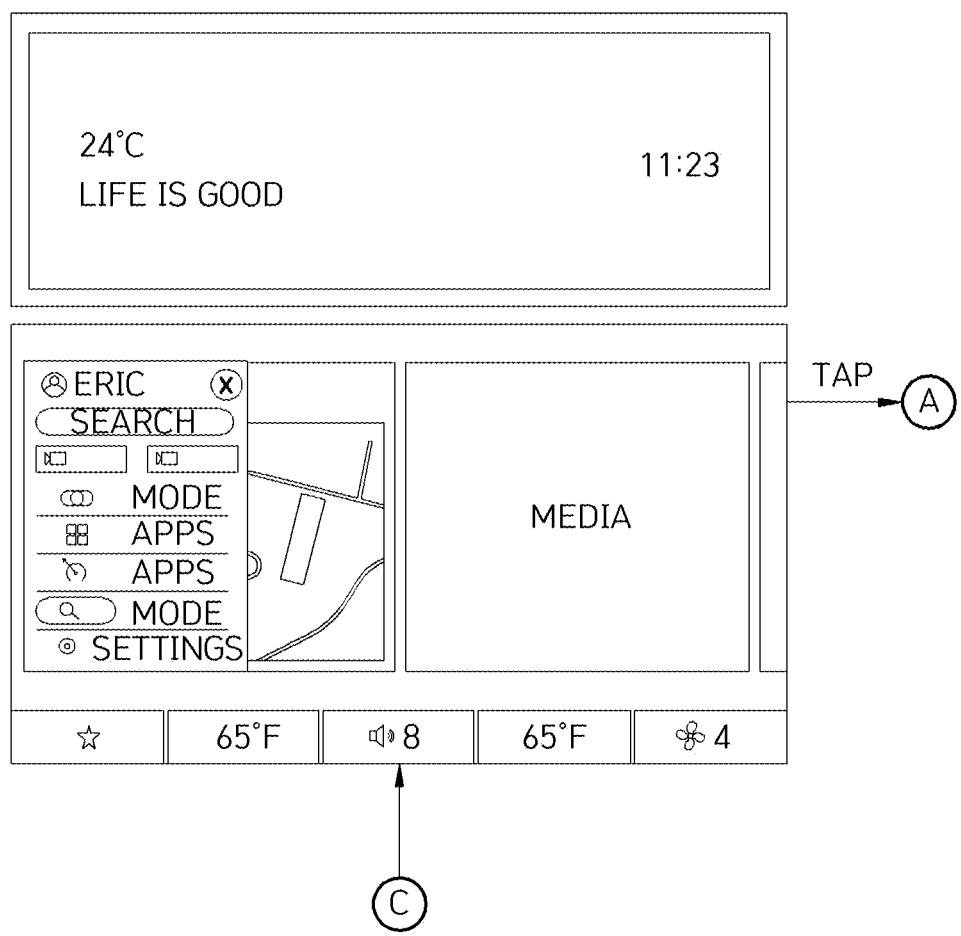
Figure 16B:
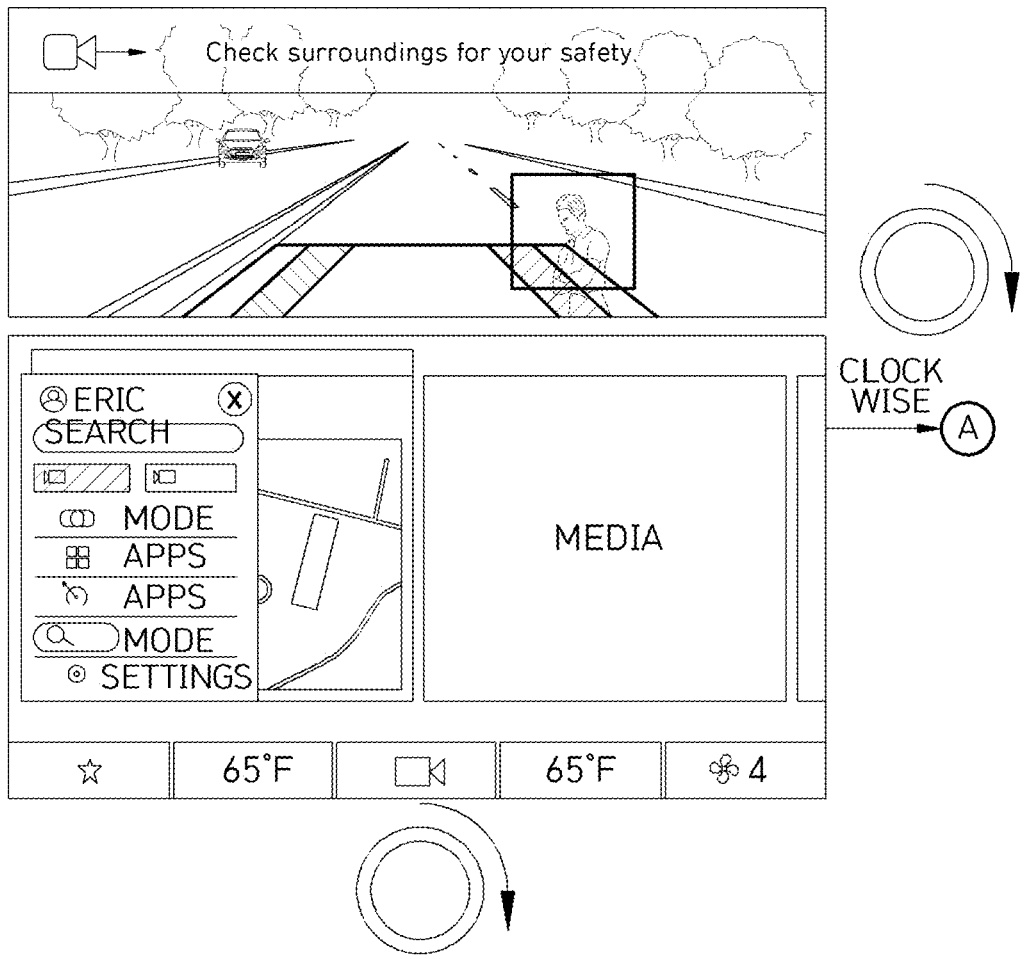
Figure 17A:
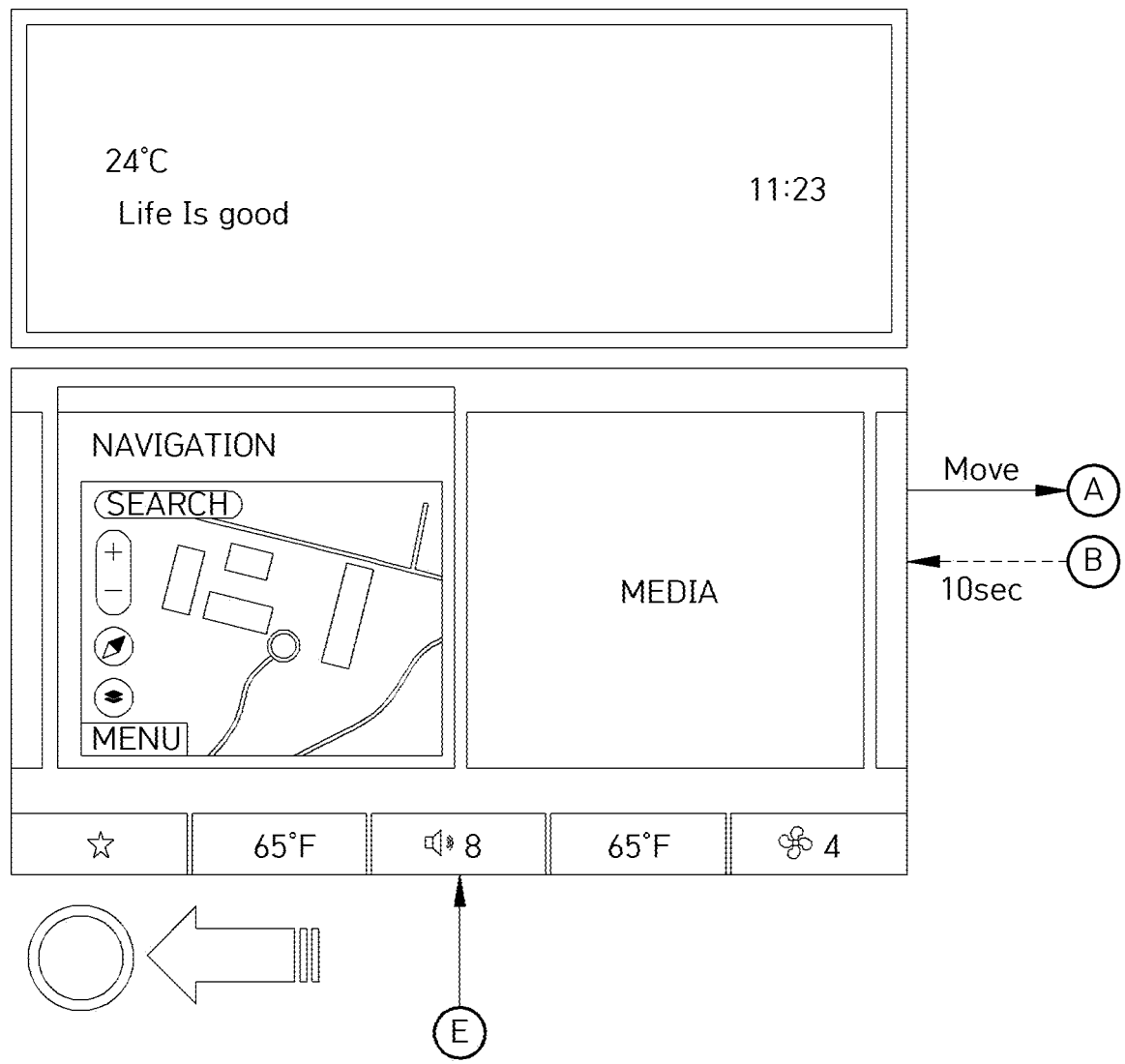
Figure 17B:
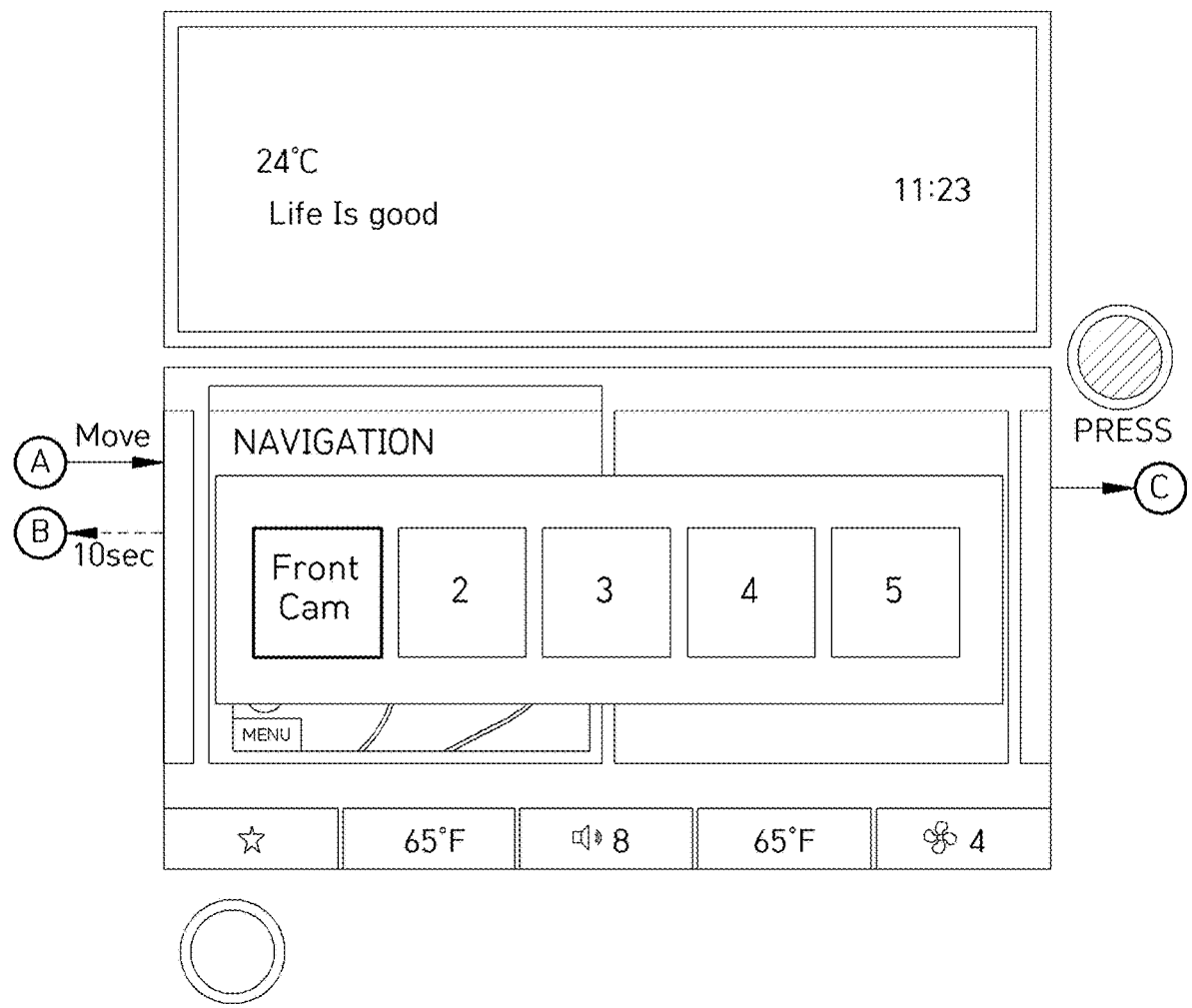
Figure 17C:
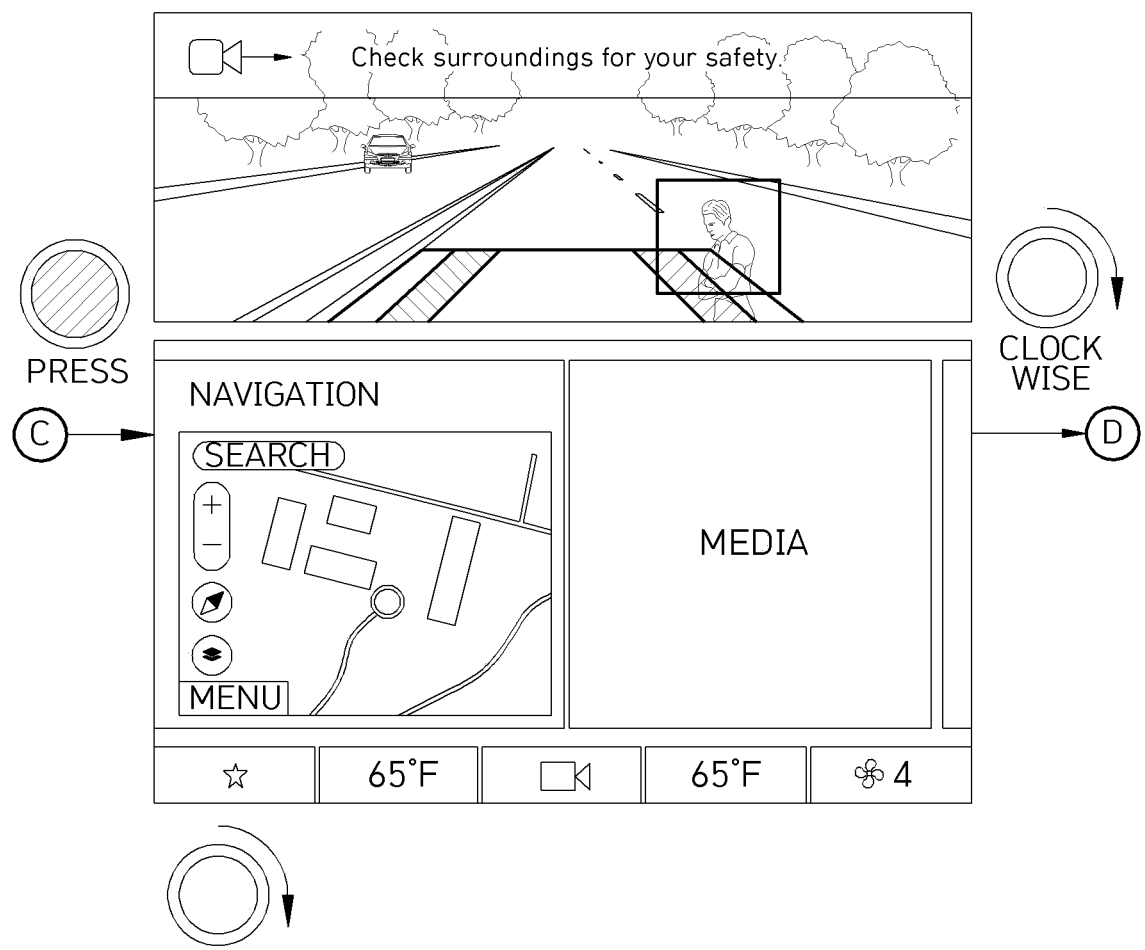
Figure 17D:
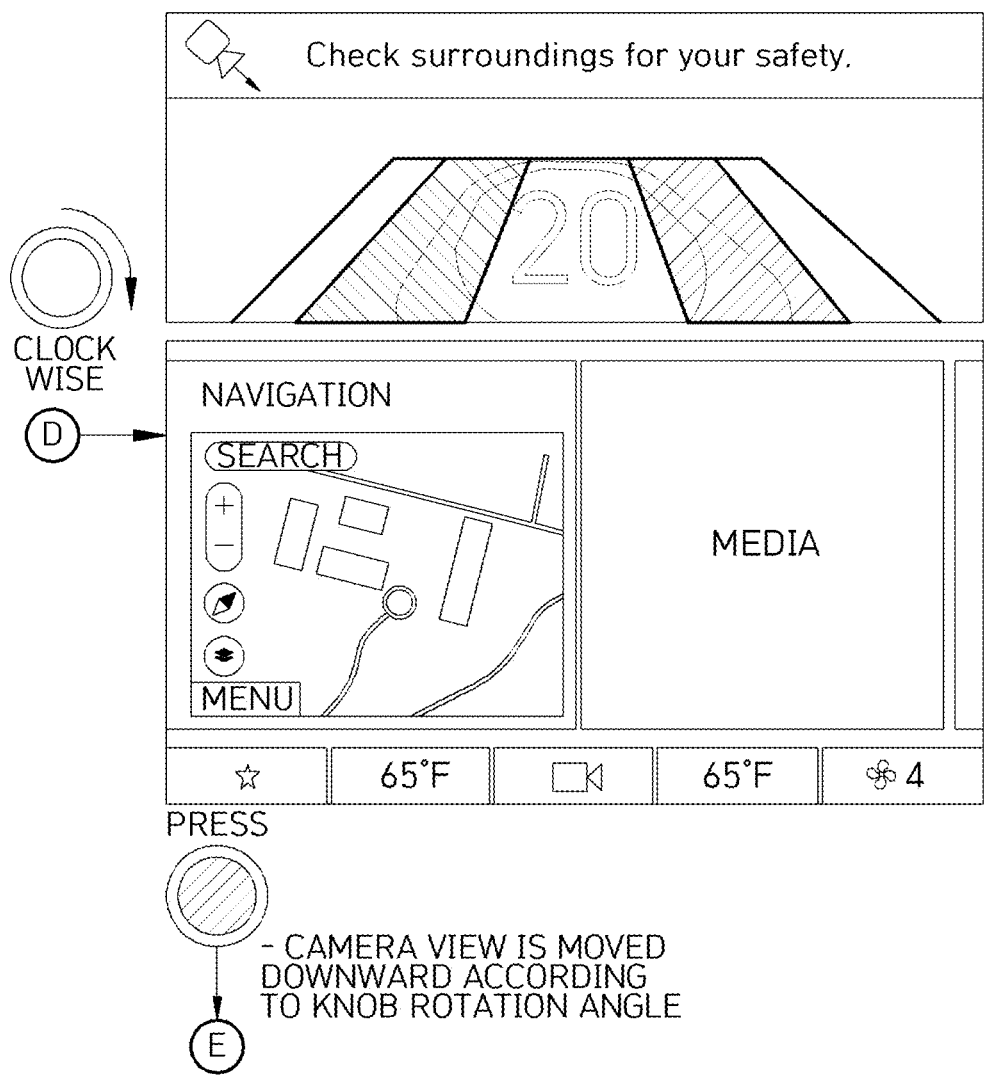

Referring to FIGS. 16A to 16C a front-facing camera icon is selected from the lower display to request a front-facing camera image to be displayed on the upper display.

When front-facing camera image display is performed, an angle of the knob is adjusted to adjust an image capturing angle of the front-facing camera in real time according to the angle.

When the knob is rotated beyond a predetermined range, the camera for recognizing the underside of the vehicle is activated, and an under-vehicle image is displayed on the upper display.

Through this, a driver may intuitively recognize an obstacle under the vehicle.

In displaying the image acquired through the front-facing camera and the under-vehicle recognition camera, at least one of a guideline for the overall width and a guideline for a vehicle wheel position is overlayed on the image and the overlayed image is displayed, thereby supporting the driver to easily avoid an obstacle.

When the knob is pressed while the front-facing camera image is displayed on the upper display, the front-facing camera image display is ended.

Referring to FIGS. 17A to 17D, as the knob is moved, a pop-up screen is called out.

At this point, when there is no operation for a predetermined time (e.g., 10 seconds) after the pop-up screen is called, the pop-up screen disappears.

When the front-facing camera is focused on the pop-up screen and the knob is pressed, an image acquired using the front-facing camera is displayed on the upper display.

As described above, as the angle of the knob is adjusted, the display area of the image acquired using the front-facing camera is selected, or the image capturing angle of the front-facing camera is adjusted.

When the knob is operated beyond a predetermined range, the image acquired through the under-vehicle recognition camera is displayed on the upper display, and at least one of the guide information about the overall width of the vehicle and the guide information about the vehicle wheel position is overlayed on the image and the overlayed image is displayed.

FIGS. 18A, 18B, 19A, 19B, and 19C illustrate surround-view monitoring screen display according to an embodiment of the present invention.

In the driver mode, widget information is displayed on the lower display and an SVM screen is displayed on the upper display.

In the passenger mode, the upper display is linked with a mobile phone of a passenger, and the SVM screen is displayed on the lower display.

The SVM screen is automatically displayed on the upper or lower display in the case of the reverse gear R.

Warning phrases and a vehicle top view image as shown in Table 7 below are displayed in the SVM screen.

TABLE 7

| No. | Component | Description |
|---|---|---|
| 1 | Warning phrase | Display warning phrase in overlay form |
| 2 | Vehicle image | Display vehicle top view image |

Figure 18A:
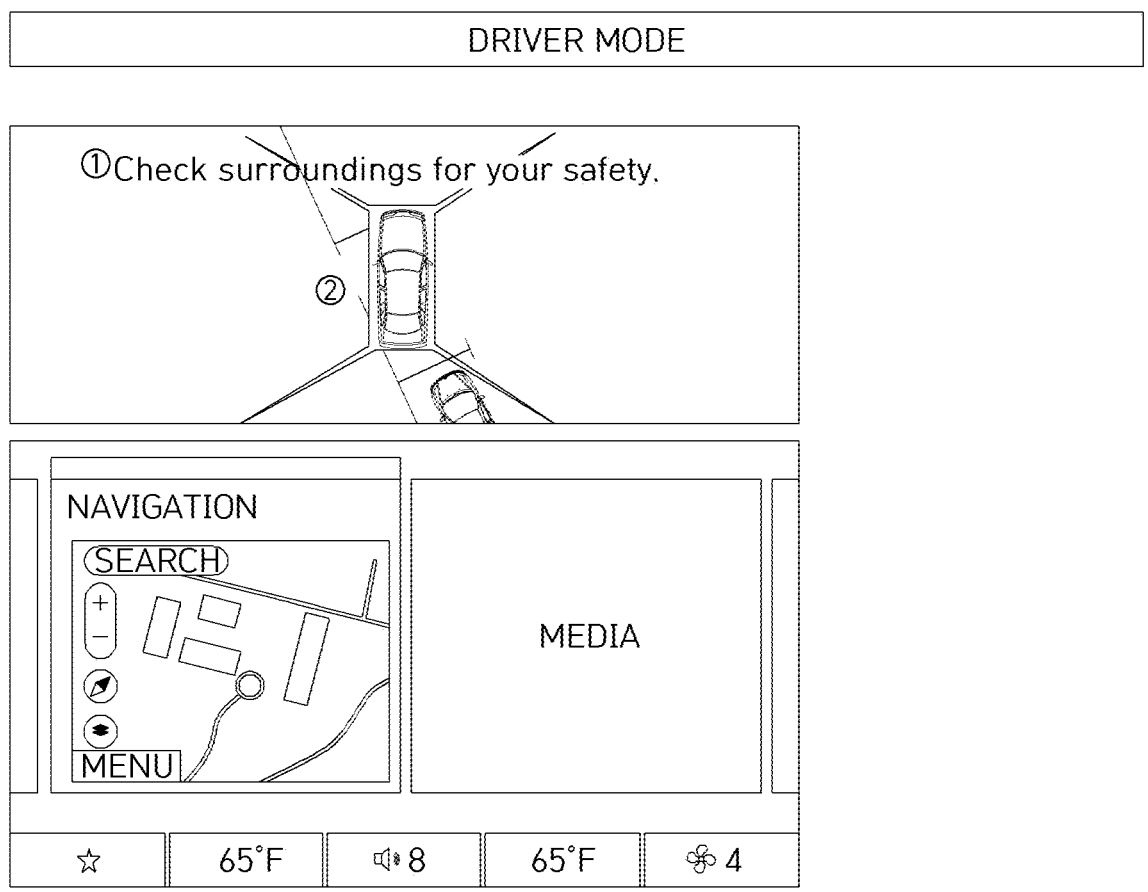
Figure 18B:
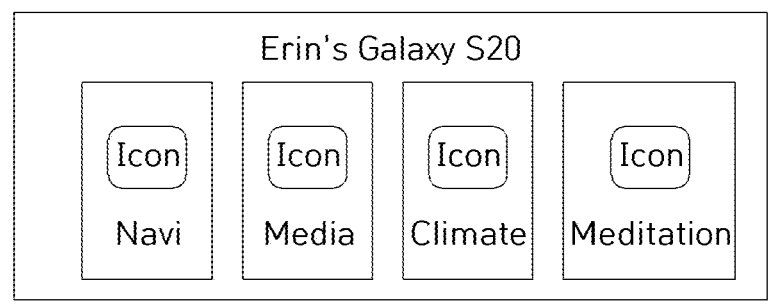
Figure 18B:
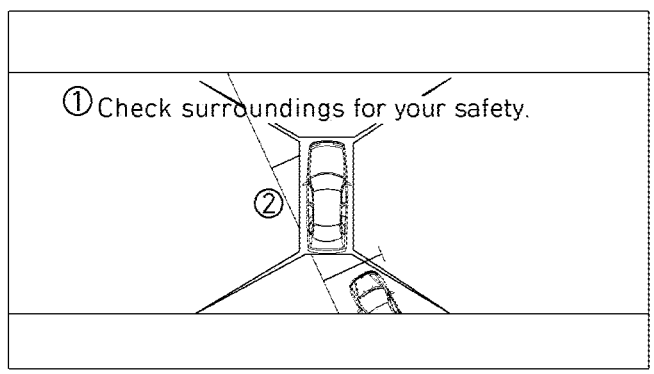
Figure 19A:
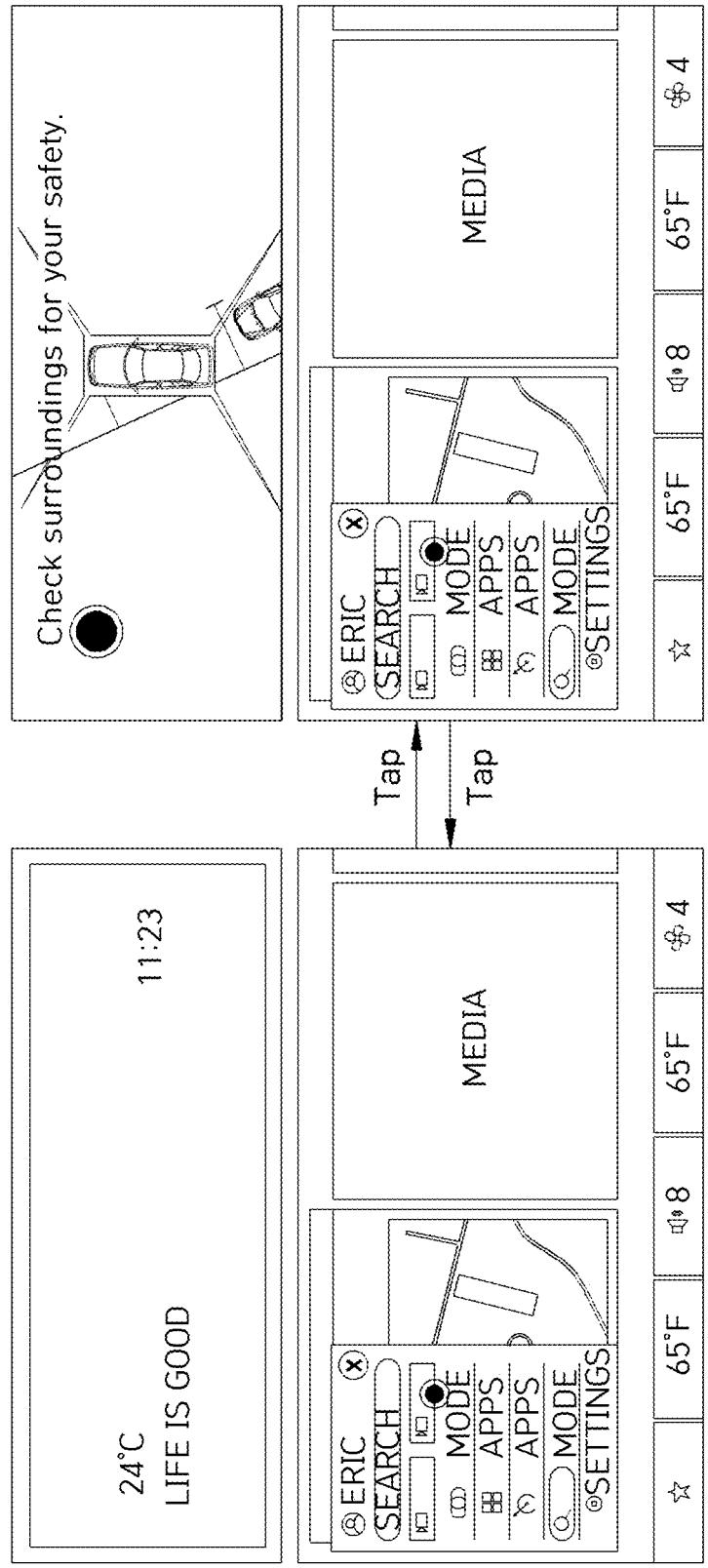
Figure 19B:
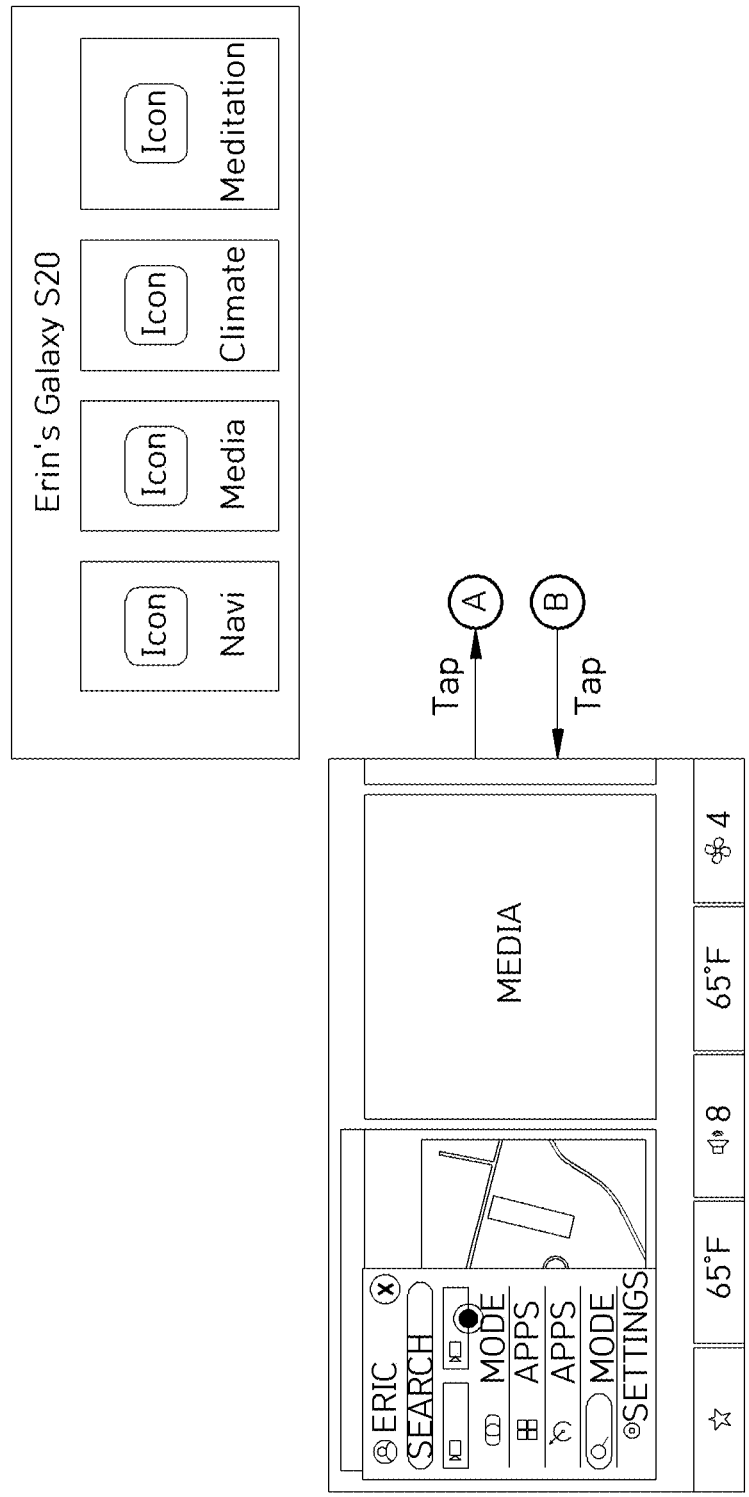

Referring to FIGS. 18A and 18B, when a request for displaying an SVM screen is received or the reverse gear R is engaged, the SVM screen is executed in the form of a global pop-up.

When the reverse gear R is released, the upper display returns to a previous screen.

In the passenger mode, when a request for displaying an SVM screen through the lower display is received or the reverse gear R is engaged, the SVM screen is displayed on the lower display.

When the reverse gear R is released or a signal, which is generated by touching any one point in the entire area of the lower display on which the SVM screen is displayed, is received, the lower display returns to the previous screen.

According to the related art, there is a limitation in which navigation information is displayed only in a limited audio video navigation (AVN) display area.

In order to solve the above problem, the present invention is directed to providing a navigation control apparatus capable of supporting a driver to easily check route guidance information by controlling navigation according to a situation using multiple displays.

Figure 20:
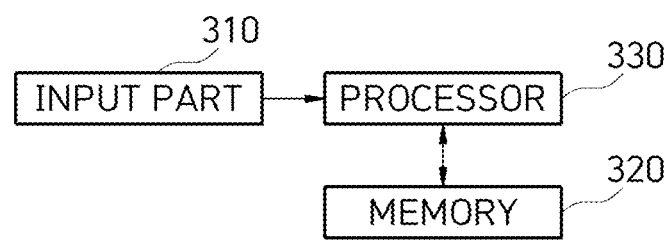
FIG. 20 illustrates a navigation control apparatus using multiple displays according to an embodiment of the present invention.

FIG. 20 illustrates a navigation control apparatus using multiple displays according to an embodiment of the present invention.

The navigation control apparatus using multiple displays according to an embodiment of the present invention includes an input part 310 configured to receive a navigation request signal, a memory 320 in which a program for controlling to display navigation information using multiple displays upon receiving the navigation request signal is stored, and a processor 330 configured to execute the program. The processor 330 controls to display the navigation information using at least one of the lower display disposed in the cockpit and the upper display disposed above the lower display.

In a case in which the processor 330 controls to display the navigation information on the lower display and the upper display, when a navigation application is operated in any one area of the lower display and the upper display, the processor 330 controls search and menu buttons to not be exposed in the other area.

The processor 330 uses response information according to the calling of the pop-up window to display a 3D driving image or an augmented reality (AR) driving image on the upper display.

In a case in which the navigation information is displayed on the lower display and the upper display, when the mode is changed to a passenger mode, the processor 330 changes the upper display to an area for passenger content viewing and maintains the display of the navigation information through the lower display.

In a case in which a navigation widget is being executed in an area outside the screen of the lower display, when the mode is changed to the passenger mode, the processor 330 moves the navigation widget to an area in the screen of the lower display.

In setting a destination, the processor 330 provides 3D image information and provides a destination confirmation function using a rotation function to support route guidance setting for a specific point of the destination.

In the passenger mode, when the navigation application is executed through the upper display, and a request to send route guidance information to the driver who has set destination information is received, the processor 330 controls to provide the route guidance information through the lower display.

Figure 21A:
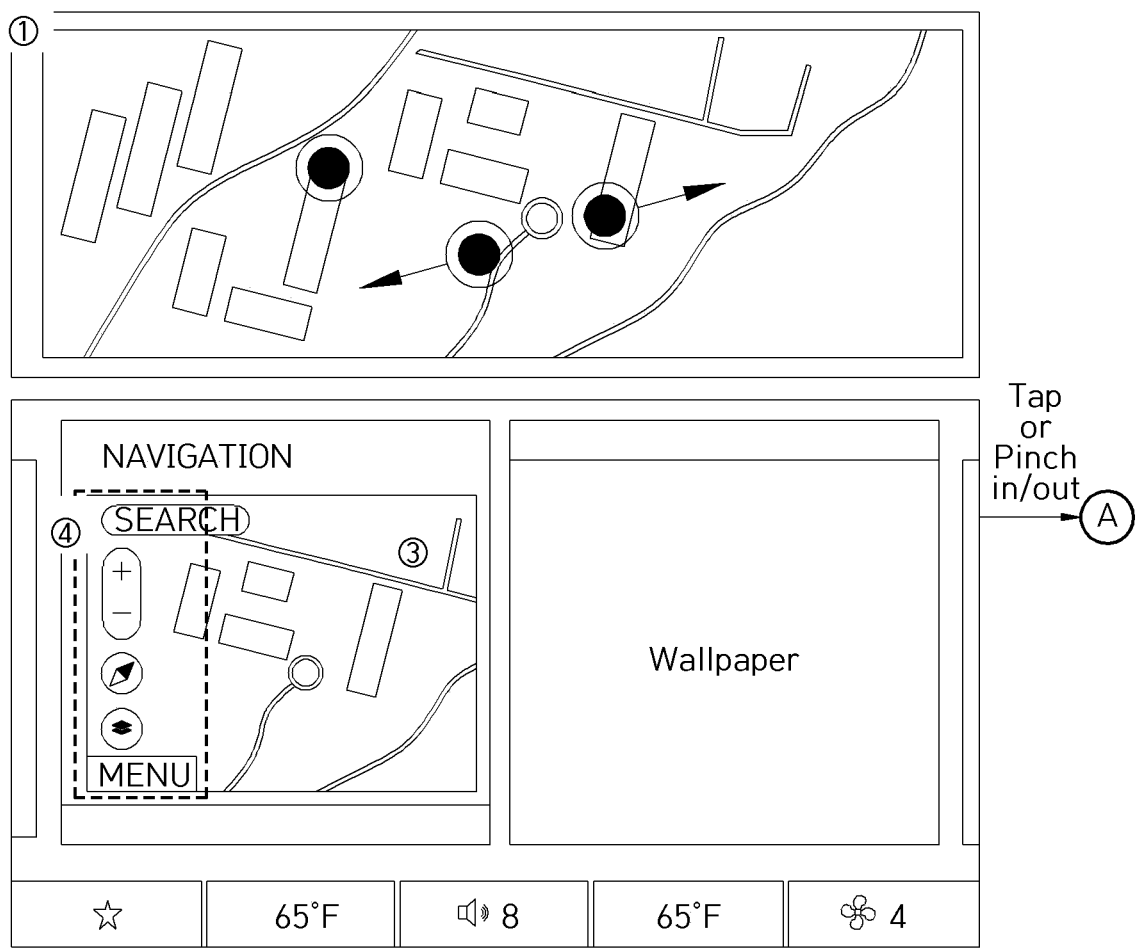
FIGS. 21A and 21B illustrate navigation display before driving according to an embodiment of the present invention.
Figure 21B:
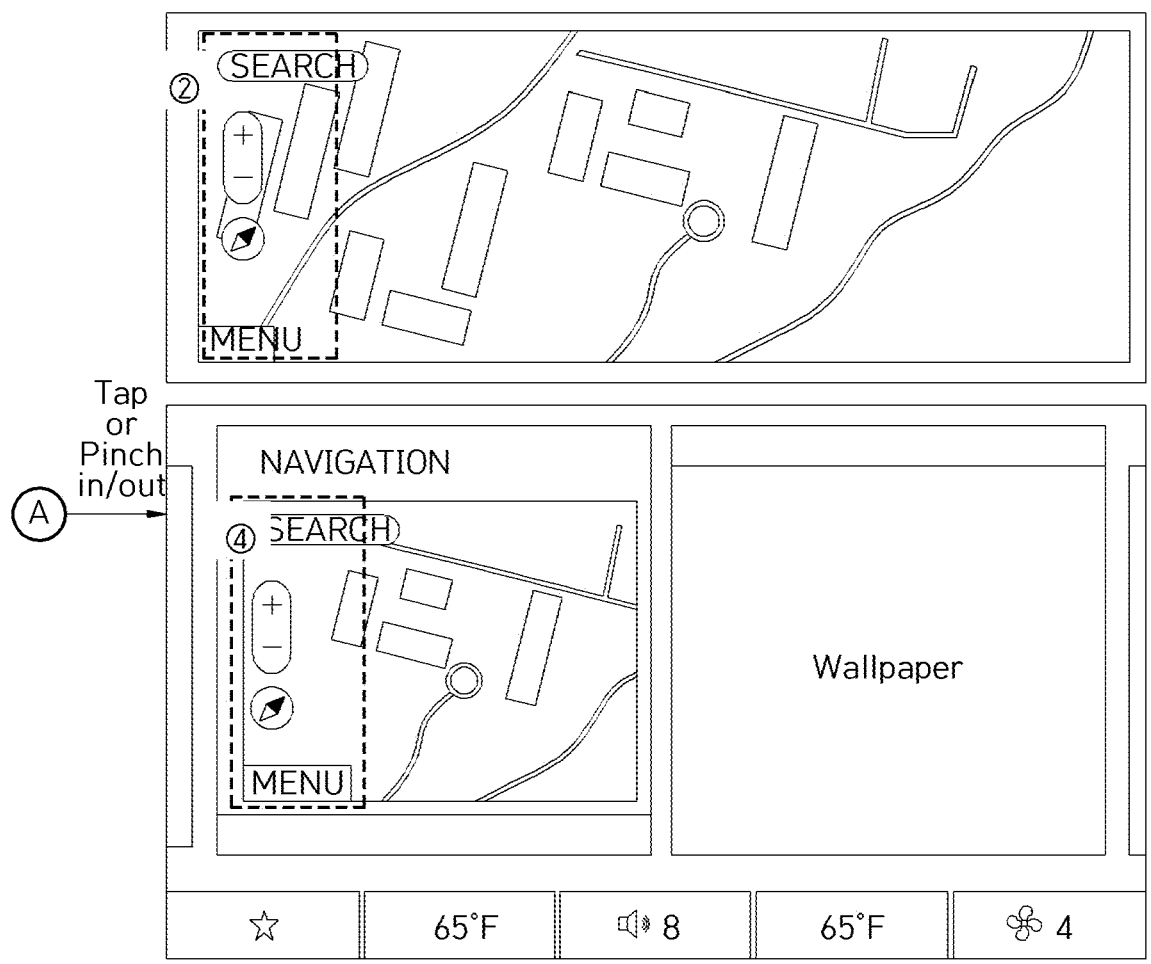

FIGS. 21A and 21B illustrate navigation display before driving according to an embodiment of the present invention.

Before driving, on the upper display, a map image is displayed, and, when there is a touch event, a search button, an enlargement/reduction button, and a menu button are displayed.

On the lower display, the map image is displayed, and the search, enlargement/reduction, and menu buttons are always displayed.

The configuration and definition of the navigation display before driving shown in FIGS. 21A and 21B is as shown in Table 8 below.

TABLE 8

| No. | Component | Description |
| --- | --- | --- |
| 1 | 12.3" navigation app | Map image |
| 2 | 12.3" button | Display when there is driving image touch event (disappear after 5 sec) |
| 3 | 13.2" navigation app | Map image |
| 4 | 13.2" button | Always display |

Figure 22A:
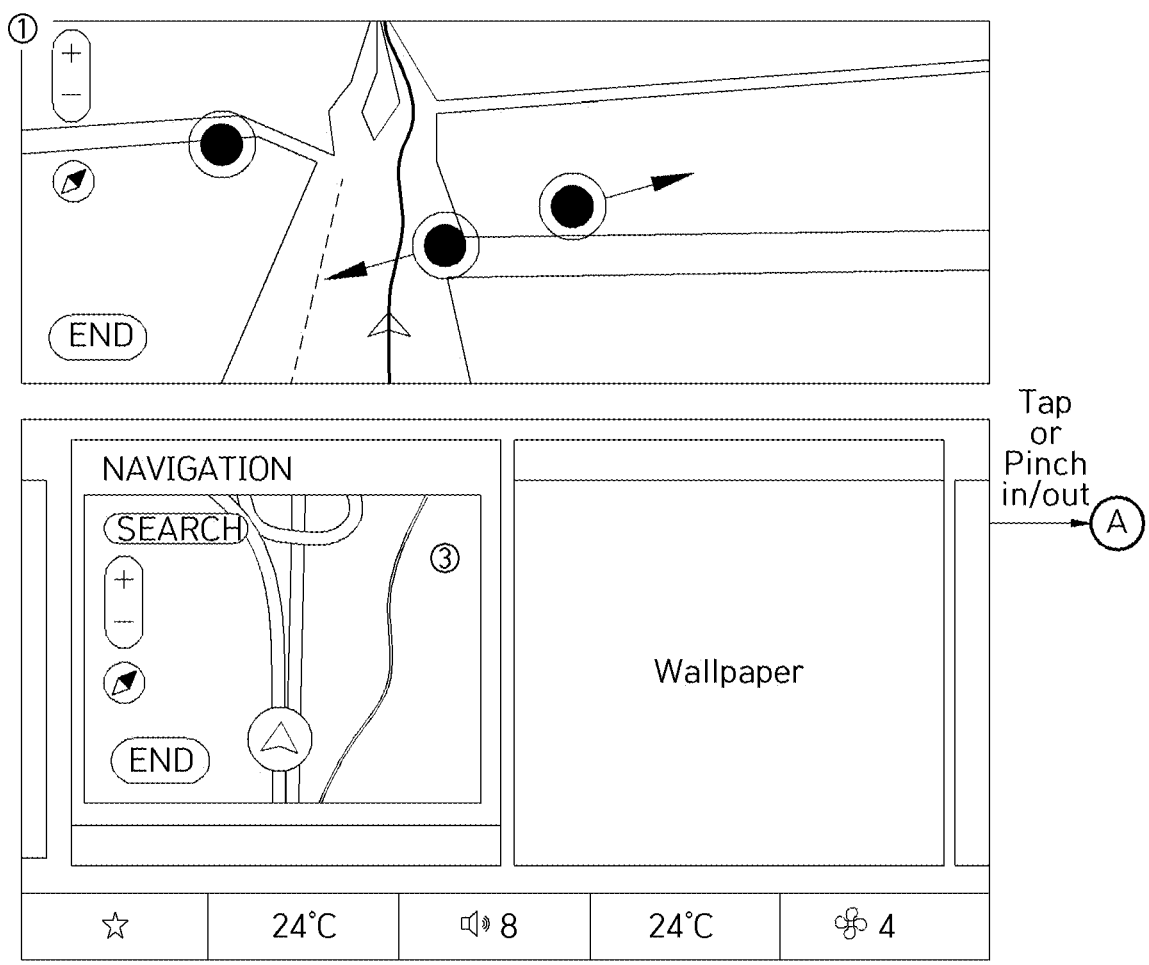
FIGS. 22A and 22B illustrate navigation display during driving according to an embodiment of the present invention.
Figure 22B:
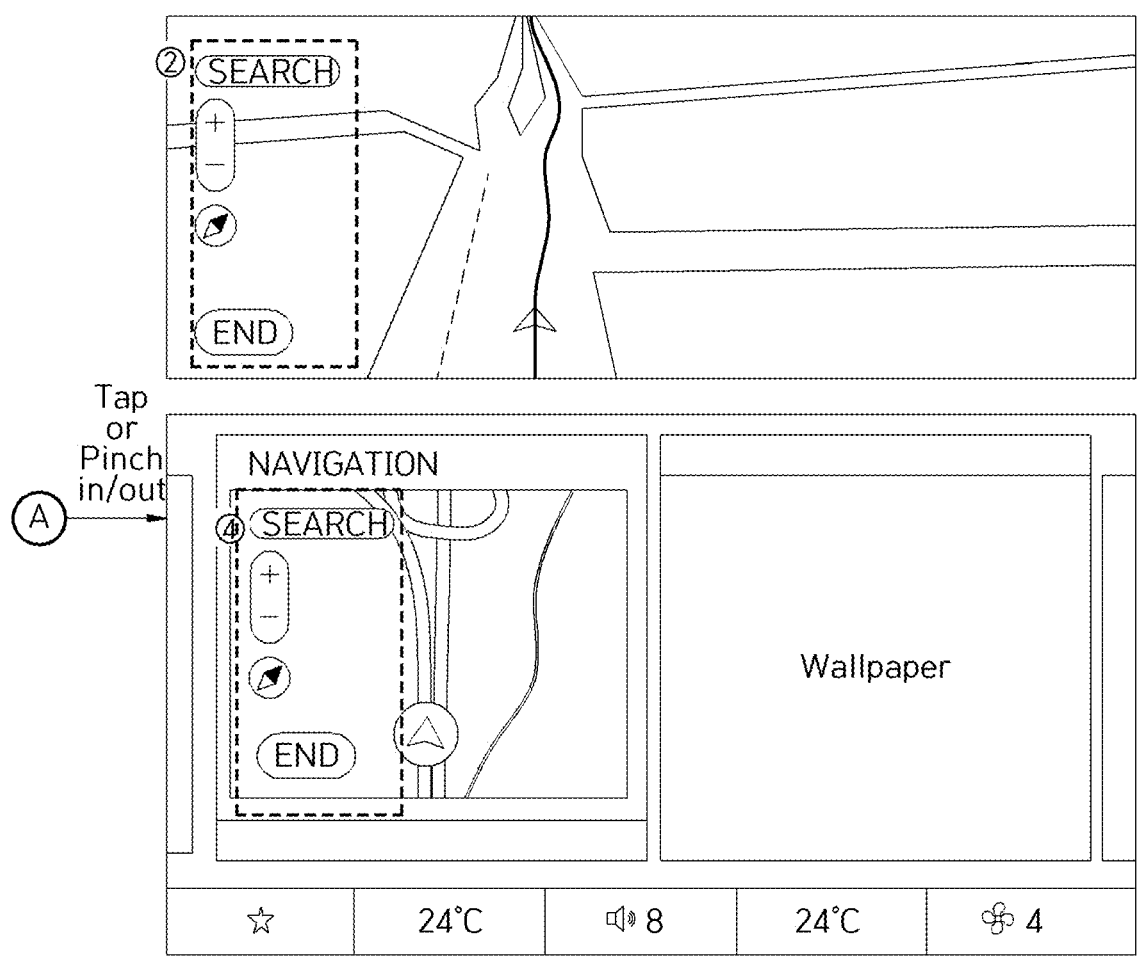

FIGS. 22A and 22B illustrate navigation display during driving according to an embodiment of the present invention.

During driving, on the upper display, a 3D driving image is displayed, and, when a touch event is generated, a search button, an enlargement/reduction button, and an end button are displayed.

During driving, on the lower display, a 2D driving image is displayed, and the search, enlargement/reduction, and end buttons are always displayed.

The configuration and definition of the navigation display during driving shown in FIGS. 22A and 22B is as shown in Table 9 below.

TABLE 9

| No. | Component | Description |
| --- | --- | --- |
| 1 | 12.3" navigation app | 3D driving image |
| 2 | 12.3" button | Display when there is driving image touch event (disappear after 5 sec) |
| 3 | 13.2" navigation app | 2D driving image |
| 4 | 13.2" button | Always display |

Figure 23:
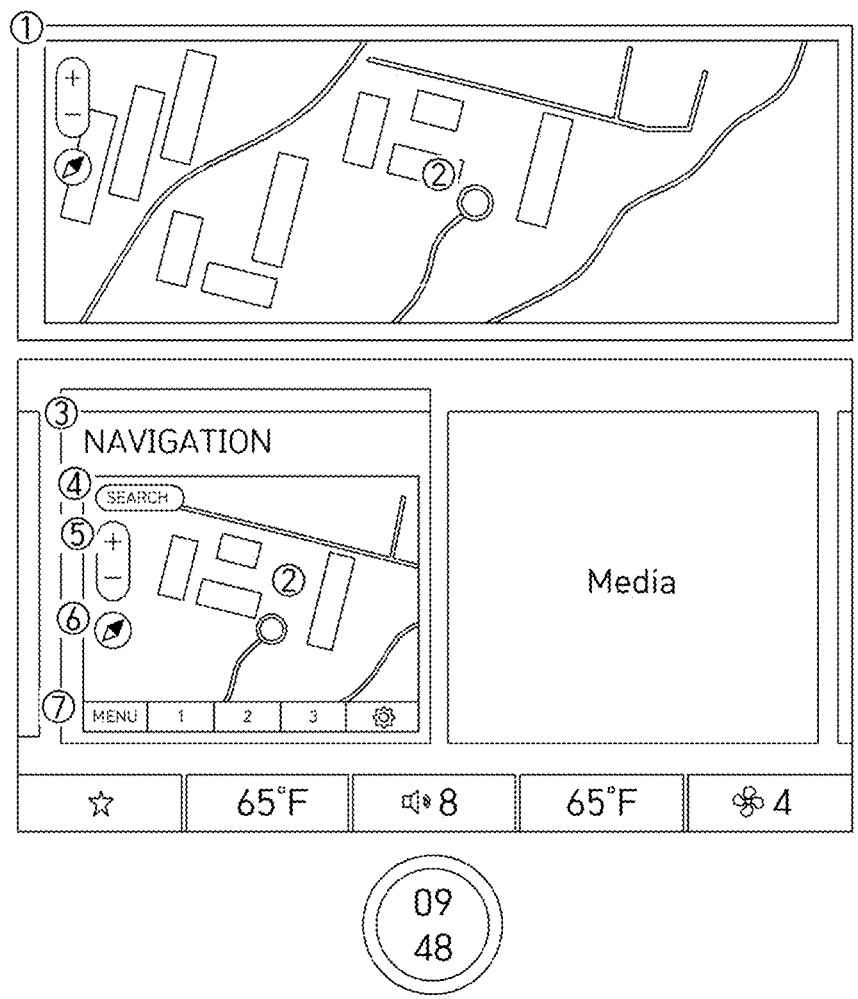
FIG. 23 illustrates operations using the lower display according to an embodiment of the present invention.
Figure 24:
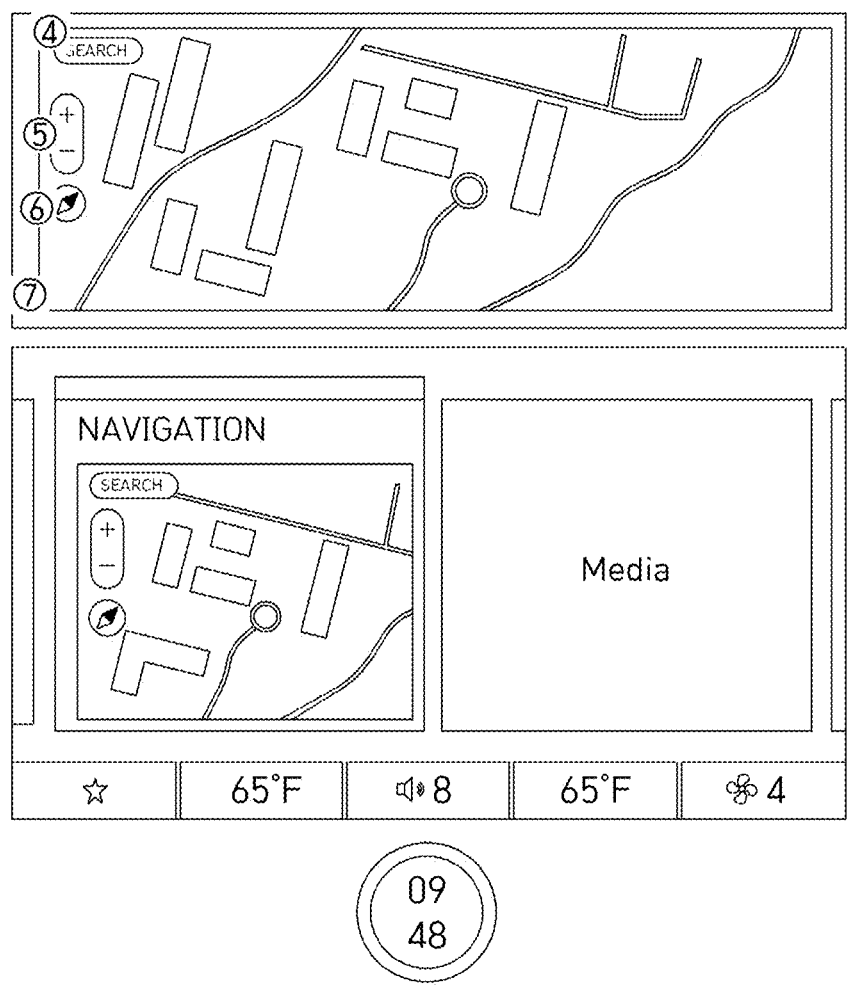
FIG. 24 illustrates operations using the upper display according to an embodiment of the present invention.

FIG. 23 illustrates an operation using the lower display according to an embodiment of the present invention, and FIG. 24 illustrates an operation using the upper display according to an embodiment of the present invention.

Referring to FIG. 23, when a navigation app is being operated on the lower display, the upper display does not display the search/menu buttons.

Referring to FIG. 24, when the navigation app is being operated on the upper display, the lower display does not display the search/menu buttons.

The configuration and definition of the navigation widget screen shown in FIGS. 23 and 24 are as shown in Table 10 below.

TABLE 10

| No. | Component | Description |
| --- | --- | --- |
| 1 | 12.3" screen | Display driving route |
| 2 | Current position icon | Display current driving position icon |
| 3 | Widget title | Display navigation text |
| 4 | Search button | Enter search screen |
| 5 | Map enlargement/reduction button | Enlarge/reduce map at specific ratio |
| 6 | Compass button | Due-north direction fixed button Operate button on/off toggle |
| 7 | Menu button | Display destination list: 1/2/3 Setting button |

Figure 25A:
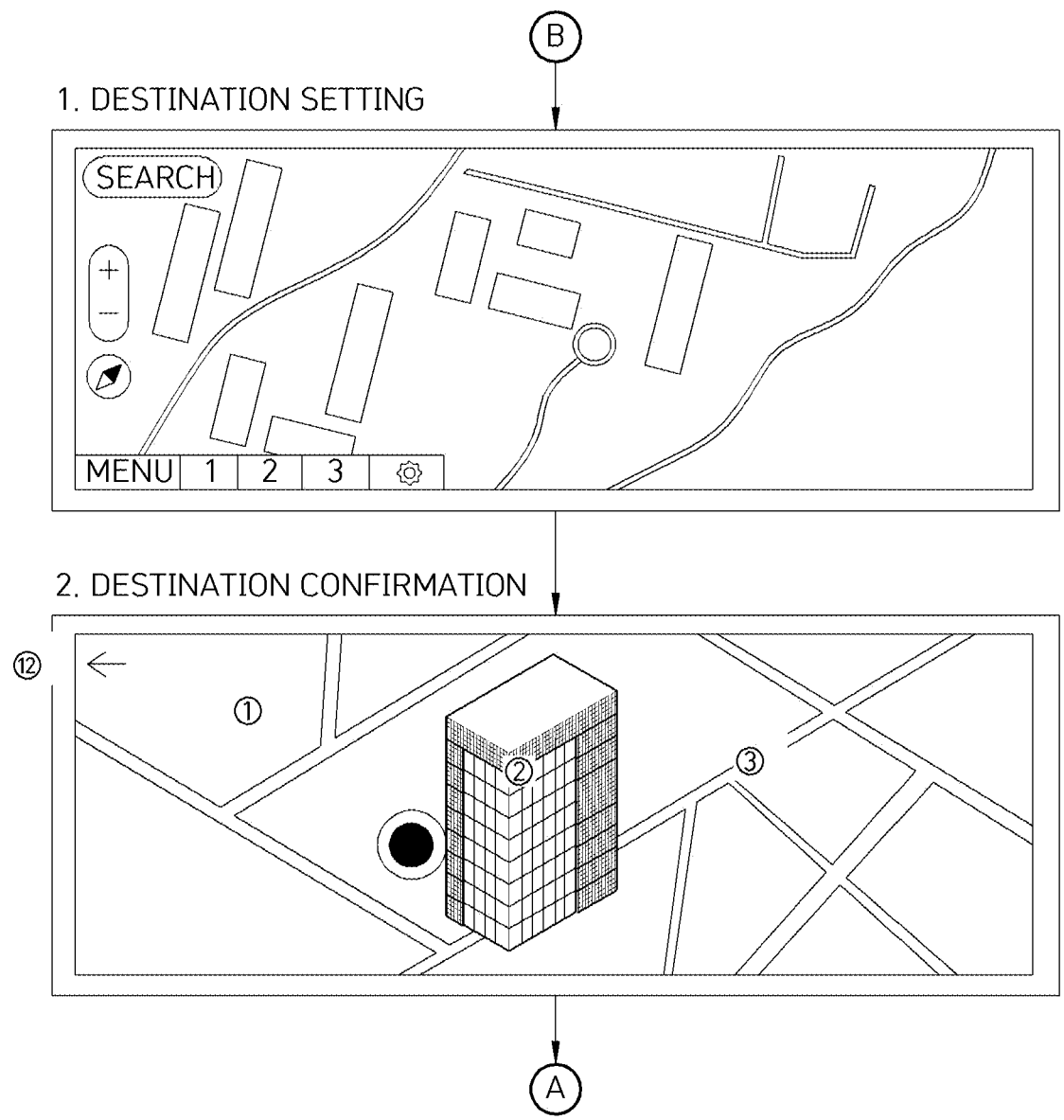
FIGS. 25A and 25B illustrate navigation setting using the upper display according to an embodiment of the present invention.
Figure 25B:
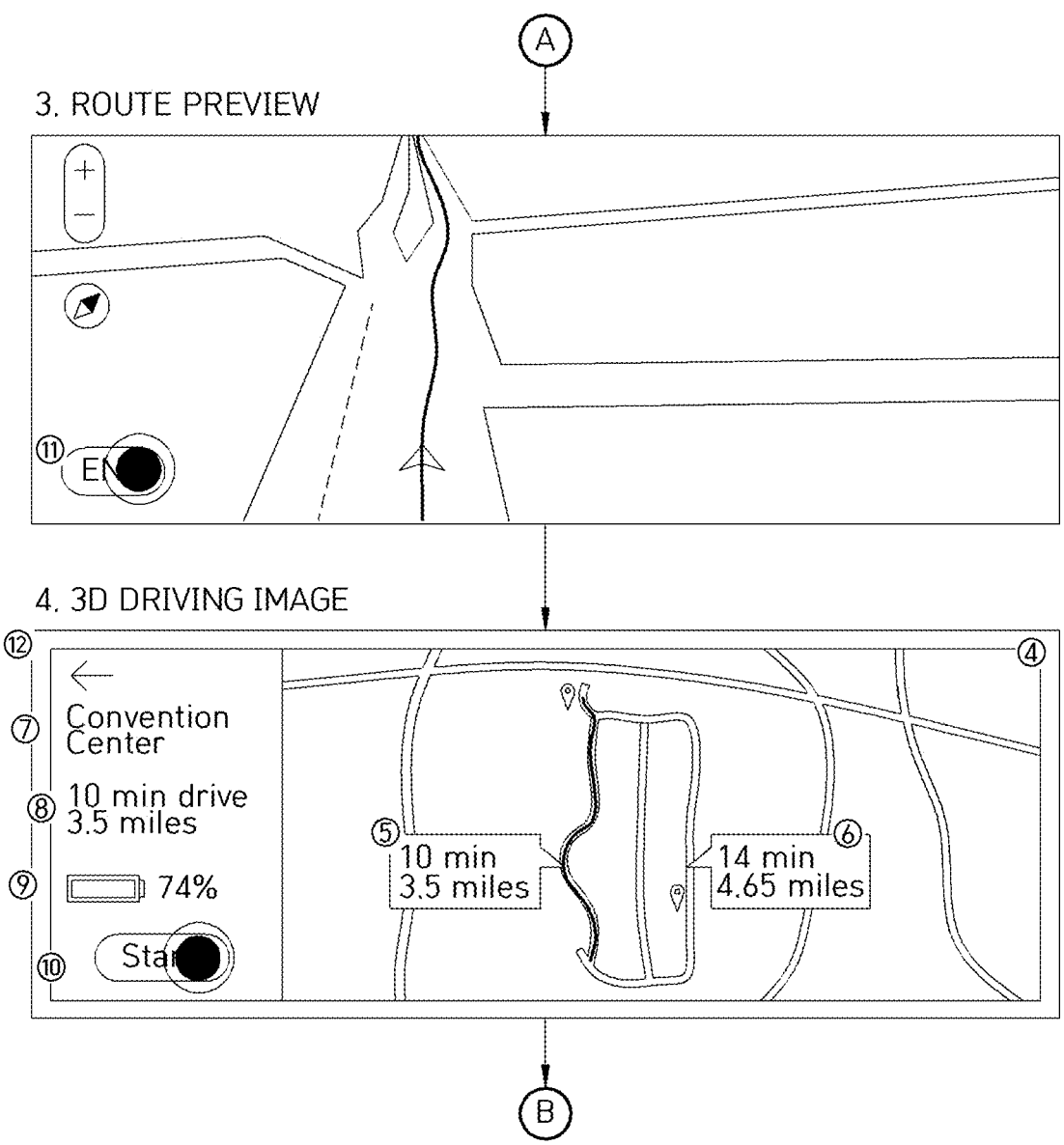

FIGS. 25A and 25B illustrate navigation setting using the upper display according to an embodiment of the present invention.

In a situation in which navigation information is displayed on the upper display, when a destination is set, a 3D map image for the destination is displayed.

In the upper display on which the 3D map image is displayed, a user may check 3D information through an operation of rotating a building, and as a result of the check, the user may set a point to reach even for the same destination (e.g., the destination may be set, such as an entrance of an underground parking lot at a front door of a department store, an entrance of an outdoor parking lot at a back door of a department store, or the like)

When the route setting is completed as the destination is checked, a route preview screen is provided, and here, a destination name, an estimated required time/distance, an estimated residual battery power upon arrival at the destination, a route guidance start button, a button for returning to the previous screen, and the like are displayed on the upper display.

The upper display displays a 3D route guidance screen as the route guidance start button is pressed, and returns to the destination setting screen as the end button is pressed on the corresponding screen.

The configuration and definition of the navigation widget screen shown in FIGS. 25A and 25B is as shown in Table 11 below.

TABLE 11

| No. | Component | Description |
|---|---|---|
| 1 | Destination map image | Destination map image |
| 2 | 3D destination map image | Building rotate operation |
| 3 | Parking lot POI | Parking lot information: Pin icon + name When building rotate, rotate together (TBD) |
| 4 | Route preview map image | 2D map image |
| 5 | Main Route | Display suggested route: blue Estimated required time/distance pop-up: 00 min/00.0 miles |
| 6 | Alternate Routes | Display suggested route: Gray Estimated time/distance pop-up: 00 min/00.0 miles |
| 7 | Destination name | Display text |
| 8 | Estimated required time/distance | Estimated required time/distance pop-up: 00 min/00.0 miles |
| 9 | Estimated residual battery power when arriving at destination | Icon + 00% |
| 10 | Start button | When button is touched, start driving image |
| 11 | End button | When button is touched, end driving image |
| 12 | Back button | When button is touched, return to previous screen |

Figure 26:
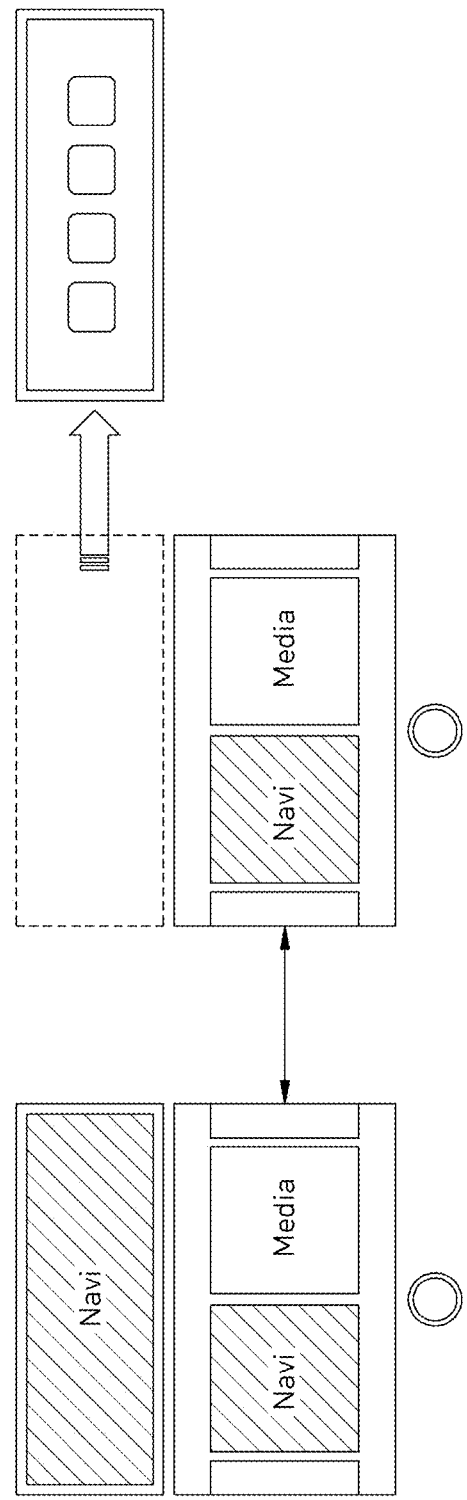
FIGS. 26 and 27 illustrate a situation according to a change to a passenger mode while navigation is being executed, according to an embodiment of the present invention.
Figure 27:
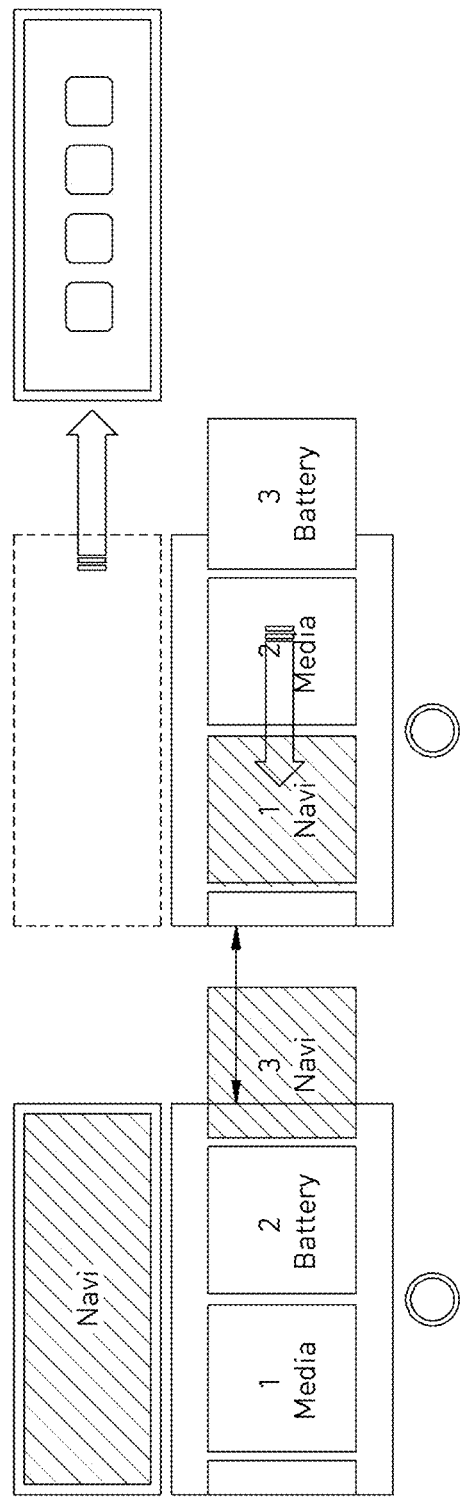

FIGS. 26 and 27 illustrate a situation according to a change to a passenger mode while navigation is being executed, according to an embodiment of the present invention.

Referring to FIG. 26, in a situation in which the navigation is being executed on the upper display and the lower display, when the mode is changed to the passenger mode and the upper display is used for the purpose of content use by the passenger, the navigation guidance on the upper display is ended, and route guidance information is provided through the lower display.

When the mode is returned to the driver mode from the passenger mode, the upper display resumes navigation screen display that was previously executed.

Referring to FIG. 27, in a situation in which the navigation is being executed on the upper display, the navigation widget is being executed on an area outside the screen of the lower display.

At this point, when the mode is changed to the passenger mode, the navigation guidance on the upper display is ended, and the lower display moves the navigation widget to the leftmost side.

When the mode is returned to the driver mode from the passenger mode, the upper display resumes the navigation screen display that was previously executed.

Figure 28:
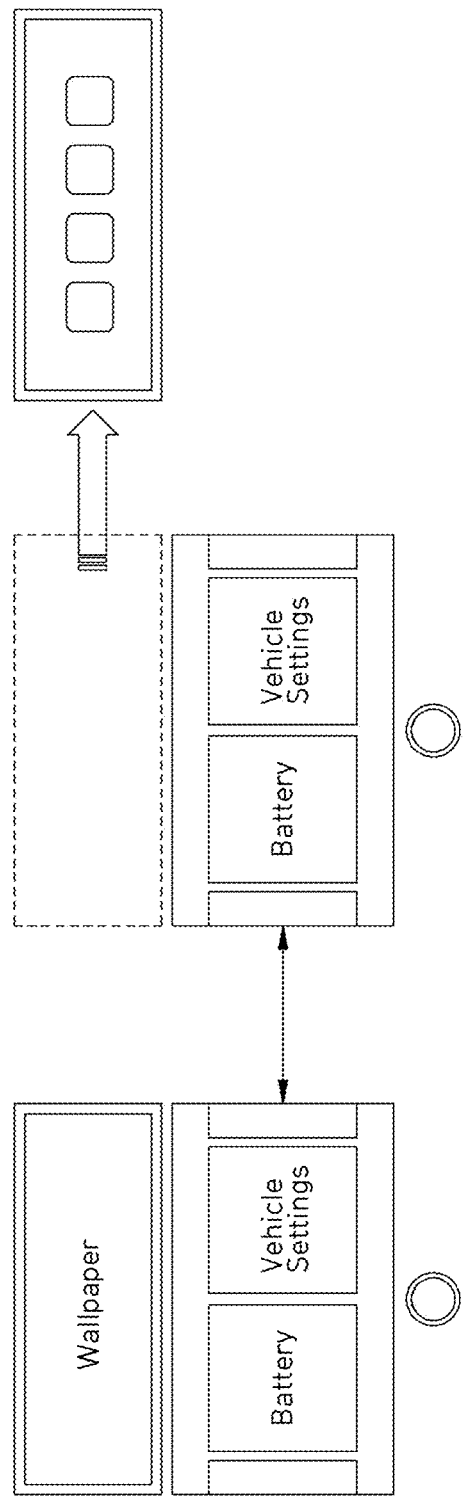
FIG. 28 illustrates a situation according to a change to the passenger mode while the navigation is not executed, according to an embodiment of the present invention.
Figure 29A:
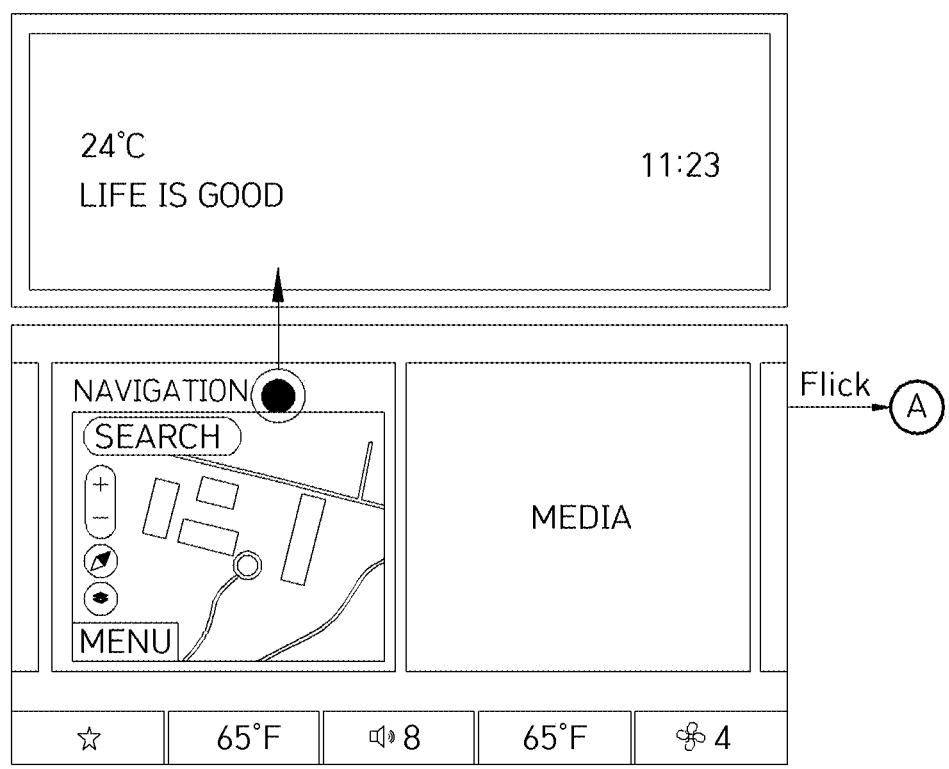
FIGS. 29A to 29H illustrate a destination search process using the lower display according to an embodiment of the present invention.
Figure 29B:
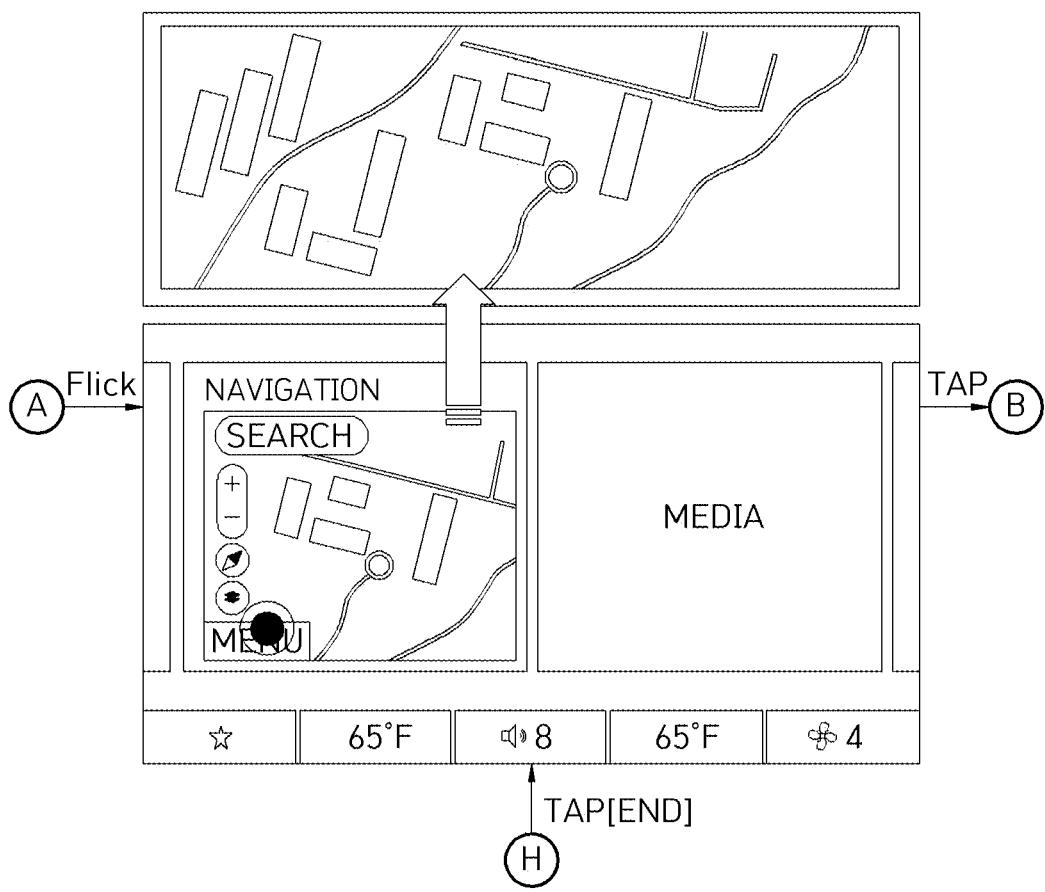
Figure 29C:
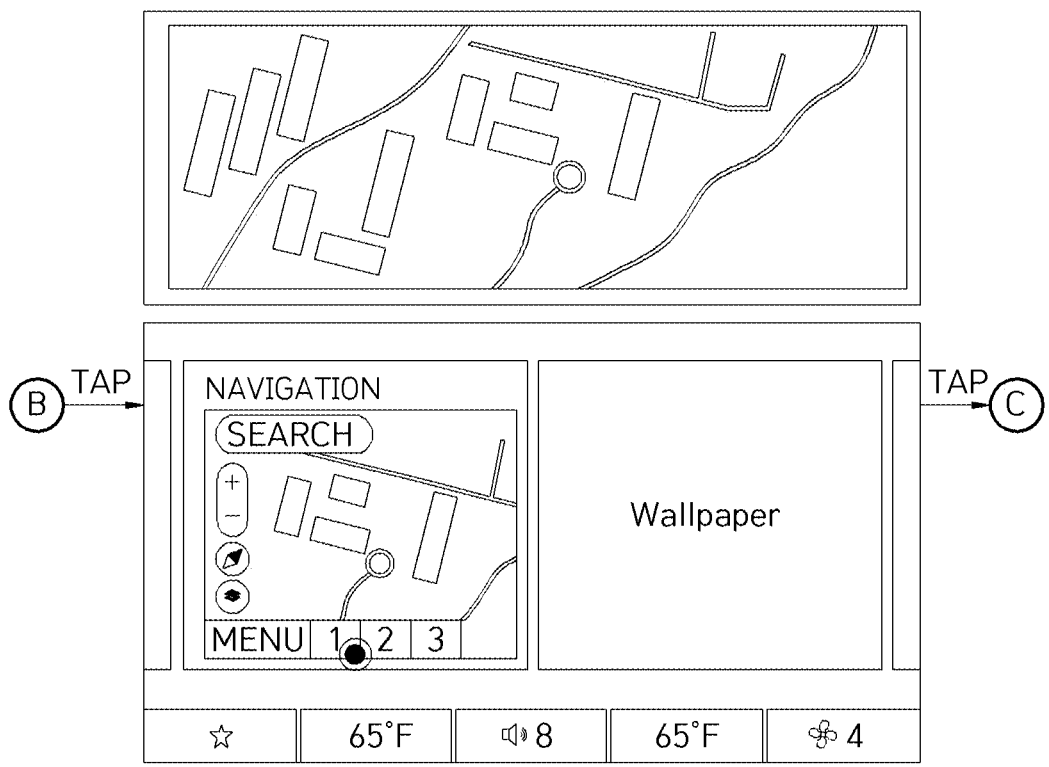
Figure 29D:
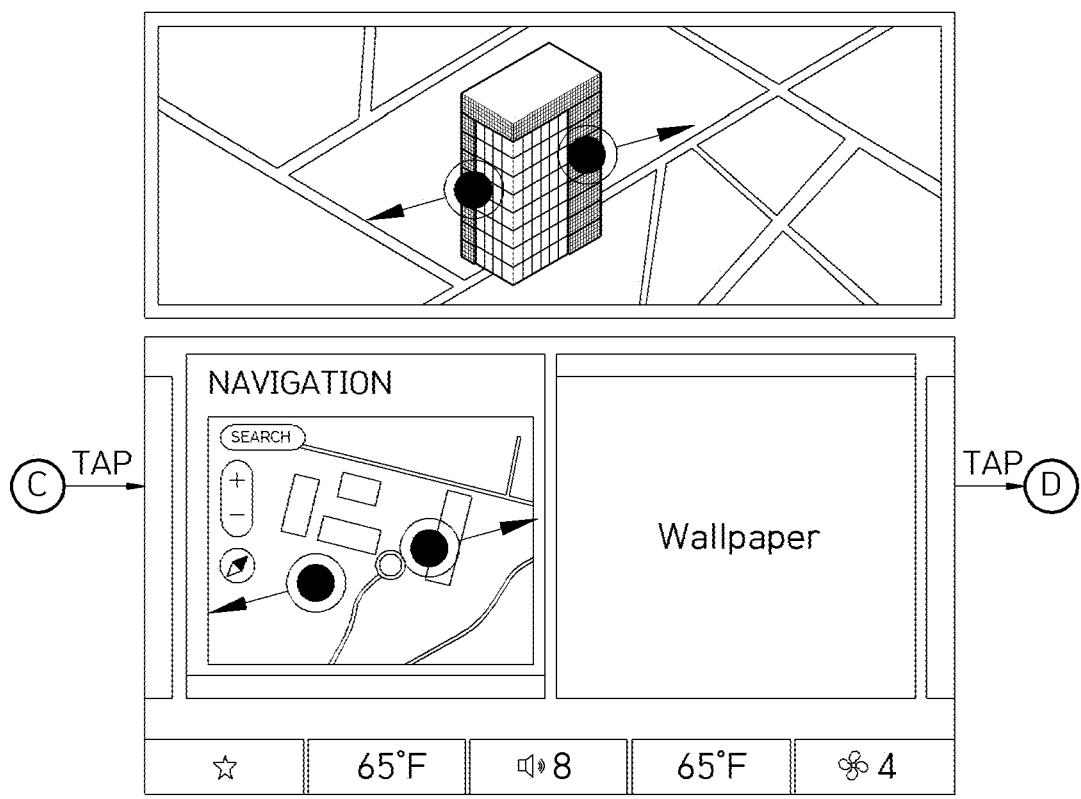
Figure 29E:
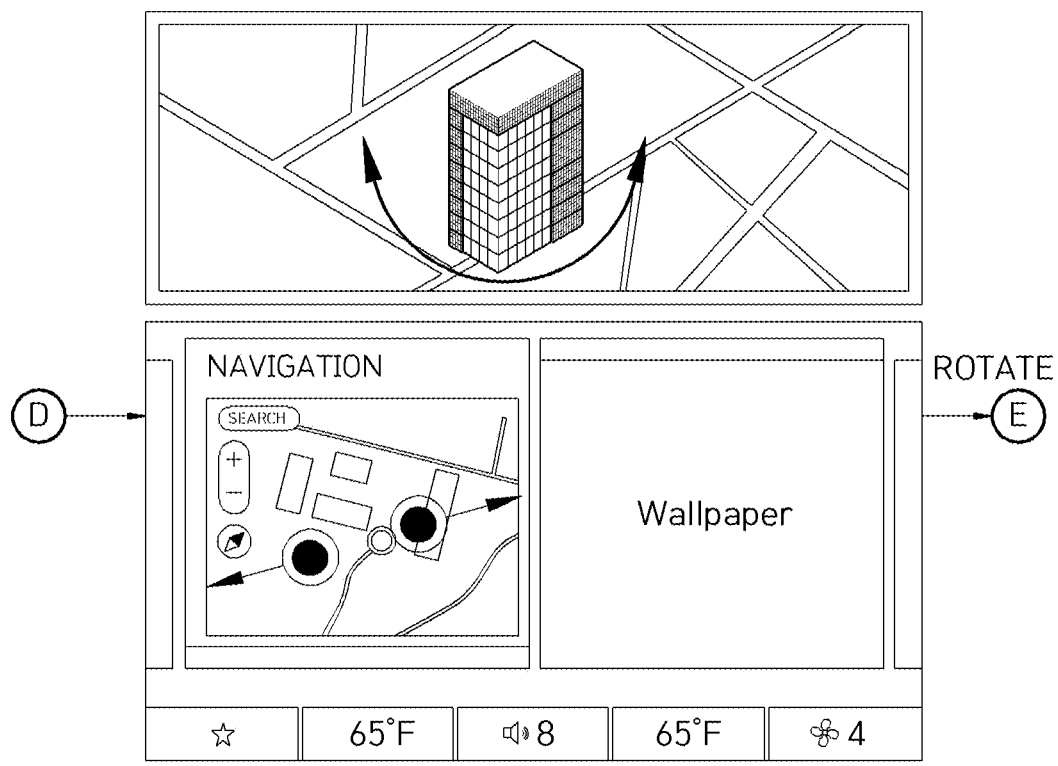
Figure 29F:
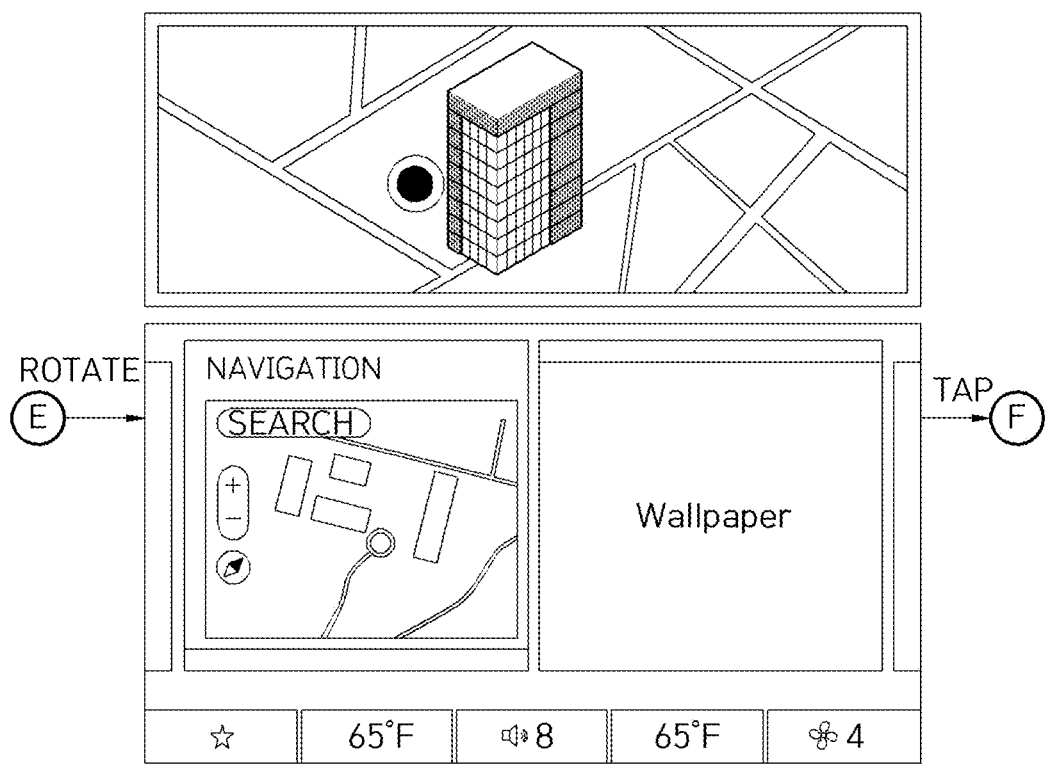
Figure 29G:
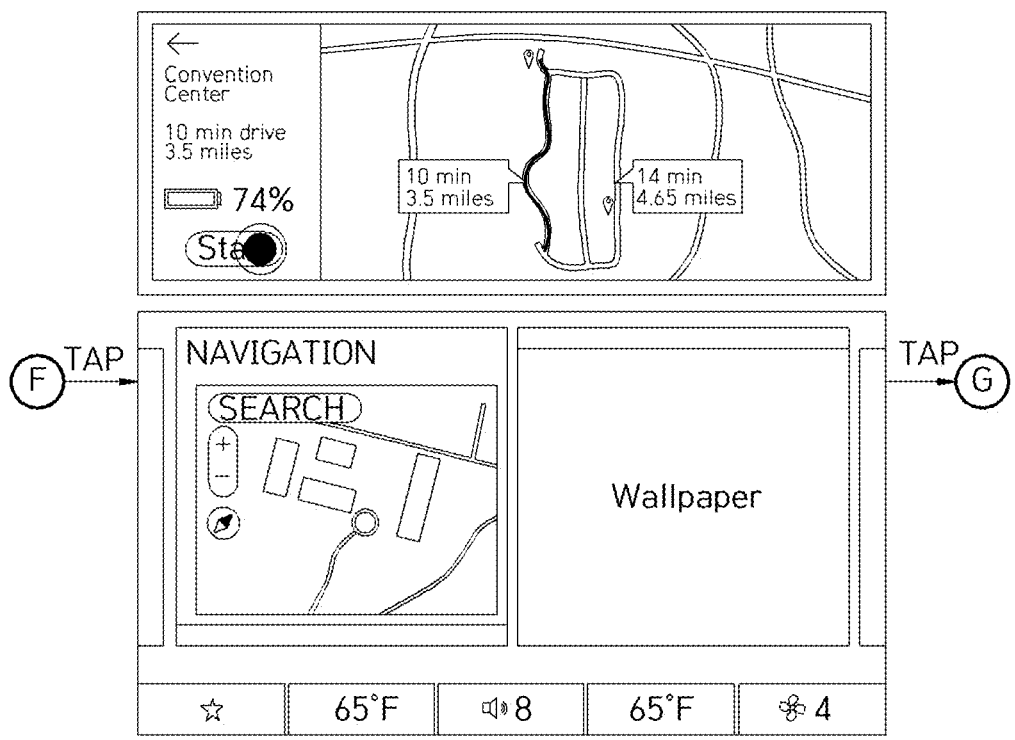
Figure 29H:
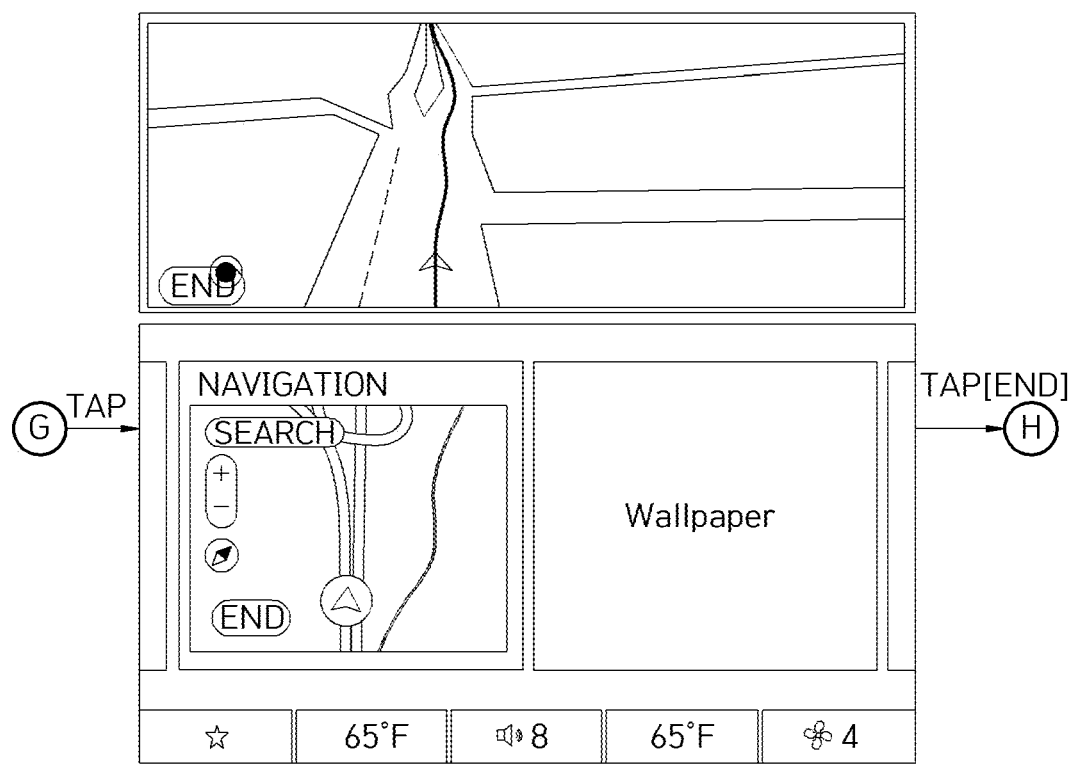
Figure 30A:
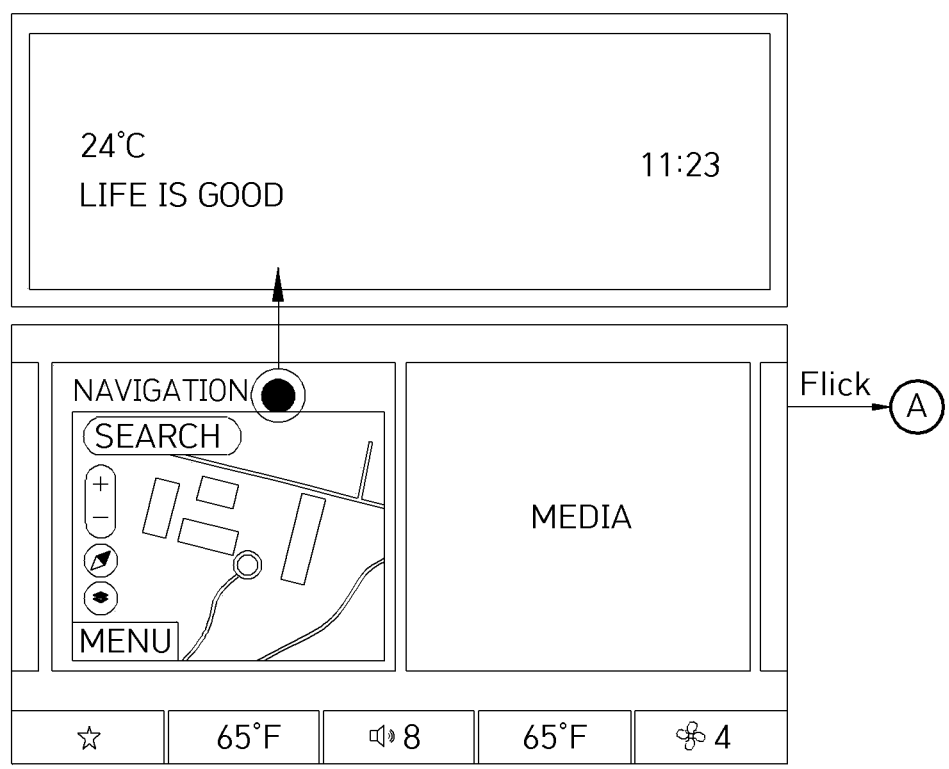
FIGS. 30A to 30H illustrate a destination search process using the upper display according to an embodiment of the present invention.
Figure 30B:
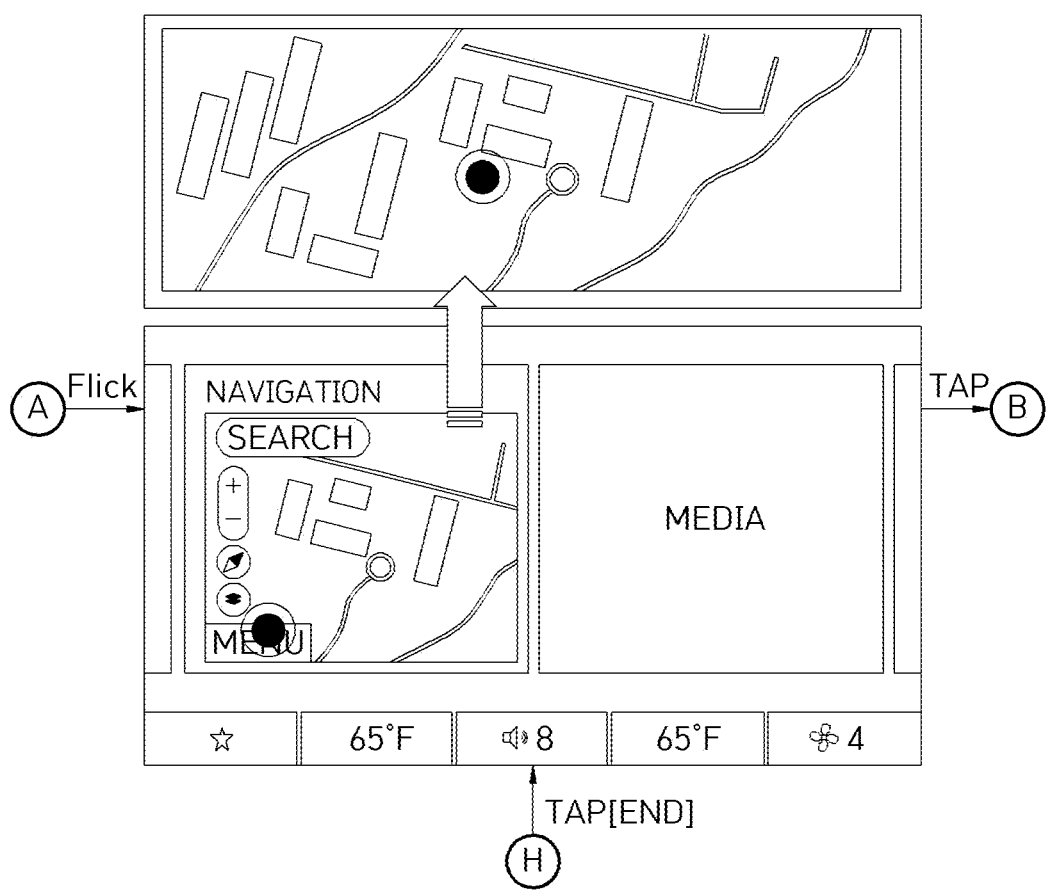
Figure 30C:
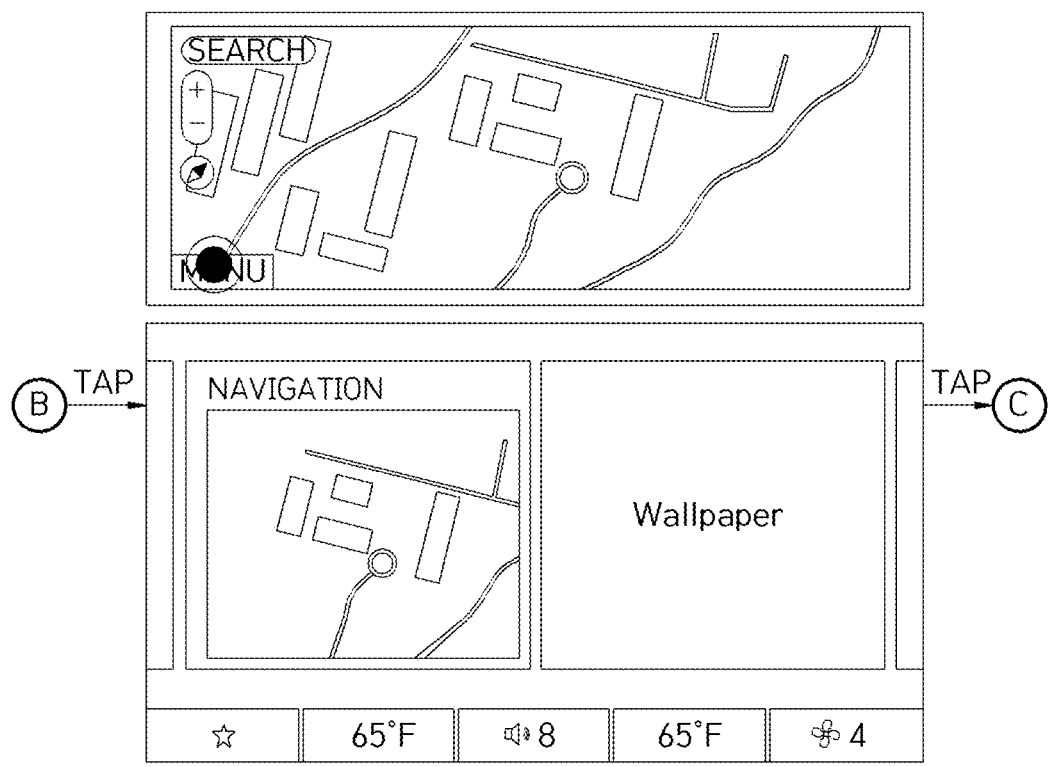
Figure 30D:
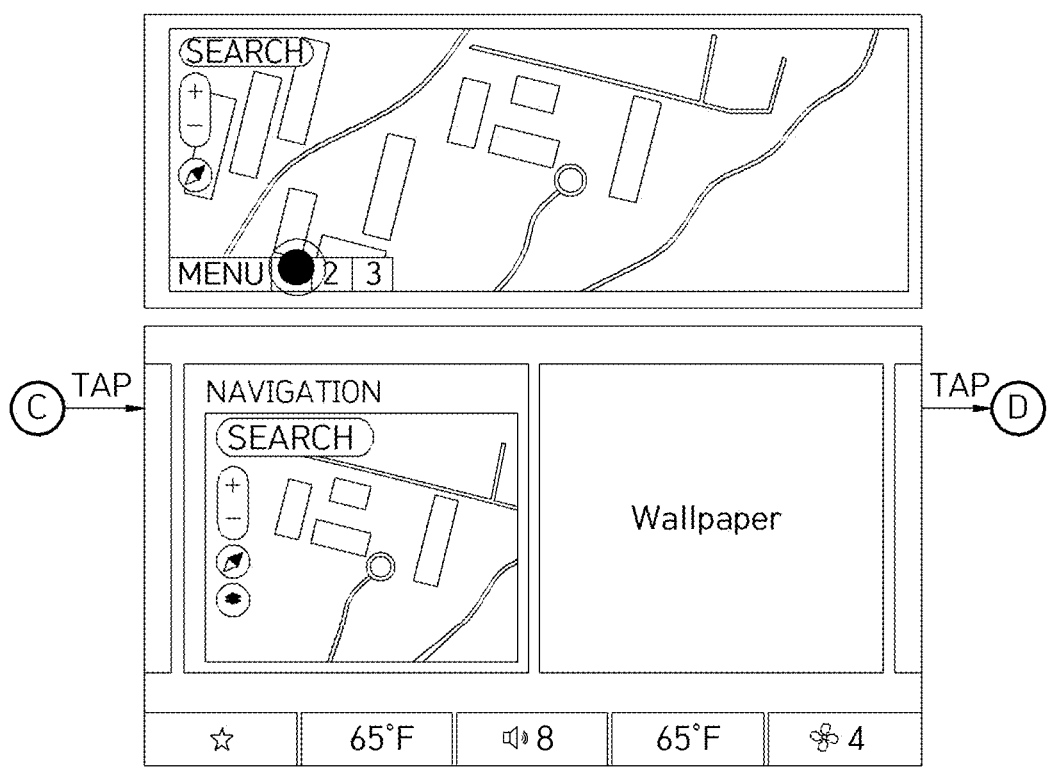
Figure 30E:
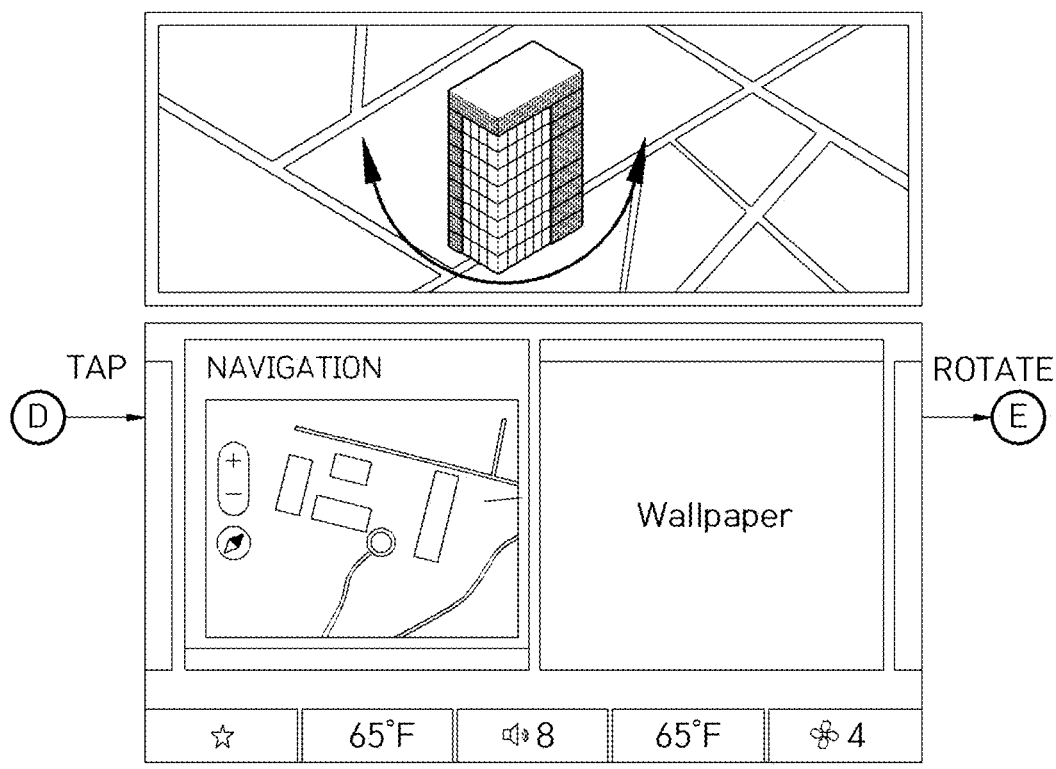
Figure 30F:
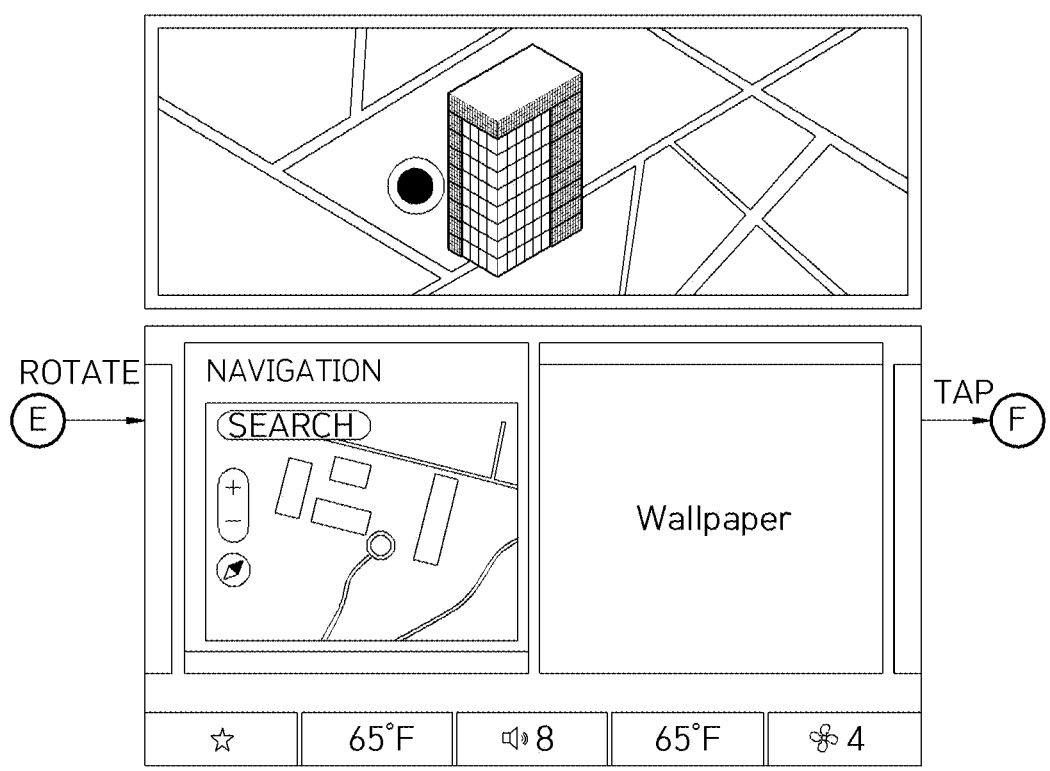
Figure 30G:
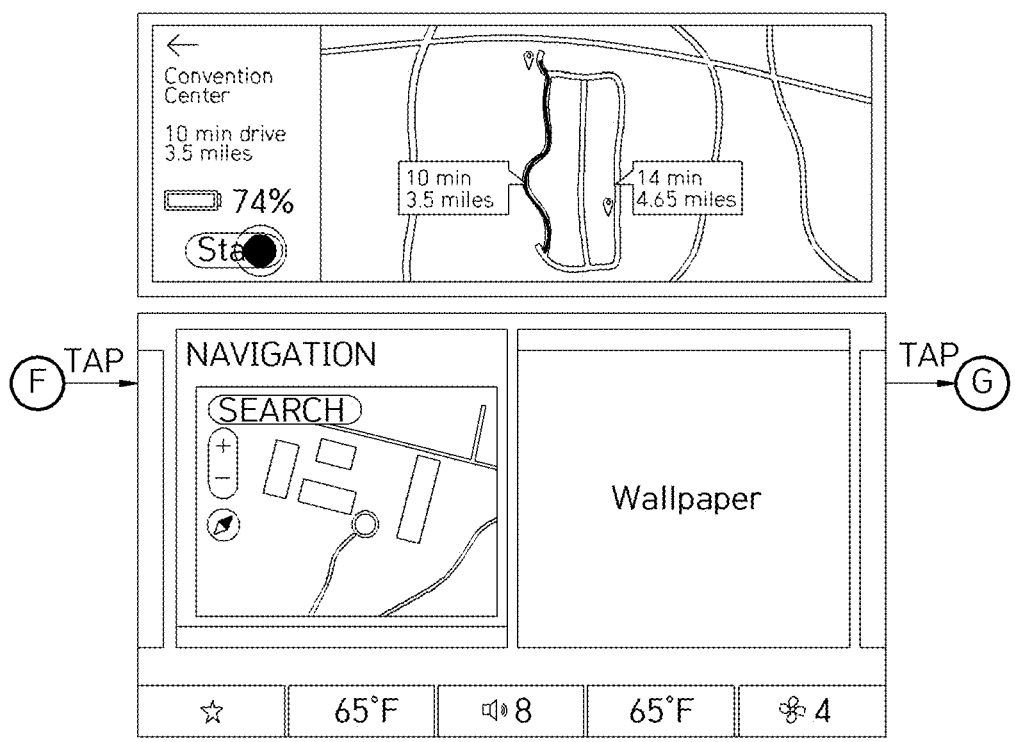
Figure 30H:
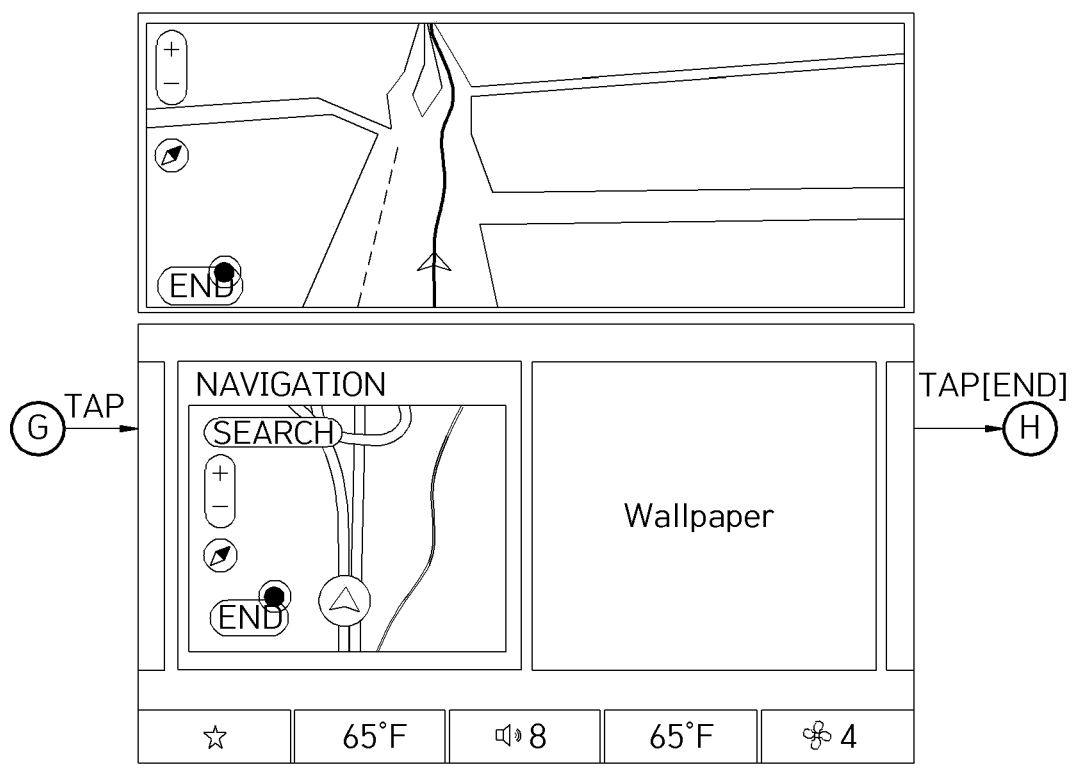
Figure 31A:
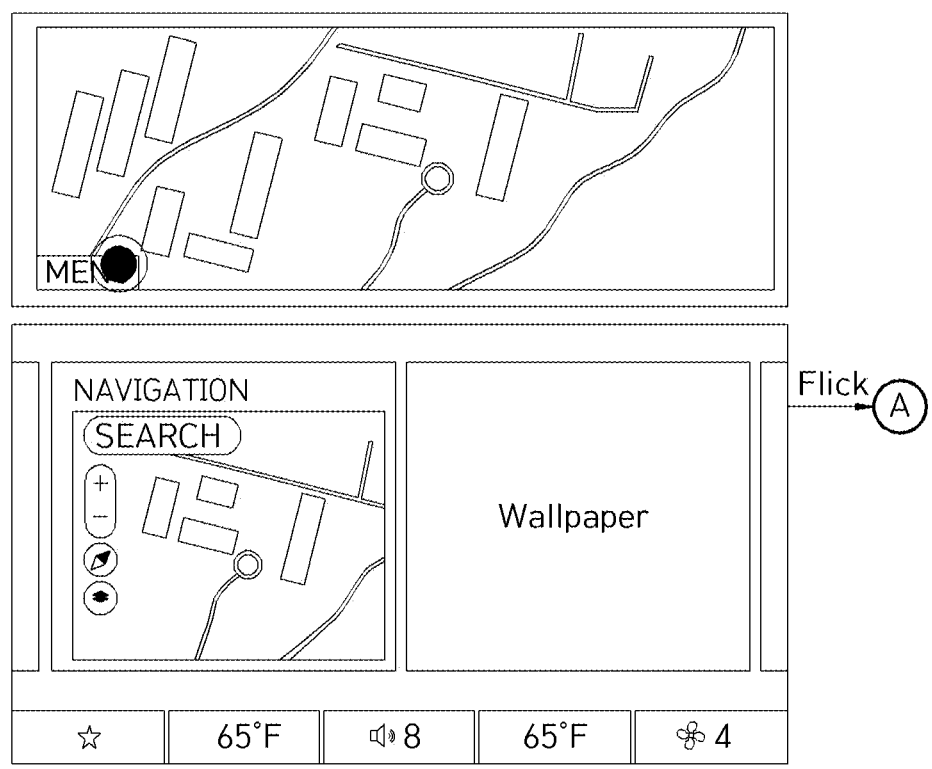
FIGS. 31A to 31H illustrate three-dimensional (3D) navigation and augmented reality (AR) navigation settings according to an embodiment of the present invention.
Figure 31B:
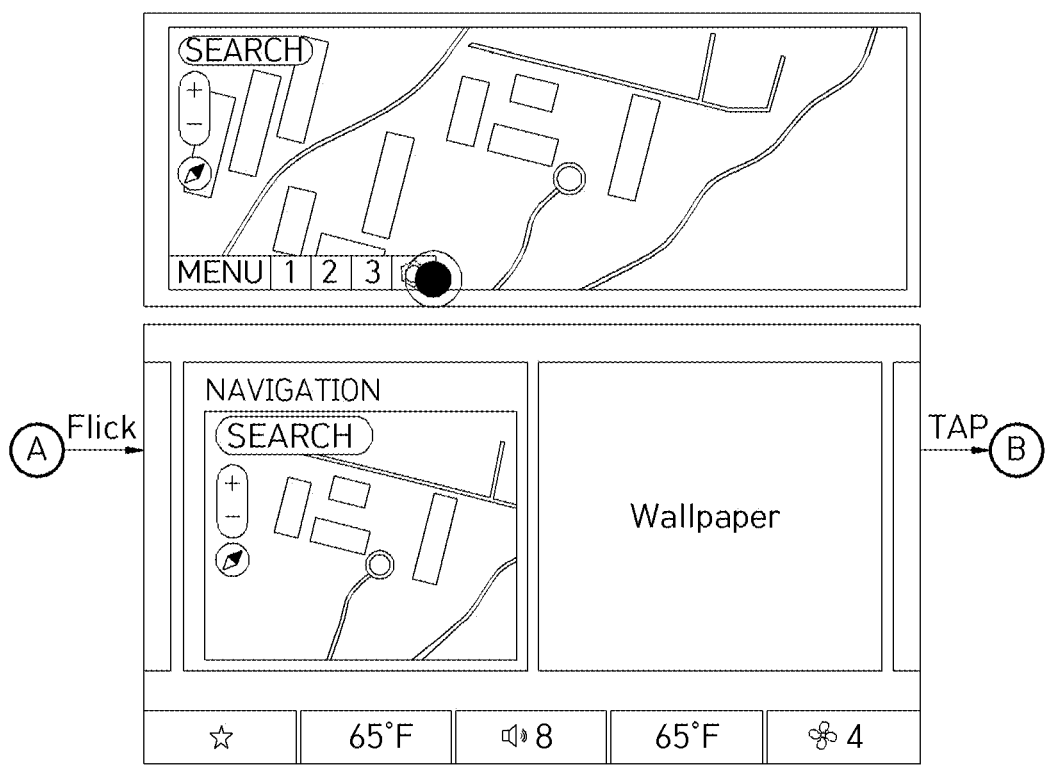
Figure 31C:
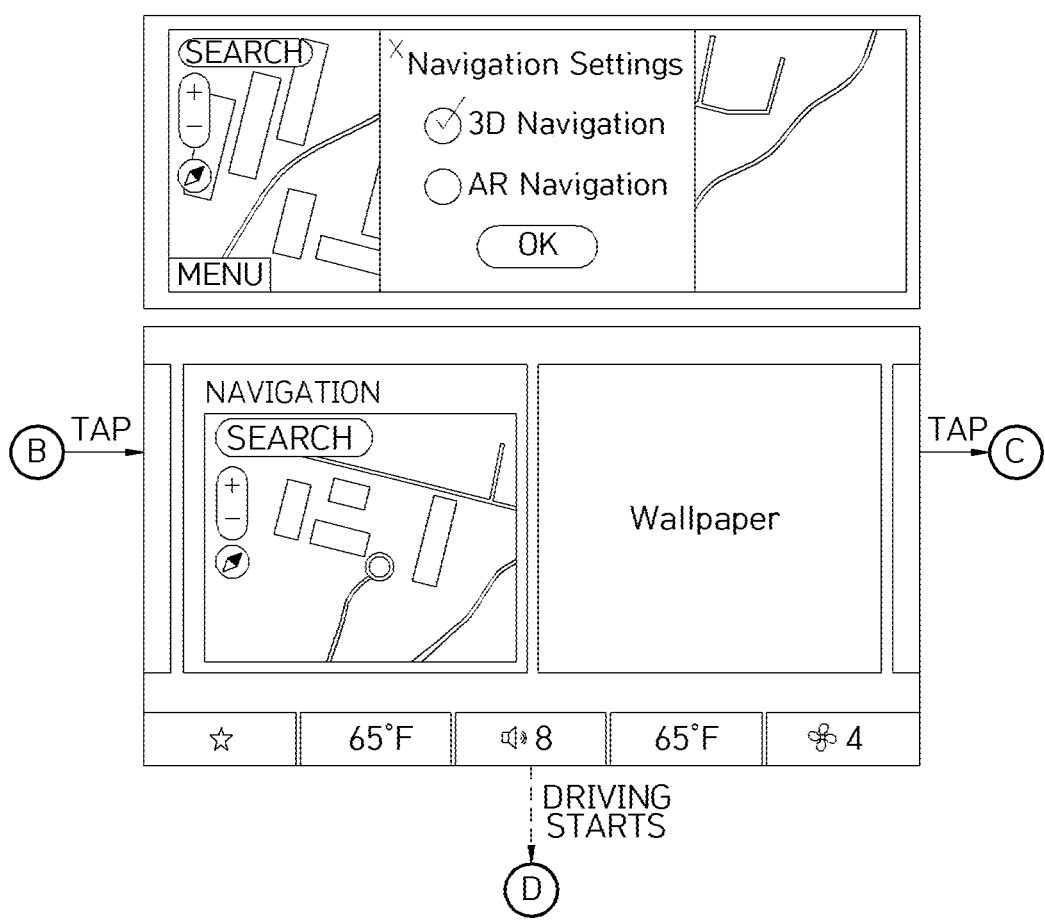
Figure 31D:
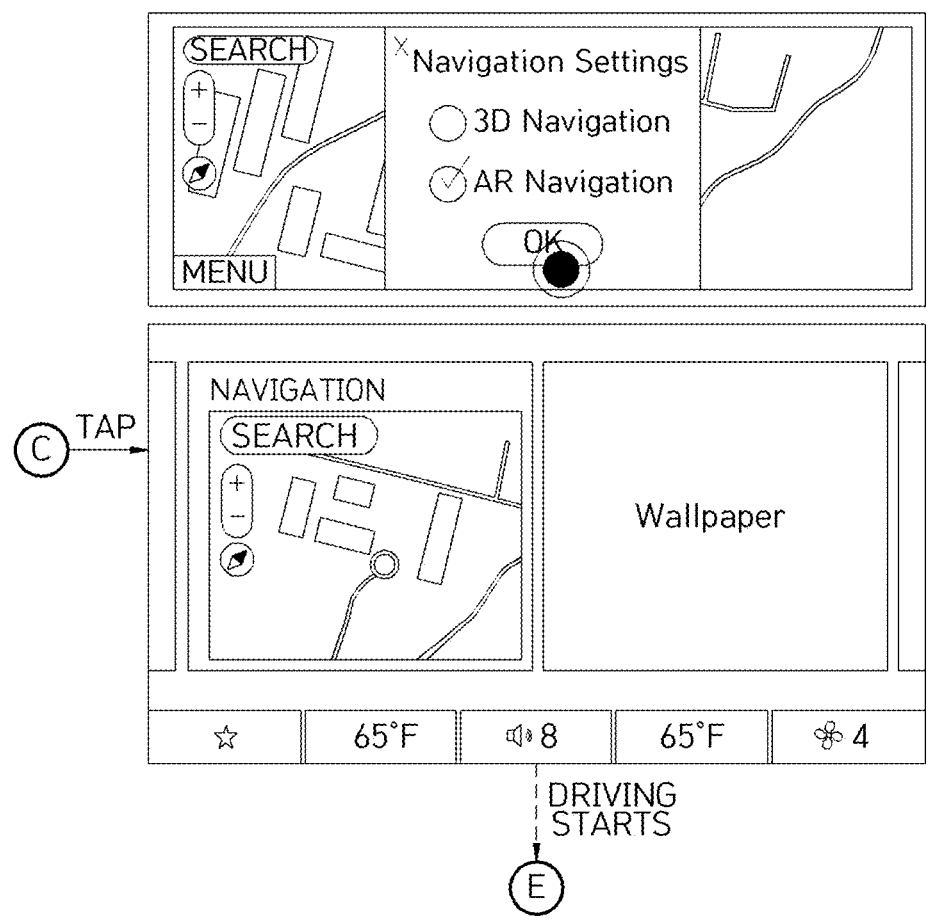
Figure 31E:
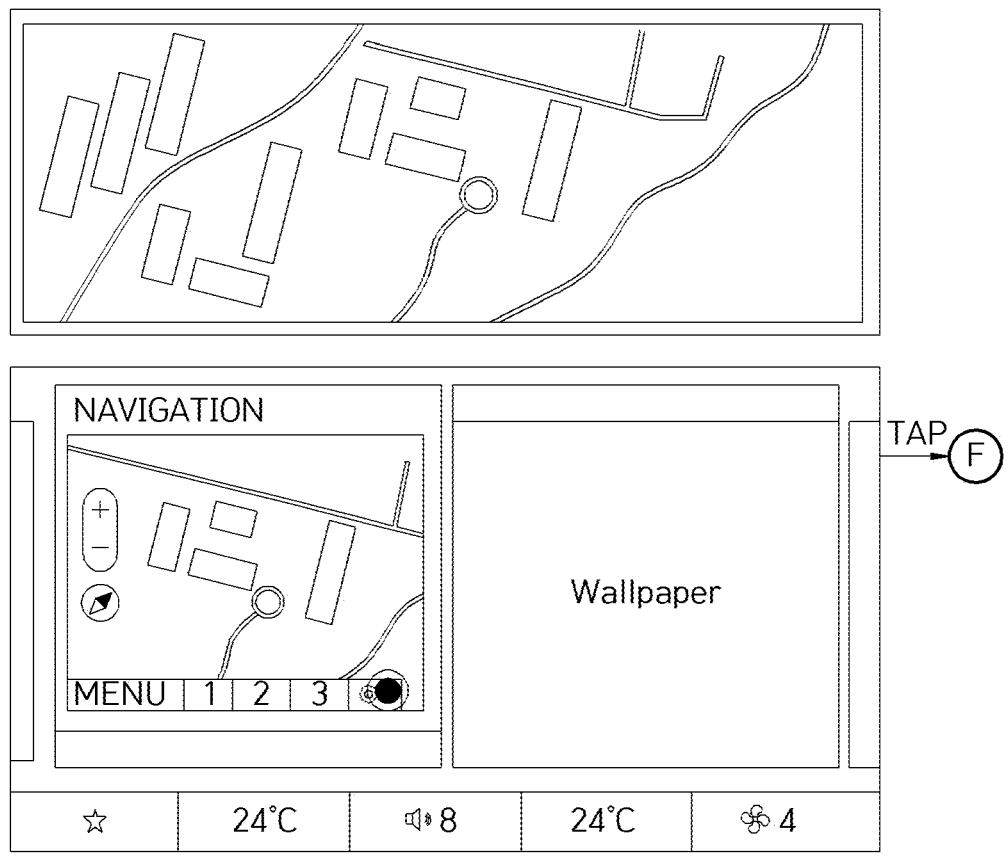
Figure 31F:
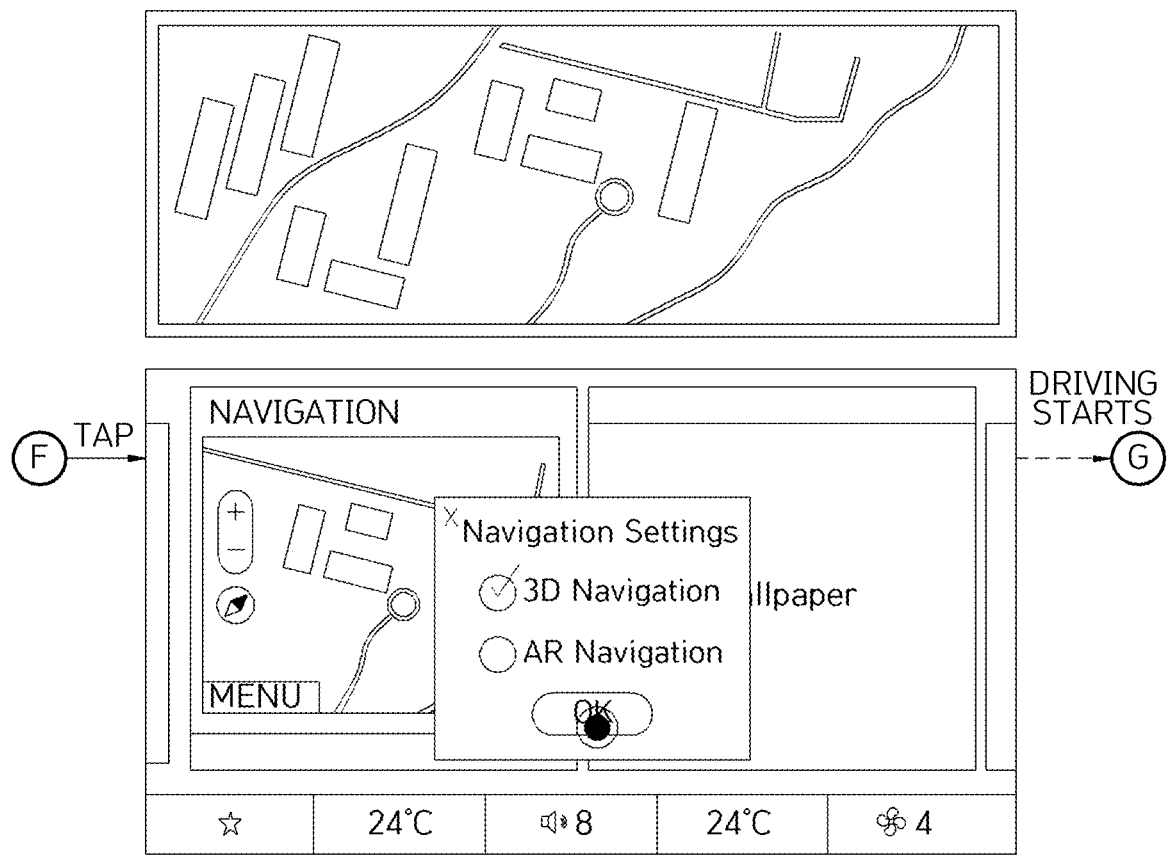
Figure 31G:
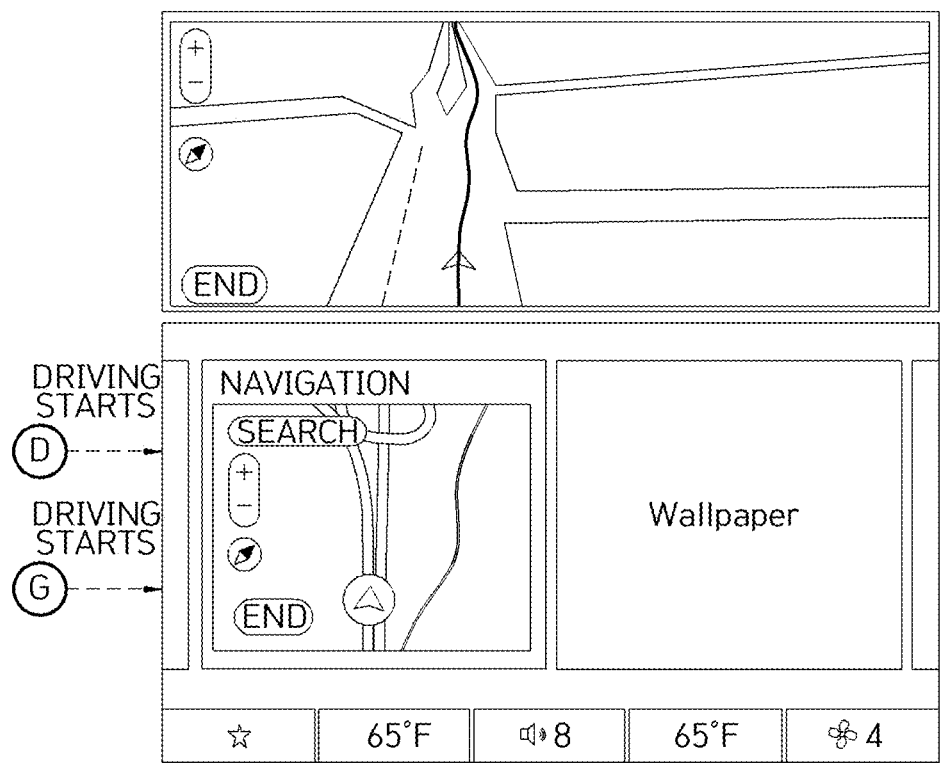
Figure 31H:
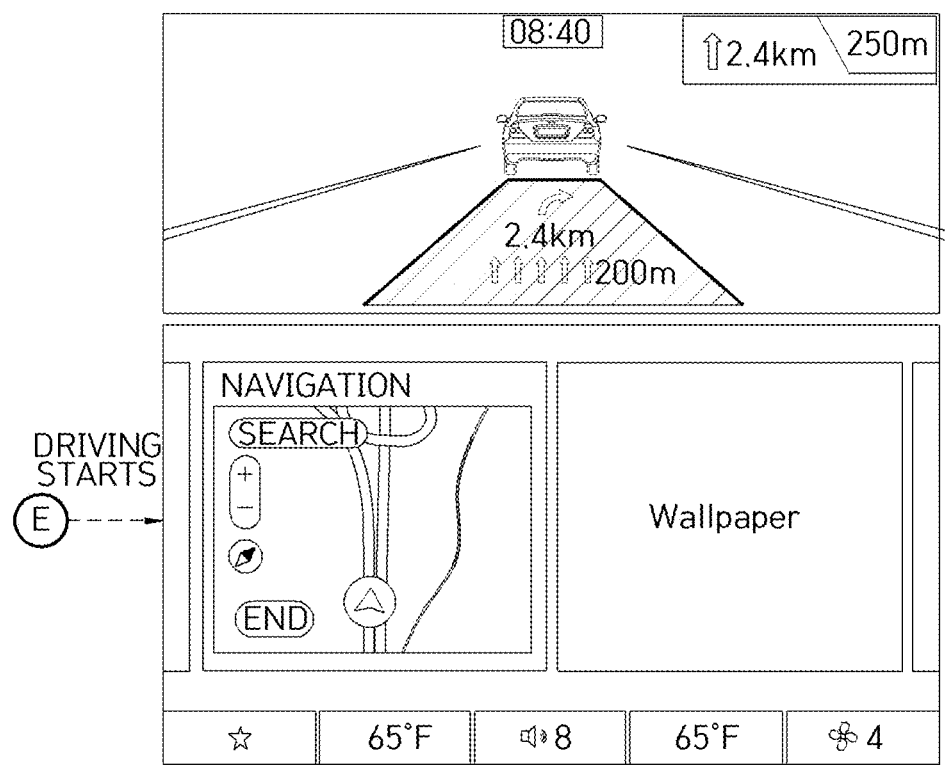

FIG. 28 illustrates a situation according to a change to the passenger mode while the navigation is not executed, according to an embodiment of the present invention.

When the navigation is not executed on the upper and lower displays, the widget arrangement on the lower display is maintained even when the mode is changed to the passenger mode.

When the mode is returned to the driver mode from the passenger mode, the upper display resumes wallpaper display that was previously executed.

FIGS. 29A to 29H illustrate a destination search process using the lower display according to an embodiment of the present invention When the default screen is displayed on the upper display, and the navigation is dragged from the lower display to the upper display, navigation information is displayed on the upper display.

At this point, when a touch is input to an area of the upper display, pieces of information about the search, the enlargement/reduction, and the menu are displayed, and when "1" is selected after the menu selection is made, 3D map image information around the destination is provided according to the execution of a predetermined function.

Vertical linkage is not allowed according to pinch in and pinch out, and panning.

Since 3D map image information of the destination is provided through the upper display before the driving starts, the driver may register a desired point as the destination using the 3D map image information.

According to the destination registration, the upper display displays route information, and when the route guidance start button is pressed, the upper display displays 3D navigation information and the lower display displays 2D navigation information.

FIGS. 30A to 30H illustrate a destination search process using the upper display according to an embodiment of the present invention.

When the default screen is displayed on the upper display, and the navigation is dragged from the lower display to the upper display, navigation information is displayed on the upper display.

At this point, when a touch is input to an area of the upper display, pieces of information about the search, the enlargement/reduction, and the menu are displayed, and when "1" is selected after the menu selection is made, 3D map image information around the destination is provided according to the execution of a predetermined function.

Since 3D map image information of the destination is provided through the upper display before the driving starts, the driver may register a desired point as the destination using the 3D map image information.

Vertical linkage is not allowed according to pinch in and pinch out, and panning.

As the destination is registered, the upper display displays route information, and when the route guidance start button is pressed, the upper display displays 3D navigation information and the lower display displays 2D navigation information.

FIGS. 31A to 31H illustrate 3D navigation and AR navigation settings according to an embodiment of the present invention.

When a menu button and a setting button of the upper or lower display are pressed in sequence, a navigation setting window is displayed to receive a selection for 3D navigation or AR navigation.

FIGS. 31A to 31H illustrate navigation display during driving according to the 3D navigation and the AR navigation.

Figure 32A:
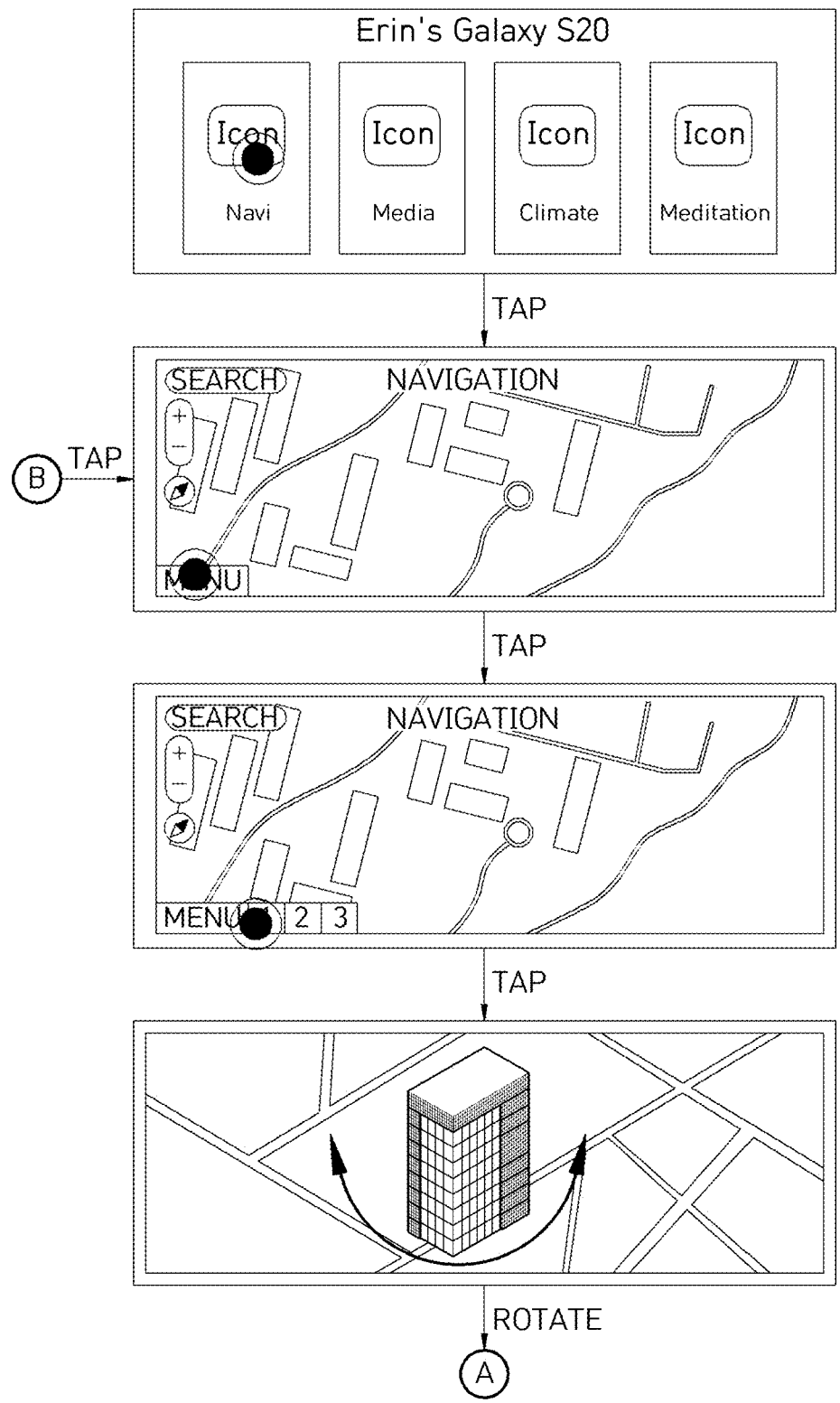
FIGS. 32A and 32B illustrate navigation control in the passenger mode according to an embodiment of the present invention.
Figure 32B:
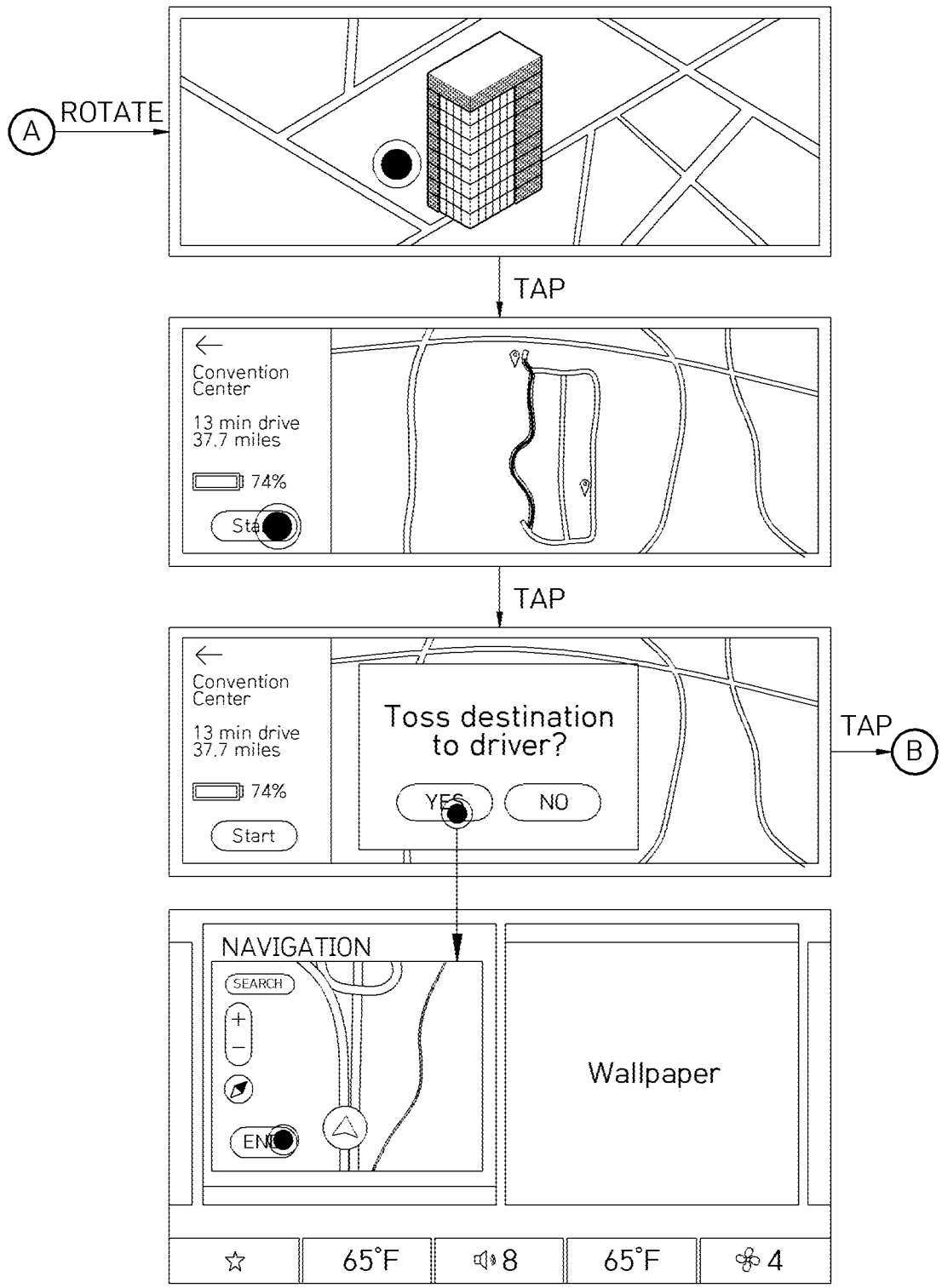

FIGS. 32A and 32B illustrate navigation control in the passenger mode according to an embodiment of the present invention.

In a user mobile device linked with the upper display, when navigation app execution is selected, 2D image information about the destination and 3D image information about the destination are displayed on the screen of the upper display.

The passenger rotates a place displayed as an object on the screen of the upper display to request route guidance to a final destination place.

In the passenger mode, the upper display displays guidance information about a route to the destination and displays a "Toss" button.

When the user presses the "Toss" button, a pop-up window asking whether to send route guidance information to the driver is displayed.

As the user presses a "yes" button, the route guidance information is displayed in the 2D driving image on the navigation app of the lower display.

According to the related art, there is a limitation in simply using content using AVN in the vehicle.

In order to solve the above problem, the present invention is directed to providing a media sound multi-connection control apparatus using multiple displays capable of simultaneously reproducing different media through AVN and a mobile device and selecting a sound source output device, simultaneously reproducing media through the multiple displays, and forming sound bubbles to prevent sound source interference between a vehicle speaker and a headrest speaker.

Figure 33:
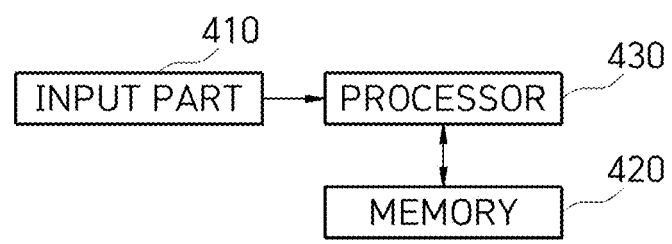
FIG. 33 illustrates a media sound multi-connection control apparatus using multiple displays according to an embodiment of the present invention.

FIG. 33 illustrates a media sound multi-connection control apparatus using multiple displays according to an embodiment of the present invention.

The media sound multi-connection control apparatus using multiple displays according to an embodiment of the present invention includes an input part 410 configured to receive a content execution request signal, a memory 420 in which a program for controlling media and sound multi-connection using multiple displays upon receiving the content execution request signal is stored, and a processor 430 configured to execute the program. The processor 430 controls to display a player screen according to the content execution request signal using at least one of the lower display disposed in the cockpit and the upper display disposed above the lower display.

The processor 430 controls such that a sound source is output to an in-vehicle speaker and a headrest speaker using a sound path setting signal.

When a request for moving a media application from the lower display to the upper display is input, the processor 430 controls to display a player screen on the upper display and to display a list screen on the lower display.

When a pull-down button is touched on the upper display, the processor 430 moves the player screen to the lower display, and controls to maintain the sound source reproduction during the movement.

When an image full-screen reproduction button is touched on the lower display, the processor 430 controls the upper display to be turned off and controls the lower display to reproduce the entire screen.

When a command for moving the entire screen from the lower display to the upper display is input, the processor 430 controls the entire screen to be reproduced on the upper display, and controls to display an existing widget on the lower display and display a display-off button on the lower display.

When the display-off button displayed on the lower display is touched, the processor 430 turns off the lower display. When a touch signal is applied to an area of the lower display, the processor 430 controls the upper display to be turned off and the entire screen to be reproduced on the lower display The processor 430 controls to display a function bar on the lower display when a knob disposed at a lower end of the lower display is operated or a touch is input to the lower display.

When different pieces of content are reproduced on the lower display and the upper display in the passenger mode, the processor 430 controls a sound source of the content being reproduced on the upper display to be output through the headrest speaker, and controls a sound source of the content reproduced on the lower display to be output through the in-vehicle speaker.

Figure 34A:
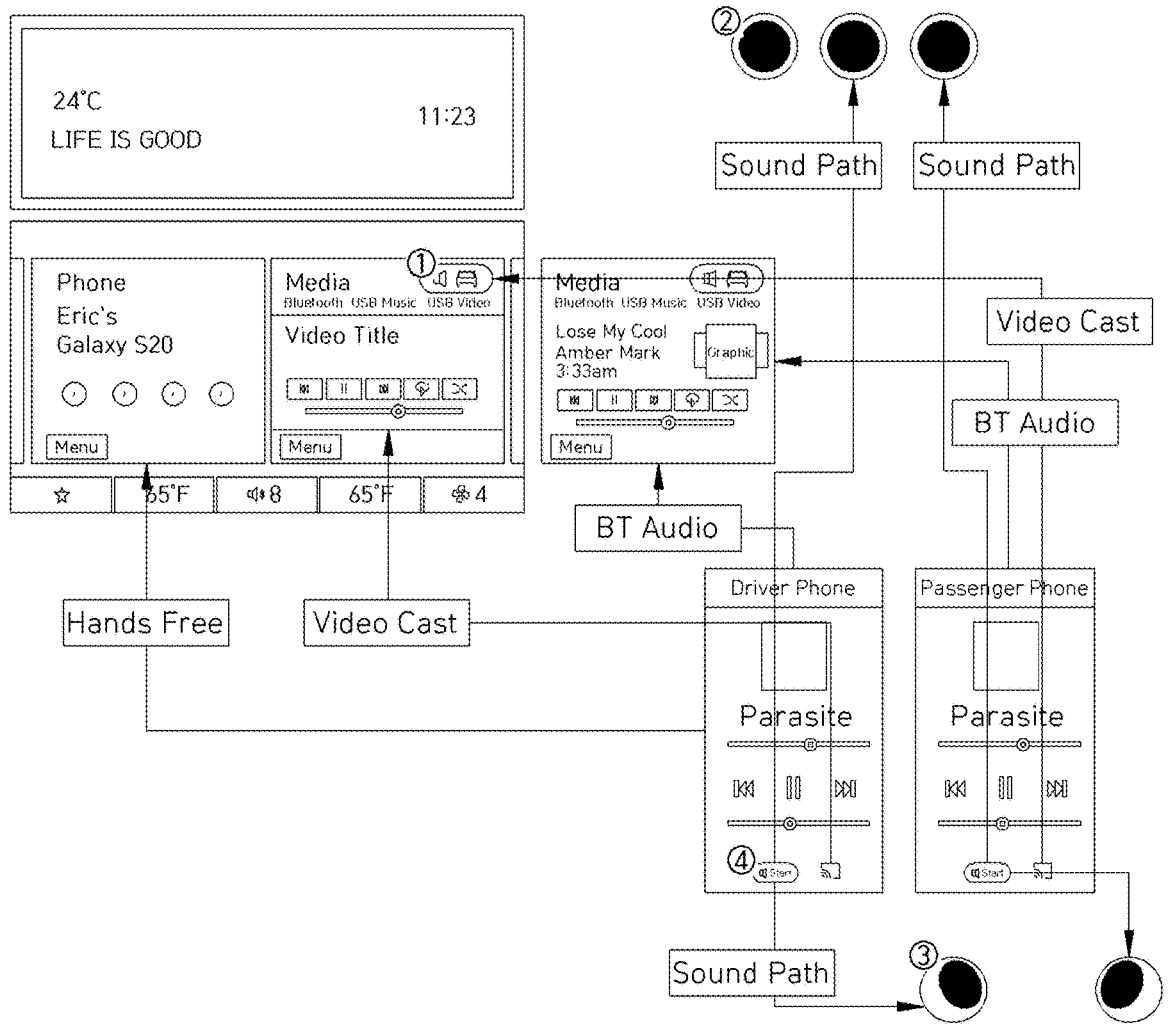
FIGS. 34A and 34B illustrate media multi-connection in a driver mode and a passenger mode according to an embodiment of the present invention.
Figure 34B:
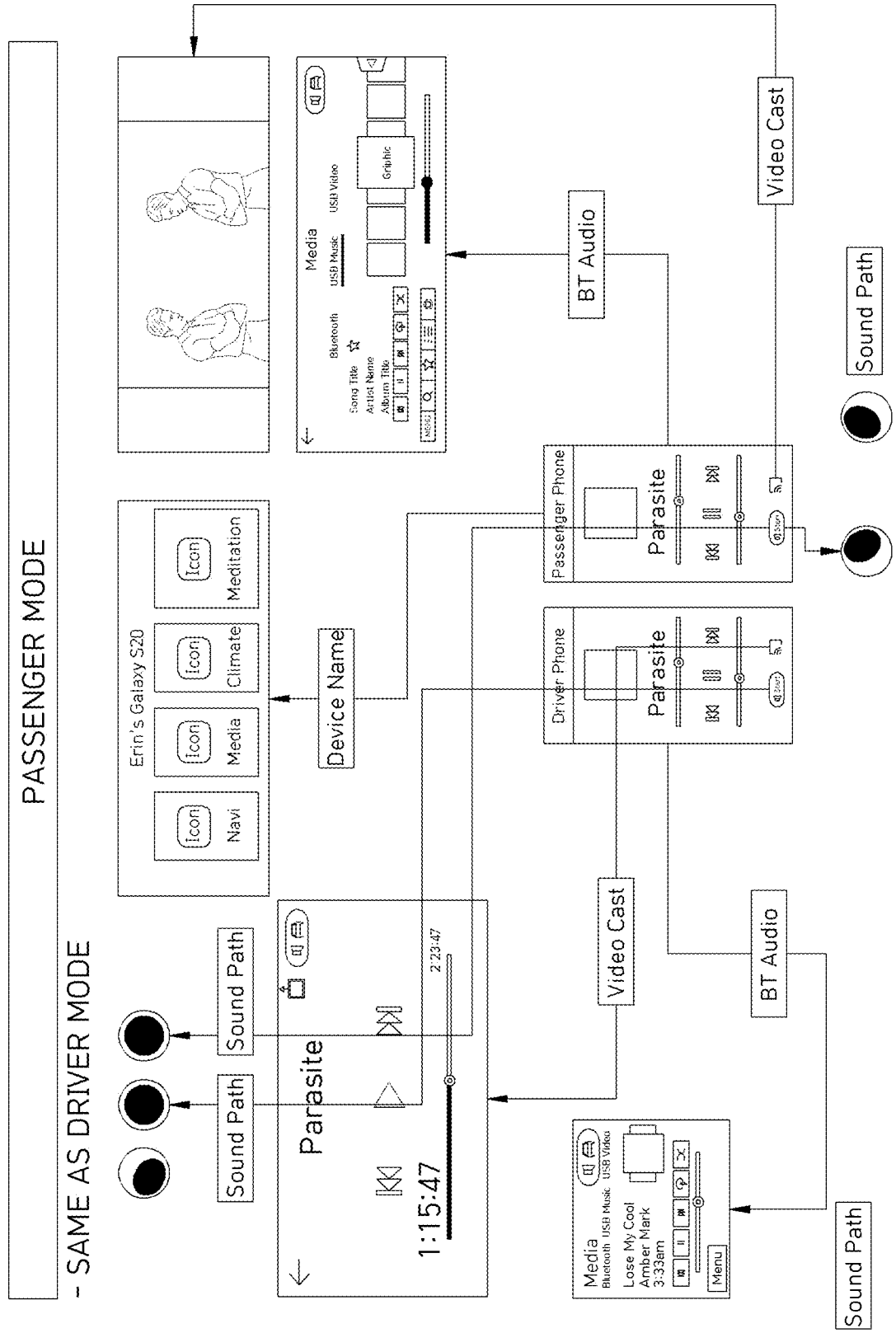

FIGS. 34A and 34B illustrate media multi-connection in a driver mode and a passenger mode according to an embodiment of the present invention.

According to an embodiment of the present invention, on the upper display and the lower display, universal serial bus (USB) music and video may be reproduced simultaneously, but the same file may not be reproduced.

On the upper display or the lower display, and Bluetooth audio and video casts of a smartphone may be reproduced simultaneously with the USB music and video reproduction.

On the upper display and the lower display, Bluetooth audio and video casts of the smartphone may be simultaneously reproduced, and the same file may not be reproduced.

An input for setting a sound source output to the vehicle speaker or the headrest speaker is received from a user through a sound path setting button of the lower display.

An input for setting a sound source output to the vehicle speaker or the headrest speaker is received from a user through a sound path setting button of a smartphone.

Figure 35A:
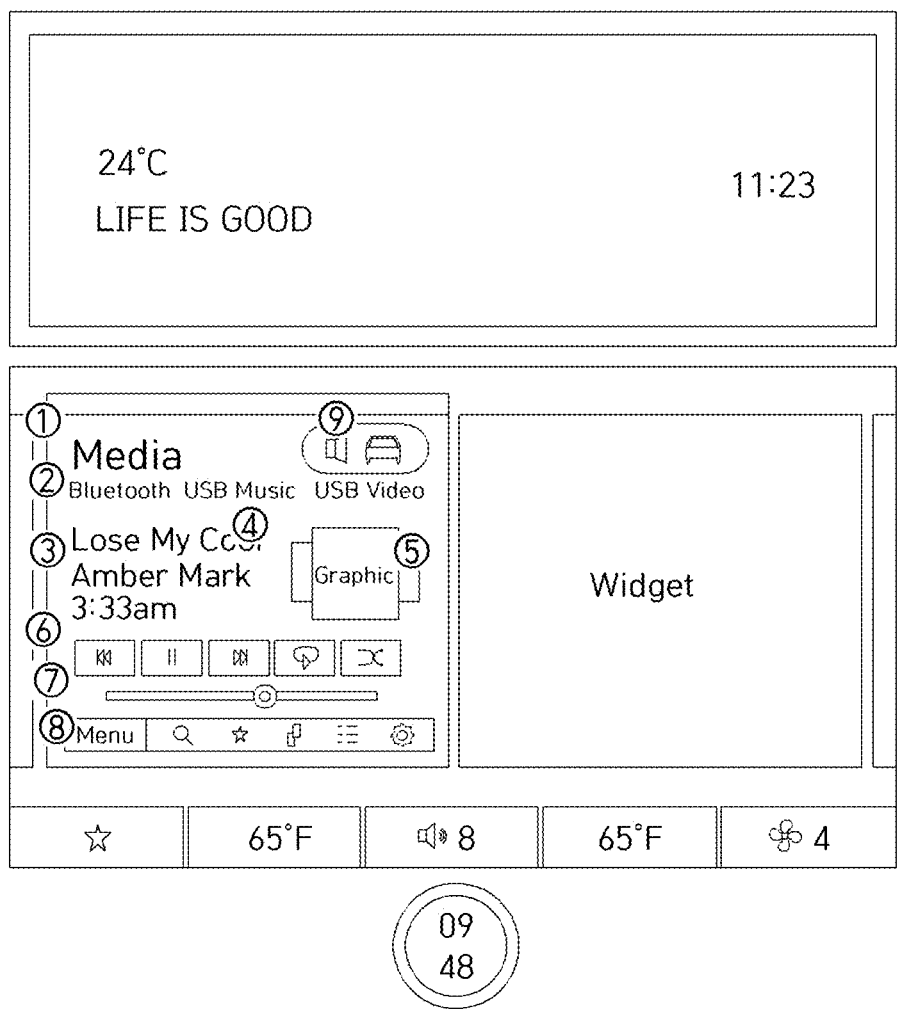
FIGS. 35A and 35B illustrate Bluetooth audio reproduction according to an embodiment of the present invention.
Figure 35B:
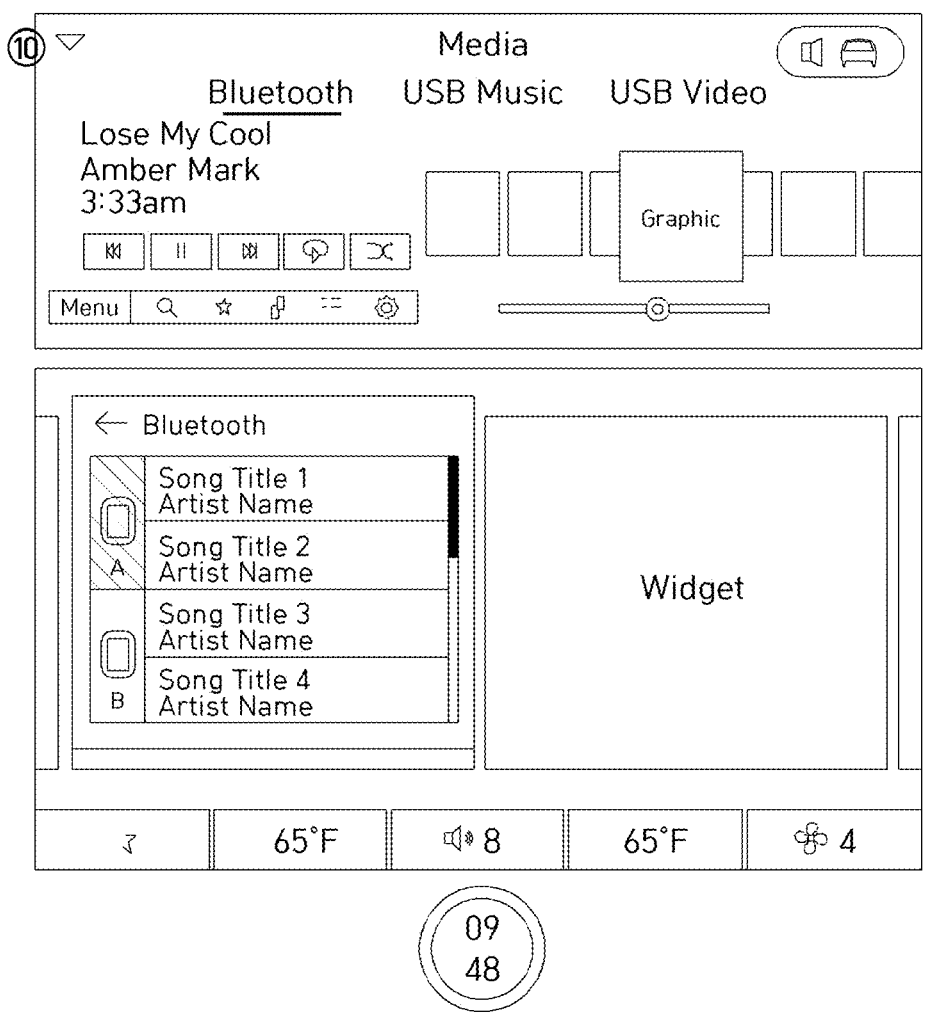

FIGS. 35A and 35B illustrate Bluetooth audio reproduction according to an embodiment of the present invention.

FIGS. 35A and 35B illustrate a case in which Bluetooth audio is reproduced on the lower display and a case in which Bluetooth audio is reproduced on the upper display.

The configuration and function in the Bluetooth audio screen shown in FIGS. 35A and 35B are as summarized in Table 12 below.

TABLE 12

| No. | Component | Description |
|---|---|---|
| 1 | Widget title | Display media text |
| 2 | Source tab button | Bluetooth/USB Music/USB Video<br>When each tab is touched, display player screen |
| 3 | Song information | $1^{st}$ line: Song title<br>$2^{nd}$ line: Artist name<br>$3^{rd}$ line: Album name |
| 4 | Favorites button | When button is touched, favorites add/delete toggle |
| 5 | Album art | Display current album jacket<br>Display previous/next song album jacket<br>When swiping leftward and rightward, change song |
| 6 | Control button | Rewind/Play&Pause/Fast Forward/Repeat/Shuffle |
| 7 | Progress bar | Current position<br>Reproduced time: MM:SS<br>Total time: MM:SS |
| 8 | Menu button | Search/Favorites/List/Sound settings |
| 9 | Sound path setting button | Display current set sound path (vehicle/seat)<br>When button is touched, display sound path change pop-up |
| 10 | ▼ Button | When button is touched, end 12.3" app<br>When button is touched while music is reproduced, reproduce music continuously |

Figure 36:
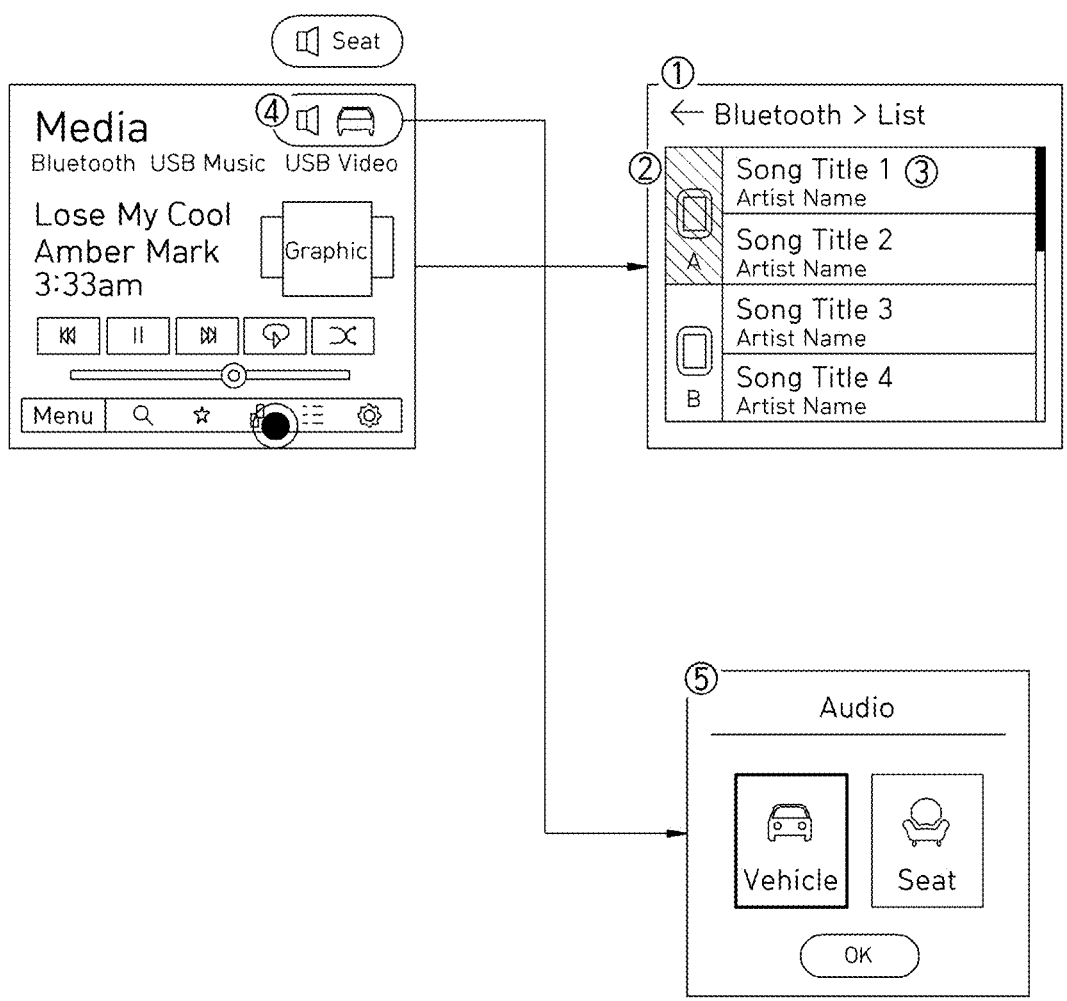
FIG. 36 illustrates a Bluetooth audio list according to an embodiment of the present invention.
Figure 37A:
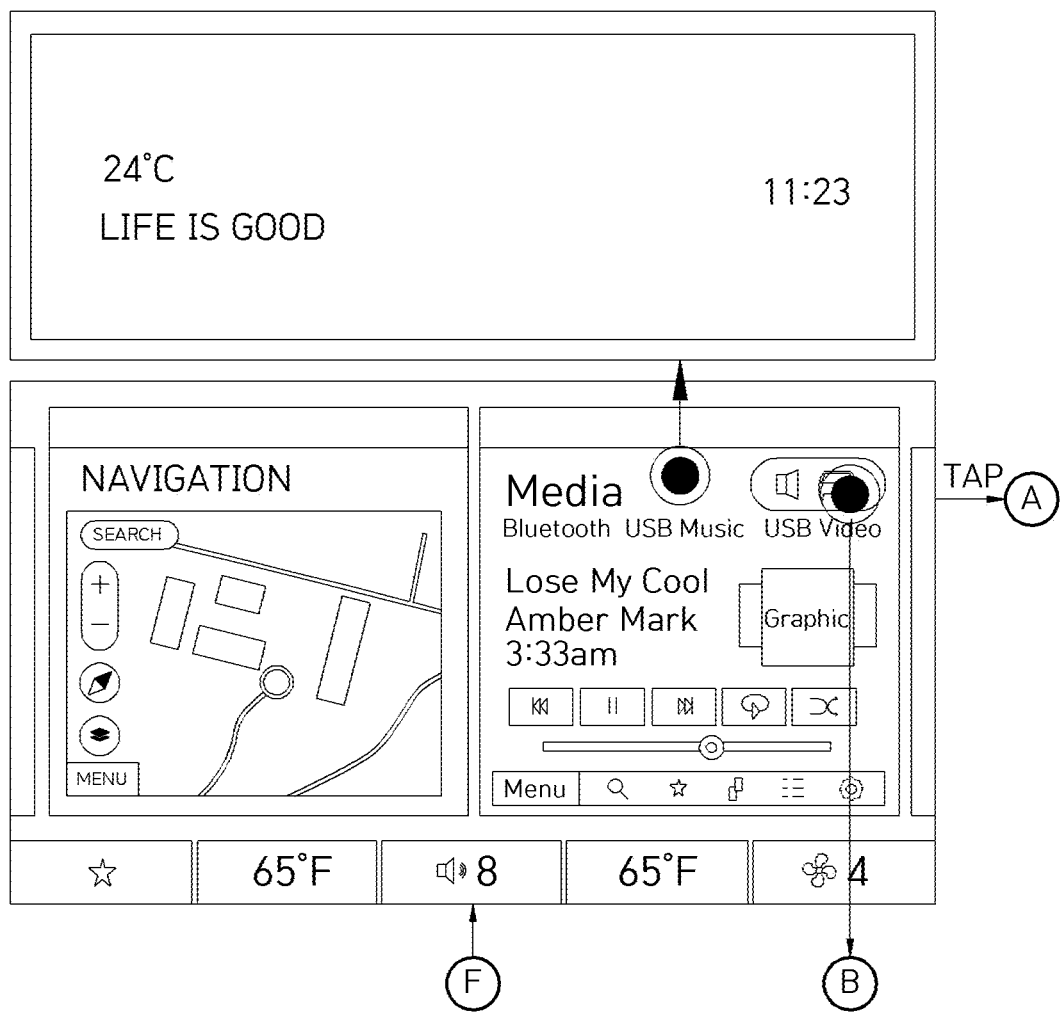
FIGS. 37A to 37F illustrate a Bluetooth audio reproduction process according to an embodiment of the present invention.
Figure 37B:
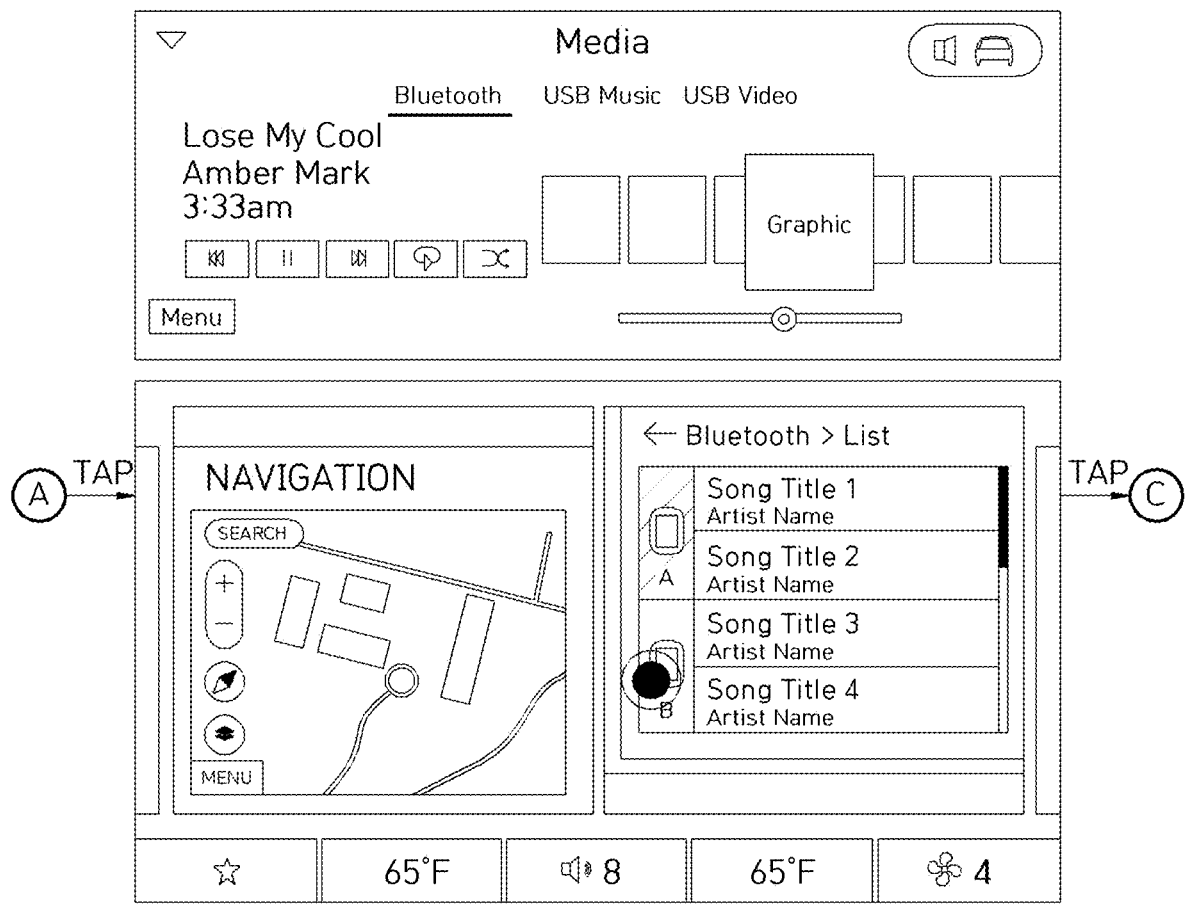
Figure 37C:
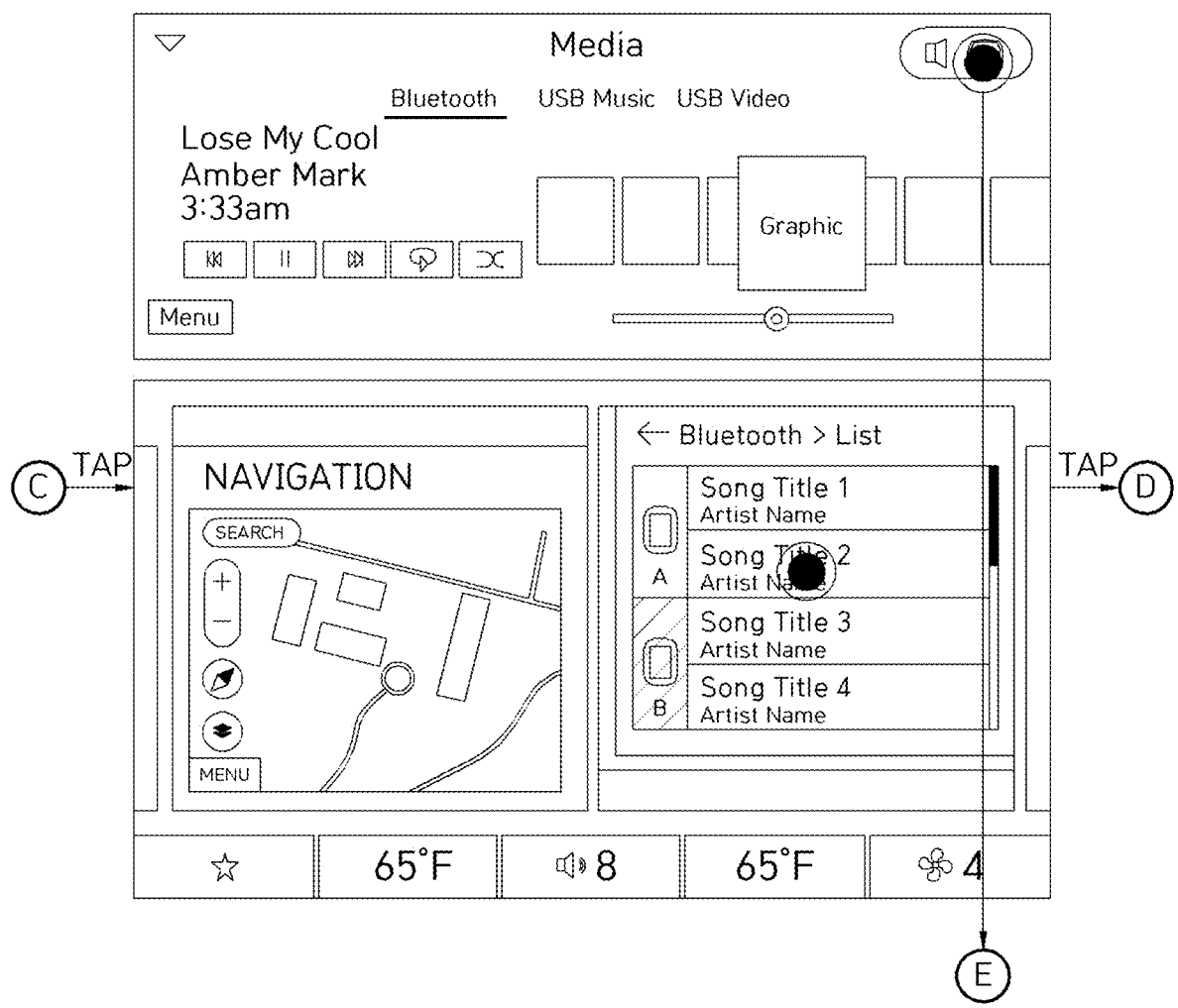
Figure 37D:
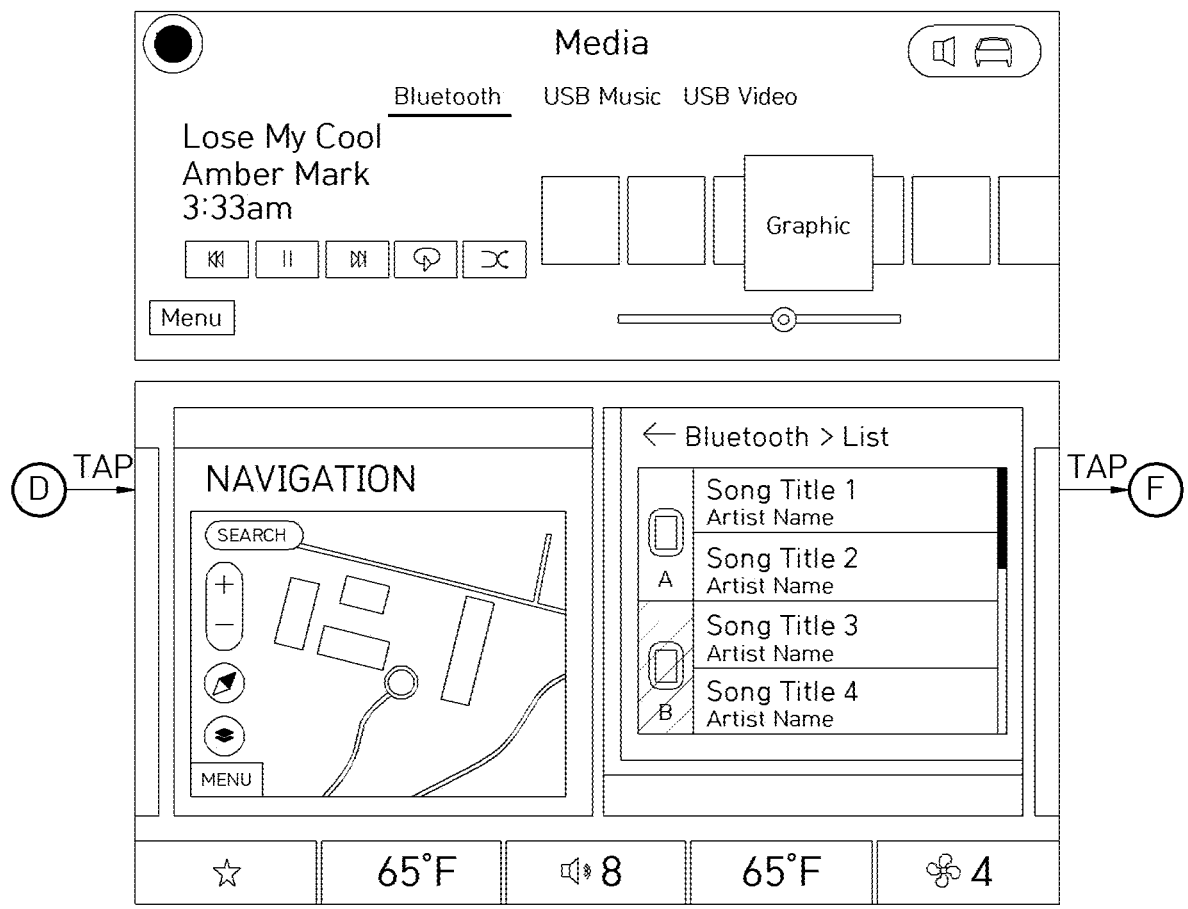
Figure 37E:
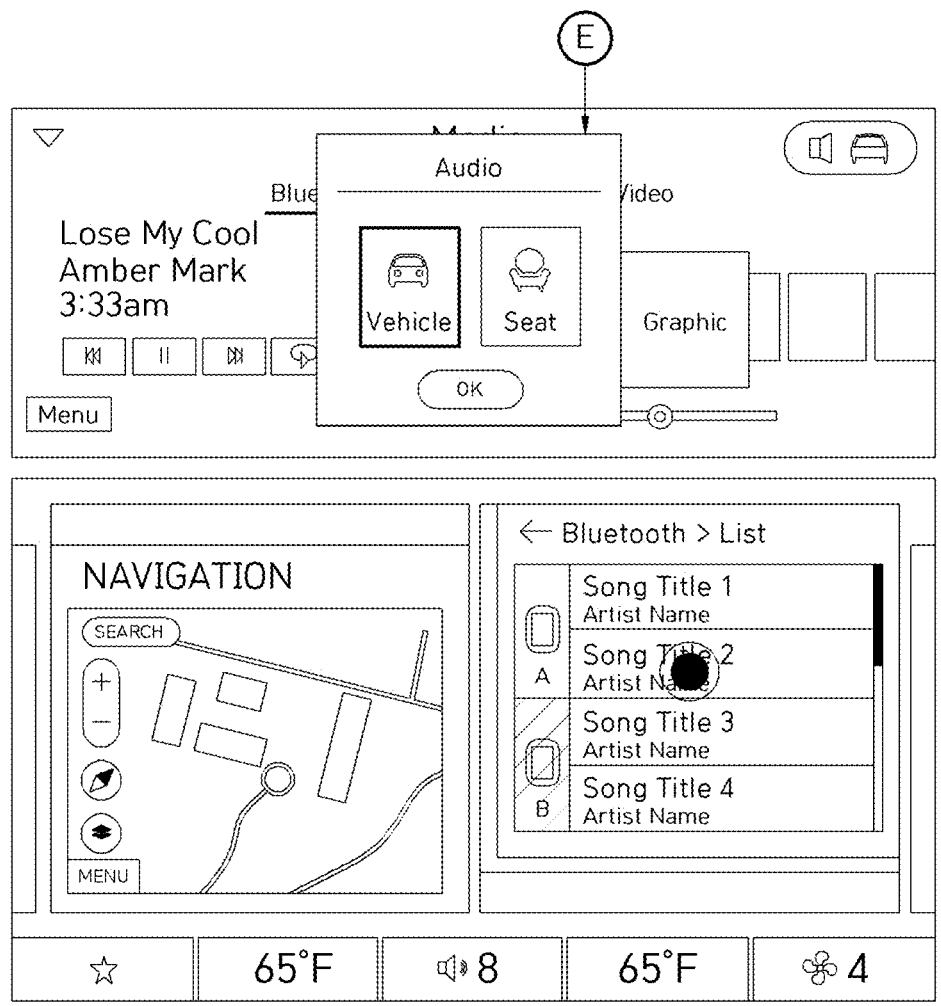
Figure 37F:
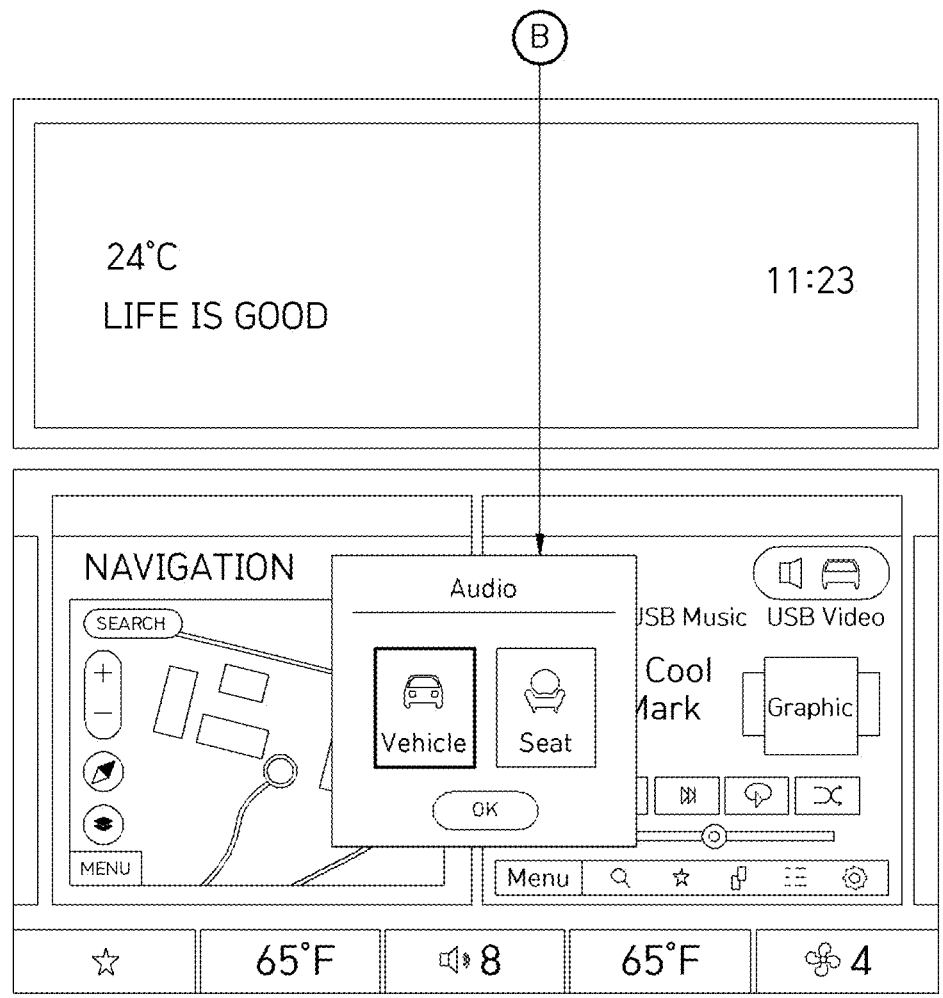

FIG. 36 illustrates a Bluetooth audio list according to an embodiment of the present invention.

The Bluetooth audio list includes a button for returning to a previous screen, an area for displaying information about Bluetooth-connected devices, and a song information area.

The sound path setting button is used when setting a sound path as the in-vehicle speaker or the headrest speaker.

The configuration and function in the Bluetooth audio list screen shown in FIG. 36 are as summarized in Table 13 below.

TABLE 13

| No. | Component | Description |
| --- | --- | --- |
| 1 | Back button | When touched, return to previous screen |
| 2 | BT device name tab | Display information about two connected BT devices<br>Icon + device name |
| 3 | Song information | 1$^{st}$ line: Song title<br>2$^{nd}$ line: Artist name |
| 4 | Sound path setting button | Display current set sound path (vehicle/seat)<br>When button is touched, display sound path change pop-up |
| 5 | Sound path pop-up | Vehicle/seat selection pop-up |

FIGS. 37A to 37F illustrate a Bluetooth audio reproduction process according to an embodiment of the present invention.

The default screen is displayed on the upper display, and navigation information and media information are displayed on the lower display.

When the sound path setting button on the lower display is pressed, the setting may be changed such that the path is changed to the in-vehicle speaker or the headrest speaker.

When an operation for moving the media app from the lower display to the upper display is input, a media player app is displayed on the upper display, and the screen is changed to the list screen on the lower display.

In the lower display, when the connected device is changed to other Bluetooth connected devices, a list of other Bluetooth connected devices is displayed.

When the sound path setting button is pressed in the upper display, the setting may be changed such that the path is changed to the in-vehicle speaker or the headrest speaker.

When the pull-down button on the upper display is pressed, the media player app is moved to the lower display and the sound source reproduction is maintained while the player is moving.

Figure 38:
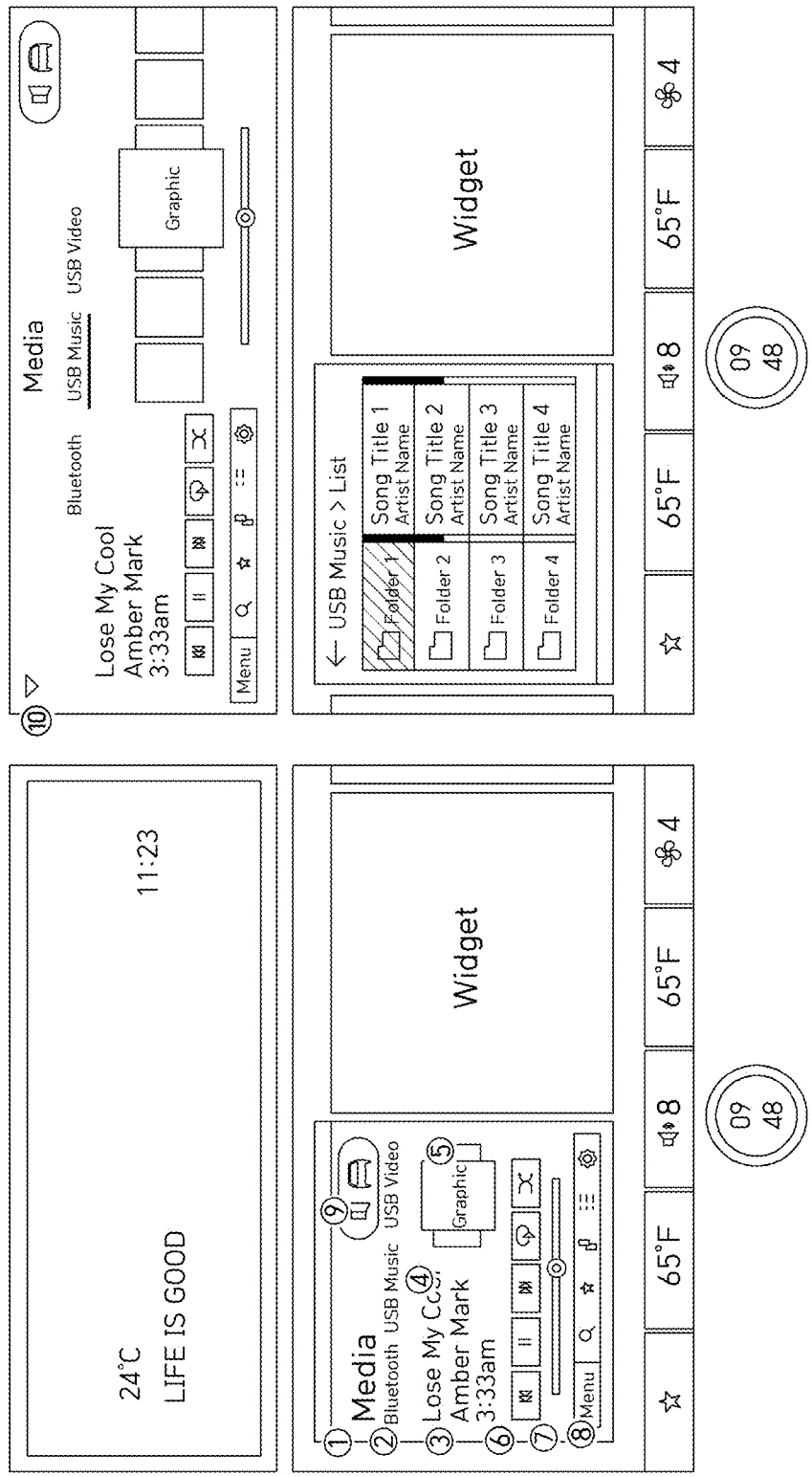
FIG. 38 illustrates universal serial bus (USB) music reproduction according to an embodiment of the present invention.

FIG. 38 illustrates USB music reproduction according to an embodiment of the present invention.

FIG. 38 illustrates a case in which the default screen is displayed on the upper display and USB music is reproduced on the lower display, and a case in which USB music is reproduced on the upper display and a USB music list is displayed on the lower display.

The configuration and function in the USB music reproduction screen shown in FIG. 38 are as shown in Table 14 below.

TABLE 14

| No. | Component | Description |
| --- | --- | --- |
| 1 | Widget title | Display media text |
| 2 | Source tab button | Bluetooth/USB Music/USB Video<br>When each tab is touched, display player screen |
| 3 | Song information | 1$^{st}$ line: Song title<br>2$^{nd}$ line: Artist name<br>3$^{rd}$ line: Album name |
| 4 | Favorites button | When button is touched, favorites add/delete toggle |
| 5 | Album art | Display current album jacket<br>Display previous/next song album jacket<br>When swiping leftward and rightward, change song |
| 6 | Control button | Rewind/Play&Pause/Fast Forward/Repeat/Shuffle |
| 7 | Progress bar | Current position<br>Reproduced time: MM:SS<br>Total time: MM:SS |
| 8 | Menu button | Search/Favorites/List/Sound settings |
| 9 | Sound path setting button | Display current set sound path (vehicle/seat)<br>When button is touched, display sound path change pop-up |
| 10 | ▼ Button | When button is touched, end 12.3" app<br>When button is touched while music is reproduced, reproduce music continuously |

Figure 39:
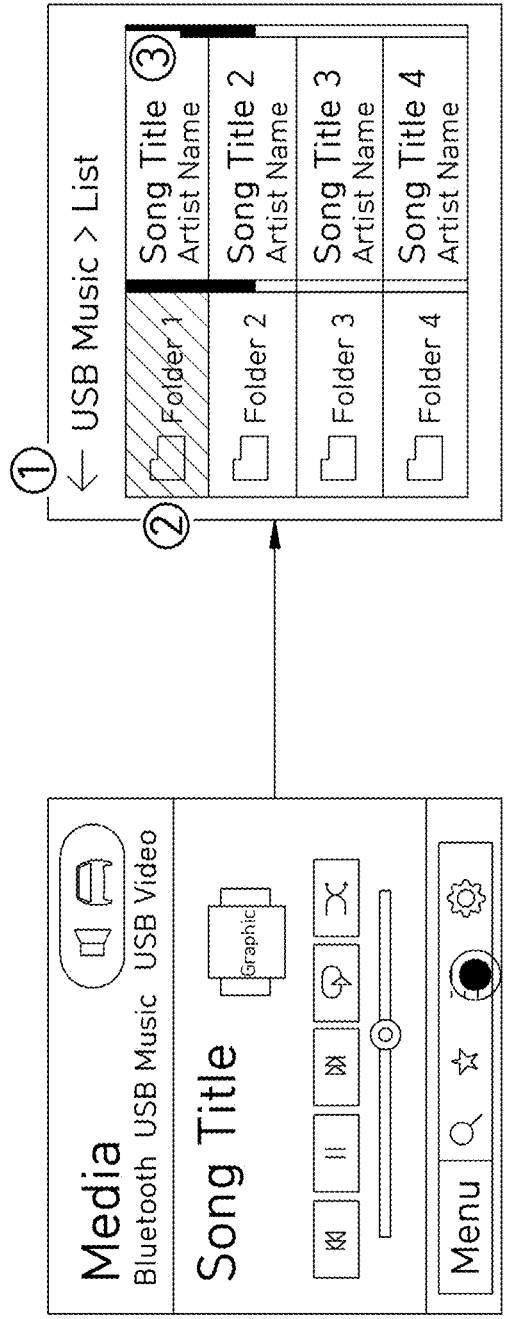
FIG. 39 illustrates a USB music reproduction list according to an embodiment of the present invention.
Figure 40A:
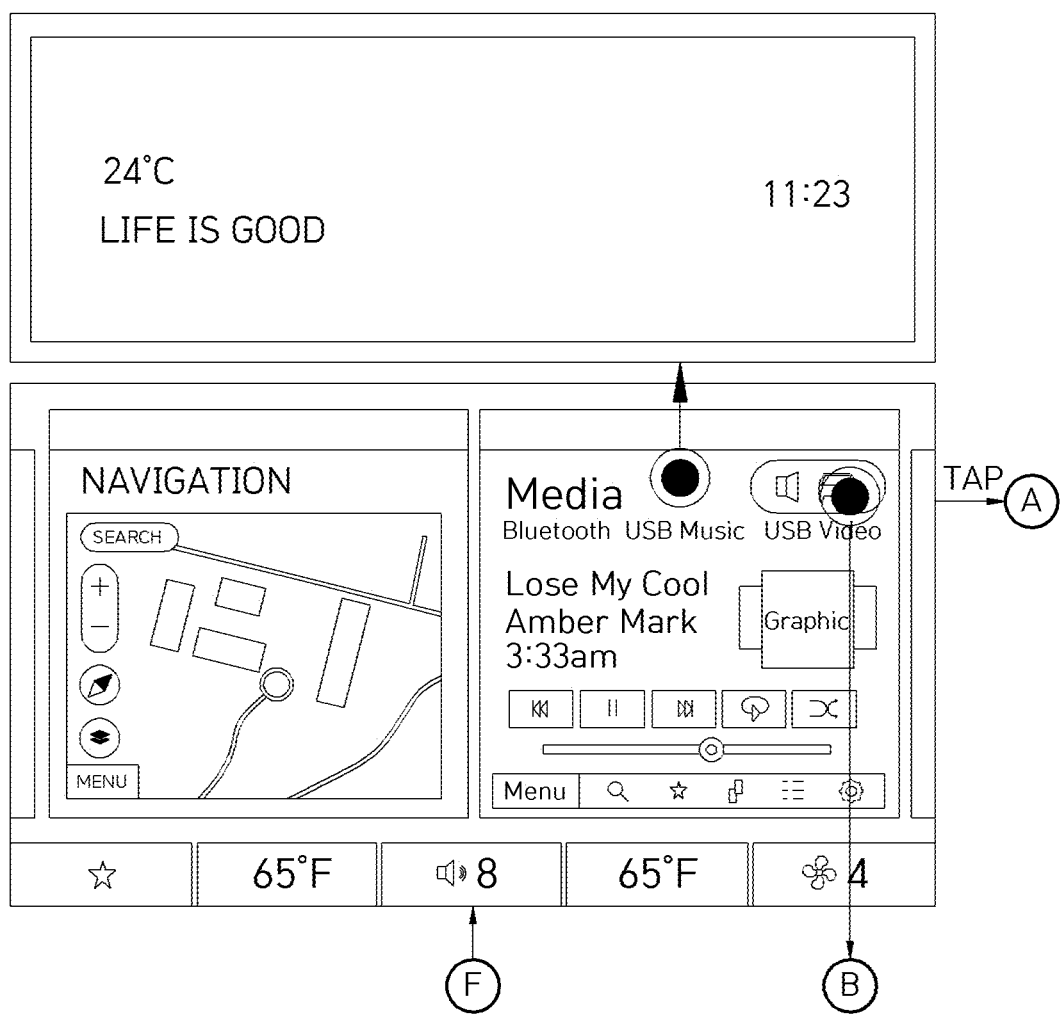
FIGS. 40A to 40E illustrate a USB music reproduction process according to an embodiment of the present invention.
Figure 40B:
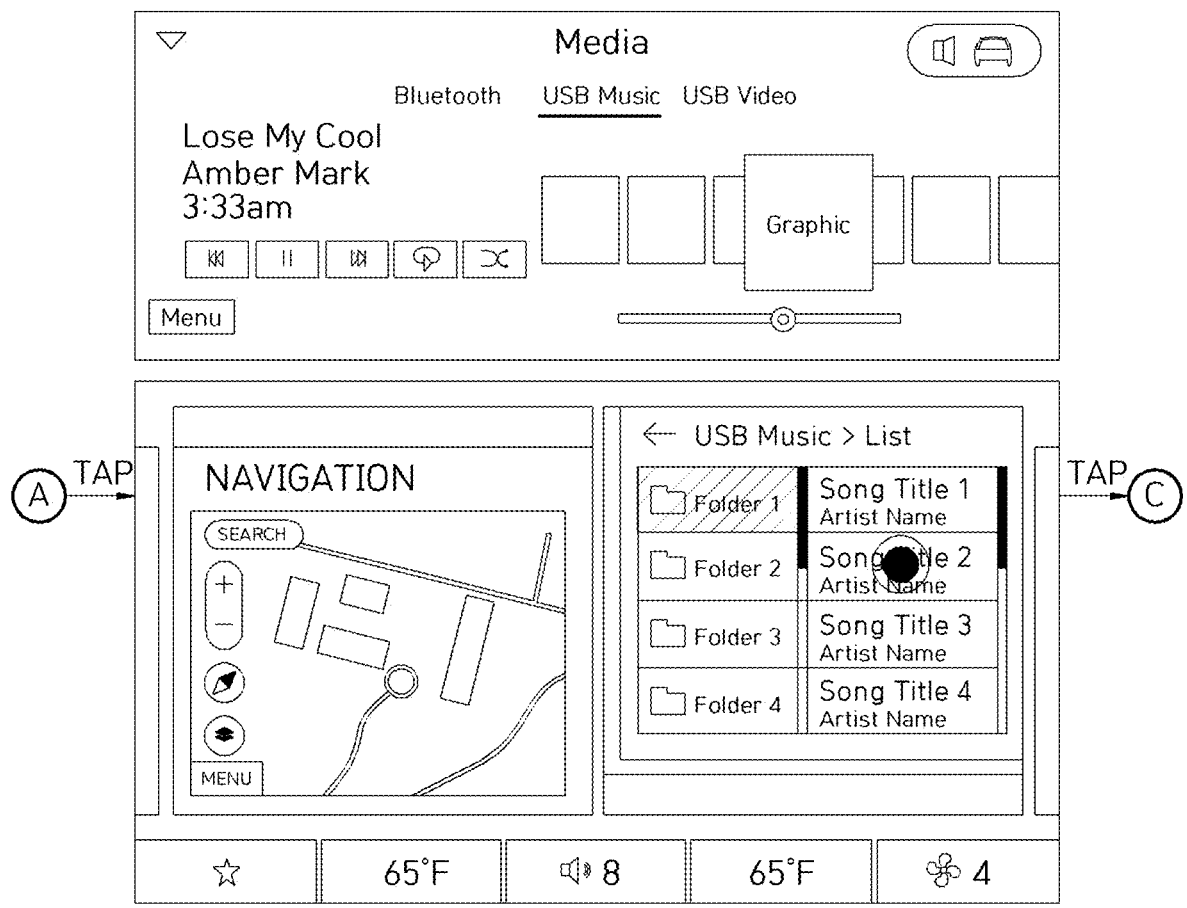
Figure 40C:
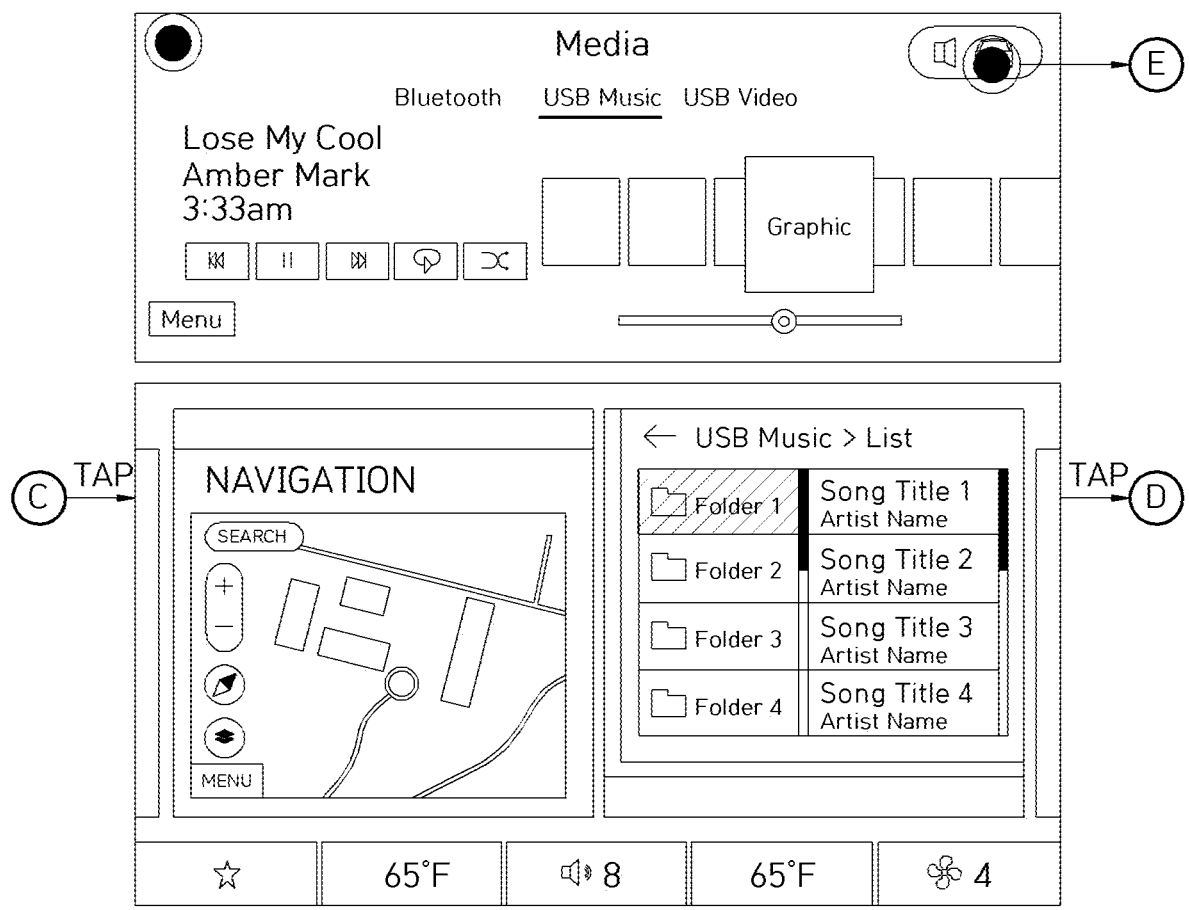
Figure 40D:
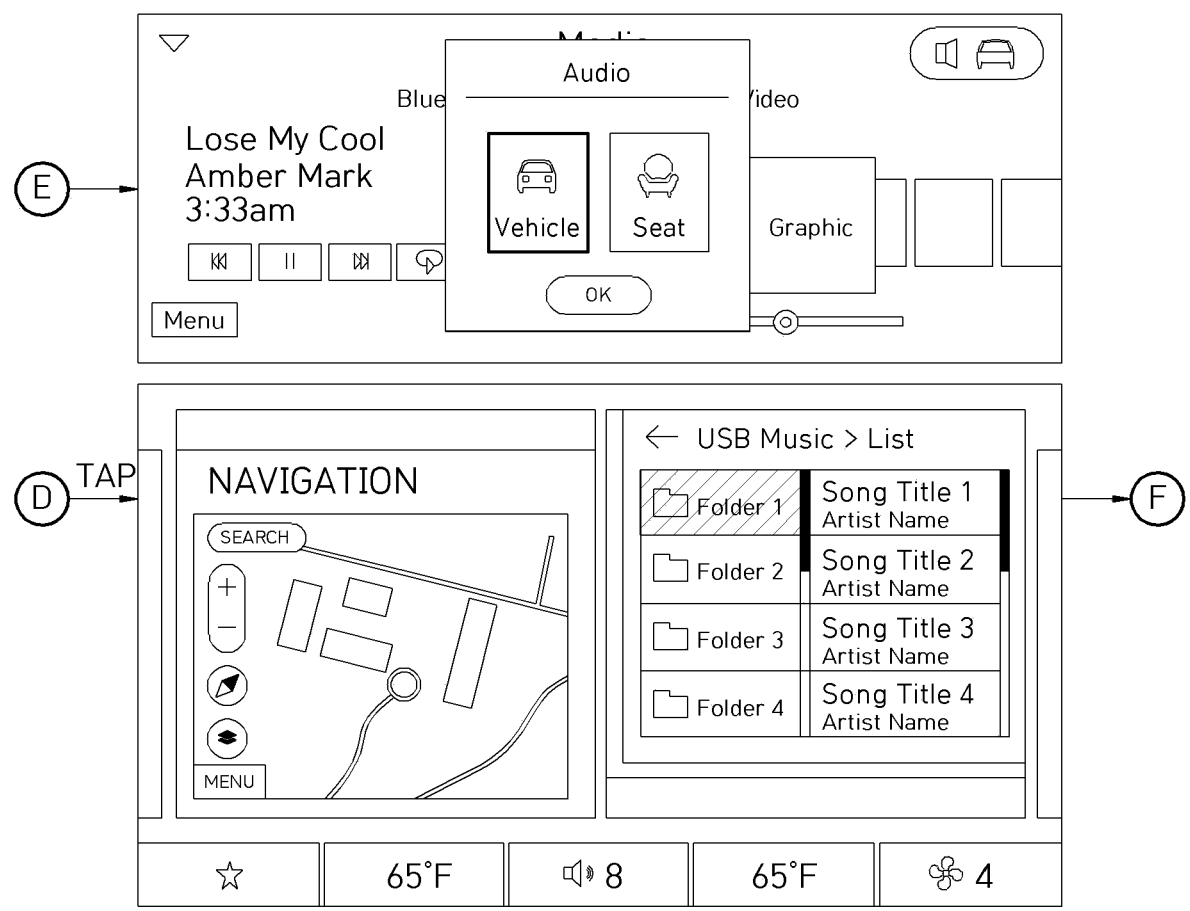
Figure 40E:
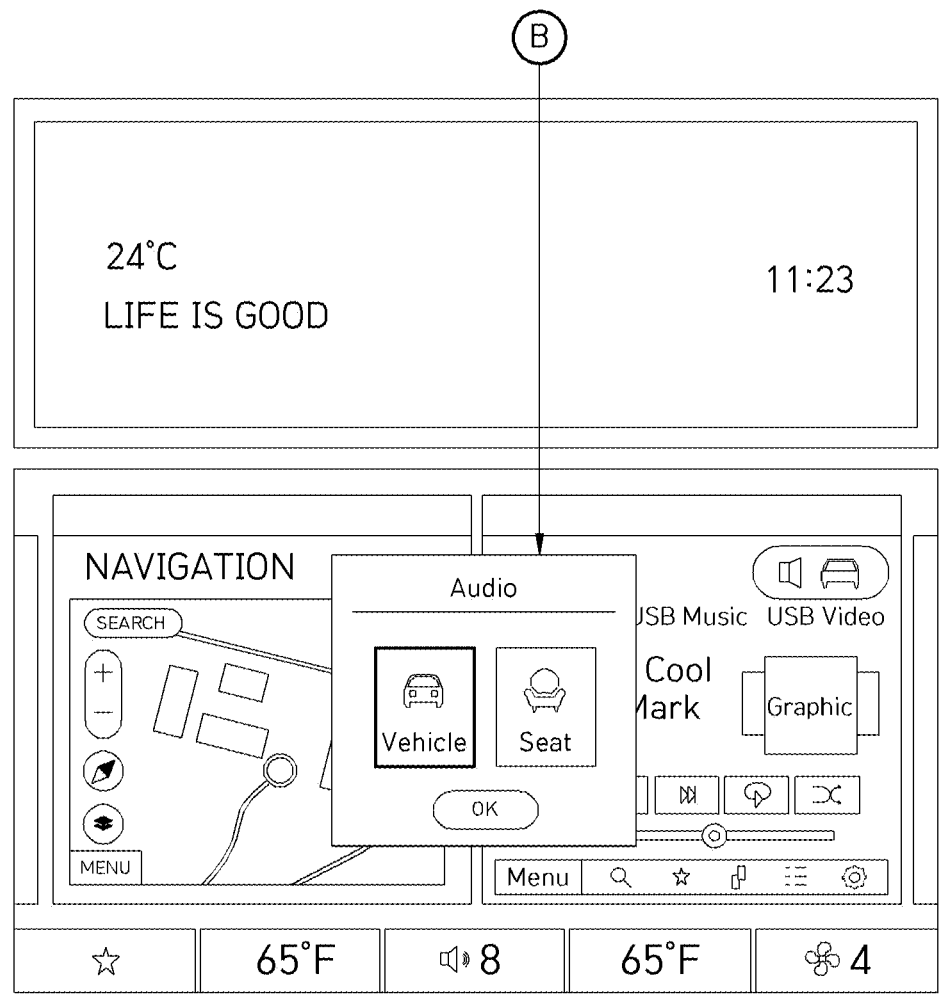

FIG. 39 illustrates a USB music reproduction list according to an embodiment of the present invention.

The configuration and function in the USB music reproduction list screen shown in FIG. 39 are as summarized in Table 15 below.

TABLE 15

| No. | Component | Description |
| --- | --- | --- |
| 1 | Back button | When touched, return to previous screen |
| 2 | Folder list | Folder icon + folder name |
| 3 | Song list | 1$^{st}$ line: Song title<br>2$^{nd}$ line: Artist name |

FIGS. 40A to 40E illustrate a USB music reproduction process according to an embodiment of the present invention.

The default screen is displayed on the upper display, and navigation information and media information are displayed on the lower display.

When the sound path setting button on the lower display is pressed, the setting may be changed such that the path is changed to the in-vehicle speaker or the headrest speaker.

When an operation for moving the media app to the upper display from the lower display to the upper display is input, the media player app is displayed on the upper display, and the screen is changed to the list screen on the lower display.

When the pull-down button on the upper display is pressed, the media player app is moved to the lower display and the sound source reproduction is maintained while the player is moving.

When the sound path setting button on the upper display is pressed, the setting may be changed such that the path is changed to the in-vehicle speaker or the headrest speaker.

Figure 41:
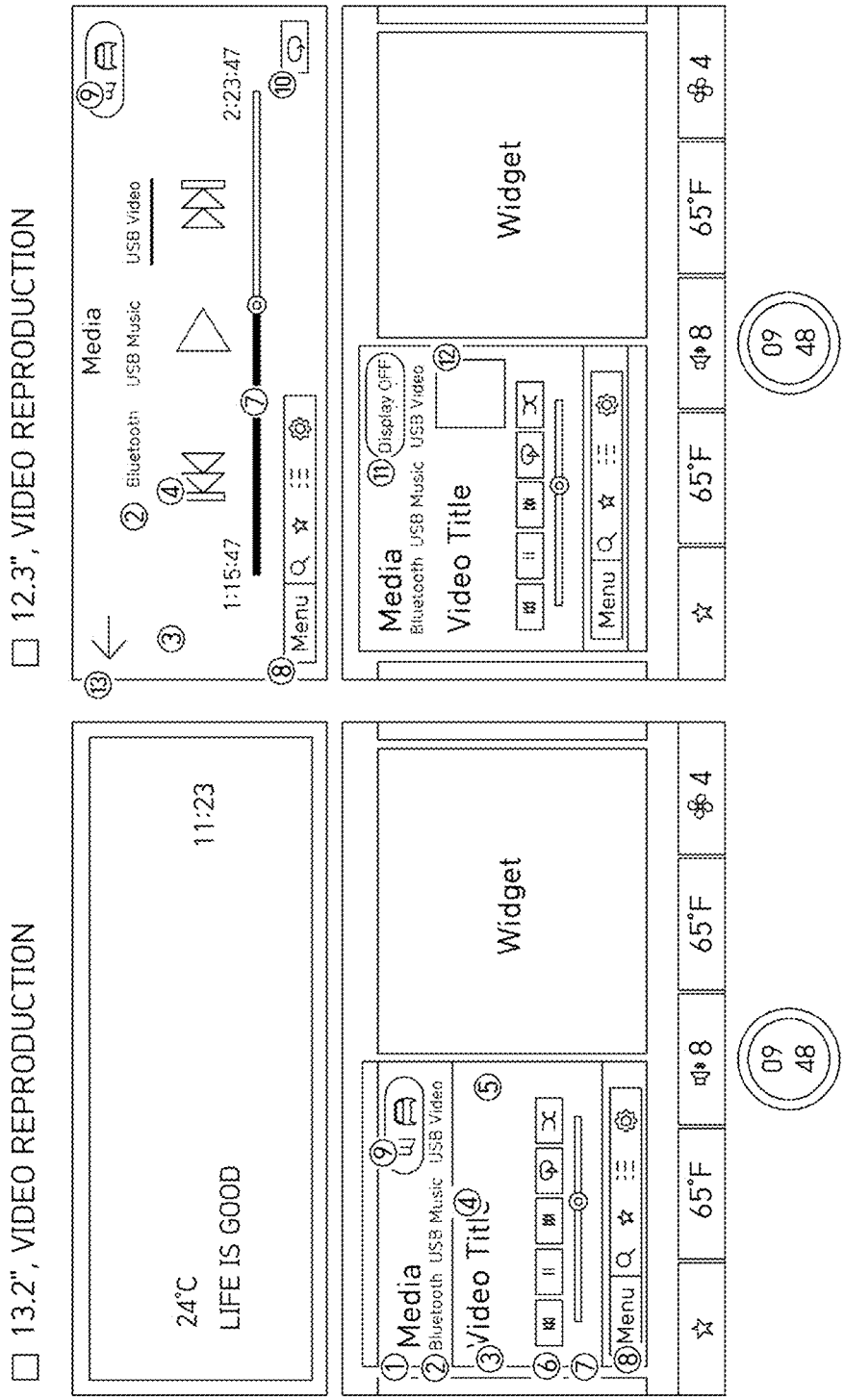
FIG. 41 illustrates USB video reproduction according to an embodiment of the present invention.

FIG. 41 illustrates USB video reproduction according to an embodiment of the present invention.

FIG. 41 illustrates a case in which the default screen is displayed on the upper display and a video is reproduced on the lower display, and a case in which a video is reproduced on the upper display and video related information is displayed on the lower display.

The configuration and function in the video reproduction screen shown in FIG. 41 are summarized in Table 16 below.

TABLE 16

| No. | Component | Description |
|---|---|---|
| 1 | Widget title | Display media text |
| 2 | Source tab button | Bluetooth/USB Music/USB Video<br>When each tab is touched, display player screen |
| 3 | Video title | Video title |
| 4 | Favorites button | When button is touched, favorites add/delete toggle |
| 5 | Player | Display in fit-to-screen<br>When screen is enlarged, display in fill-screen |
| 6 | 13.2" control button | Rewind/Play&Pause/Fast Forward/Repeat |
| 7 | Progress bar | Current position<br>Reproduced time: MM:SS<br>Total time: MM:SS |
| 8 | Menu button | Search/Favorites/List/Screen settings |
| 9 | Sound path setting button | Display current set sound path (vehicle/seat)<br>When button is touched, display sound path change pop-up |
| 10 | 12.3" control button | Rewind/Play&Pause/Fast Forward/Repeat |
| 11 | Display off button | When button is touched, turn 12.3" display off |
| 12 | Video thumbnail image | 12.3", Display reproducing video thumbnail image |
| 13 | ▼ Button | When button is touched while music is reproduced, reproduce music continuously |

Figure 42:
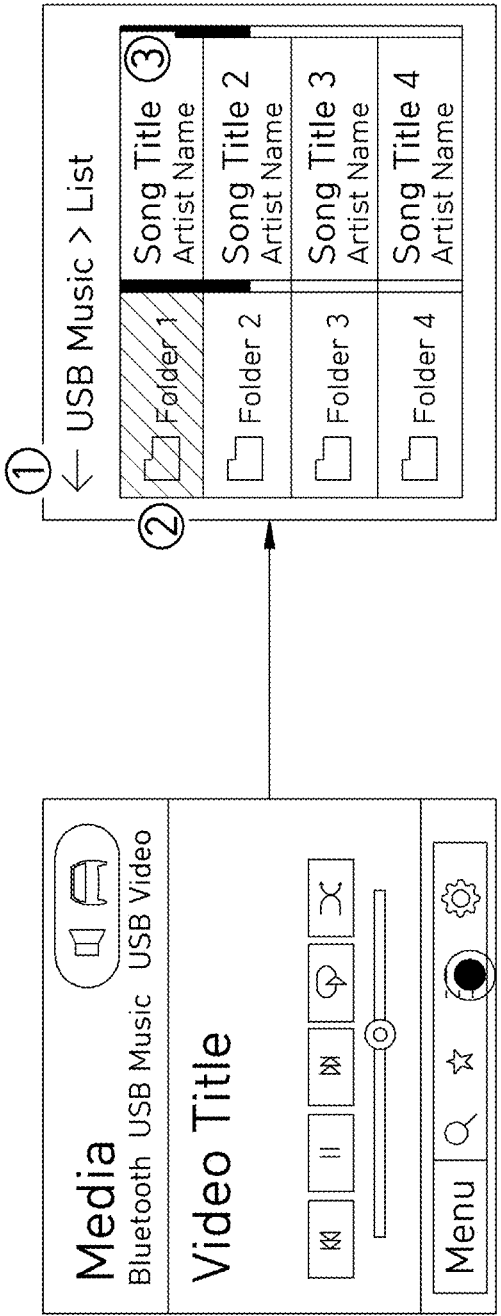
FIG. 42 illustrates a USB video reproduction list according to an embodiment of the present invention.
Figure 43A:
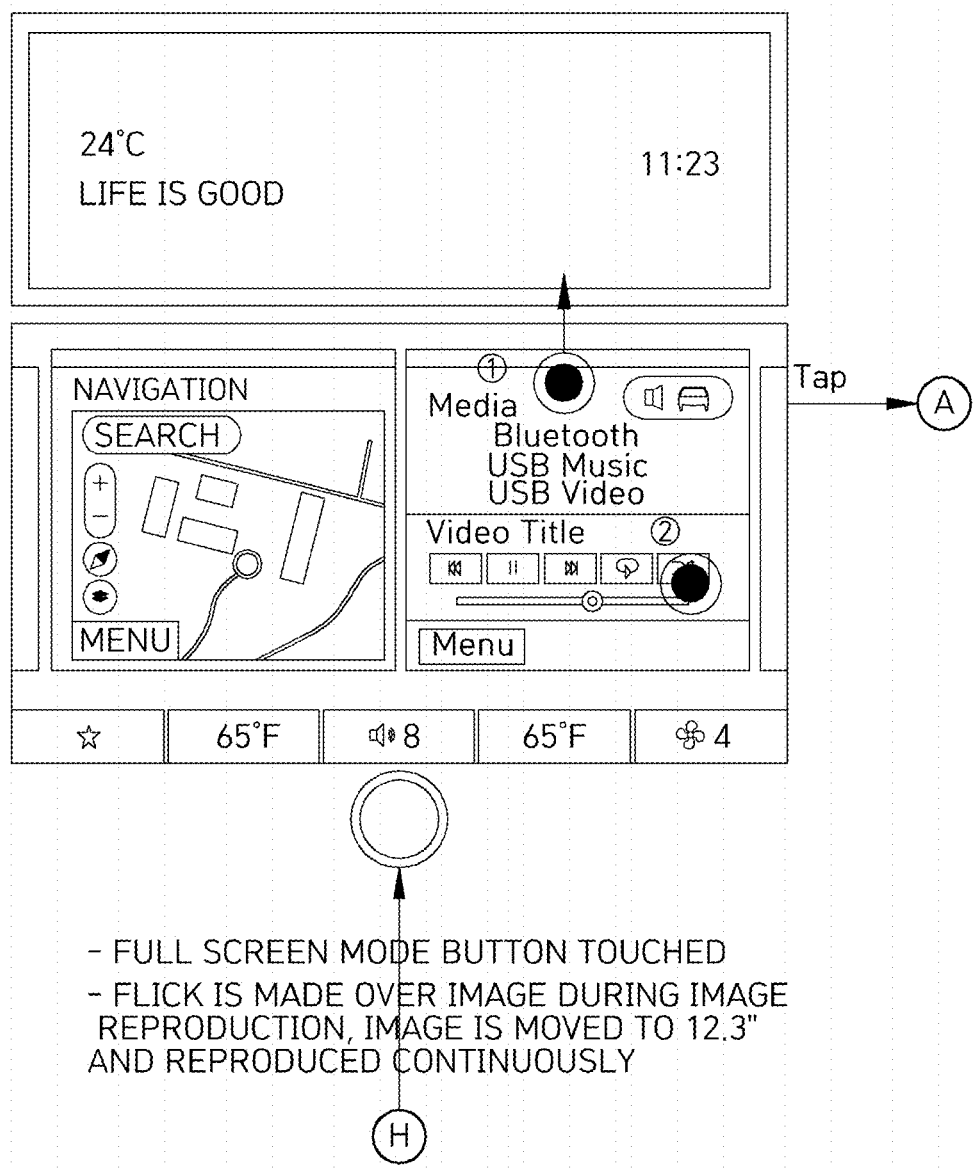
Figure 43B:
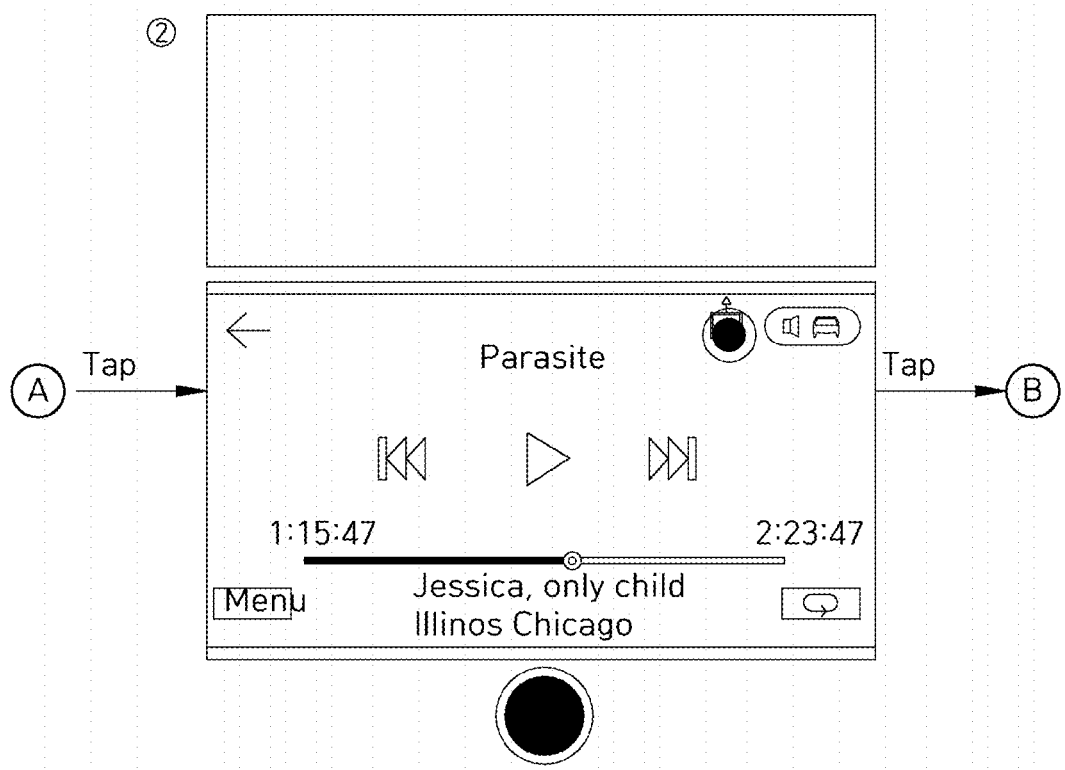
Figure 43C:
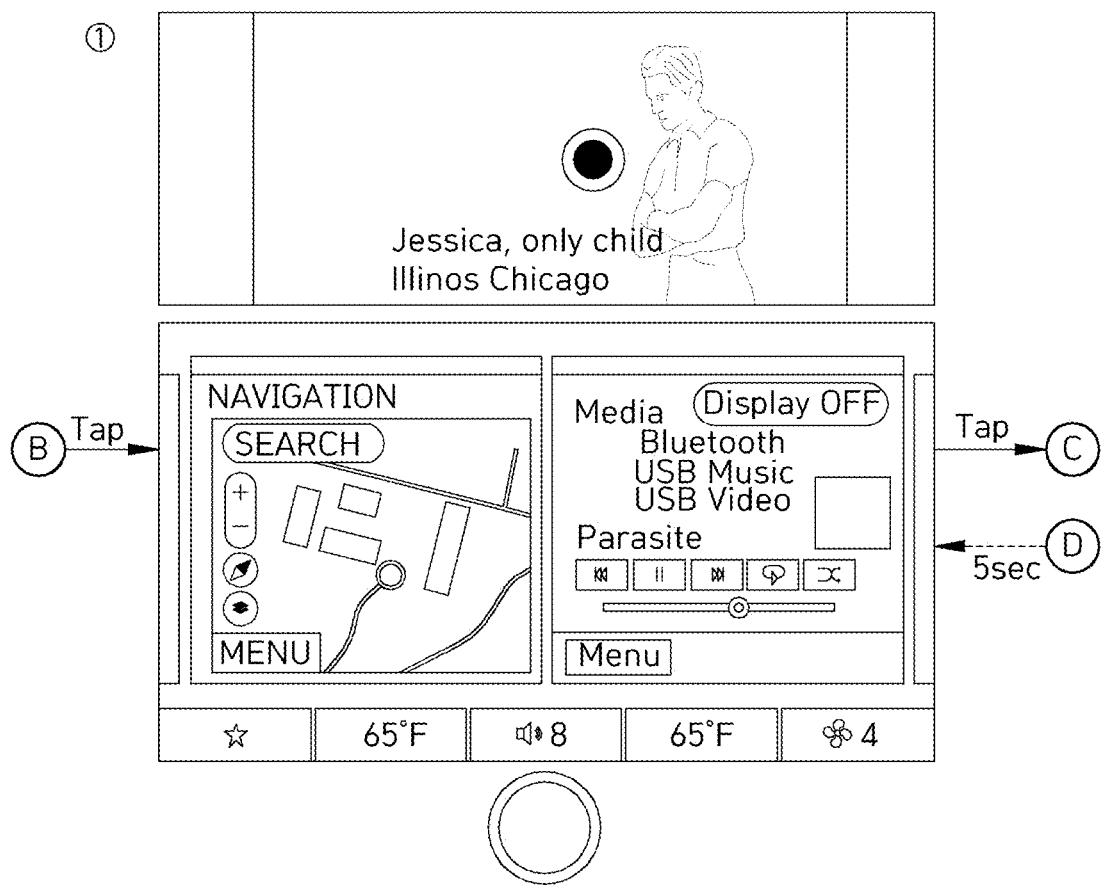
Figure 43D:
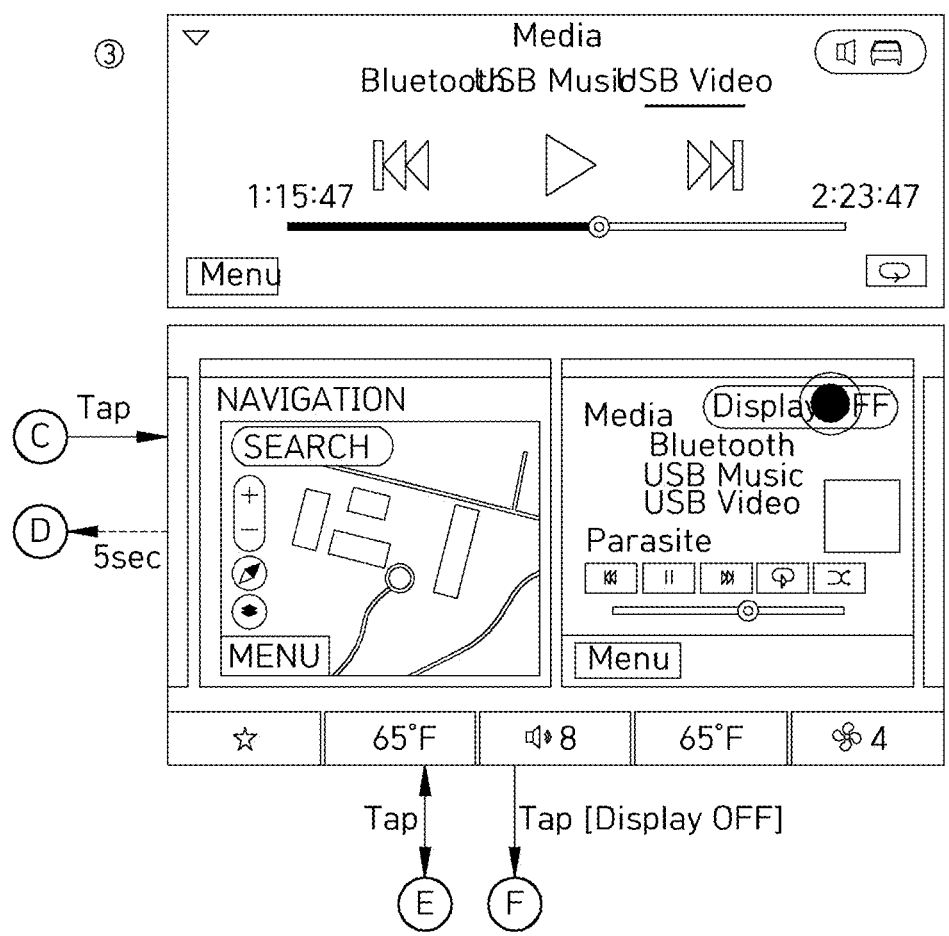
Figure 44A:
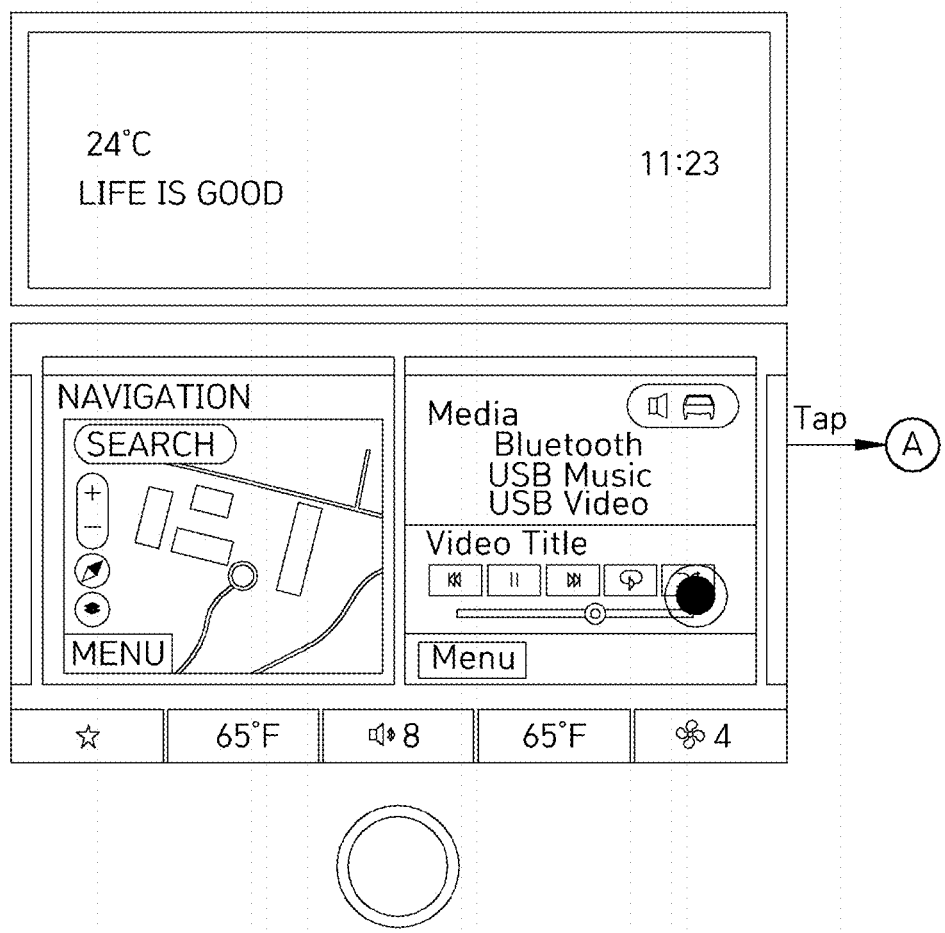
FIGS. 44A to 44D illustrate a knob operation process according to an embodiment of the present invention.
Figure 44B:
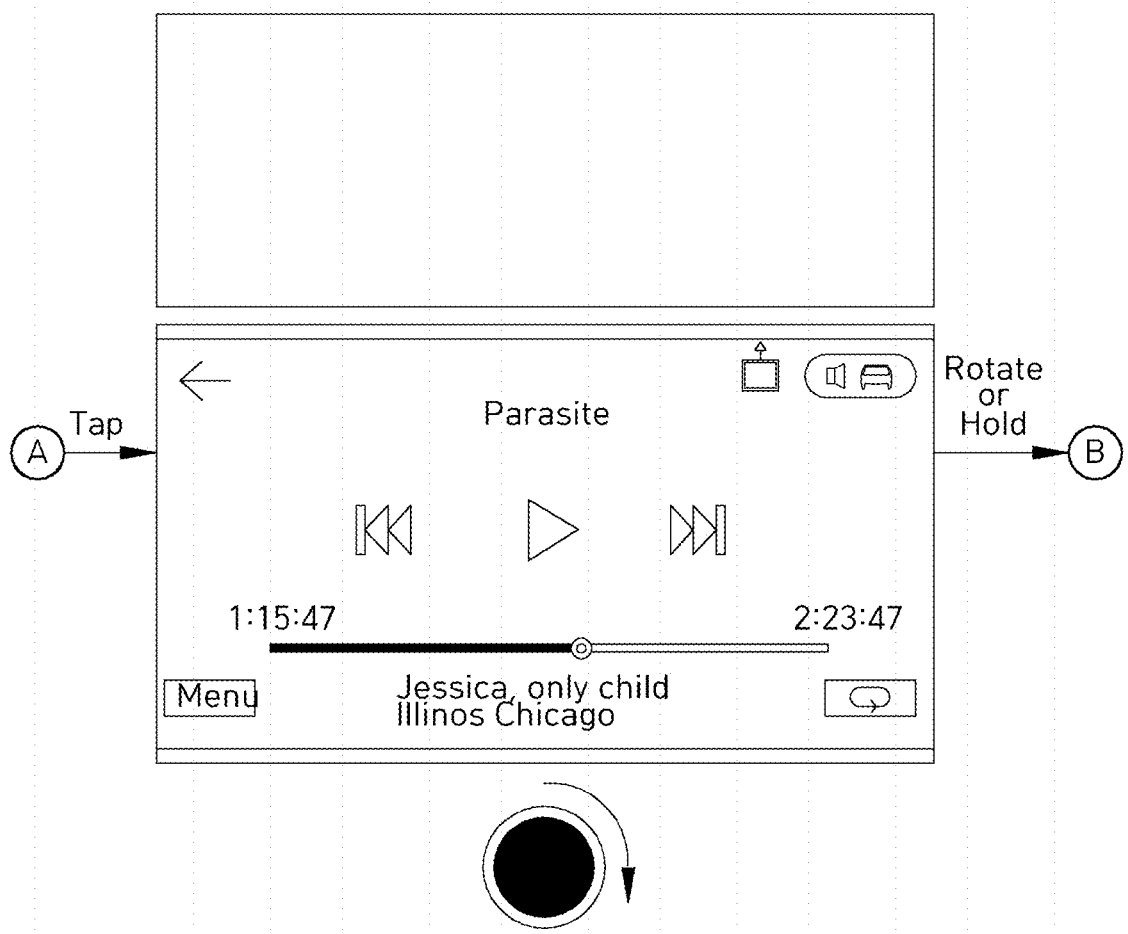
Figure 44C:
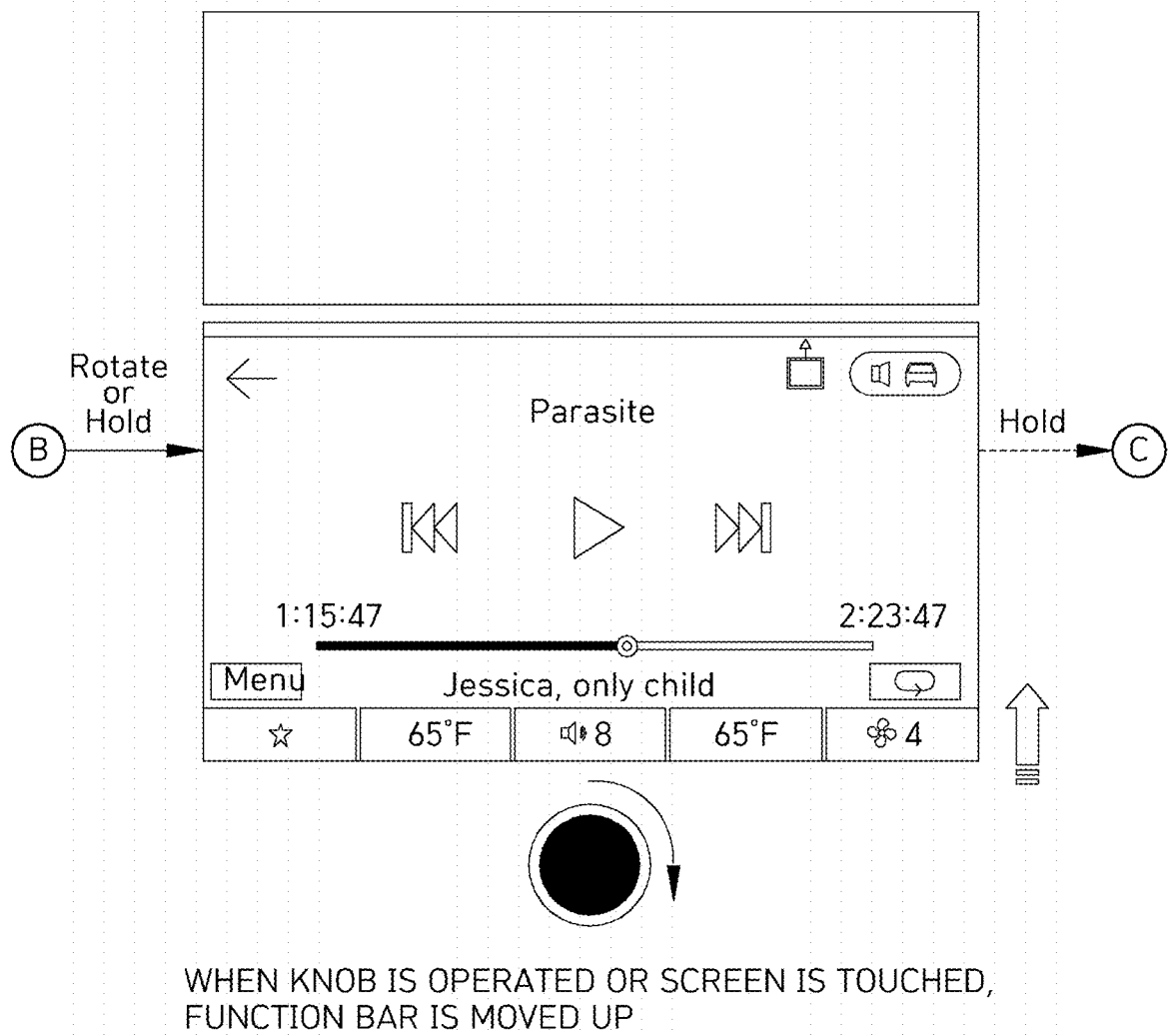
Figure 44D:
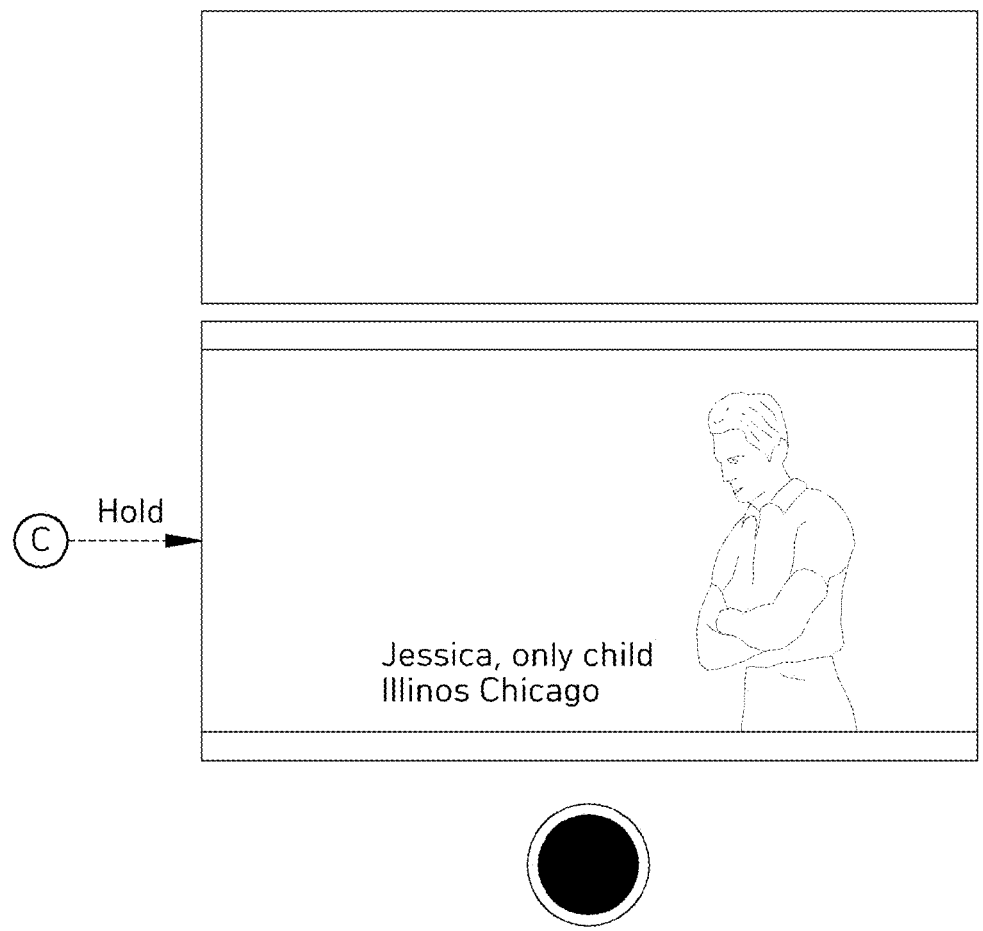

FIG. 42 illustrates a USB video reproduction list according to an embodiment of the present invention.

The configuration and function in the USB video reproduction list shown in FIG. 42 are as summarized in Table 17 below.

TABLE 17

| No. | Component | Description |
|---|---|---|
| 1 | Back button | When touched, return to previous screen |
| 2 | Folder list | Folder icon + folder name |
| 3 | Video list | $1^{st}$ line: Video title<br>$2^{nd}$ line: Duration Time - HH:MM:SS |

FIGS. 43A to 43E illustrate the movement of a video between the displays according to an embodiment of the present invention.

A situation in which the default screen is displayed on the upper display and navigation information and media information are displayed on the lower display is assumed.

When a full-screen mode button on the lower display is touched, the upper display is turned off and the entire screen is reproduced on the lower display.

When a button for moving an image from the lower display to the upper display is touched, the entire screen is reproduced on the upper display, and the navigation information and the media information are displayed on the lower display.

When a display-off button is touched in a media information display area of the lower display, the lower display is turned off, and when an area of the lower display that is turned off is touched, the upper display is turned off and the entire screen is reproduced on the lower display.

FIGS. 44A to 44D illustrate a knob operation process according to an embodiment of the present invention.

In a situation in which the default screen is displayed on the upper display and the navigation information and the media information are displayed on the lower display, when the full-screen mode button on the lower display is touched, the upper display is turned off and the entire screen is reproduced on the lower display.

When the knob is operated or a screen touch is made on the lower display, a function bar appears and is displayed on the lower display.

Figure 45A:
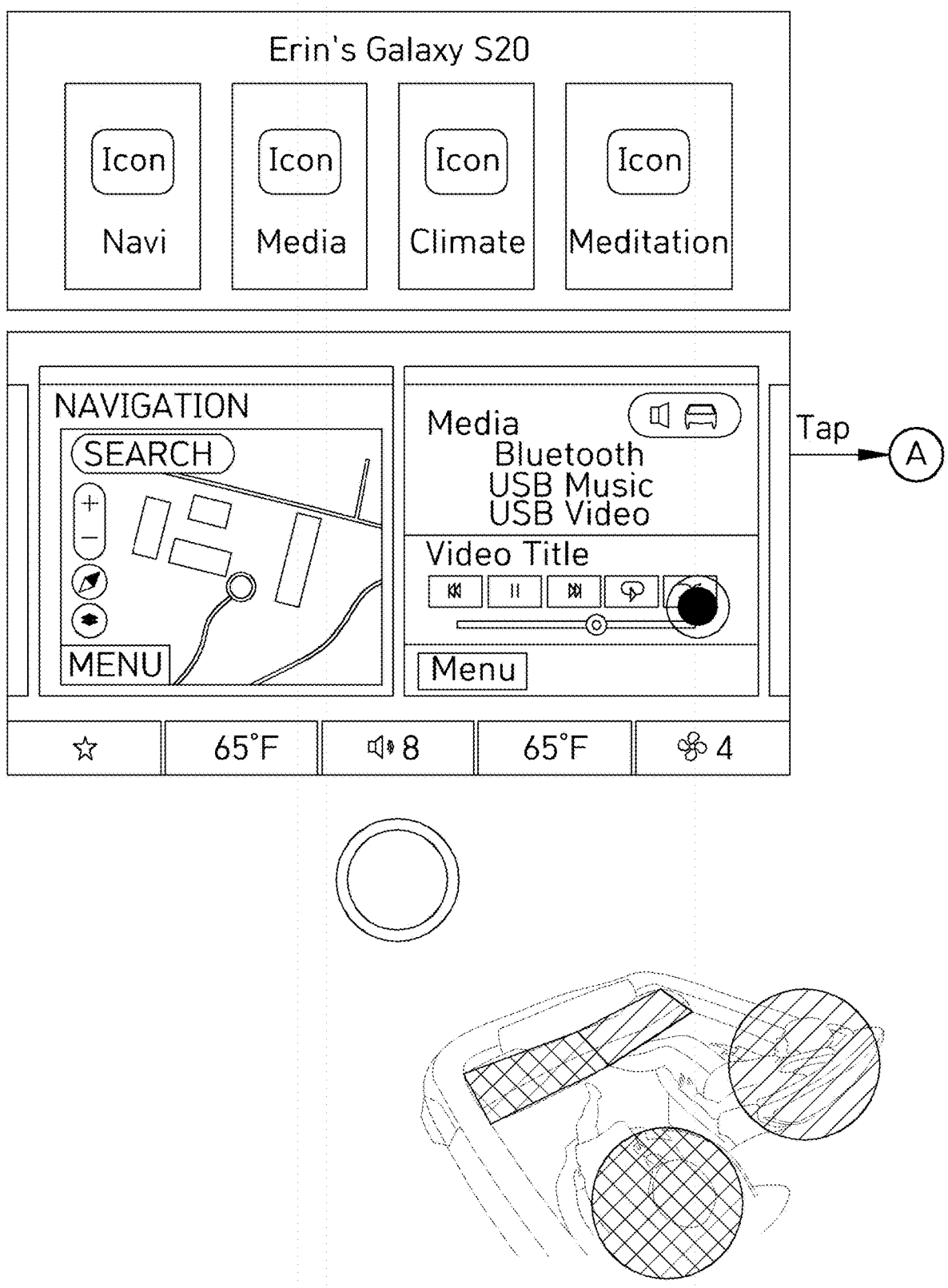
FIGS. 45A to 45C illustrate a simultaneous video reproduction process according to an embodiment of the present invention.
Figure 45B:
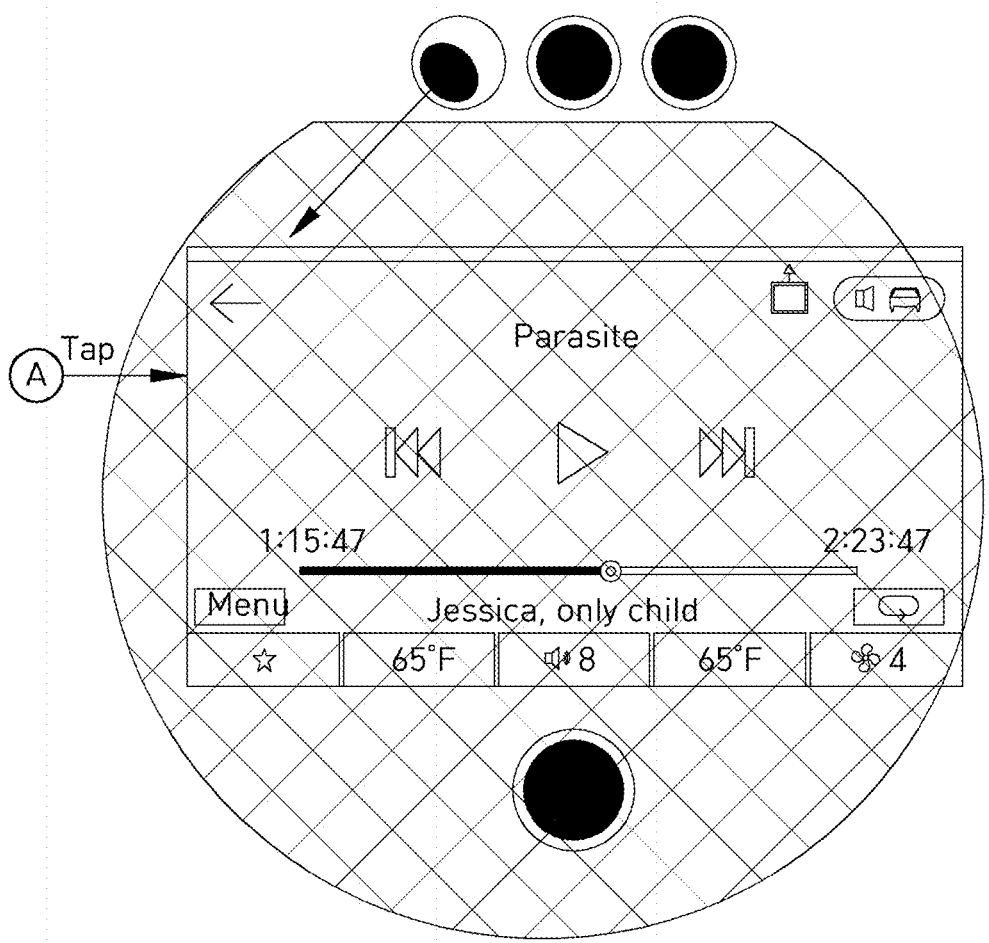
Figure 45C:
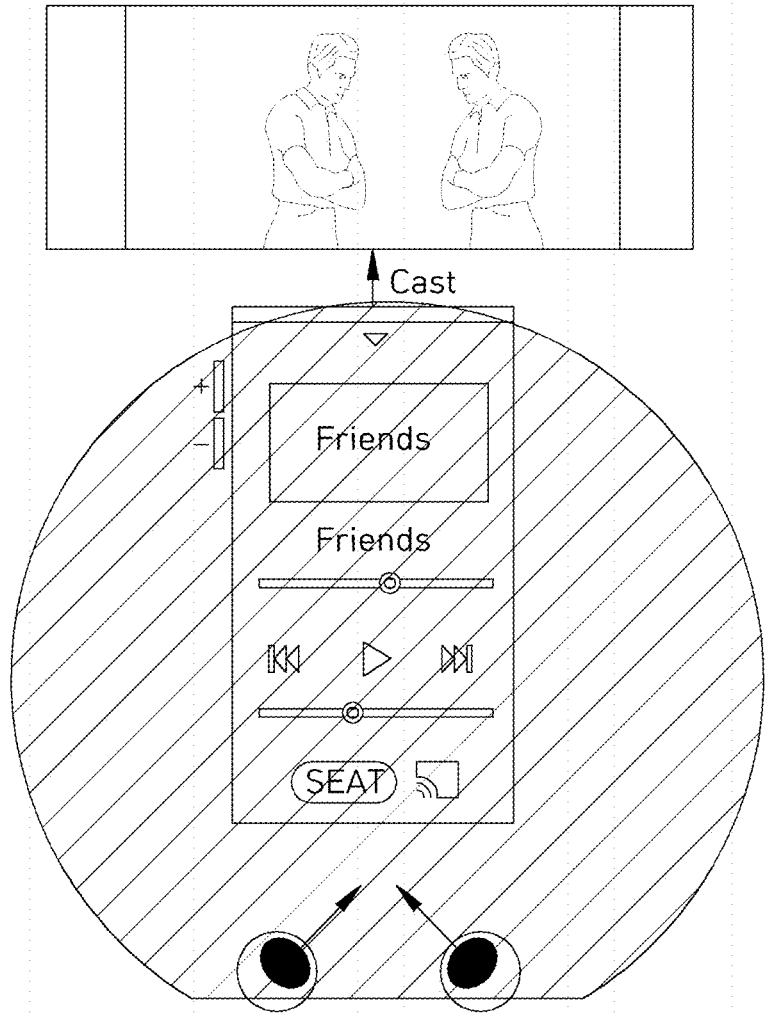

FIGS. 45A to 45C illustrate a simultaneous video reproduction process according to an embodiment of the present invention.

In the passenger mode, the upper display is linked to a passenger's mobile device, and navigation information and media information are displayed on the lower display.

When a full-screen mode button on the lower display is touched, the entire screen is reproduced on the lower display, and the upper display is linked to the passenger's mobile device to play back content selected on the passenger's mobile device.

In the passenger mode, a media sound source reproduced on the lower display is output through blooming sound (in-vehicle speaker), and a media sound source reproduced on the upper display is output through the headrest speaker.

In the passenger mode, each speaker forms a sound bubble to prevent sound sources provided to the driver and the passenger from interfering each other.

According to the related art, there is a limitation in which a function of simply adjusting the color of ambient light in the vehicle is provided, but a function that allows a vehicle passenger to meditate is not provided.

In order to solve the above problem, the present invention is directed to providing an apparatus capable of providing a function that allows a vehicle passenger to meditate by controlling the multiple displays, the speaker, and a mood lamp in the vehicle.

Figure 46:
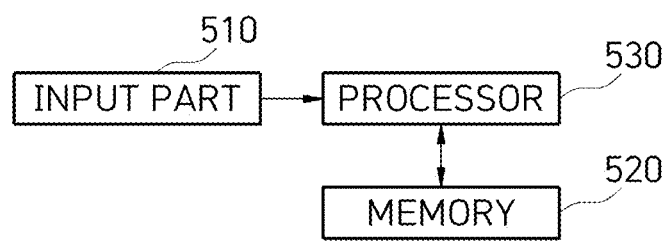
FIG. 46 illustrates a meditation function-providing apparatus using multiple displays according to an embodiment of the present invention.

FIG. 46 illustrates a meditation function-providing apparatus using multiple displays according to an embodiment of the present invention.

The meditation function-providing apparatus using multiple displays according to an embodiment of the present invention includes an input part 510 configured to receive a meditation function request signal, a memory 520 in which a program for providing a meditation function using multiple displays upon receiving the mediation function request signal is stored, and a processor 530 configured to execute the program. The processor 530 uses at least one of the lower display disposed in the cockpit and the upper display disposed above the lower display and provides the meditation function in conjunction with the speaker and the mood lamp.

In the driver mode, the processor 530 controls to turn off the lower display and to display a meditation app execution screen on the upper display.

When a knob is operated, the processor 530 controls to perform an event operation on the meditation app execution screen according to a knob operating direction.

In the passenger mode, the processor 530 controls to display the meditation app execution screen on the upper display.

The processor 530 controls to display a meditation multitasking screen on the upper display, and controls to display a media thumbnail screen when an app drawer button is touched and the meditation app is selected.

The processor 530 controls the sound source, which is linked with the meditation app displayed on the upper display, to be output through the passenger headrest speaker, and controls a sound source of media, whose execution screen is displayed on the lower display, to be output through the in-vehicle speaker.

The processor 530 controls the headrest speaker and the in-vehicle speaker to form sound bubbles.

Figure 47:
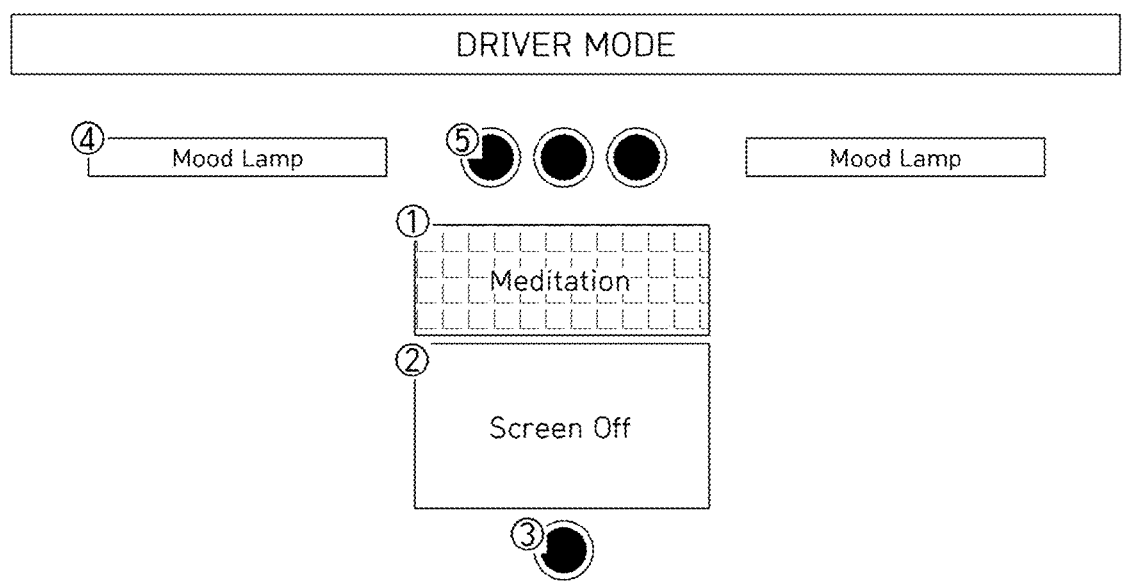
FIG. 47 illustrates a meditation execution screen in a driver mode according to an embodiment of the present invention.

FIG. 47 illustrates a meditation execution screen in the driver mode according to an embodiment of the present invention.

According to an embodiment of the present invention, a meditation app execution screen is displayed on the upper display, the lower display is turned off, and a knob display is also turned off.

The mood lamp and the blooming speaker are linked to the meditation app so that the color and sound thereof are set.

The configuration and definition in the execution screen shown in FIG. 47 are as described in Table 18 below.

TABLE 18

| No. | Component | Description |
| --- | --- | --- |
| 1 | 12.3" Display | Execute meditation app |
| 2 | 13.2" Display | Screen Off |
| 3 | Knob display | Screen Off |
| 4 | Mood Lamp | Changing color and dimming of lamp in conjunction with screen |
| 5 | Blooming Speaker | Reproduce meditation app sound |

Figure 48:
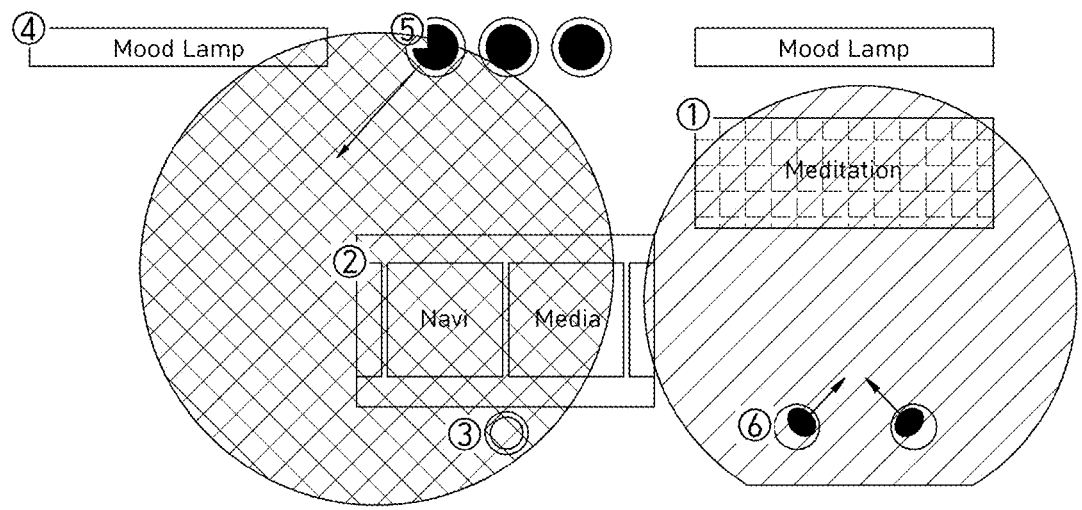
FIG. 48 illustrates a meditation execution screen in a passenger mode according to an embodiment of the present invention.
Figure 49B:
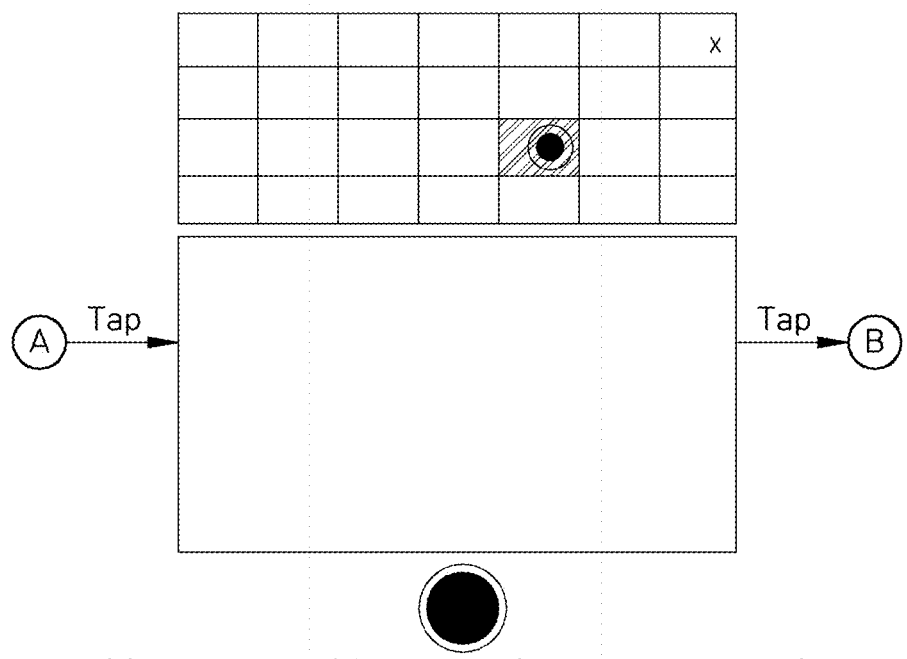
Figure 49D:
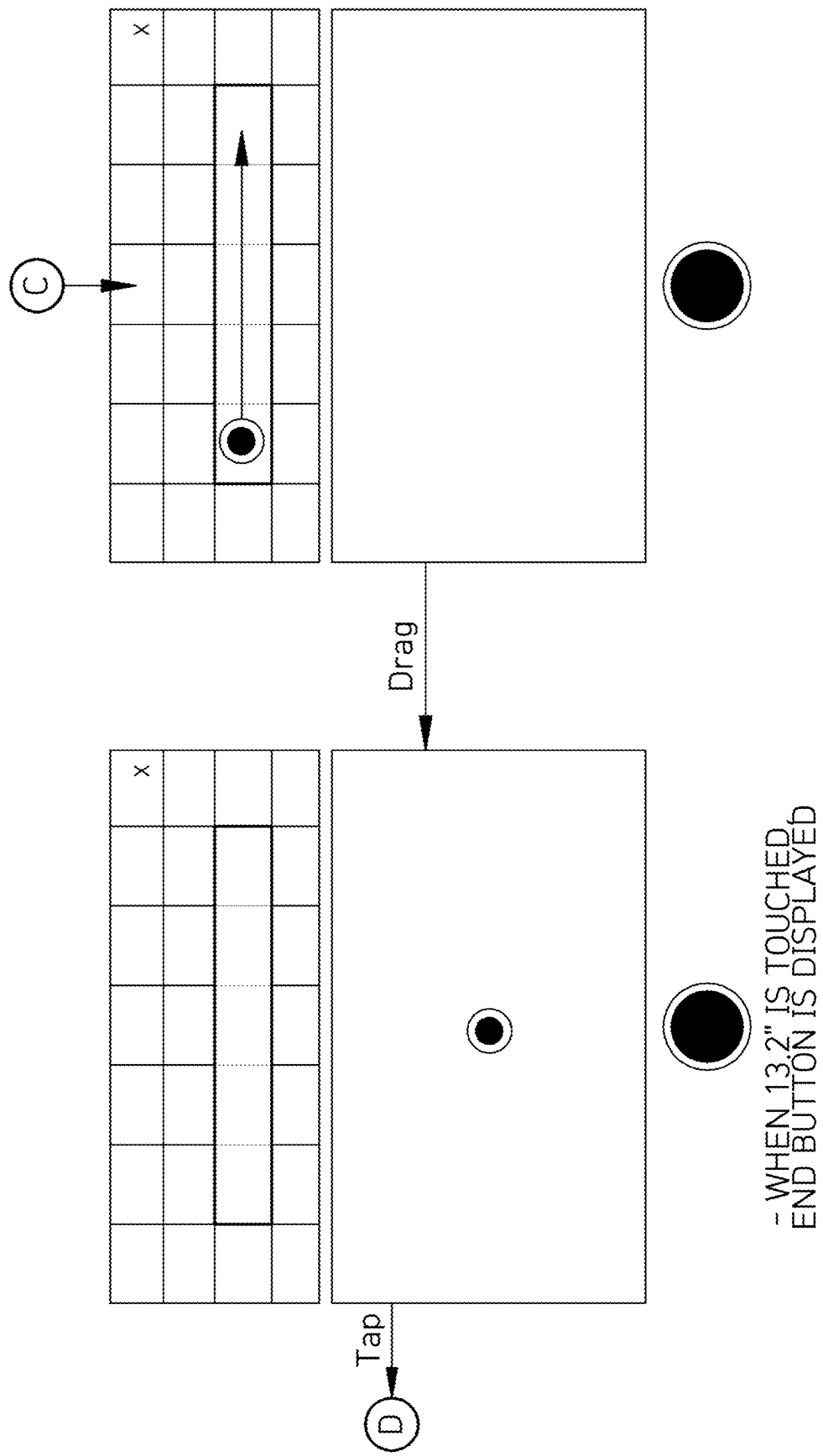

FIG. 48 illustrates a meditation execution screen in the passenger mode according to an embodiment of the present invention.

In the passenger mode, the meditation app is executed on the upper display, and the lower display displays navigation information, media information, or the like as a normal screen operation, and a normal operation is performed on the knob display.

The blooming speaker reproduces a sound source of content displayed through the lower display, and a passenger seat headrest speaker reproduces a meditation app sound.

The configuration and definition in the execution screen shown in FIG. 48 are as described in Table 19 below.

TABLE 19

| No. | Component | Description |
| --- | --- | --- |
| 1 | 12.3" Display | Execute meditation app |
| 2 | 13.2" Display | Normal screen operation |
| 3 | Knob display | Normal operation |
| 4 | Mood Lamp | Changing color and dimming of lamp in conjunction with screen |
| 5 | Blooming Speaker | Reproduce 13.2" content |
| 6 | Headrest Speaker | Reproduce meditation app sound |

FIGS. 49A to 49D illustrate a meditation function-providing process according to an embodiment of the present invention.

It is assumed that the default screen is displayed on the upper display and the meditation function is selected on the lower display.

As the meditation app is executed, sound and mood lamps for each image are linked to the application, and when the knob is operated, an event operation for a touch/drag operation is performed according to a knob operating direction in a random area.

When a touch signal is applied to the lower display screen, an end button is displayed, and when the end button is touched, the default screen is displayed on the upper display, and previously executed widgets are displayed on the lower display.

Figure 50:
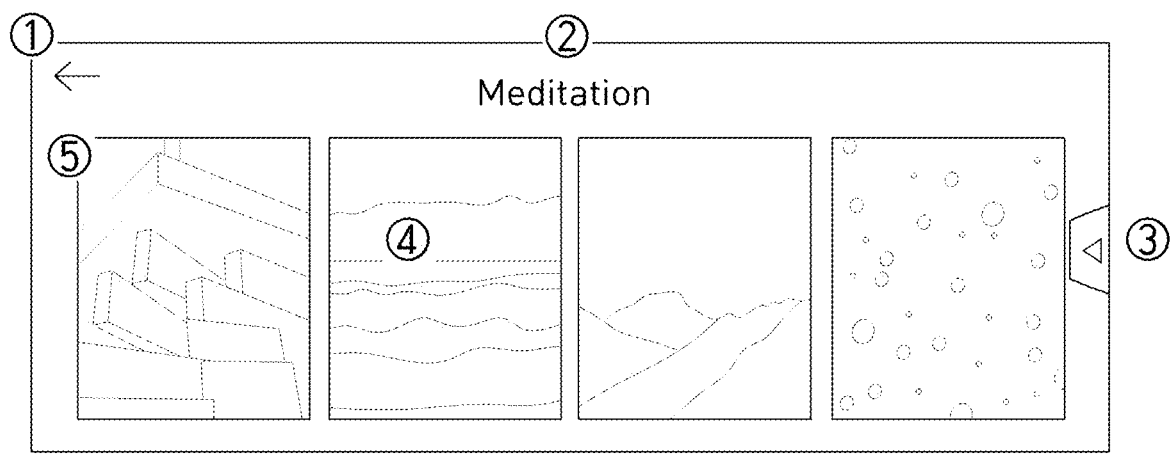
FIG. 50 illustrates a passenger mode meditation screen according to an embodiment of the present invention.

FIG. 50 illustrates a meditation screen in the passenger mode according to an embodiment of the present invention.

In the passenger mode, the meditation screen displayed on the upper display displays a button for returning to the previous screen when touched, an area in which a title is displayed, an app drawer button, a meditation thumbnail button, and a meditation icon.

The configuration and definition in the screen shown in FIG. 50 are as described in Table 20 below.

TABLE 20

| No. | Component | Description |
| --- | --- | --- |
| 1 | Back button | When touched, return to previous screen |
| 2 | Title | Display text |
| 3 | App drawer button | App drawer open/close button |
| 4 | Meditation thumbnail button | When touched, execute entire meditation screen |
| 5 | Meditation icon | In case of interactive meditation content, display icon |

Figure 51:
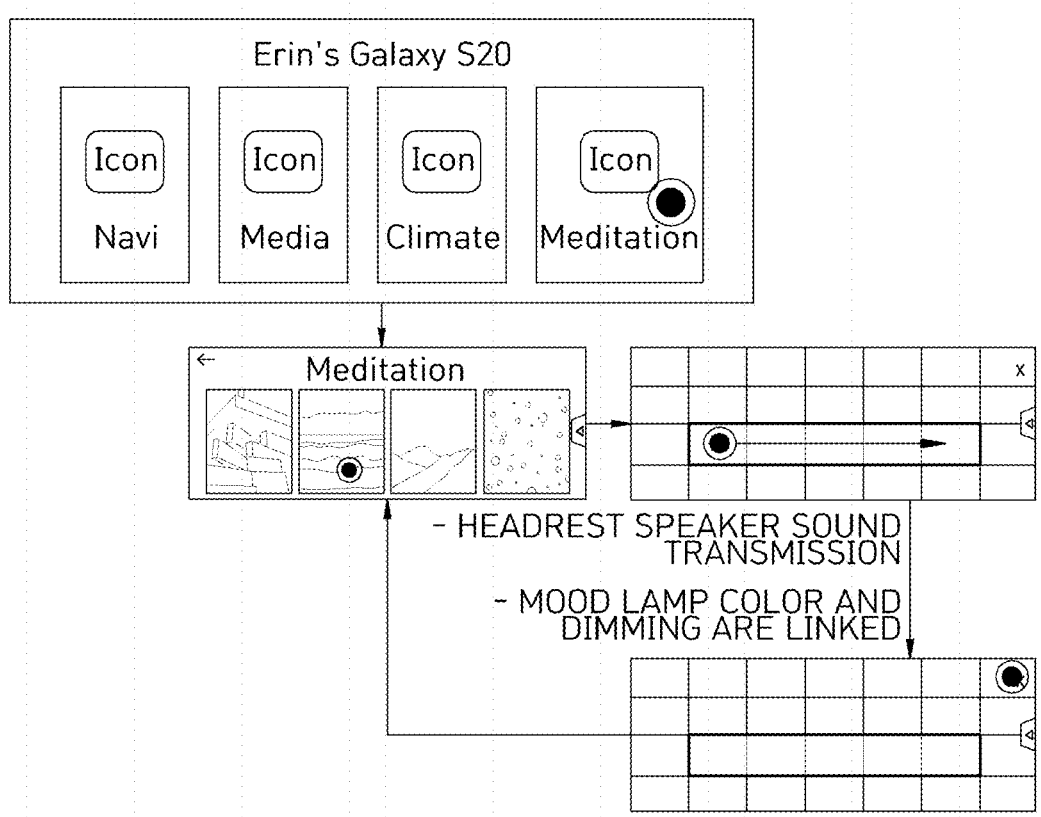
FIG. 51 illustrates a meditation function-providing process in the passenger mode according to an embodiment of the present invention.

FIG. 51 illustrates a meditation function-providing process in the passenger mode according to an embodiment of the present invention.

In the passenger mode, the upper display displays information about a linked passenger mobile device.

When the meditation app is executed, the meditation screen shown in FIG. 50 is displayed.

As the meditation app is executed, the headrest speaker and the mood lamp of the passenger seat are linked with the execution of the app so that a sound source and a mood light thereof are set.

Figure 52:
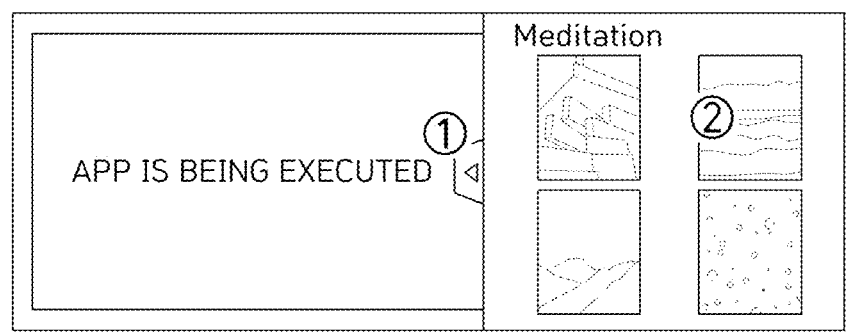
FIG. 52 illustrates a passenger mode meditation multi-tasking screen according to an embodiment of the present invention.

FIG. 52 illustrates a meditation multi-tasking screen in the passenger mode according to an embodiment of the present invention.

In the meditation multi-tasking screen in the passenger mode, an app drawer button provides an app drawer open/close button.

When a meditation thumbnail button is touched, an entire meditation screen is executed.

Figure 53A:
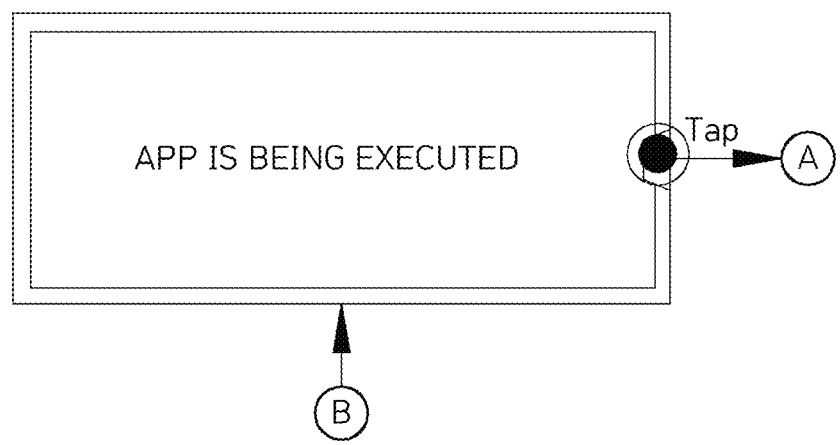
FIGS. 53A and 53B illustrate a meditation function-providing process in the passenger mode according to an embodiment of the present invention.
Figure 53B:
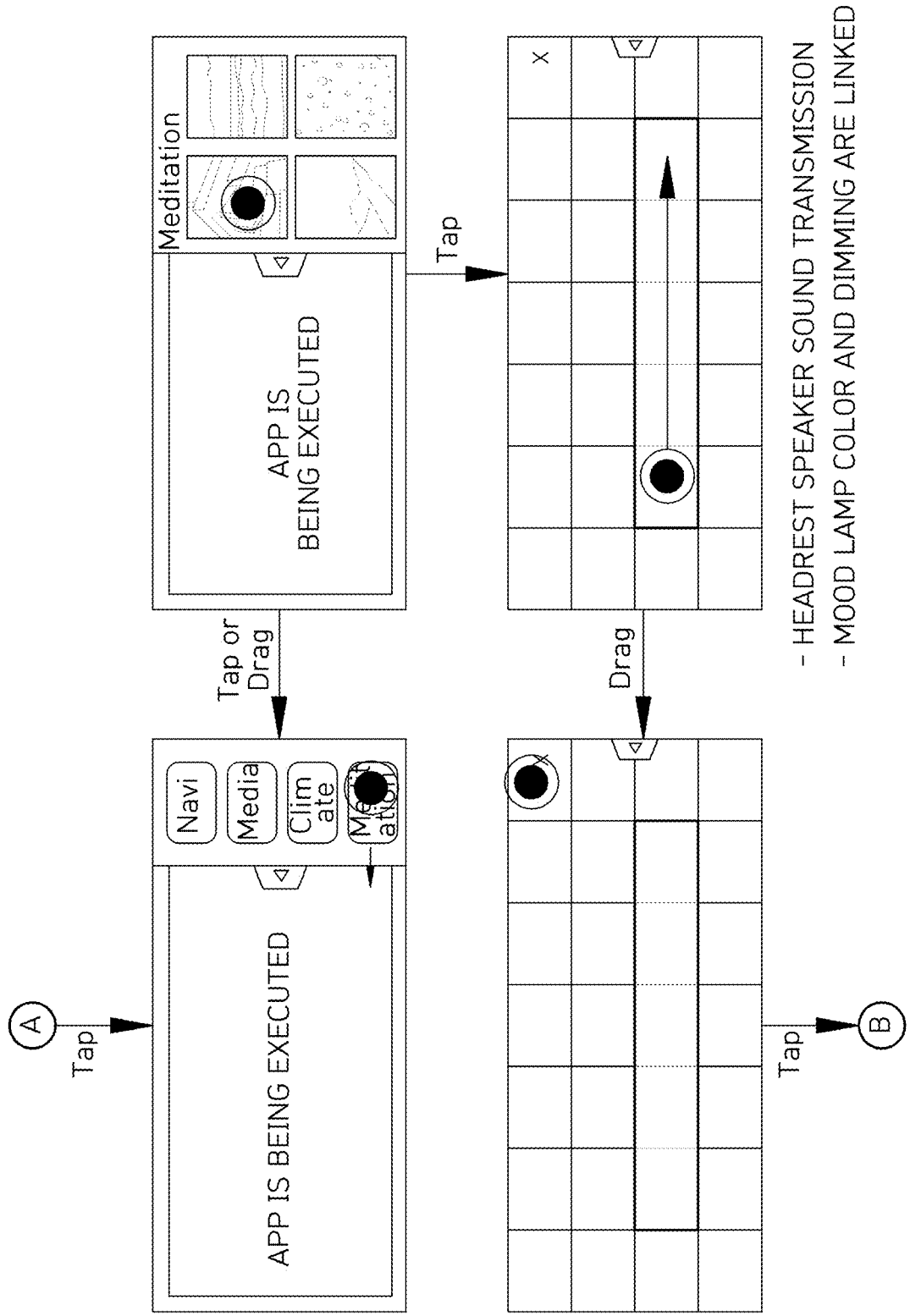

FIGS. 53A and 53B illustrate a meditation function-providing process in the passenger mode according to an embodiment of the present invention.

When the app is being executed on the upper display in the passenger mode, apps such as a navigation app, a media app, a meditation app, and the like are displayed according to a touch on the app drawer button, a meditation function is provided according to the execution of the meditation app and the touch on the meditation thumbnail button, and in conjunction with the meditation app, a sound source is reproduced by the passenger seat headrest speaker and the mood lamp is set.

Figure 54A:
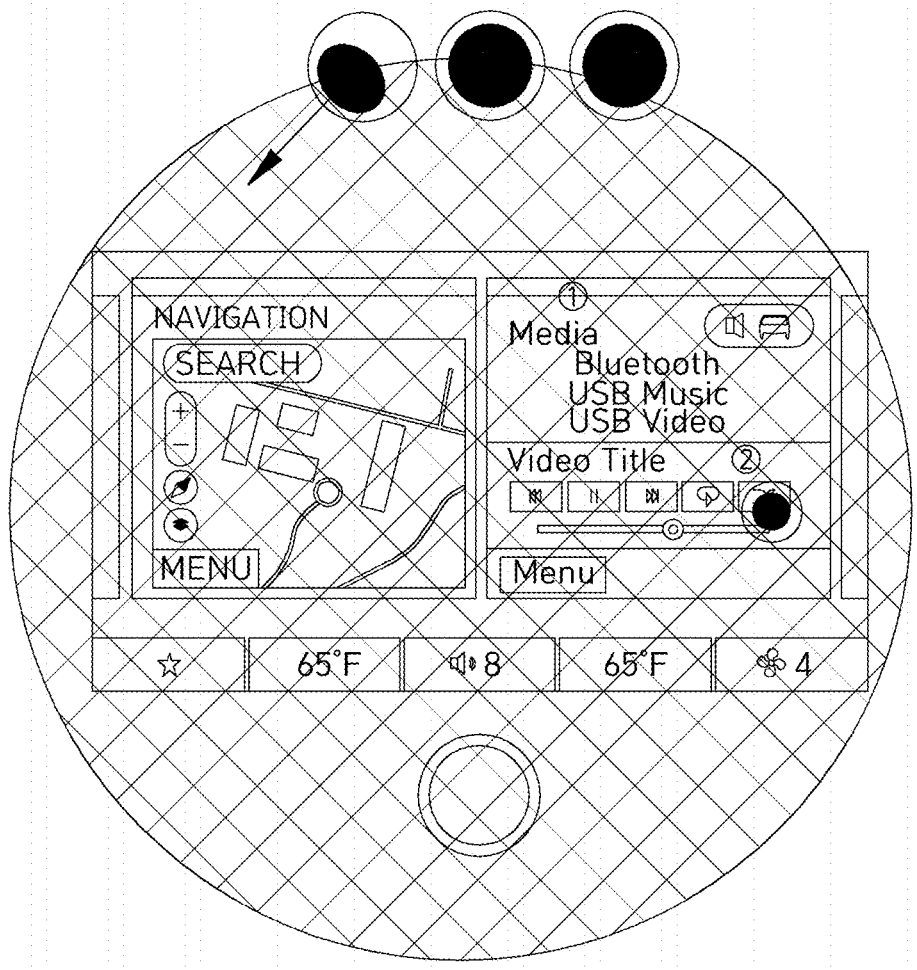
FIGS. 54A to 54C illustrate sound bubble formation when a passenger mode meditation function is provided, according to an embodiment of the present invention.
Figure 54B:
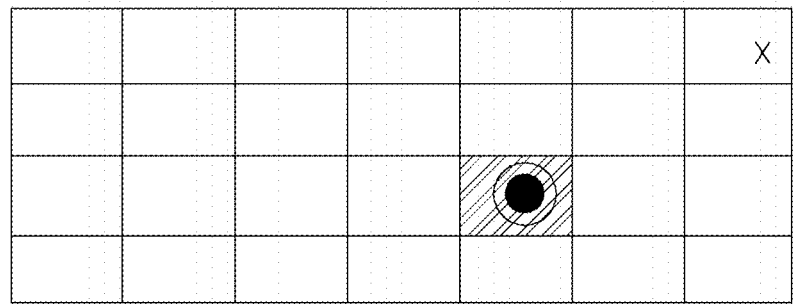
Figure 54B:
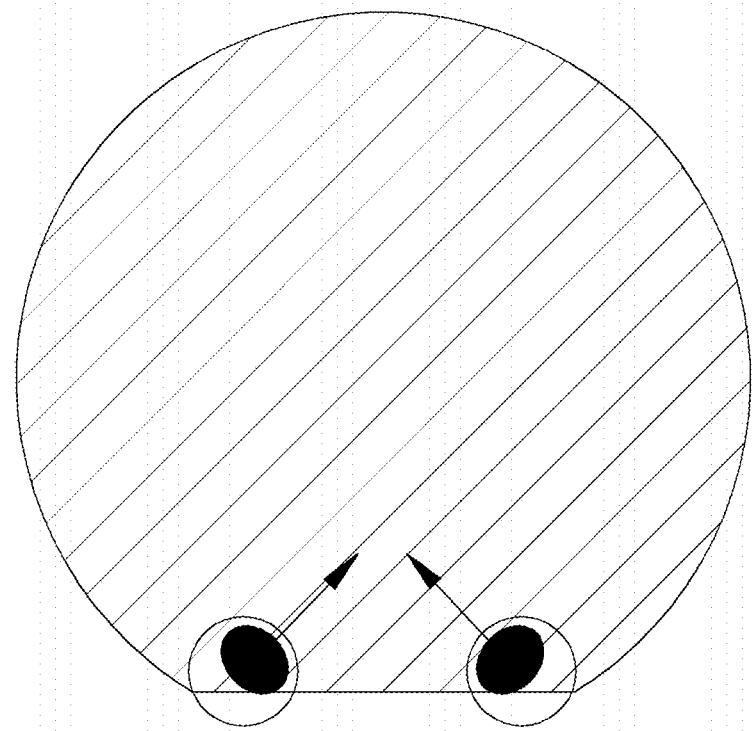
Figure 54C:
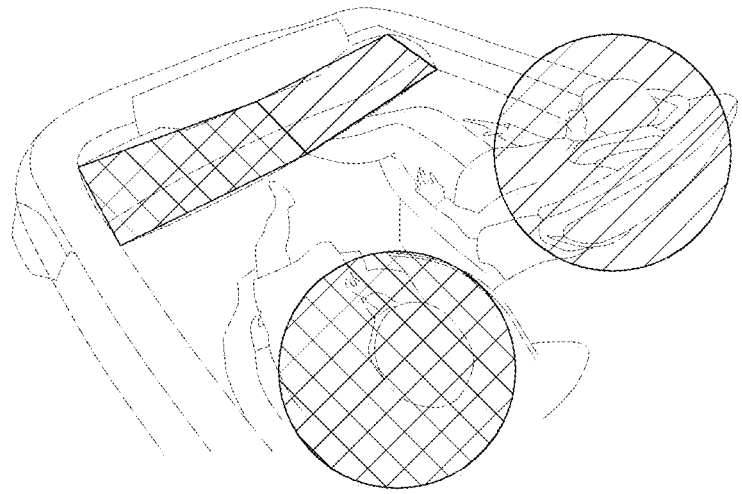

FIGS. 54A to 54C illustrate sound bubble formation when the mediation function is provided in the passenger mode according to an embodiment of the present invention.

According to an embodiment of the present invention, when the upper display is linked with the mobile device of the passenger in the passenger mode to display the meditation app execution screen, the passenger seat headrest speaker outputs a sound source according to the execution of the meditation app.

The media sound source reproduced on the lower display is output through the blooming speaker.

In the passenger mode, the headrest speaker and the blooming speaker form sound bubbles to prevent sound sources provided to the driver and the passenger from interfering with each other.

According to the related art, there has been proposed a technique of connecting an in-vehicle system and a mobile device so that media reproduced in the mobile device may be viewed through the in-vehicle system. As an in-vehicle display is provided in various aspects, there is a need for a technique related to media cast between an in-vehicle infotainment (IVI) system and the mobile device.

In order to achieve the above object, the present invention is directed to providing a control apparatus for media cast between a mobile device and an IVI system capable of continuously reproducing media running on the mobile device, in the IVI system, selecting the in-vehicle speaker or the headrest speaker as an output device, and preventing sound source interference between the in-vehicle speaker and the passenger headrest speaker.

Figure 55:
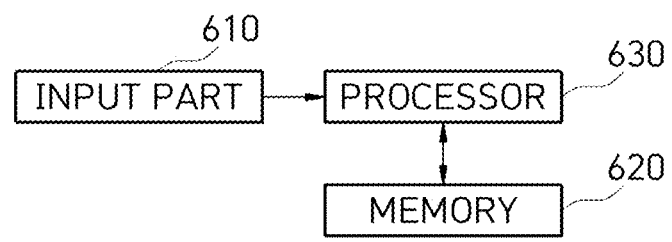
FIG. 55 illustrates a control apparatus for media cast between a mobile device and an in-vehicle infotainment (IVI) system according to an embodiment of the present invention.

FIG. 55 illustrates a control apparatus for media cast between a mobile device and an IVI system according to an embodiment of the present invention.

The control device for media cast between an IVI system and a mobile device according to the present invention includes an input part 610 configured to receive a cast request from the mobile device, a memory 620 in which a program for reproducing content of the mobile device on the in-vehicle display according to the cast request is stored, and a processor 630 configured to execute the program. The processor 630 controls to provide a cast service using the upper display disposed above the lower display disposed in the cockpit.

When the mobile device is linked with the upper display according to the cast request, the processor 630 controls the reproduction of content in response to a signal input through a controller screen displayed on the mobile device.

The processor 630 controls a sound path to be set as the in-vehicle speaker or the headrest speaker according to an input on a sound path setting button.

The processor 630 controls to display the sound path setting button when the cast is successful.

When the cast is ended, the processor 630 controls to display a screen previous to the cast on the upper display.

When the mode is the passenger mode and a passenger screen app is being executed on the upper display, the processor 630 controls the corresponding content to be directly executed on the upper display according to the cast request.

Figure 56:
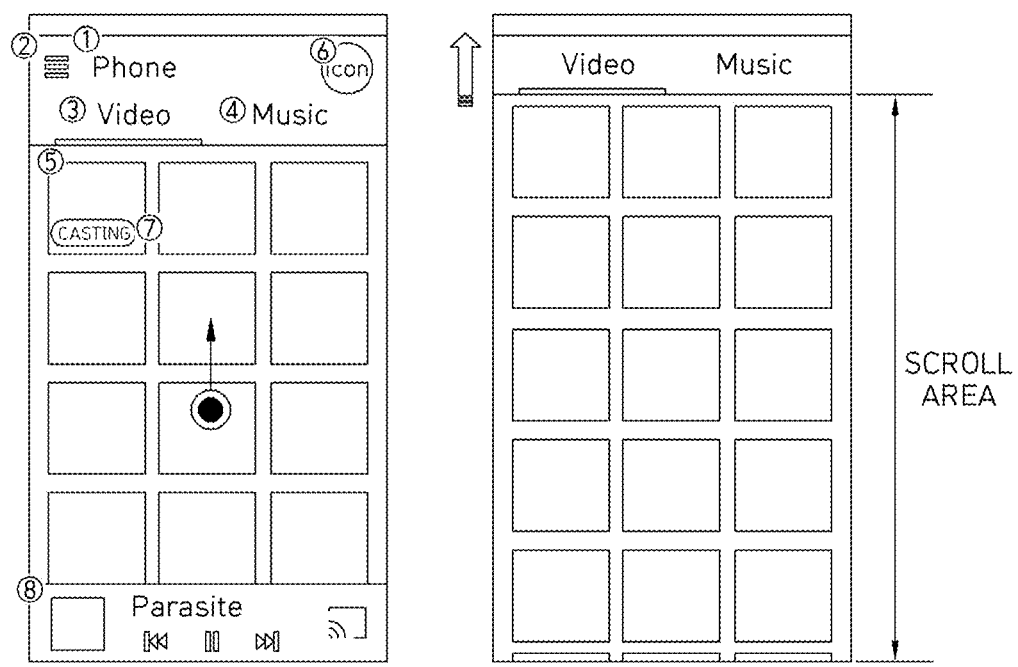
FIG. 56 illustrates a smartphone app home screen according to an embodiment of the present invention.

FIG. 56 illustrates a smartphone app home screen according to an embodiment of the present invention.

A smartphone app screen according to an embodiment of the present invention includes a title area, a menu button, a video tab, a music tab, a thumbnail, a motion-sickness reduction operation button, a casting flag, and a mini player.

When the motion-sickness reduction operation button is touched, visual, auditory, tactile feedback operations are performed to reduce motion sickness.

The configuration and definition of the smartphone app screen is as summarized in Table 21 below.

TABLE 21

| No. | Component | Description |
| --- | --- | --- |
| 1 | Title area | Display current selected media position<br>Phone: display media in terminal<br>Vehicle: display media in vehicle |
| 2 | Menu button | When selected, extend menu bar |
| 3 | Video tab | List of video files in app |
| 4 | Music tab | List of sound source files in app |
| 5 | Thumbnail | Media thumbnail file |
| 6 | Motion-sickness reduction operation button | When button is touched, visual, auditory, and tactile feedback operations for reducing motion sickness |
| 7 | Casting Flag | Display flag of content being cast |
| 8 | Mini Player | Display mini player when there is content being cast |

TABLE 21-continued

| No. | Component | Description |
| --- | --- | --- |
| | | Same specification in video/music<br>Fix bottom<br>Thumbnail<br>File name<br>Previous/Next/Play/Pause<br>Cast button: when touched, execute in app after cast end |

Figure 57:
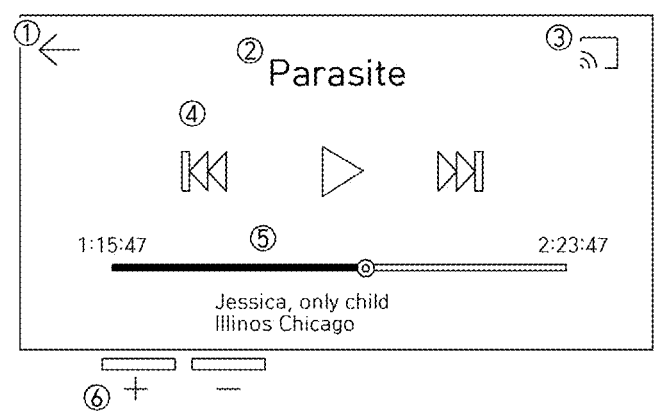
FIG. 57 illustrates a smartphone app video player screen according to an embodiment of the present invention.

FIG. 57 illustrates a smartphone app video player screen according to an embodiment of the present invention.

The smartphone app video player screen includes a button for returning to a previous screen when touched, a video title, a cast button, a control button, and a progress bar, and when a hardware volume button of the mobile device is operated, the volume of content being reproduced is adjusted.

When the cast button is touched, the content is displayed on the upper display through the cast function.

The configuration and definition of the smartphone app video player screen are as summarized in Table 22 below.

TABLE 22

| No. | Component | Description |
| --- | --- | --- |
| 1 | Back button | When touched, return to previous screen |
| 2 | Title | Display video title |
| 3 | Cast button | When button is touched, 12.3" cast function on/off toggle operation |
| 4 | Control button | Previous/Play&Pause/Next |
| 5 | Progress bar | Current position<br>Reproduced time: H:MM:SS<br>Total time: H:MM:SS |
| 6 | H/W volume button | When hardware volume button of phone terminal is controlled, adjust volume of reproducing content |

Figure 58:
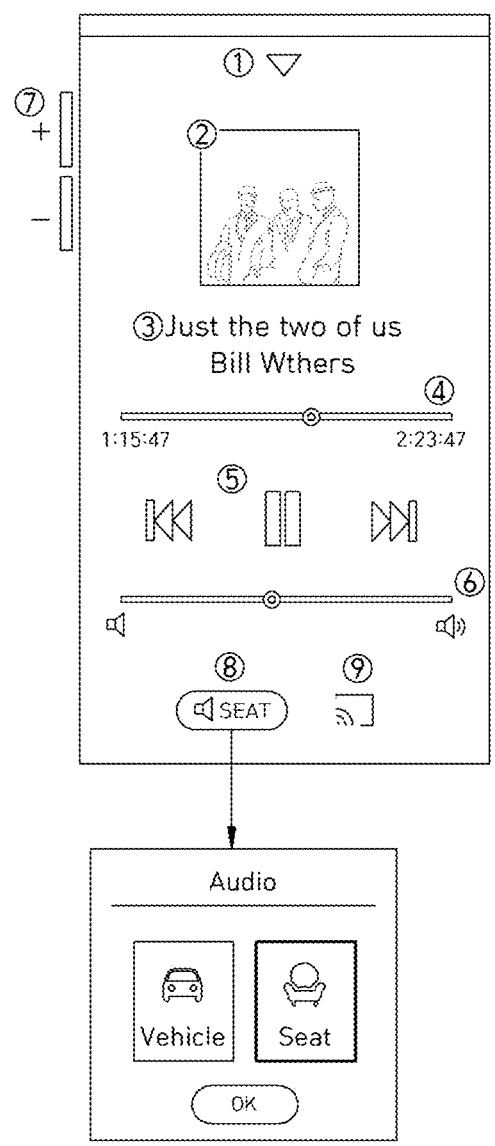
FIG. 58 illustrates a smartphone app music player screen according to an embodiment of the present invention.

FIG. 58 illustrates a smartphone app music player screen according to an embodiment of the present invention.

The smartphone app music player screen includes a minimization button for minimizing to a mini-player when touched, a sound source thumbnail image, content information, a progress bar, a control button, a volume control bar, a sound path setting button, and a cast button When the cast button is touched, the content is displayed on the upper display through the cast function.

In the sound path setting button, a current set sound path (the in-vehicle speaker or the headrest speaker) is displayed, and when the button is touched, a sound path change pop-up window is displayed, and when the cast is performed, the default sound path is a headrest speaker.

The configuration and definition of the smartphone app music player screen are as summarized in Table 23 below.

TABLE 23

| No. | Component | Description |
| --- | --- | --- |
| 1 | Minimization button | When button is touched, minimize to mini-player |
| 2 | Thumbnail image | Display sound source thumbnail image |
| 3 | Content information | $1^{st}$ line: Song title<br>$2^{nd}$ line: Artist name |
| 4 | Progress bar | Current position<br>Reproduced time: H:MM:SS<br>Total time: H:MM:SS |
| 5 | Control button | Previous/Play&Pause/Next |

TABLE 23-continued

| No. | Component | Description |
|---|---|---|
| 6 | Volume control bar | When handler is dragged leftward and rightward, set volume steps |
| 7 | H/W volume button | When hardware volume button of phone terminal is controlled, adjust volume of reproducing content |
| 8 | Sound path setting button | Display current set sound path (vehicle/seat) When button is touched, display sound path change pop-up During cast, default sound path is seat speaker |
| 9 | Cast button | When button is touched, 12.3" cast function on/off toggle operation |

Figure 59:
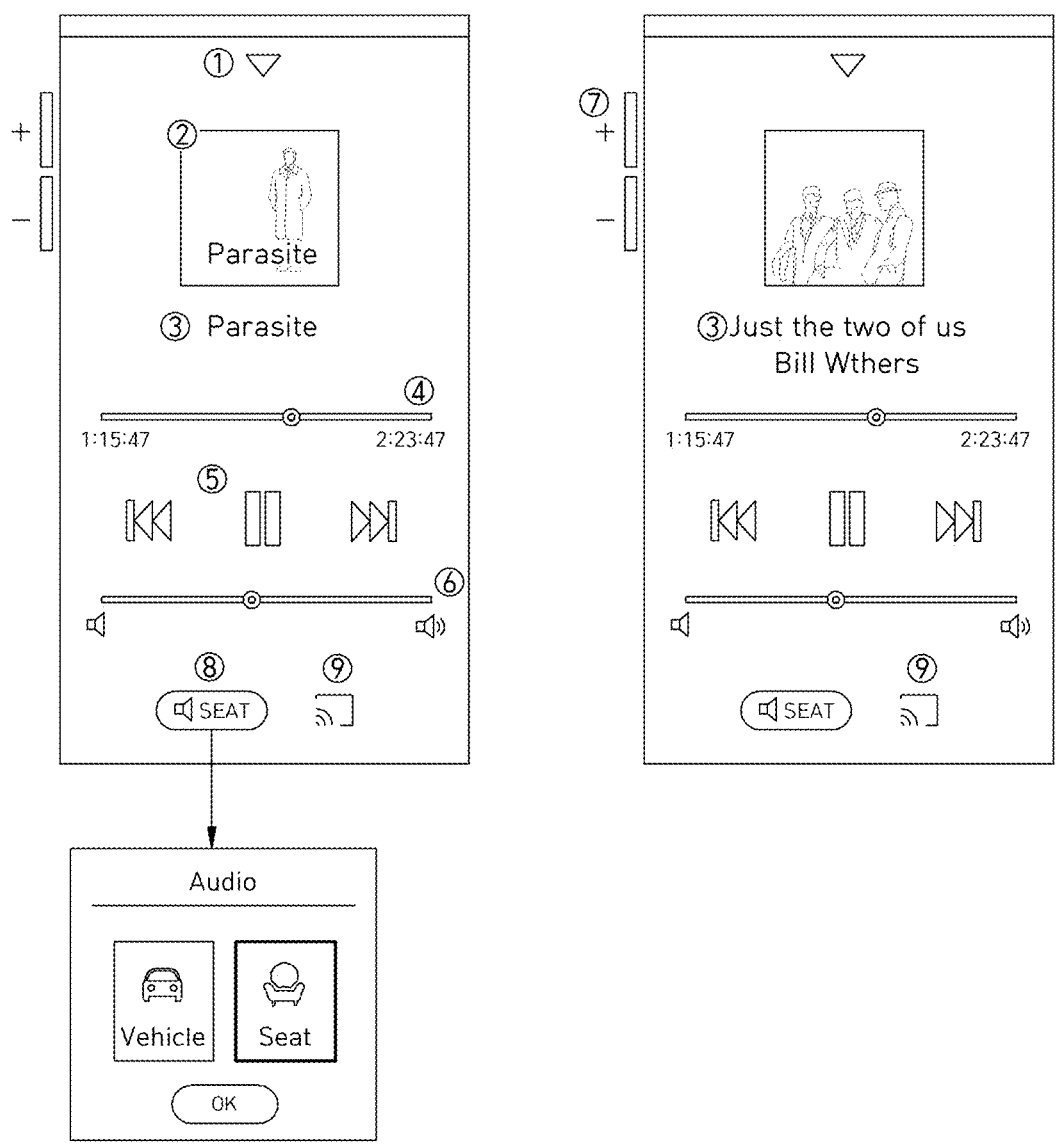
FIG. 59 illustrates a controller screen during smartphone app cast according to an embodiment of the present invention.

FIG. 59 illustrates a controller screen during smartphone app cast according to an embodiment of the present invention.

During the smartphone app cast, the controller screen includes a button for minimizing to a mini-player when touched, a sound video or source thumbnail image, content information, a progress bar, a control button, a volume control bar, a sound path setting button, and a cast button When the cast button is touched, the content is displayed on the upper display through the cast function.

In the sound path setting button, a current set sound path (the in-vehicle speaker or the headrest speaker) is displayed, and when the button is touched, a sound path change pop-up window is displayed, and when the cast is performed, the default sound path is the headrest speaker.

The configuration and definition of the controller screen during the smartphone app cast are as summarized in Table 24, below

TABLE 24

| No. | Component | Description |
|---|---|---|
| 1 | Minimization button | When button is touched, minimize to mini-player |
| 2 | Thumbnail image | Display video/sound source thumbnail image |
| 3 | Content information | Video: Video title Sound source $1^{st}$ line: Song title $2^{nd}$ line: Artist name |
| 4 | Progress bar | Current position Reproduced time: H:MM:SS Total time: H:MM:SS |
| 5 | Control button | Previous/Play&Pause/Next |
| 6 | Volume control bar | When handler is dragged leftward and rightward, set volume steps |
| 7 | H/W volume button | When hardware volume button of phone terminal is controlled, adjust volume of reproducing content |
| 8 | Sound path setting button | Display current set sound path (vehicle/seat) When button is touched, display sound path change pop-up During cast, default sound path is seat speaker |
| 9 | Cast button | When button is touched, 12.3" cast function on/off toggle operation |

Figure 60:
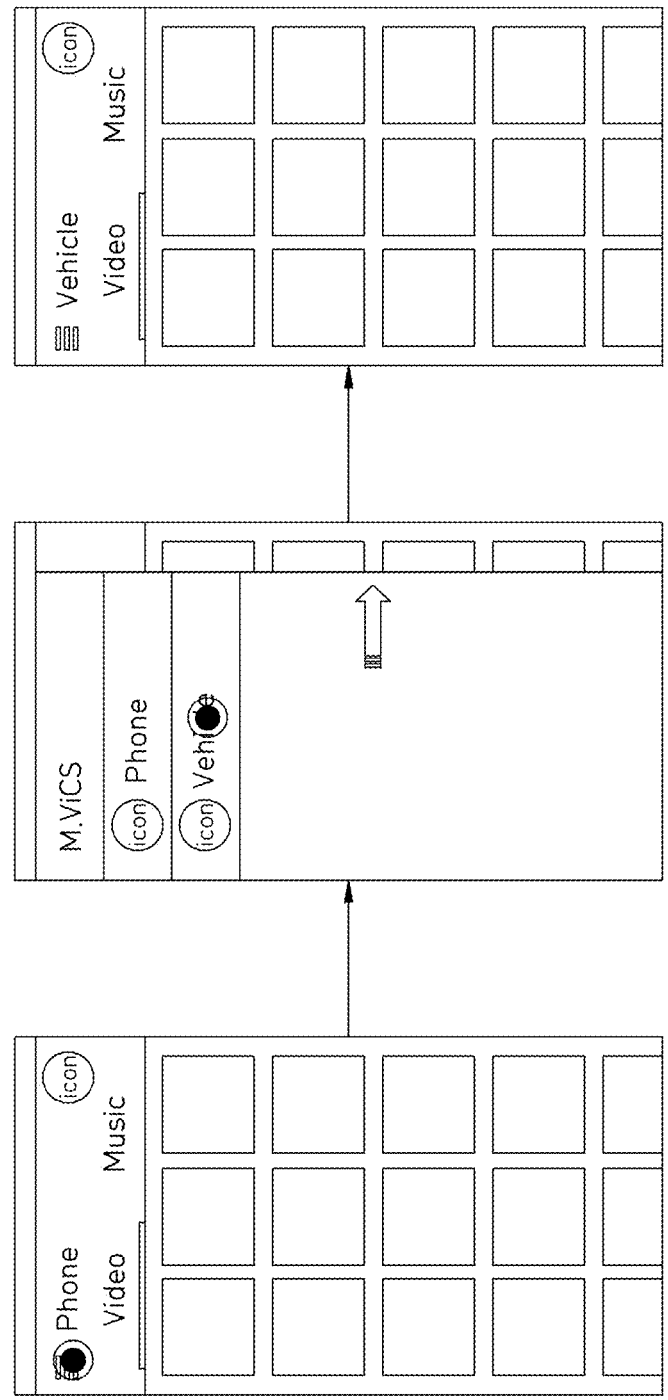
FIG. 60 illustrates a content position change according to an embodiment of the present invention.
Figure 61A:
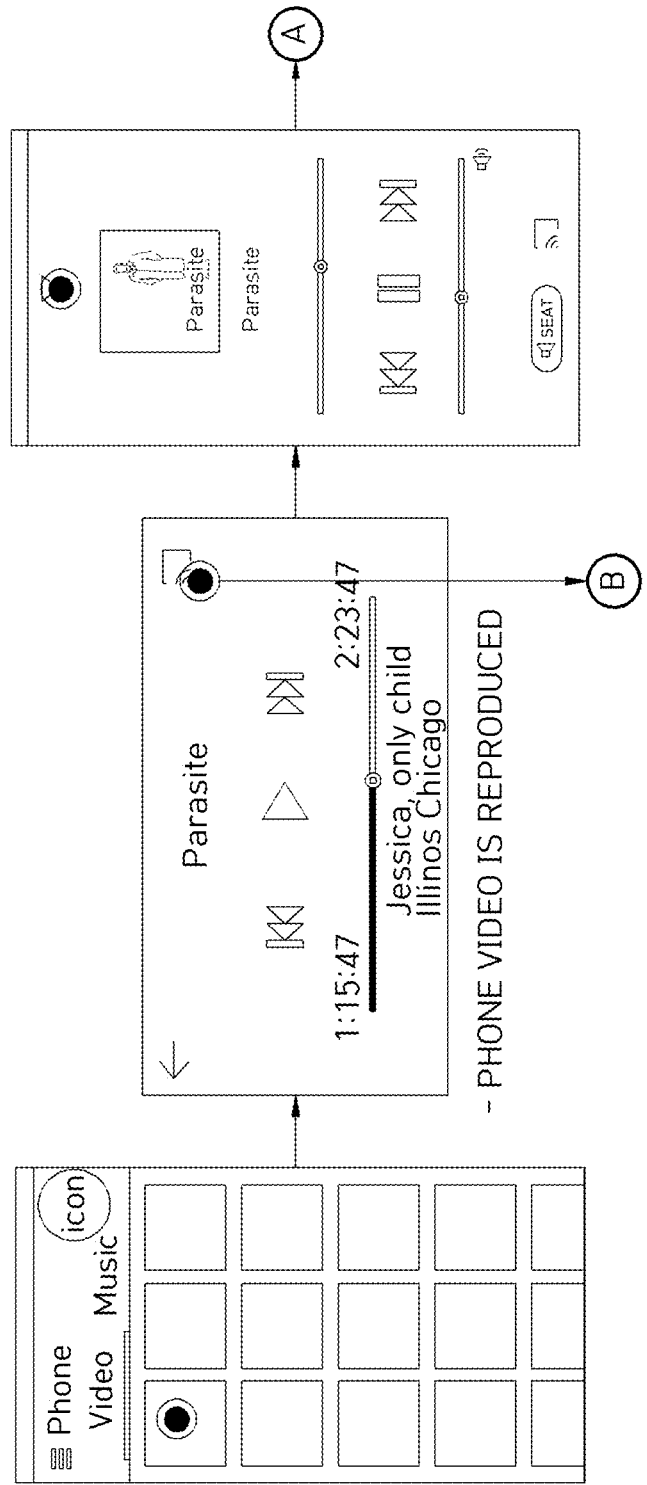
Figure 61C:
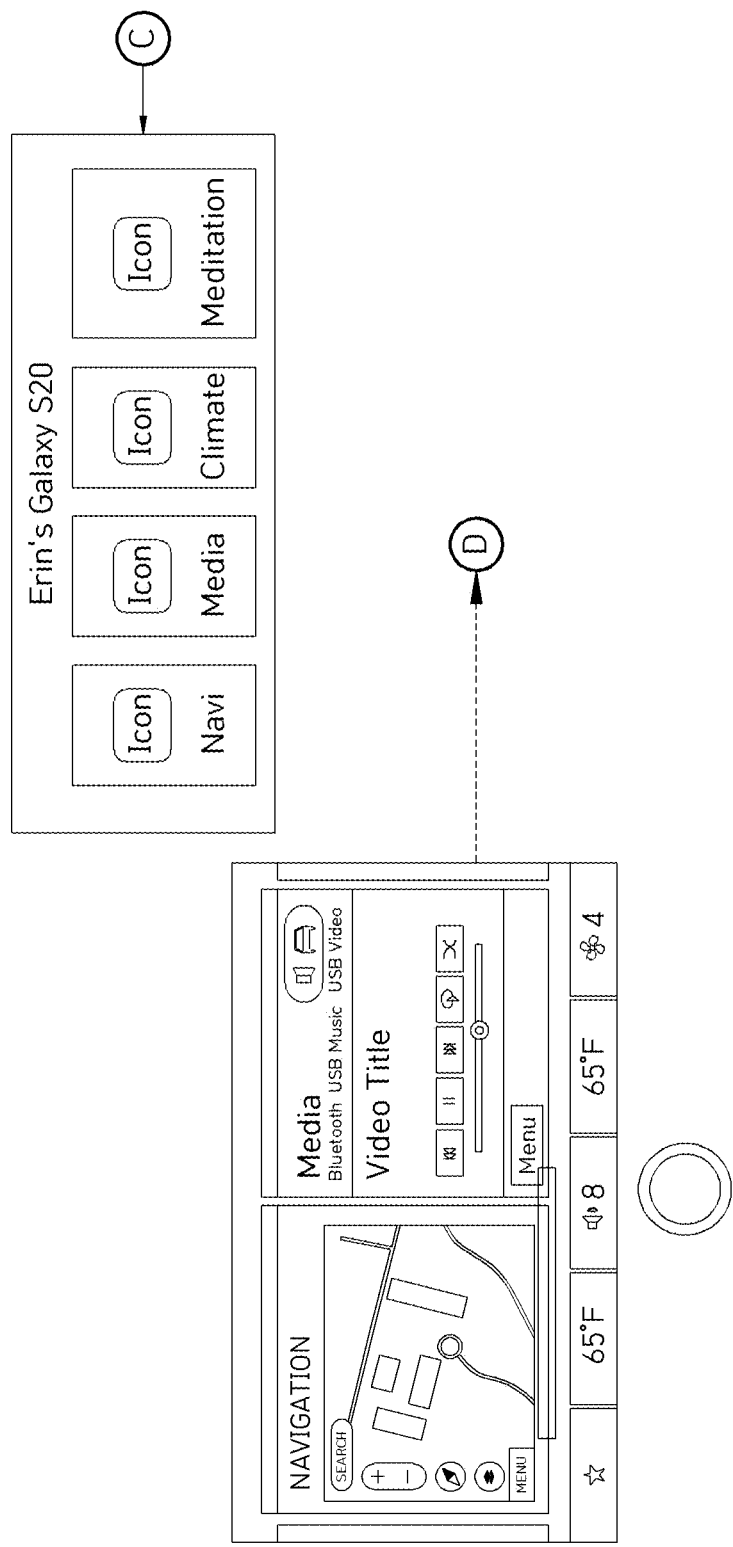
Figure 61D:
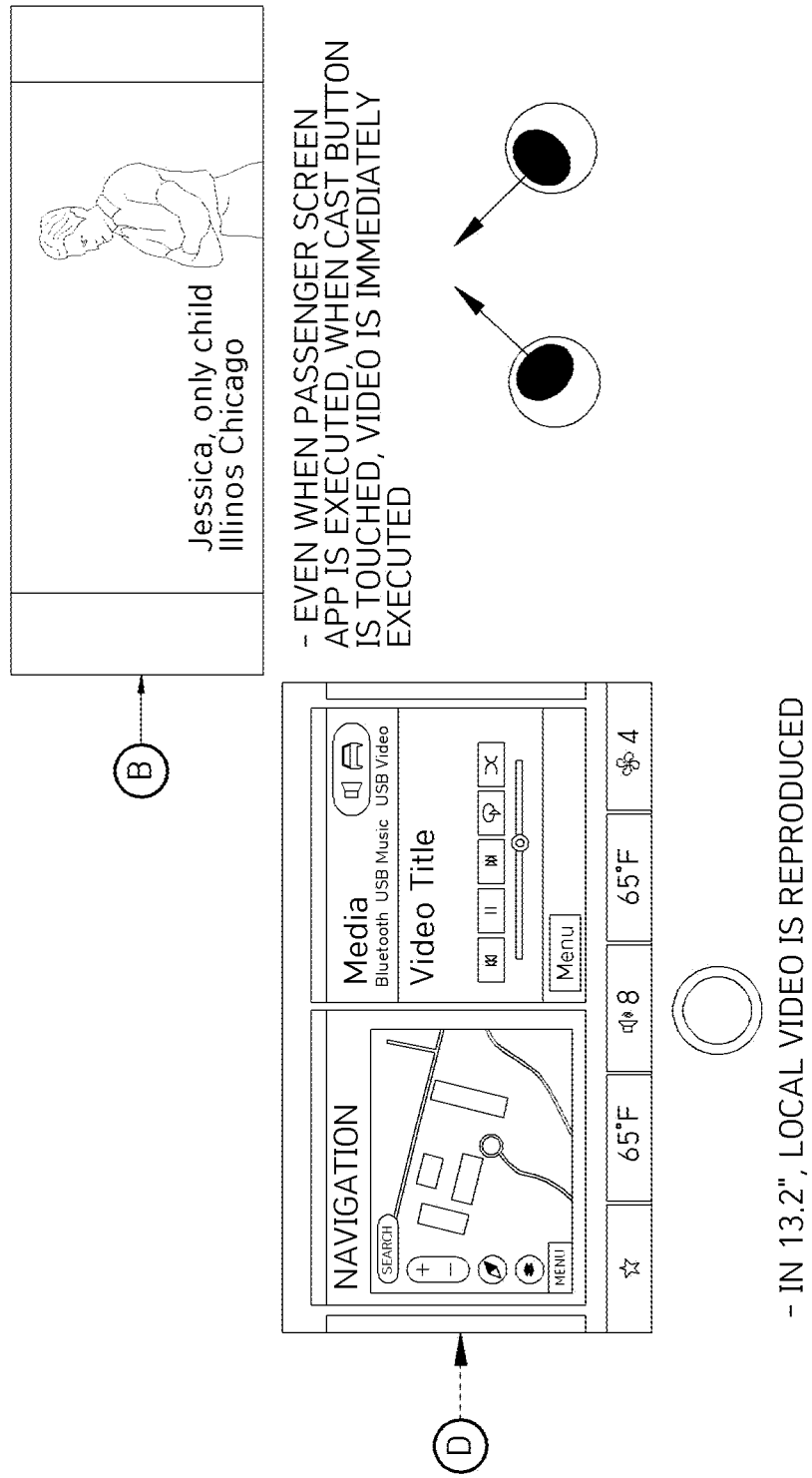

FIG. 60 illustrates a content position change according to an embodiment of the present invention.

As an upper left button is touched, a position for searching for content may be changed to the mobile device and the vehicle.

FIGS. 61A to 61D illustrate a video cast process according to an embodiment of the present invention.

A video selected in the mobile device is displayed on the upper display according to a cast request, and during the cast, a minimization button, a thumbnail image, content information, a progress bar, a control button, a volume control bar, a sound path setting button, and a cast button are displayed on the controller screen.

As the minimization button is touched, media thumbnail files are displayed on a video tab, and information about a currently reproducing video is displayed on a minimization screen.

When the cast button is touched again, the linkage is ended, and the screen displayed before the cast request is received is displayed again on the upper display.

At the end of the cast, the video is seamlessly reproduced on the mobile device. In the case of the passenger mode, as the cast is ended, the screen in the upper display is returned to a widget screen of the mobile device of the passenger.

A local video may be reproduced on the lower display, and when the cast button is touched, the video is immediately reproduced even when the passenger screen app is being executed in the passenger mode.

Figure 62A:
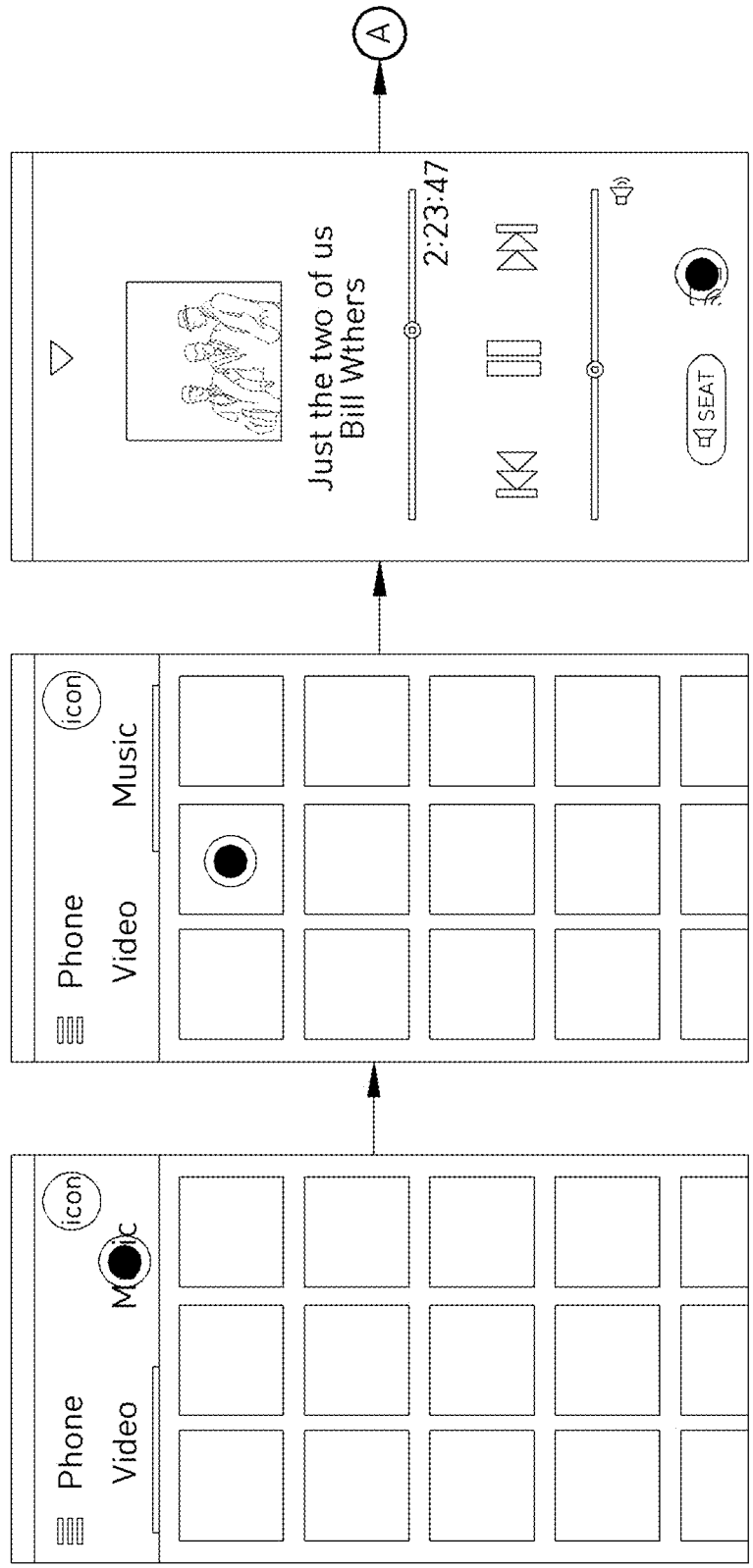
FIGS. 62A and 62B illustrate a music cast process according to an embodiment of the present invention.
Figure 62B:
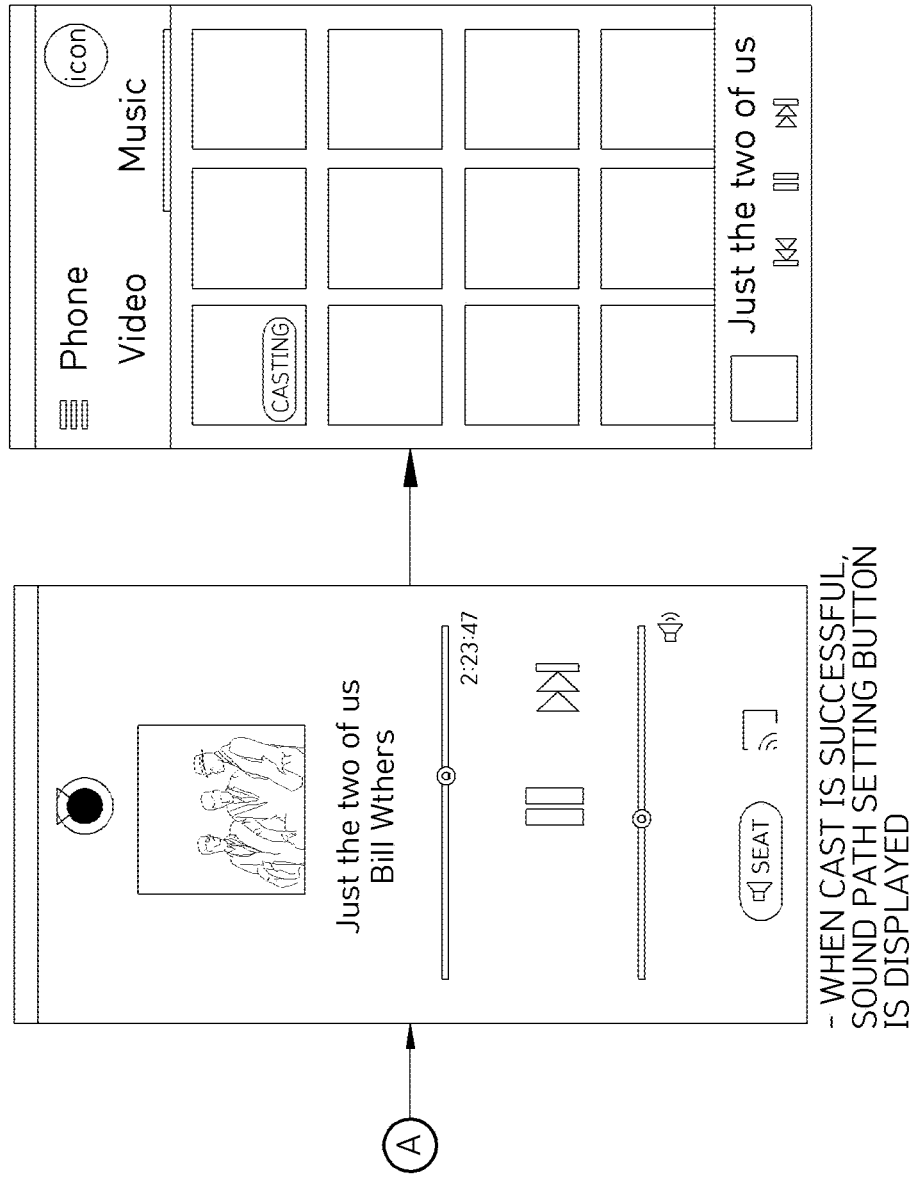

FIGS. 62A and 62B illustrate a music cast process according to an embodiment of the present invention.

As one moves to the music tab on the app home screen of the mobile device, when the media thumbnail is selected, the corresponding music is reproduced.

When the cast button is touched, the cast is performed on the upper display, the sound path setting button is displayed when the cast is successful.

As the minimization button is touched, the currently reproducing player screen is changed to the minimization screen and displayed, and the app home screen is displayed.

According to the related art, a driver state is monitored to provide warnings, but there is a limitation in that criteria for providing the warnings are not subdivided, and there is a problem in that the warnings are limited to being provided only to the driver.

In order to solve the above problems, the present invention is directed to providing an apparatus for providing a stepwise warning according to a driver state capable of determining whether to provide a warning by subdividing criteria for providing warnings according to the driver state, and notifying a passenger of an inattentive state of a driver.

Figure 63:
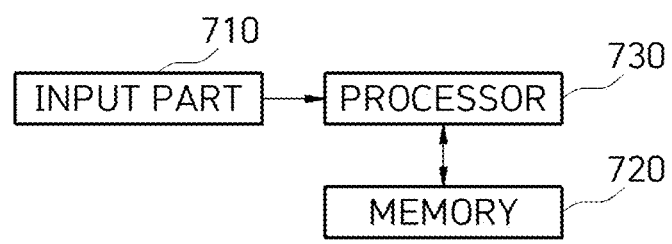
FIG. 63 illustrates an apparatus for providing a stepwise warning according to a driver state according to an embodiment of the present invention.

FIG. 63 illustrates an apparatus for providing a stepwise warning according to a driver state according to an embodiment of the present invention.

The apparatus for providing a stepwise warning according to a driver state according to an embodiment of the present invention includes an input part 710 configured to receive a driver state detection result, a memory 720 in which a program for classifying warning steps using the driver state detection result and providing a predetermined warning according to the driver state detection result is stored, and a processor 730 configured to execute the program. The processor 730 provides a warning using a warning message output, a warning sound output, lamp lighting, and the like.

The processor 730 outputs a warning message using the upper display disposed above the lower display disposed in the cockpit, and controls to output the warning message when a predetermined warning step is on the upper display that moved to a passenger side according to a passenger mode.

The processor 730 controls to output a warning sound to a passenger headrest speaker according to a predetermined warning step.

The processor 730 provides a warning for a predetermined period of time according to warning steps classified using the driver state detection result.

The processor 730, as a first step, outputs a warning message to a cluster and turns a cluster ambient lamp on.

The processor 730, as a second step, controls an interior mood lamp to be additionally turned on, and to output a warning sound.

The processor 730, as a third step, controls to change and display colors of the cluster ambient lamp and the interior mood lamp, controls a beep to be output at a faster reproduction speed, and turns an emergency light on.

Figure 64:
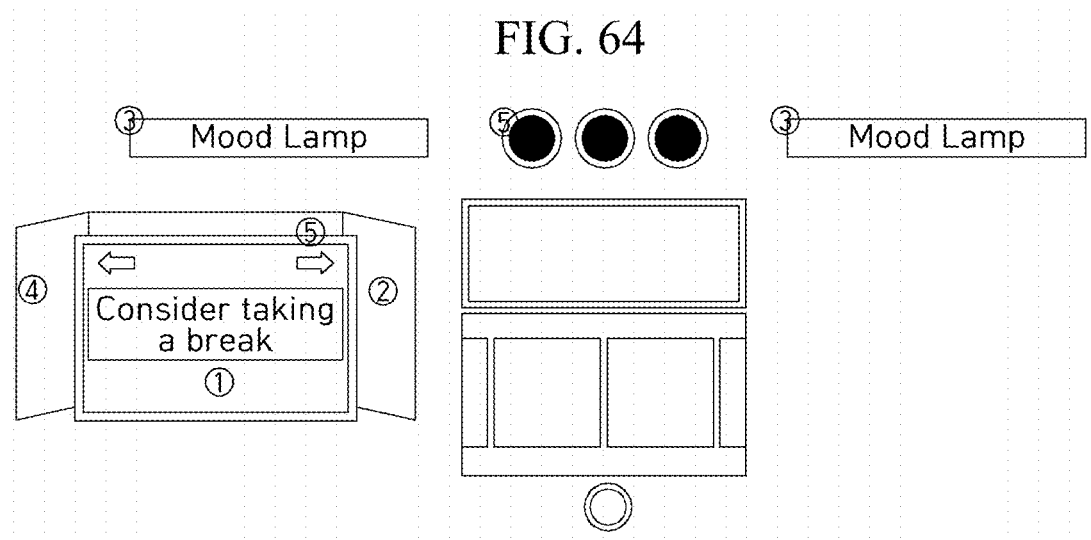
FIG. 64 illustrates driver state warning (DSW) implementation in a driver mode according to an embodiment of the present invention.

FIG. 64 illustrates DSW implementation in a driver mode according to an embodiment of the present invention.

When negligence in keeping eyes forward, fatigue, or drowsiness is detected in the driver mode, the cluster is provided with a warning message through a warning pop-up.

The cluster ambient lamp flashes with different colors according to the warning step.

The mood lamp flashes with different colors according to the warning step.

The blooming sound is reproduced with a different warning sound according to the warning step.

Whether the emergency light flashes is determined according to the warning step.

The configuration and definition in DSW implementation in the driver mode are as summarized in Table 25 below.

TABLE 25

| No. | Component | Description |
|---|---|---|
| 1 | Cluster warning pop-up | Display negligence in keeping eyes forward warning phrase<br>Display fatigue/drowsiness warning phrase |
| | Cluster ambient lamp | First/second warning steps: flash default color<br>Third warning step: flash red color |
| 3 | Mood lamp | Second warning step: flash default color<br>Third warning step: flash red color |
| 4 | Blooming sound | Second/third warning steps: reproduce warning sound |
| 5 | Emergency light | Third step warning: flash emergency light |

Figure 65:
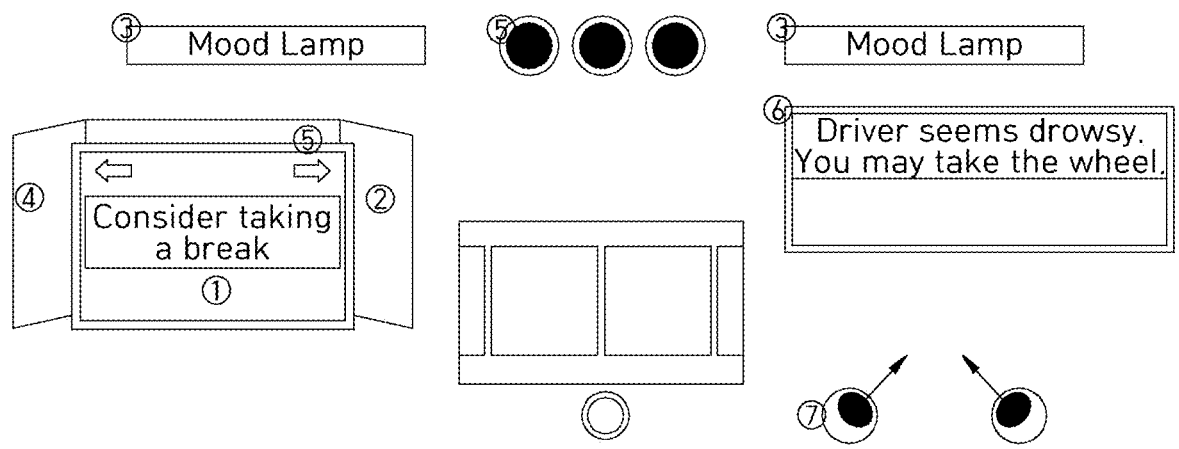
FIG. 65 illustrates DSW implementation in a passenger mode according to an embodiment of the present invention.

FIG. 65 illustrates DSW implementation in the passenger mode according to an embodiment of the present invention.

When negligence in keeping eyes forward, fatigue, or drowsiness is detected in the passenger mode, the cluster is provided with a warning message through warning pop-up.

The cluster ambient lamp flashes with different colors according to the warning step.

The mood lamp flashes with different colors according to the warning step.

The blooming sound is reproduced with a different warning sound according to the warning step.

Whether the emergency light flashes is determined according to the warning step.

The upper display is in a state of being moved toward the passenger side according to the passenger mode, and a driver state classification result and a warning message according to the driver state classification result are provided to the upper display.

The passenger headrest speaker outputs different warning sounds due to the warning steps according to the driver state.

The configuration and definition in the DSW implementation in the passenger mode are as summarized in Table 26 below.

TABLE 26

| No. | Component | Description |
|---|---|---|
| 1 | Cluster warning pop-up<br>Cluster ambient lamp | Same as driver mode |

TABLE 26-continued

| No. | Component | Description |
|---|---|---|
| 3 | Mood lamp | |
| 4 | Blooming sound | |
| 5 | Emergency light | |
| 6 | 12.3" passenger display | Display negligence in keeping eyes forward warning phrase<br>Display fatigue/drowsiness warning phrase |
| 7 | Headrest Speaker | Second/third step warnings: reproduce warning sound |

Figure 66B:
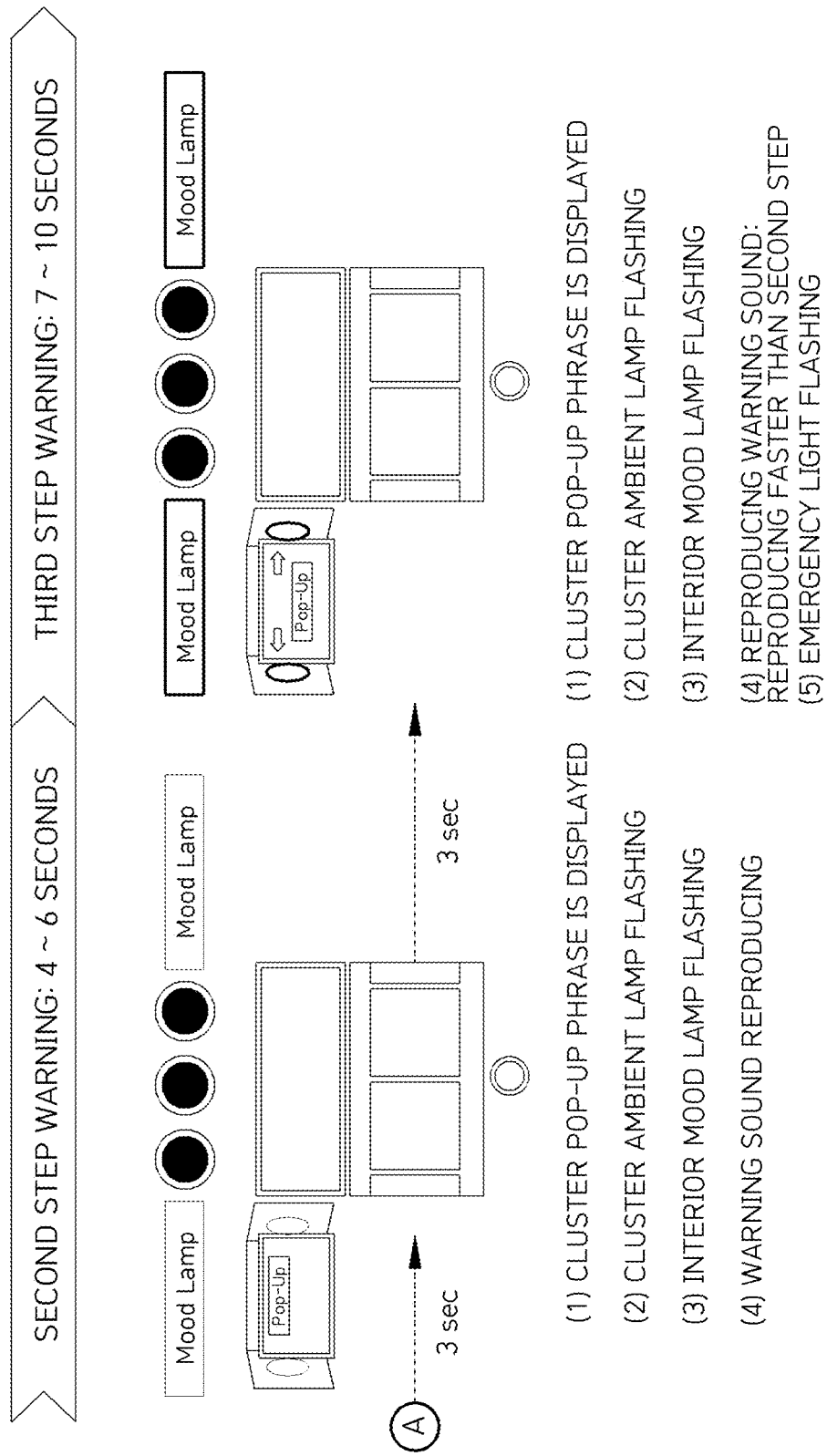

FIGS. 66A and 66B illustrate a stepwise warning-providing process in the driver mode according to an embodiment of the present invention.

When negligence in keeping eyes forward, fatigue, or drowsiness is detected during driving, as a first step warning, a cluster pop-up phrase is displayed and a cluster ambient lamp is turned on.

As a second step warning, a cluster pop-up phrase is displayed, the cluster ambient lamp is turned on, the interior mood lamp is turned on, and a warning sound is reproduced using the in-vehicle speaker.

As a third step warning, a cluster pop-up phrase is displayed, the cluster ambient lamp is turned on in a color (e.g., red color) different from that in the second step, and the interior mood lamp is turned on in a color (e.g., red color) different from that in the second step, and a warning sound (e.g., a warning sound reproduced with a faster period), which is different from that in the second step, is reproduced using the in-vehicle speaker, and the emergency light is turned on.

FIGS. 67A and 67B illustrate a stepwise warning-providing process in the passenger mode according to an embodiment of the present invention.

When negligence in keeping eyes forward, fatigue, or drowsiness is detected during driving, as a first step warning, a cluster pop-up phrase is displayed and the cluster ambient lamp is turned on.

As a second step warning, a cluster pop-up phrase is displayed, the cluster ambient lamp is turned on, the interior mood lamp is turned on, and a warning sound is reproduced using the in-vehicle speaker. In addition, a warning message is provided using the upper display moved to the passenger side according to the passenger mode.

As a third step warning, a cluster pop-up phrase is displayed, the cluster ambient lamp is turned on in a color (e.g., red color) different from that in the second step, and the interior mood lamp is turned on in a color (e.g., red color) different from that in the second step, and a warning sound (e.g., a warning sound reproduced with a faster period), which is different from that in the second step, is reproduced using the in-vehicle speaker, and the emergency light is turned on. In addition, a warning message is provided to the upper display, and a warning sound is output through the passenger headrest speaker.

Meanwhile, the method according to an embodiment of the present invention may be implemented in a computer system or recorded in a recording medium. The computer system may include at least one processor, a memory, a user input device, a data communication bus, a user output device, and a storage. Each of the components described above performs data communication over the data communication bus.

The computer system may further include a network interface coupled to a network. The processor may be a central processing unit (CPU), or a semiconductor device that processes instructions stored in the memory and/or storage.

The memory and storage may include various types of volatile or non-volatile storage media. For example, the memory may include a read-only memory (ROM) memory and a random access memory (RAM).

Accordingly, the method according to an embodiment of the present invention may be implemented as a computer-executable method. When the method according to an embodiment of the present invention is performed in a computer device, computer-readable instructions may perform the method according to the present invention.

According to the present invention, an integrated search is performed using upper/lower displays arranged in an integrated cockpit, so that there is an effect of increasing search convenience of a driver and a passenger.

It should be noted that objects of the present invention are not limited to the above-described object, and other objects of the present invention will be apparent to those skilled in the art from the following descriptions.

What is claimed is:

1. A system for conducting a search using multiple displays, the multiple displays comprising a lower display positioned at a cockpit and an upper display positioned above the lower display, the system comprising:
   a processor; and
   a computer-readable medium in communication with the processor and storing instructions that, when executed by the processor, cause the processor to control the system to perform:
      receiving, from a user via a user interface, a first user input requesting to initiate an integrated search session;
      in response to receiving the first user input, performing:
         displaying, on the upper display, a plurality of first lists respectively corresponding to a plurality of menu categories, each first list including a plurality of selectable items of the corresponding menu category that are arranged in an order of usage recency;
         displaying, on the lower display, (1) an integrated search window configured to display a search word provided by the user and (2) a plurality of buttons respectively corresponding to the plurality of menu categories, each button being associated with the most frequently used selectable item of the corresponding menu category;
      receiving, from the user via the user interface, a second user input containing a search word including one or more characters; and
      in response to receiving the second user input, performing:
         displaying, on the integrated search window, the one or more characters of the received search word; and
         replacing the plurality of first lists displayed on the upper display with a plurality of second list, respectively, each second list including a plurality of selectable items of the corresponding menu category that are relevant to the one or more characters of the received search word.

2. The system of claim 1, wherein the instructions, when executed by the processor, further cause the processor to control the system to perform:
   receiving, from the user via the user interface, a user input identifying a user profile; and
   in response to receiving the user input, displaying a search result for each of the plurality of menu categories relevant to the identified user profile and a search word.

3. The system of claim 1, wherein, for displaying the integrated search window on the lower display, the instructions, when executed by the processor, further cause the processor to control the system to perform:
   detecting that an app function is being executed on the upper display; and
   in response to detecting the app function being executed on the upper display, displaying the integrated search window on the lower display.

* * * * *